(12) United States Patent
Hayashi et al.

(10) Patent No.: US 7,309,146 B2
(45) Date of Patent: Dec. 18, 2007

(54) BACKLIGHT HAVING DISCHARGE TUBE, REFLECTOR AND HEAT CONDUCTION MEMBER CONTACTING DISCHARGE TUBE

(75) Inventors: Keiji Hayashi, Kawasaki (JP); Tetsuya Kobayashi, Kawasaki (JP); Tetsuya Hamada, Kawasaki (JP); Takeshi Gotoh, Kawasaki (JP); Toshihiro Suzuki, Kawasaki (JP); Mari Sugawara, Kawasaki (JP); Akio Sotokawa, Kawasaki (JP); Seiji Hachisuka, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/100,136

(22) Filed: Apr. 6, 2005

(65) Prior Publication Data
US 2005/0179352 A1    Aug. 18, 2005

Related U.S. Application Data

(62) Division of application No. 10/005,259, filed on Dec. 4, 2001, now Pat. No. 7,164,224.

(30) Foreign Application Priority Data

| Dec. 14, 2000 | (JP) | ............................. 2000-380205 |
| Jan. 19, 2001 | (JP) | ............................. 2001-012333 |
| Mar. 19, 2001 | (JP) | ............................. 2001-78546 |
| May 16, 2001 | (JP) | ............................. 2001-146925 |

(51) Int. Cl.
*F21V 29/00* (2006.01)

(52) U.S. Cl. ...................... 362/294; 362/260; 362/614; 313/46

(58) Field of Classification Search .................. 313/46; 362/260, 294, 373, 614
See application file for complete search history.

(56) References Cited

U.S. PATENT DOCUMENTS

| 3,777,199 A | 12/1973 | Davis |
| 4,147,947 A | 4/1979 | Hoeh |

(Continued)

FOREIGN PATENT DOCUMENTS

EP    859 270    8/1998

(Continued)

OTHER PUBLICATIONS

"Fluorescent Lamp Definition"—http://www.hyperdictionary.com/dictionary/flourescent+lamp- Dec. 2, 2004.

(Continued)

*Primary Examiner*—Stephen F. Husar
(74) *Attorney, Agent, or Firm*—Greer, Burns, & Crain, Ltd.

(57) ABSTRACT

A display device includes a backlight having a discharge tube and a reflector. A heat conduction member is attached to the reflector in contact with the discharge tube, so that a part of the discharge tube is locally cooled by the heat conduction member. Liquid mercury is collected at a first position in the discharge tube, and the backlight is assembled so that the heat conduction member or other cooling device is located at the first position. Also, the display device includes an optical sheet having a diffusion portion having projections containing scattering material particles.

11 Claims, 85 Drawing Sheets

U.S. PATENT DOCUMENTS

| | | |
|---|---|---|
| 4,409,511 A | 10/1983 | Loda et al. |
| 4,931,685 A | 6/1990 | Dobashi et al. |
| 4,978,890 A | 12/1990 | Sekiguchi et al. |
| 5,495,143 A * | 2/1996 | Lengyel et al. ............. 313/574 |
| 5,612,593 A * | 3/1997 | Olson .......................... 313/13 |
| 5,828,169 A * | 10/1998 | Myojo et al. ................ 313/490 |
| 5,828,488 A | 10/1998 | Ouderkirk et al. |
| 6,018,214 A | 1/2000 | De Vaan |
| 6,024,465 A | 2/2000 | Kobayashi |
| 6,804,058 B1 | 10/2004 | Ouderkirk et al. |
| 2002/0012169 A1 | 1/2002 | Kashima |
| 2004/0051429 A1 | 3/2004 | Hayashi et al. |

FOREIGN PATENT DOCUMENTS

| | | |
|---|---|---|
| JP | 38-00439 | 10/1959 |
| JP | 38-00596 | 10/1959 |
| JP | 54-044372 | 4/1979 |
| JP | 60-168134 | 1/1985 |
| JP | 60168134 | 8/1985 |
| JP | 03-274605 | 12/1991 |
| JP | 5-225819 | 9/1993 |
| JP | 6-273762 | 9/1994 |
| JP | 6-324304 | 11/1994 |
| JP | 7-130477 | 5/1995 |
| JP | 7-175035 | 7/1995 |
| JP | 7-335015 | 12/1995 |
| JP | 08-055608 | 2/1996 |
| JP | 8-146207 | 6/1996 |
| JP | 8-320487 | 12/1996 |
| JP | 9-5739 | 1/1997 |
| JP | 9-15404 | 1/1997 |
| JP | 9-304607 | 11/1997 |
| JP | 10-20310 | 1/1998 |
| JP | 10-97199 | 4/1998 |
| JP | 10-246805 | 9/1998 |
| JP | 10-255527 | 9/1998 |
| JP | 11-084381 | 3/1999 |
| JP | 11-326618 | 11/1999 |
| JP | 11-329042 | 11/1999 |
| JP | 2000-56105 | 2/2000 |
| JP | 2000-173542 | 6/2000 |
| JP | 2000-323099 | 11/2000 |
| JP | 2001-6619 | 1/2001 |
| WO | 98/03898 | 1/1998 |

OTHER PUBLICATIONS

"Fluorescent Lamps, Ballasts, and Fixtures"-http://members.misty.com/don/f-lamp.html- Dec. 2, 2004.

"Howstuffworks "How Fluorescent Lamps Work""-http://home.howstuffworks.com/fluorescent-lamp2.htm- Dec. 2, 2004.

* cited by examiner

BACKLIGHT HAVING DISCHARGE TUBE, REFLECTOR AND HEAT CONDUCTION MEMBER CONTACTING DISCHARGE TUBE

This Application is a Divisional of parent application Ser. No. 10/005,259, filed Dec. 4, 2001 now U.S. Pat. No. 7,164,224.

BACKGROUND OF THE INVENTION

1. Field of the Invention

This invention relates to a backlight, of a display device, having a discharge tube emitting light during discharge in a lean gas and to a method of manufacturing a backlight, and a display device.

2. Description of the Related Art

A backlight, of a display device such as a liquid crystal display device, uses a light source device comprising one or a plurality of discharge tubes and a reflector. The discharge tube is a cold cathode tube, in which mercury and argon (Ar) gas or neon (Ne) gas are sealed and a fluorescent material is coated on the tube wall. Mercury gas generates ultraviolet light during discharge, and the ultraviolet light impinges against the fluorescent material and generates visible light.

The backlight of most of liquid crystal display devices includes a light guide plate. In one example, two light source devices are disposed on opposite sides of the light guide plate in such a manner as to face each other. Each light source device comprises two discharge tubes and a reflector. In this arrangement, two discharge tubes having a diameter of several millimeters are disposed in a narrow region of not greater than 10 mm. Therefore, the ambient temperature around the discharge tubes often reaches 70° C. or more.

The light intensity-temperature characteristics of a discharge tube have a tendency such that the light intensity drops in a high temperature region for the following reason. First, considering the amount of ultraviolet light generated by the mercury gas, the amount is substantially proportional to the mercury gas concentration and the current. On the other hand, mercury gas has the property of absorbing ultraviolet light, and the absorption factor changes exponentially, with the product of the mercury gas concentration, over the distance the ultraviolet light must travel (the transmission factor changes as the concentration and the distance of transmission become greater). The ultraviolet light is converted into visible light by the fluorescent material coated on the tube wall. The product of the diameter of the discharge tube and the concentration of the mercury gas determines the probability of the incidence of one UV photon on the fluorescent material. From the explanation given above, the light intensity I of the visible light can be expressed as follows, wherein "d" is the tube diameter, "n" is the mercury gas concentration (a function of the temperature of discharge tube) and "J" is the current.

$$I \sim k(J \times n) \times \exp(-b \times n \times d) \quad (1)$$

(where k and b are proportional constants.)

Equation (1) shows that I is likely to assume the maximum value for a predetermined mercury gas concentration n, and when the mercury gas concentration becomes higher than this predetermined concentration n, the intensity of the visible light drops. The mercury gas concentration changes exponentially with the temperature of the mercury gas and, therefore, the brightness becomes lower in a high temperature region as the tube temperature becomes higher. Since the tube temperature becomes higher as the current increases, the intensity of the visible ray decreases when the current is increased at a predetermined ambient temperature. These decreases cause a problem when the brightness of the backlight is to be increased.

Japanese Unexamined Patent Publication (Kokai) No. 5-225819 discloses control of the brightness of a discharge tube by fitting a cooling metal device to the discharge tube to cool the whole discharge tube.

Japanese unexamined Patent Publication (Kokai) No. 60-16813 discloses a light source for a copying machine. This light source comprises a fluorescent lamp, a lamp heater encompassing the fluorescent lamp and a heat pump disposed at a notched portion of the lamp heater. The heat pump absorbs heat from the tube wall of the fluorescent lamp and controls the light intensity of the fluorescent lamp by controlling the mercury vapor pressure in the fluorescent lamp tube.

However, it is difficult to apply the technology of fitting the cooling metal device for the discharge tube to the light source device of the backlight of the display device. That is, as the tube diameter is small in the backlight of the display device and a reflector exists around the discharge tube, a large cooling metal device cannot be fitted to the discharge tube. Also, leakage of current through the cooling metal device becomes large and, as the backlight of the display device has smaller power consumption than the fluorescent lamp for ordinary illumination, the discharge tube is likely to be excessively cooled. For these reasons, this technology is not practical.

The light source device having a lamp heater that encompasses the fluorescent lamp cannot be used for the backlight of the liquid crystal display device.

Japanese Unexamined Patent Publication (Kokai) No. 2000-323099 discloses a method of fabricating a fluorescent lamp in which liquid mercury gathers at the central portion of a fluorescent lamp to prevent the central portion of the fluorescent lamp from becoming dark for several seconds of its use after the lamp is left standing for a long time in a cold environment, because liquid mercy gathers at the ends of the fluorescent lamp. This prior art discloses that when the fluorescent lamp is cooled and the temperature of its central portion becomes lower, by about 10° C., than the temperature at the ends thereof, liquid mercury gathers at the central portion of the fluorescent lamp. In practice, however, almost all the liquid mercury in the fluorescent lamp does not gather at one position in the fluorescent lamp.

A study of small diameter discharge tubes, for use in the backlight, conducted by the inventors has revealed that almost all the liquid mercury does not gather at a position remote from the end portions of a discharge tube having the inner diameter of 5 mm or below even when the discharge tube is assembled into a backlight. When electric current is applied to activate the discharge tube, liquid mercury generally gathers at one of the end portions because of the asymmetry of the waveform.

Even when the waveform is symmetric, liquid mercury that is arbitrarily distributed in the discharge tube does not gather easily at one position in the discharge tube of a backlight using a thin glass tube of 5 mm or less, because the tube is thin and contains an amount of liquid mercury considerably greater than the amount of the gaseous mercury necessary for discharge. According to experiments conducted by the inventors, a time of 200 to 1,000 hours is necessary to collect the liquid mercury at one position in the discharge tube. During the process in which liquid mercury gathers at one position, degradation of the fluorescent lamp proceeds and the brightness drops.

According to one aspect, the present invention provides a backlight capable of improving brightness by forming a most-cooled portion at a predetermined position in a discharge tube. However, it has been found that, in such a backlight, the desired improvement of brightness cannot be achieved unless liquid mercury is collected at the predetermined position. In another aspect, therefore, the present invention provides a backlight in which liquid mercury is collected at a predetermined position of a discharge tube, and this predetermined position is the most cooled portion.

The display device having the backlight containing the discharge tube involves another problem in that, even when the current supplied to the discharge tube is increased, the brightness does not increase much.

In the case of the liquid crystal display device using linearly polarized light, only a half of light of a non-polarized light source is utilized, hence, the utilization efficiency of light is low. A proposal is therefore made to dispose a polarization separating element in the backlight of the display device to improve utilization efficiency of light. The polarization separating element comprises a reflection type polarization plate (polarization separating sheet) sandwiched between a light guide plate and a liquid crystal panel. The reflection type polarization plate allows first linearly polarized light of the ray of light traveling from the light guide plate to the reflection type polarization plate to transmit therethrough but reflects second linearly polarized light having a plane of polarization crossing orthogonally the plane of polarization of first linearly polarized light. The plane of polarization of second linearly polarized light, that is again made incident to the light guide plate, is converted by means for converting the second linearly polarized light to first linearly polarized light. Therefore, the second linearly polarized light travels again as first linearly polarized light from the light guide plate to the reflection type polarization plate and is transmitted through the latter in this way, the utilization efficiency of the light can be improved, and a display device having higher brightness can be achieved.

In the conventional backlight, a diffusion reflection plate is disposed as first means for converting second linearly polarized light to first linearly polarized light below the light guide plate. Second linearly polarized light that is reflected by the reflection type polarization plate and is again made incident to the light guide plate is scattered and reflected by the diffusion reflection plate to non-polarized light. As the non-polarized light is thus made incident to the reflection type polarization plate, at least a part of the second linearly polarized light can be utilized, and utilization efficiency of light can be improved in comparison with the case where second linearly polarized light is not at all utilized. However, a part of second linearly polarized light is scattered and reflected by the diffusion reflection plate, is scattered in the periphery of the light guide plate without traveling from the light guide plate to the reflection type polarization plate, and is absorbed by the light source and the casing. Therefore, the utilization efficiency of light is still limited.

In another example, a λ/4 plate is disposed as second means for converting second linearly polarized light into first linearly polarized light below the reflection type polarization plate, and an isotropic metal mirror is disposed below the light guide plate. Second linearly polarized light reflected by the reflection type polarization plate passes through the λ/4 plate, changes to left (right) circularly polarized light, is reflected by the isotropic metal mirror, changes to right (left) circularly polarized light, again passes through the λ/4 plate and changes to first linearly polarized light. Since first linearly polarized light transmits through the reflection type polarization plate, utilization efficiency of light is improved. In this case, however, the isotropic metal mirror absorbs the rays of light, so that utilization efficiency of light is limited, too.

In addition, backlights of the liquid crystal display device include a "side light type" backlights and a "direct illumination type" backlights. The side light type backlight includes a light guide plate and a light source disposed on the side of the light guide plate, and has the advantage that a thin liquid crystal display device can be provided. The direct illumination type backlight includes a light source radiating the ray of light to the liquid crystal display device, and has the advantage that a high brightness of the liquid crystal display device can be accomplished. However, the direct illumination type backlight cannot easily provide a liquid crystal display device that is thin and has low power consumption, and involves the problem that non-uniformity of brightness is likely to occur. Therefore, the side light type backlight has gained a wider application in recent years.

Besides the light guide plate and the light source described above, the side light type backlight includes a reflection mirror (reflection film) disposed below the light guide plate (on the far side from the liquid crystal panel) and an optical sheet disposed above the light guide plate (on the near side to the liquid crystal panel). The light outgoing from the light source is made incident to the light guide plate. While the light propagates in the light guide plate, the reflection mirror reflects a part of the light, and the reflected light goes from the light guide plate and is made incident to the liquid crystal panel through the optical sheet.

The optical sheet regulates the brightness distribution of light outgoing from the light guide plate. In other words, since the light going from the light guide plate contains a large quantity of the light that describes a large angle to the normal to the light guide plate, the optical sheet mainly converts the light describing a large angle to the normal to the light guide plate into the light describing a small angle to the normal to the light guide plate.

FIG. 123 illustrates a prism sheet as one of the optical sheets. The prism sheet 1 is a transparent sheet having a large number of prisms 2 formed thereon. The light X made incident to the prism sheet 1 with a large angle to the normal of the prism sheet 1 goes from the prism sheet 1 with a small angle to the normal of the prism sheet 1. Therefore, an observer of a liquid crystal panel behind the prism sheet 1 can easily view the liquid crystal panel from the front surface. On the other hand, the prism 2 reflects the light Y that is made incident to the prism sheet 1 along the normal of the prism sheet 1. Therefore, this ray Y returns.

Incidentally, Japanese Unexamined Patent Publications (Kokai) No. 6-273762, No. 8-146207, No. 9-15404, No. 10-97199, No. 10-246805 and No. 2000-56105 disclose examples of the prism sheets and the scatter sheets. Japanese Unexamined Patent Publication (Kokai) No. 11-329042 describes an example of the planar light source.

As described above, the prism sheet 1 has fine prisms 2 formed on the sheet surface in order to allow the light, that is made incident to the prism sheet 1 at an angle in an oblique direction, to enter in the front surface direction or at an angle approximate to the front surface. In this prism sheet 1, the quantity of the outgoing light within the outgoing angle range determined by the shape of the prisms 2 is large, and the quantity of the outgoing light outside the outgoing angle range drops drastically. In other words, the brightness distribution of the light made incident to the liquid crystal panel changes drastically. Therefore, the conventional technology combines the prism sheet 1 with the scatter sheet containing scattering material particles to achieve a wide brightness distribution such that the quantity of the light at an angle in the normal direction becomes maximum and becomes progressively smaller as the angle becomes greater, from the normal direction. The light Y made incident to the prism sheet 1 along the normal to the prism sheet 1 is returned to the light guide plate side, and utilization efficiency of light drops. Further, the light X that is inclined to one side leaves from near one of the ends of the light guide plate, and the light Z inclined to the other side outgoes from near the other end of light guide plate. This tendency remains even after the light is transmitted through the prism sheet.

The production cost of the prism sheet 1 is high because the fine prisms 2 must be fabricated accurately in the prism sheet 1. The prism sheet 1 itself does not have a light absorbing property, but the ray of light returned towards the light guide plate is absorbed by the reflecting mirror, the light source, the casing frame, etc, with a drop in utilization efficiency. When the prism sheet and the scatter sheet containing the scattering material particles are used in combination, the production cost increases due to an increase in the cost of the sheet itself and an increase in the cost and the number of assembly steps. Further, a problem of a drop in the yield occurs because dust appears between the prism sheet and the scatter sheet.

As the thickness of the liquid crystal display device is required to be smaller and smaller, the light guide plate becomes smaller and smaller, too. When the thickness of the light guide plate is reduced, however, the quantity of incoming light from the sides of the light guide plate becomes small. Therefore, a reduction of thickness of the side edge type backlight is limited.

To cope with a reduction in the thickness of the light guide plate, a method has been proposed to input the rays of light from the upper or lower surface of the light guide plate (e.g. Japanese Unexamined Patent Publication (Kokai) No. 11-329042). This proposal employs a structure in which a part of a flexible film is curved to form a cylindrical portion and the light source is positioned in this cylindrical portion so as to guide the light received from the cylindrical portion to other portions of the flexible film. However, according to this construction, a part of the light irradiated from the light source onto a part of the cylindrical portion is guided to other portions, but another part of the light travels to the other side of the flexible film. Furthermore, the scatter-reflection layer reflects still another part of the light irradiated from the light source to the cylindrical portion, and the light returns to the light source lowering, thereby, the utilization efficiency of light.

SUMMARY OF THE INVENTION

It is an object of the present invention to provide a backlight capable of improving brightness by forming the most cooled portion at a predetermined position of a discharge tube, a display device and a production method thereof.

It is another object of the present invention to provide a backlight of a display device that has high utilization efficiency of light and can be used in a liquid crystal display device, for example.

It is still another object of the present invention to provide a display device capable of greatly changing brightness.

It is still another object of the present invention to provide an optical sheet having a suitable brightness distribution and capable of being economically produced, and an illumination apparatus.

It is still another object of the present invention to provide an optical member capable of inputting large quantities of light even when it assumes the form of a thin sheet-like optical member.

It is a further object of the present invention to provide a light source device having a long operating life.

A backlight, according to the present invention, includes a discharge tube, a reflector for reflecting a ray of light emitted from the discharge tube, and a heat conduction member attached to the reflector in contact with a part of the discharge tube, so that a part of the discharge tube is locally cooled by the heat conduction member. In this construction, there is an optimum value for a concentration of a light emitting substance charged in the discharge tube, such as a mercury gas, to make the light emission quantity maximum. The optimum value is substantially constant irrespective of a current. On the basis of this result, the inventors have devised a method for maintaining the concentration of the mercury gas irrespective of the gas temperature.

Assuming that the optimum concentration of the mercury gas is "n" and the inner capacity of the discharge tube is "V", the concentration is below "n" irrespective of the temperature if mercury is chargedonly to nV or below in the discharge tube. At present, however, mercury in the mount 1,000 times the necessary amount is charged to secure life of the discharge tube.

Of the amount of mercury described above, when the excessive amount with respect to nV is concentrated on a portion of the discharge tube whose temperature can be controlled, the mercury gas pressure in the discharge tube is equal to the saturation vapor pressure of mercury at the temperature of liquid crystal at the controlled portion of the discharge tube. Micro regions having an equal temperature are defined when the temperature distribution in the discharge tube reaches an equilibrium under the condition where the temperature of the portions of the discharge tube other than the temperature controlled portion is higher. Since input/output of the mercury atoms is equal among these micro regions, the mercury gas pressure is equal throughout the whole region. As to the equation of a state of the mercury gas, on the other hand, the concentration of the mercury gas (atomic concentration) of each micro region is inversely proportional to the temperature of the mercury gas because the temperature follows the equation in the respective micro regions. It can be therefore said that the mercury gas concentration (atomic concentration) becomes lower in a higher temperature range. When the temperature inside the discharge tube is elevated to a level higher than that of the temperature controlled portion, the concentration of the mercury gas reaches maximum at the temperature controlled portion and is lower at the other portions because the pressure reaches a maximum at each point and the pressure is constant at each point.

When the temperature of the portion of the discharge tube, the temperature of which is to be controlled, is set to the temperature that gives the optimum mercury gas concentration, the discharge tube can be brought, as a whole, into a condition of maximum light emission quantity. To accomplish this temperature condition, the following means can be employed.

A heat conduction member for releasing heat from the discharge tube is brought into the temperature-controlled portion and is fitted to the reflector. The heat conductivity of this heat conduction member is set to the range that can be controlled to the temperature described above. When the heat conduction member is at an ordinary room temperature (20° C.), heat generated by the discharge tube must be escaped to provide a temperature difference of 50° C. in order to keep the surface temperature of the discharge tube that gives maximum brightness. Heat conduction in the transverse direction is small inside the discharge tube. Therefore, it is necessary to discharge only heat generated in the contact area with the heat conduction member. Assuming that the proportion of energy converted into heat is $\eta$, from the energy inputted to the discharge tube, and that this heat is uniformly discharged on the entire surface of the discharge tube, the calories per unit length is approximated to $\eta \times W/L$. Heat of $\eta \times a \times W/L$ is generated in the length a in which the heat conduction member keeps contact. Therefore, this heat must be escaped to provide the temperature difference of 50° C. In other words, the heat resistance of the heat conduction member must be at least $0.02 \times \eta \times a \times W/L$ (W/K).

The heat conduction member is a solid article. It is preferably a nonmetal. Further, the heat conduction member is made of at least one of heat conductive resin, heat conductive rubber and heat conductive adhesive. The upper limit of energy consumption of the discharge tube is determined so that heat radiation by using a silicone rubber can attain an optimum temperature. A hole smaller than the tube diameter is bored in the solid article, and the discharge tube is fixed to the hole. The heat conduction member is bonded to the reflector or to the discharge tube in a boding state equal to or stronger than a hydrogen bond. Alternatively, the heat conduction member uses a viscous material. The portion at which the heat conduction capacity drops most greatly is the interface between substances. It is known that heat conductivity of the interface is the highest on the bonded interface, next on the adhering interface and the lowest on the interface merely keeping contact. To lower the temperature of the discharge tube, therefore, the heat conduction member is more preferably bonded to both discharge tube and reflector. Heat conductivity is better in the structure in which the heat conduction member itself is fixed to the discharge tube (or the reflector) than the structure in which the heat conduction member and the discharge tube (or the reflector) are bonded through an adhesive material disposed separately. The former is preferred to the latter. Preferably, the heat conduction member is in a stronger bonding state with at least one of the discharge tube and the reflector than a hydrogen bond. (This tendency is particularly remarkable when a silicone type heat conduction member is used).

The present invention employs the construction for evaporating an operating material for heat conduction in the proximity of the discharge tube. Therefore, this construction can deprive the discharge tube of heat and can speed up heat radiation. The present invention uses a heat siphon for heat conduction, condenses the operation material at the upper part and refluxes it by gravity. The present invention can also use a heat pipe for heat conduction.

Heat conductivity is increased in a high temperature zone with a temperature near the temperature at the time of turn-on as the boundary. A predetermined temperature at this time is brought close to the optimum temperature described above so that the mercury concentration of the whole discharge tube can be substantially optimized. To obtain a desired heat conduction performance, the present invention uses a material the boiling point of which is close to the predetermined temperature described above.

The heat discharge source is a reflector disposed around the discharge tube. It is also possible to dispose a heat radiation sheet that comes into contact with the heat conduction member or the reflector. The heat radiation plate can be arranged in such a fashion as not to come into contact with the heat conduction member below the predetermined temperature. The heat conduction member and/or a member in the proximity of the heat conduction member has a white color or is transparent to suppress light absorption. Brightness is maintained as a leaking current from the discharge tube is decreased.

A backlight of a display device according to another aspect of the present invention uses an interference type mirror having a multi-layered structure of a plurality of transparent film layers devoid of light absorption that is disposed below the heat conduction plate. A part, or the whole, of the plurality of film layers have birefringence. In the film layers having birefringence, two linearly polarized lights having the same wavelength substantially interfere with each other, or are reflected by different layers, so that a predetermined phase difference occurs in the reflected rays of light. The angle between the direction of the phase advance axis or the phase delay axis of the layer of the interference type mirror having birefringence and the direction of polarized light reflected by the polarization isolation device is set to about 45 degrees (within an angular range of 23 to 67 degrees).

As a result, it is possible to obtain a liquid crystal display device having high brightness in which the absorption loss and the scattering loss in the interference type mirror do not exist, the reflection factor can be brought to 100% (without the transmission loss), and the reflected light can more easily pass through the polarization isolation device.

The present invention further provides a backlight comprising a discharge tube which contains mercury and in which almost all liquid mercury other than the amount of gaseous mercury at the time of discharge is gathered at a first position spaced apart from the end portions of the discharge tube, and a cooling device for cooling the first position of the discharge tube. This backlight can be used without a change of light emission performance even when time passes.

The present invention further provides a method of producing a backlight having a discharge tube containing mercury, comprising the steps of collecting almost all liquid mercury other than the amount of gaseous mercury at the time of discharge to a first position of the discharge tube spaced apart from the end portions of the discharge tube, and then disposing a cooling device for cooling the first position of the discharge tube. The backlight produced by this production method can be used without a change of light emission performance even when time passes.

Preferably, the mercury comprises a plurality of mercury particles having a size of not greater than 0.2 mm or soaks into the fluorescent material applied to the inner wall of the discharge tube. According to this feature, liquid mercury collected at the first position does not move but is held at this first position, and light emission performance does not change.

Preferably, the cooling device includes a cooling capacity varying mechanism. According to this feature, light emission performance does not change even when the backlight is used in an environment having a large temperature change.

Preferably, the cooling device includes a movable heat conduction member. According to this feature, the backlight can be used without the change of light emission performance even when it is used in an environment having a large temperature change.

Further, the present invention provides a display device equipped with the backlight described above.

The present invention further provides a display device including a light source device comprising a discharge tube which contains mercury and in which liquid mercury is collected at a first position and a light source device capable of cooling the first position of the discharge tube and having a variable cooling capacity, and a display device illuminated by the light source device. According to this display device, brightness can be greatly changed by changing the current supplied to the discharge tube and changing the cooling capacity of the cooling device.

An optical sheet according to the present invention includes a diffusion portion having a plurality of spaced apart projections, facing to one side and having scattering property, and valley portions positioned between the projections, wherein a part of the light from the valley portion travels without coming into contact with the adjacent projections, another part of the light from the valley portion is made incident to the adjacent projections and is scattered by the projections, and the light passing through the projections is scattered by the projections and leaves the projections.

According to this construction, a part of the light from the valley portion travels at an angle within a predetermined range to the direction of the normal without coming into contact with adjacent projections. Another part of the light from the valley portion and incident into the adjacent projections enters the projections, is scattered by the projections or the surface of the projections, and leaves the projections as the scattered light. A part of the scattered light from the projections travels at an angle within a predetermined range to the normal direction without coming into contact with the adjacent projections, and another part of the scattered light from the projections is further incident into other projections and is scattered. Therefore, among the rays of light incident to the projections and scattered by the projections, the component of the light describing a large angle to the normal direction becomes the component of the light describing a small angle to the normal direction, and the outgoing light is gradually imparted with directivity. Therefore, a broad brightness distribution such that the quantity of the light at the angle of the normal direction is the greatest and the quantity of outgoing rays of light becomes progressively smaller as the angle to the normal direction becomes greater, can be obtained.

According to the present invention, such features can be accomplished by the following constructions.

An optical sheet including a diffusion portion having a plurality of spaced apart projections, facing one side and valley portions positioned between the projections, wherein a layer having a scattering property is disposed on the surface of the projections.

An optical sheet including a diffusion portion having a plurality of spaced apart projections, facing one side and having a scattering property and valley portions positioned between the projections, wherein each of the projections comprises a group of a plurality of small scattering material particles gathered together.

An optical sheet including diffusion portion having a plurality of spaced apart portions and having portions of non-uniform refractive index and portions positioned between the portions of non-uniform refractive index and having a uniform refractive index.

An optical sheet including a diffusion portion, the diffusion portion having a plurality of spaced apart wall members and having scattering property and openings formed between the wall members, wherein the wall member has first and second side surfaces opposing one another, and the wall member is constituted so that the ray of light is substantially scatter-reflected by the first and second side surfaces.

An optical sheet comprising a diffusion portion, the diffusion portion having a plurality of spaced apart projections, facing one side and having scattering property and valley portions positioned between the projections, and a reflecting mirror.

An optical sheet including a diffusion portion having a plurality of spaced apart portions having non-uniform refractive index and portions having a uniform refractive index and interposed between the portions having non-refractive index, wherein the diffusion portion comprises a mesh having filaments and an ink containing a resin, and the mesh is buried in said ink.

Further, the present invention provides an illumination device comprising a light source, a light guide plate into which the light of the light source is made incident, and an optical sheet disposed on one of the sides of the light conduction plate and having the features described above.

The present invention provides further a liquid crystal display device comprising a light source, a light guide plate into which the light of said light source is made incident, an optical sheet having the features described above, and a liquid crystal panel.

The present invention provides a production method of an optical sheet including a diffusion portion having a plurality of spaced apart projections, facing one side and having scattering property, and valley portions positioned between the projections, the method comprising the steps of screen-printing ink by using a mesh containing linear members crossing one another, and forming the diffusion portion having the projections and the valley portions positioned between the projections.

The present invention provides an optical member comprising a sheet-like body having a light turning region and a light guide region continuing the light turning region, wherein the light turning region has a plurality of spaced apart portions having a non-uniform refractive index and portions having a uniform refractive index and positioned between the portions having non-uniform refractive index, and the light guide region is a substantially transparent region.

The present invention also provides a light source device comprising a discharge tube, a reflector for reflecting a ray of light radiated from the discharge tube, and support members supporting the discharge tube on the reflector. The support members is formed of a heat insulating structure so as to prevent a temperature drop of a portion of the discharge tube near electrodes of the discharge tube. Or, the discharge tube is partially formed of a heat insulating structure so as to prevent a temperature drop of a portion of the discharge tube near electrodes of the discharge tube. Or, the support members are arranged at inward positions from ends of electrodes of the discharge tube so as to prevent a temperature drop of a portion of the discharge tube near the electrodes of the discharge tube. Or, a heat conduction member contacting a central portion of the discharge tube is provided, in addition to the support members.

BRIEF DESCRIPTION OF THE DRAWINGS

The present invention will become more apparent from the following description of the preferred embodiments, with reference to the accompanying drawings, in which:

FIGS. 118A to 118C are plan views showing arrangement examples of projections of the optical sheet;

FIG. 119 is a view explaining the construction and operation of the optical sheet;

FIG. 120 is a view explaining projections and valley portions of the optical sheet;

FIG. 121 is a diagram showing a brightness distribution of the light from the optical sheet;

FIG. 122 is a diagram showing a brightness distribution of the light from the projections of the optical sheet;

FIG. 123 is a view showing a prism sheet;

FIG. 124 is a view showing the optical sheet according to another example;

FIG. 125 is a diagram showing the brightness gain of the light of the optical sheet in FIG. 124;

FIGS. 126A to 126C are views explaining the operation of the optical sheet in FIG. 124;

FIGS. 127A to 127E are views explaining the operation of the optical sheet in FIG. 124, and showing the light from several points of side surfaces of projections and valley portions without coming into contact with adjacent projections;

FIGS. 128A and 128B are views showing examples of fabrication of the optical sheet by screen-printing using a mesh;

FIG. 129 is a view showing an example of the mesh used in FIG. 128;

Figure 124:
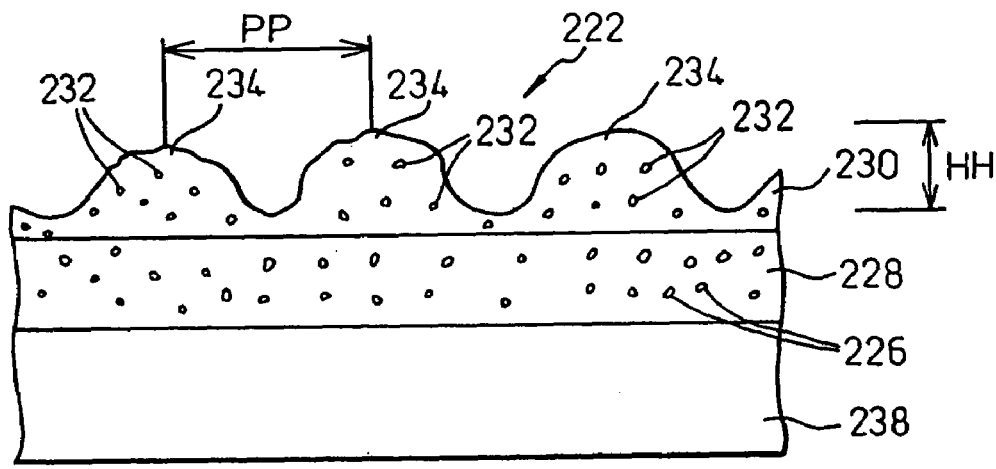
Figure 130A:
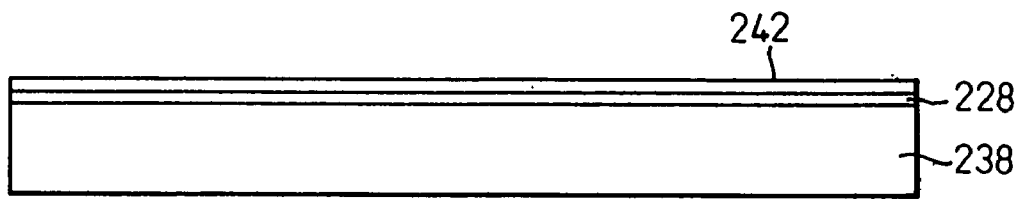
Figure 130B:
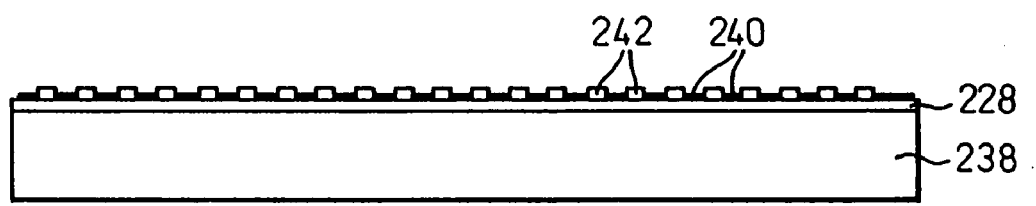
Figure 130C:
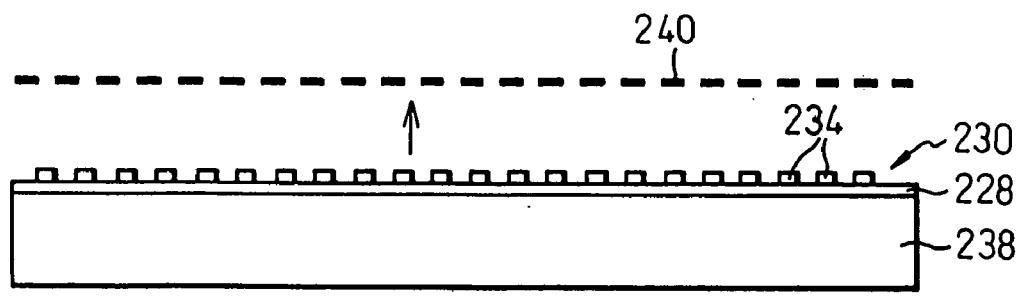
Figure 131A:
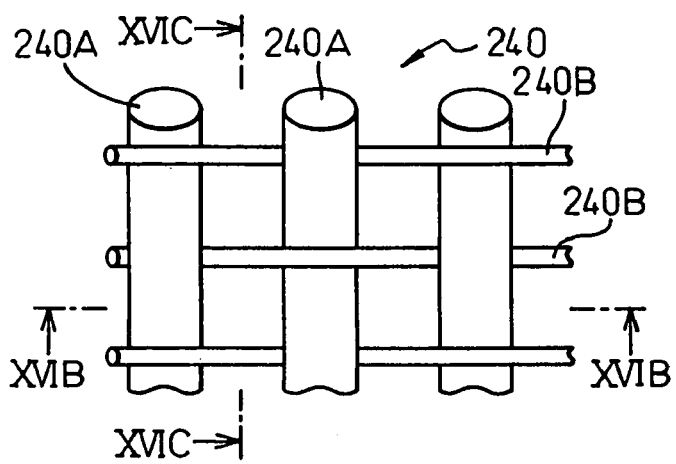
Figure 131C:
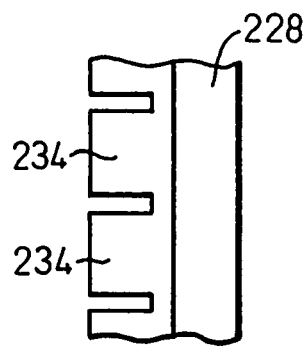
Figure 131B:
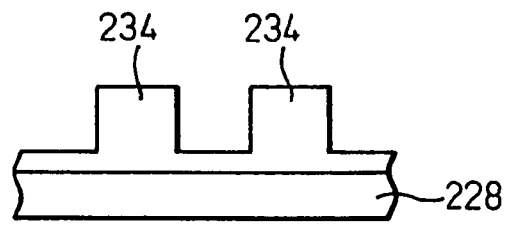
Figure 132:
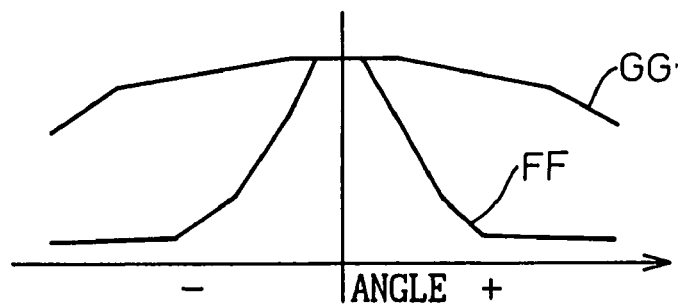
Figure 133:
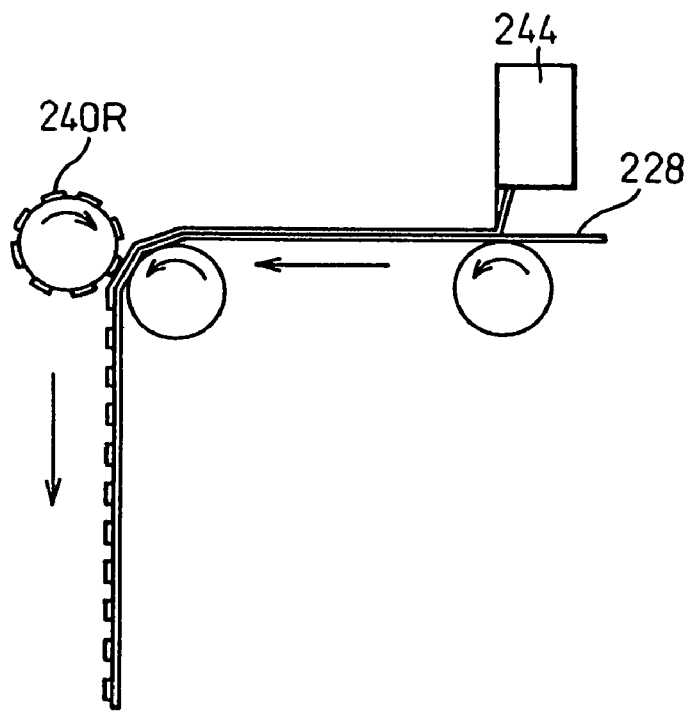
Figure 134:
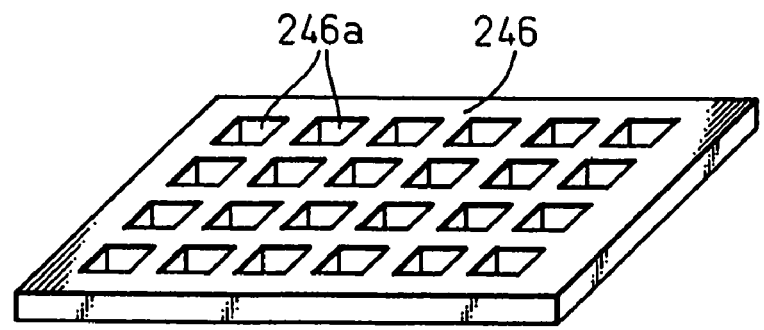
Figure 135:
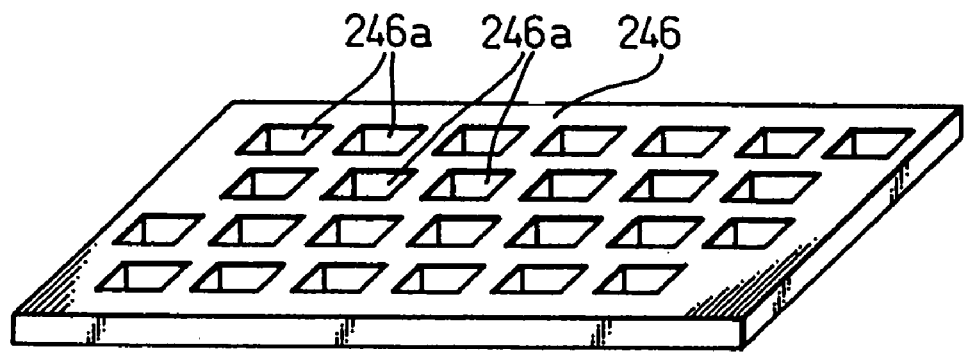
Figure 136:
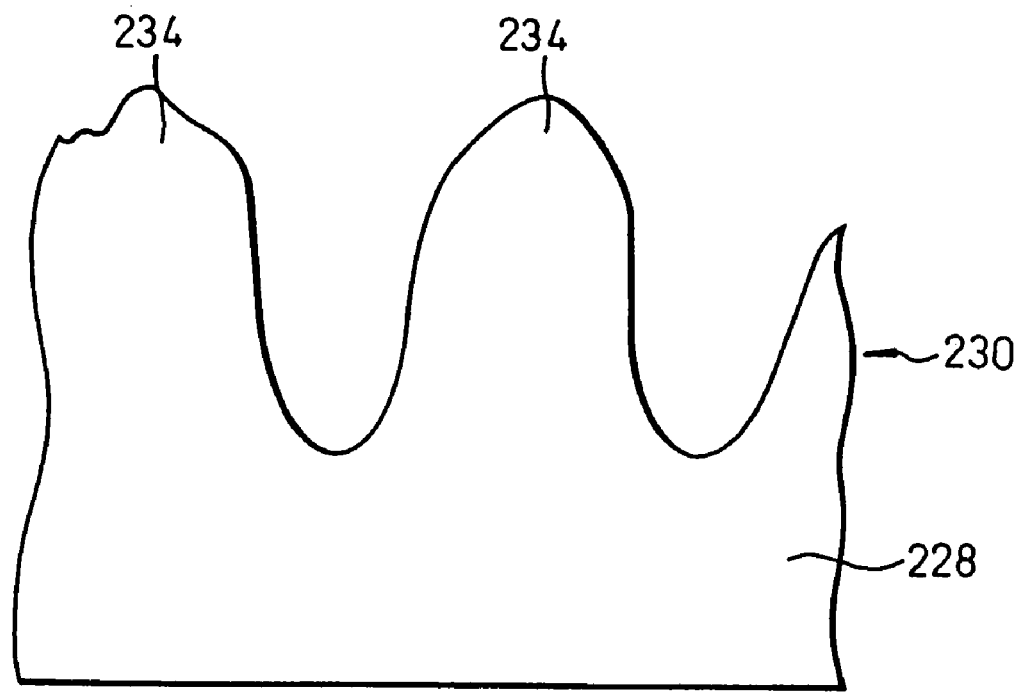
Figure 137A:
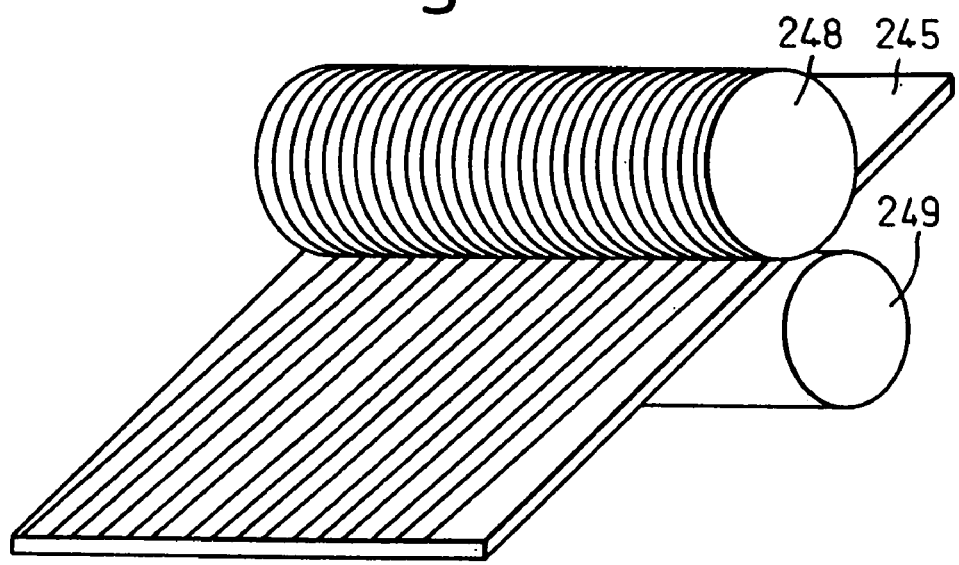
Figure 137B:
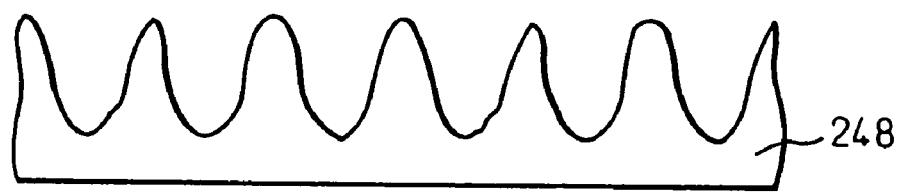
Figure 137C:
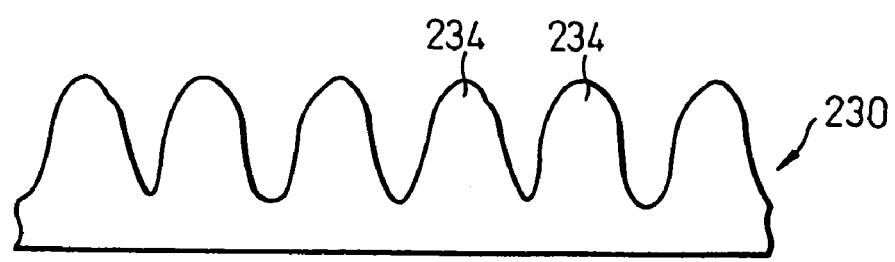
Figure 138:
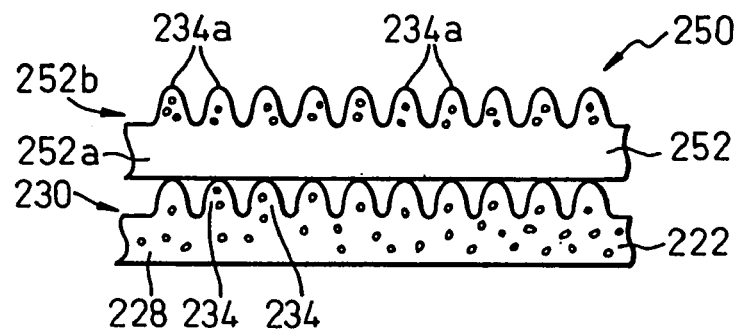
Figure 139:
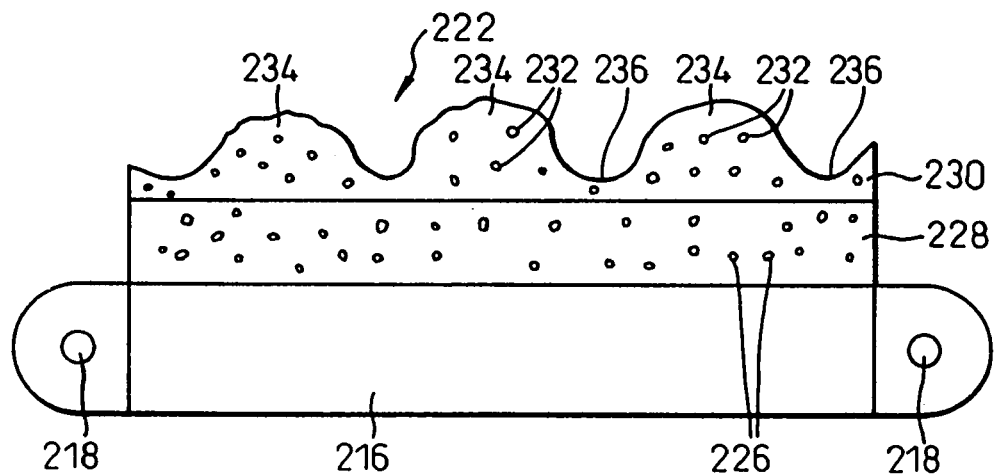
Figure 140:
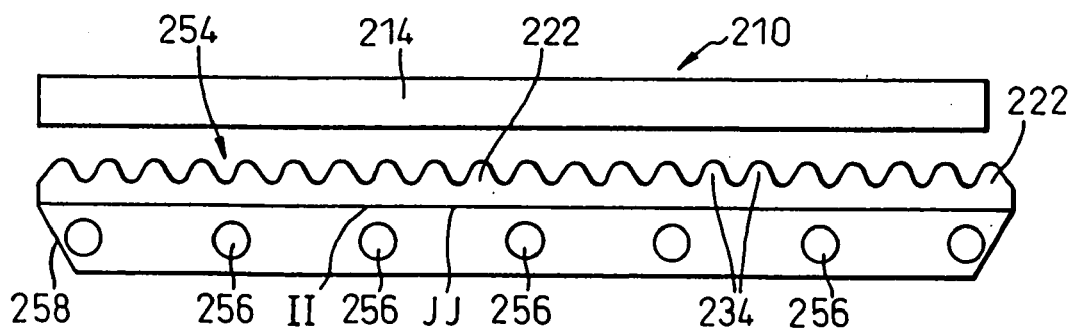
Figure 141:
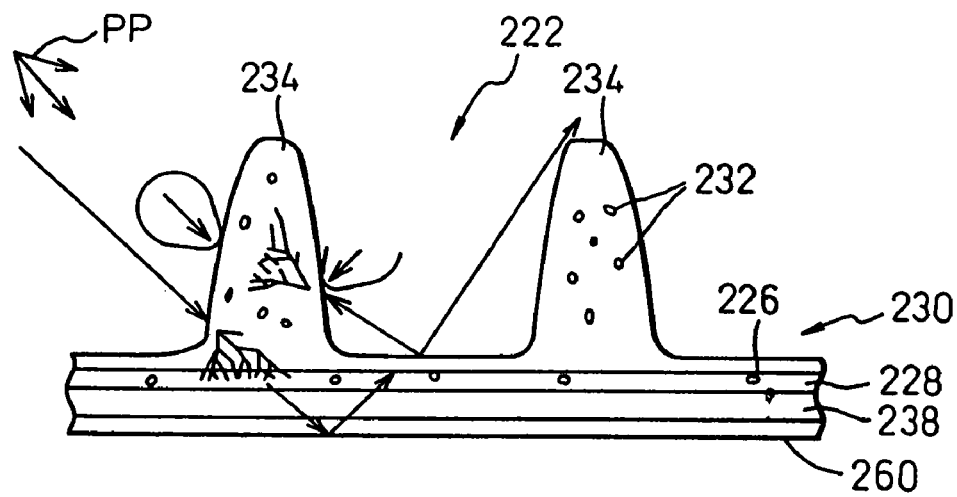
Figure 142:
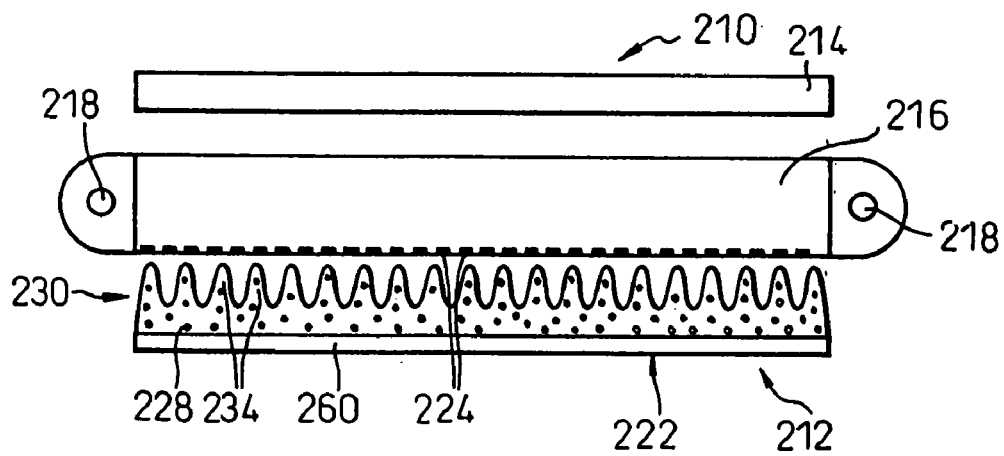
Figure 143A:
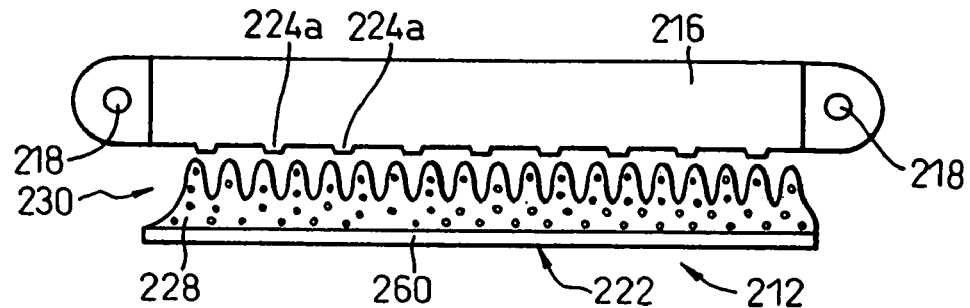
Figure 143B:
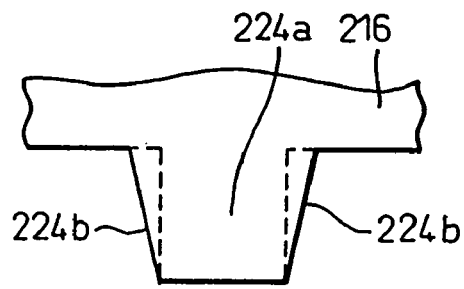
Figure 144A:
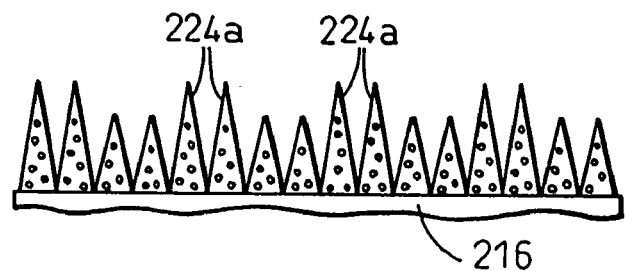
Figure 144B:
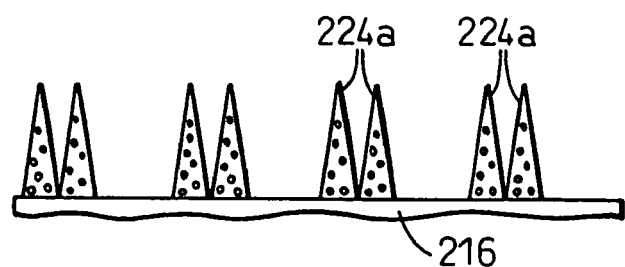
Figure 145:
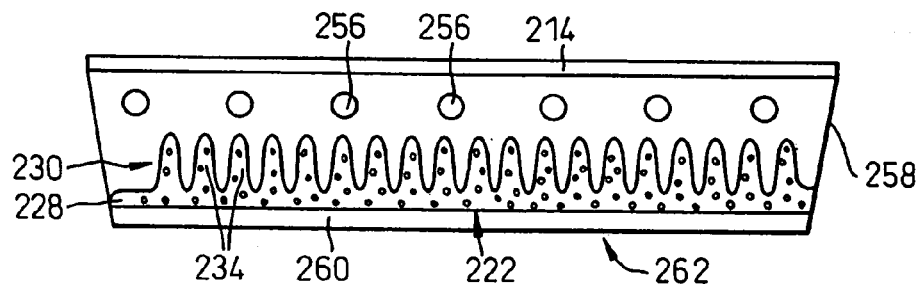
Figure 146:
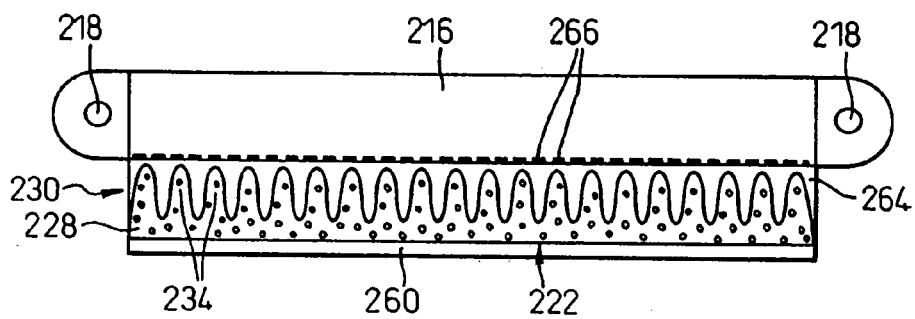
Figure 147:
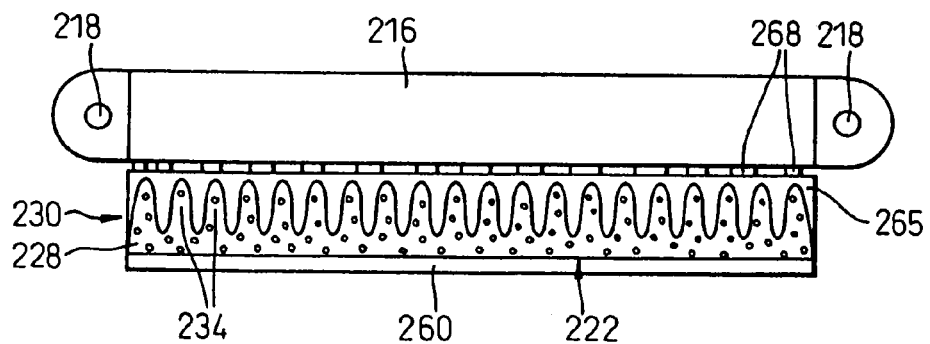
Figure 151:
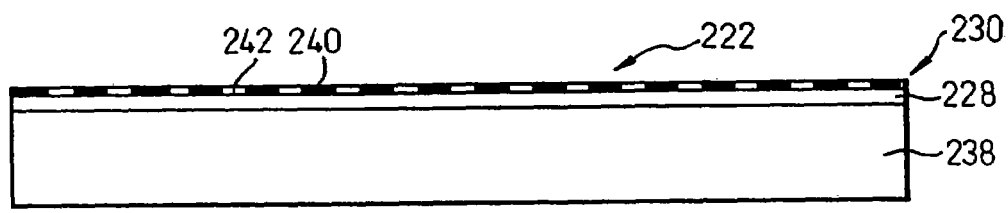
Figure 152A:
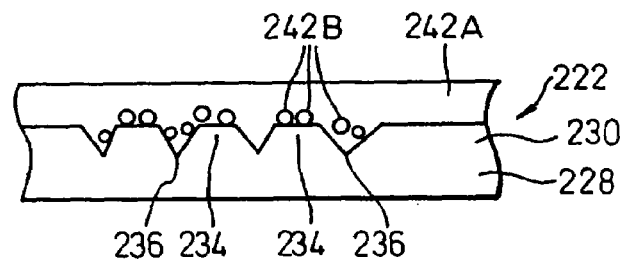
Figure 152B:
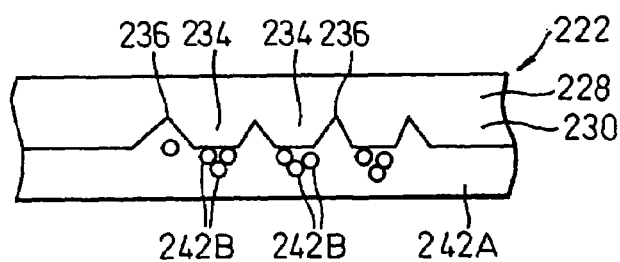
Figure 153A:
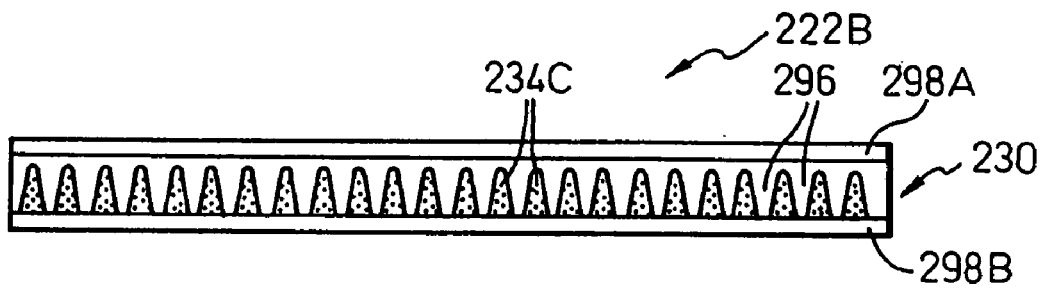
Figure 153B:
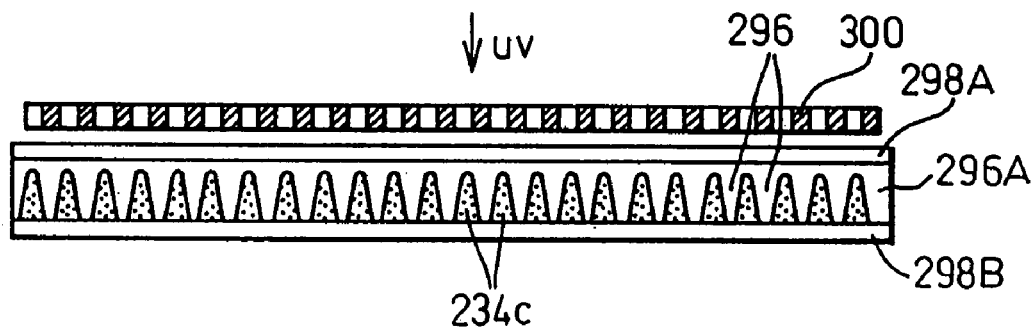
Figure 153C:
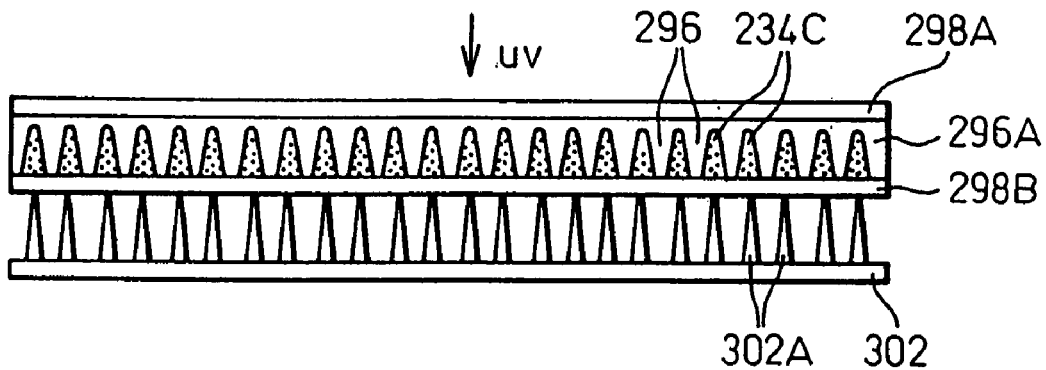
Figure 154:
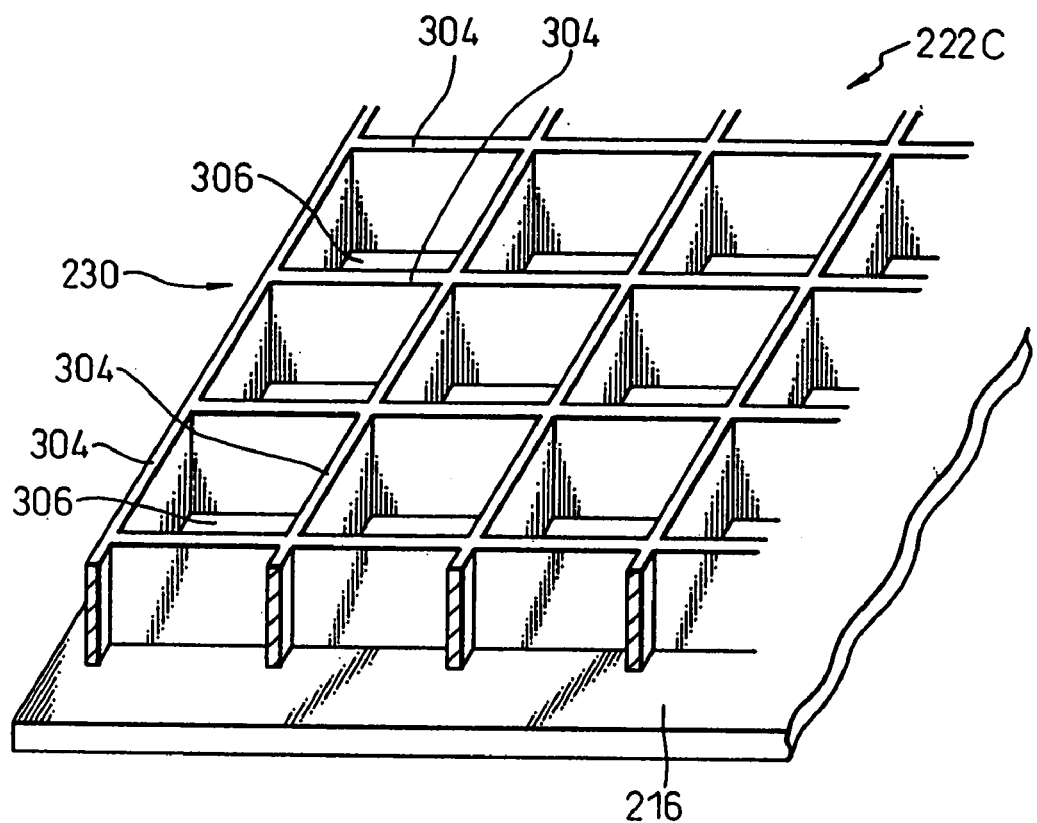
Figure 155:
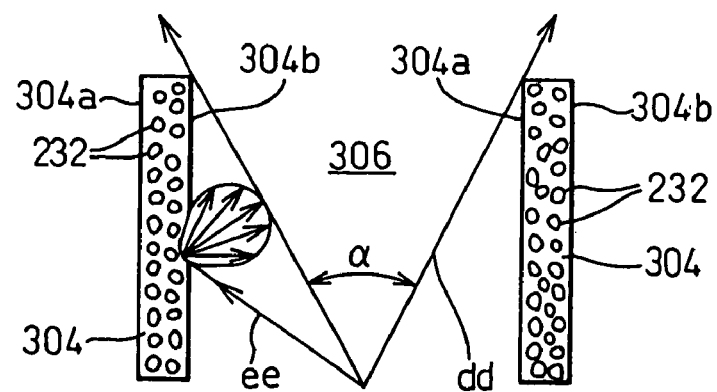
Figure 156:
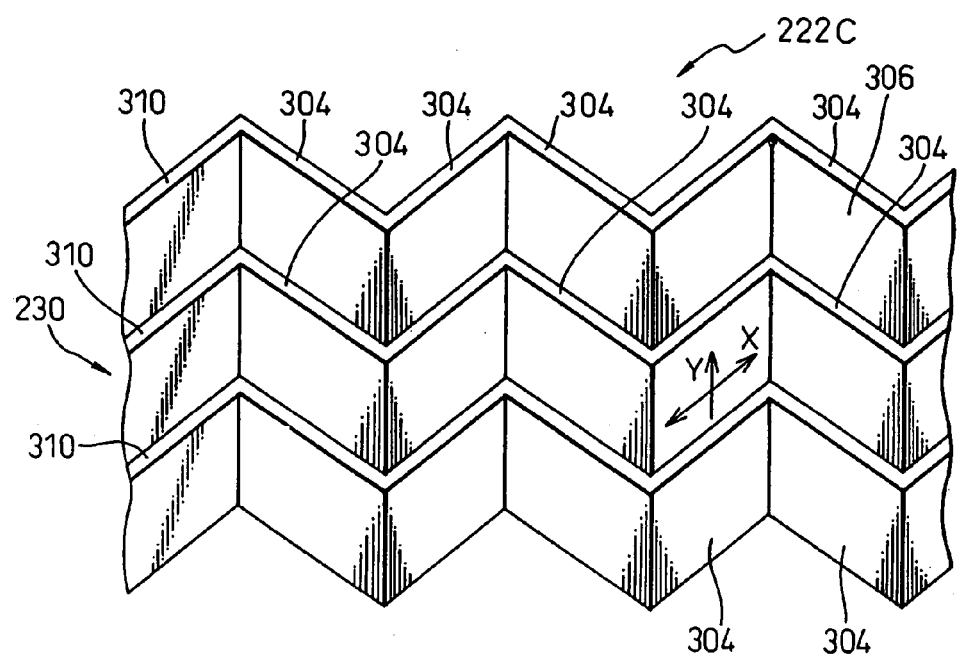
Figure 158:
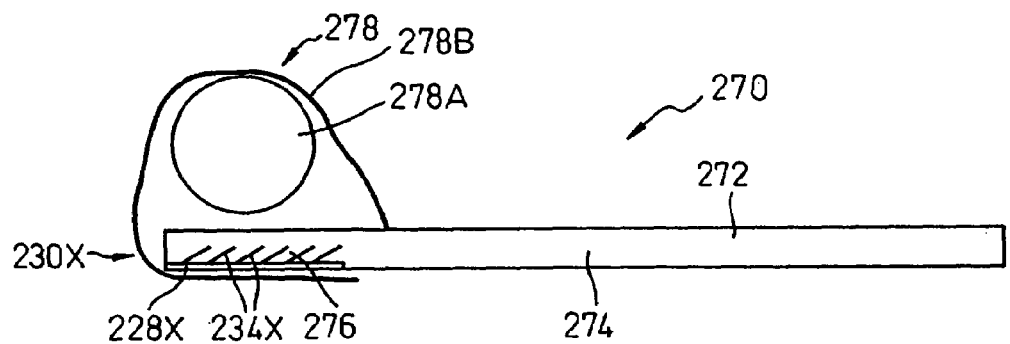
Figure 159:
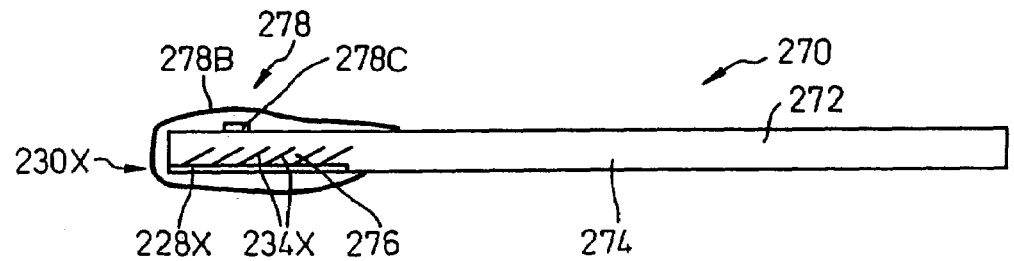
Figure 160:
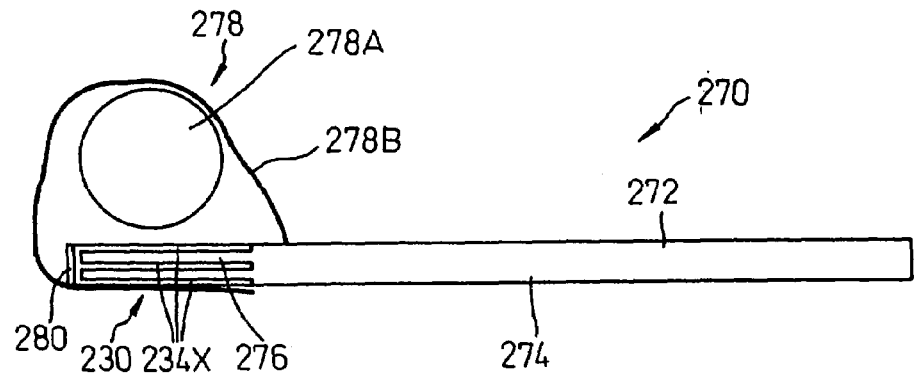
Figure 161:
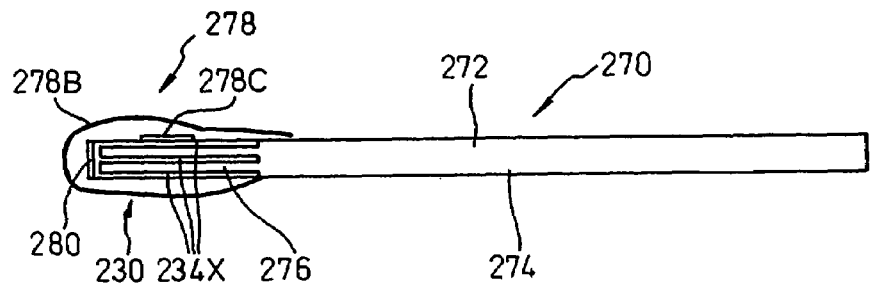
Figure 162:
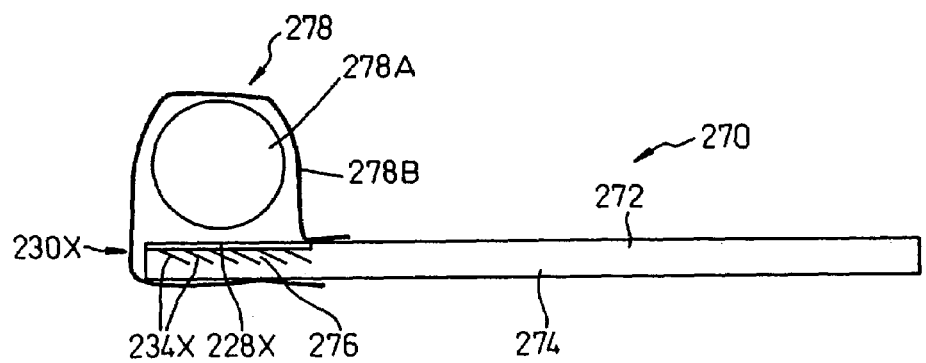
Figure 163:
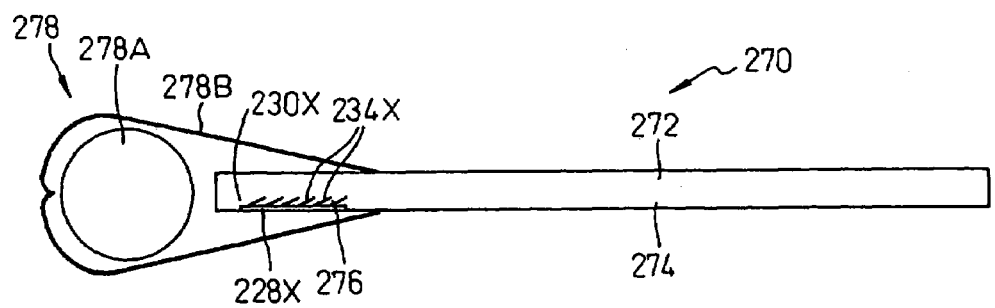
Figure 164:
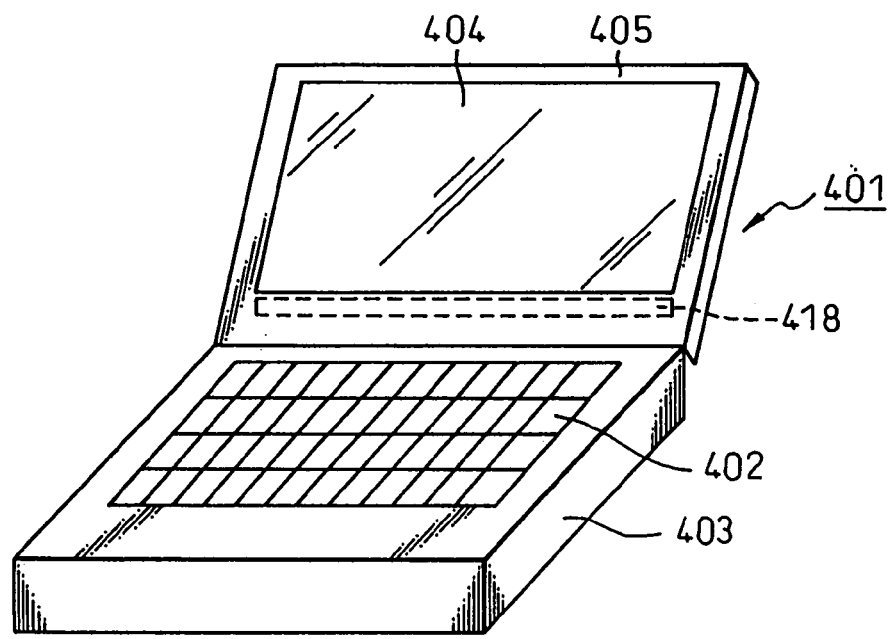
Figure 165:
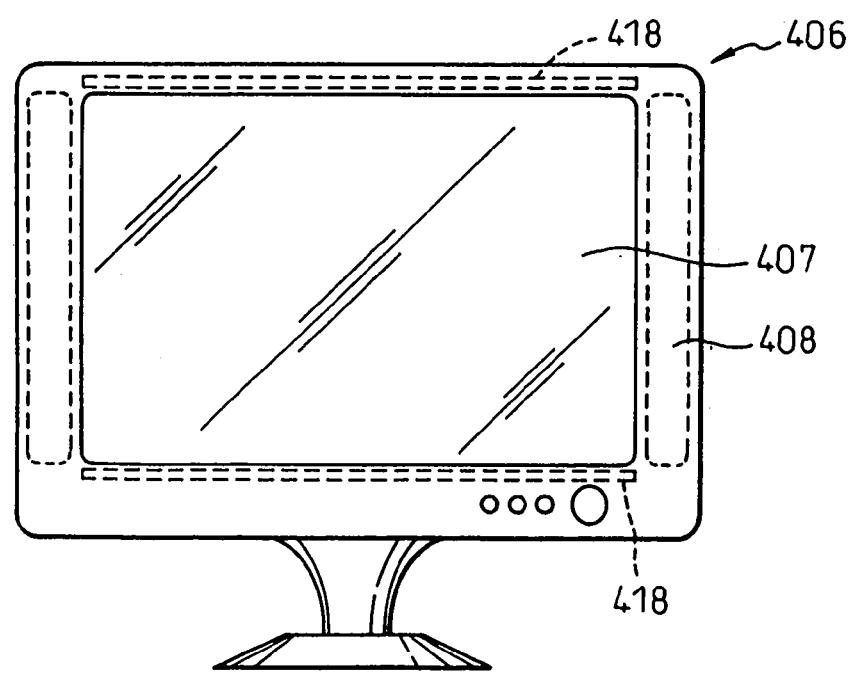
Figure 166:
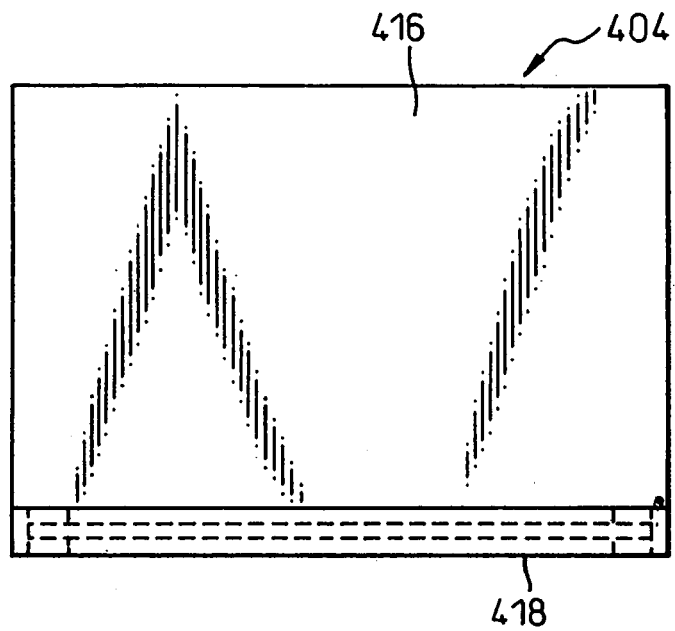
Figure 167:
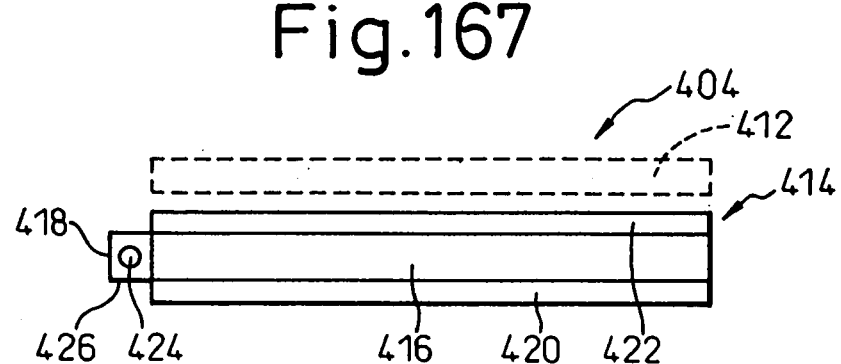
Figure 168:
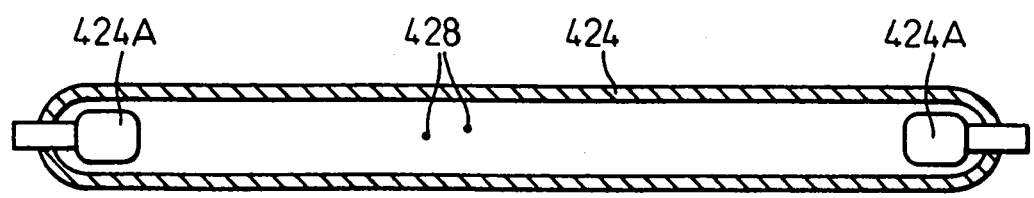
Figure 169:
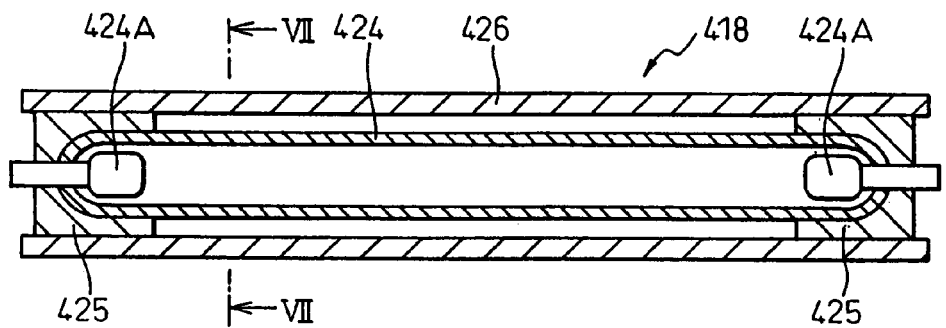
Figure 170:
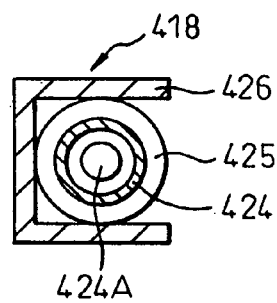
Figure 171:
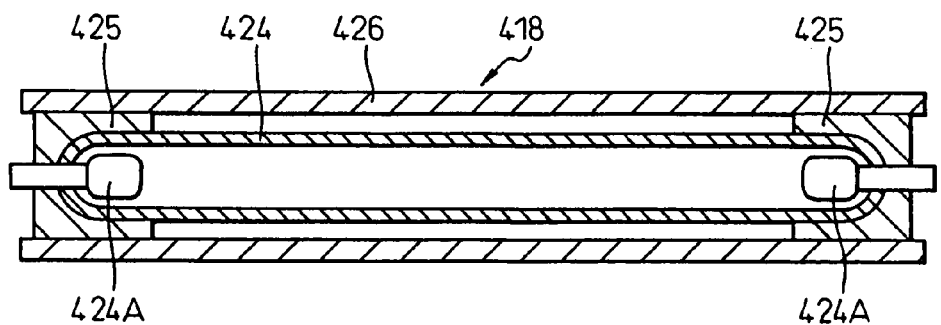
Figure 172:
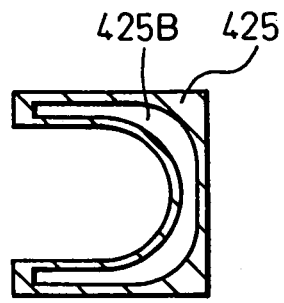
Figure 173:
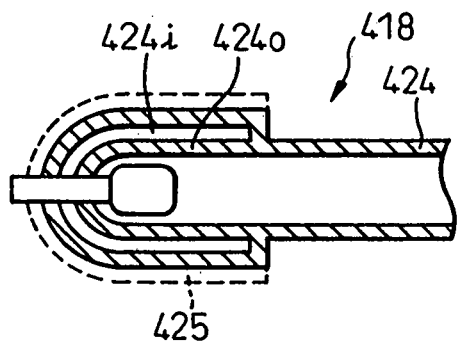
Figure 174:
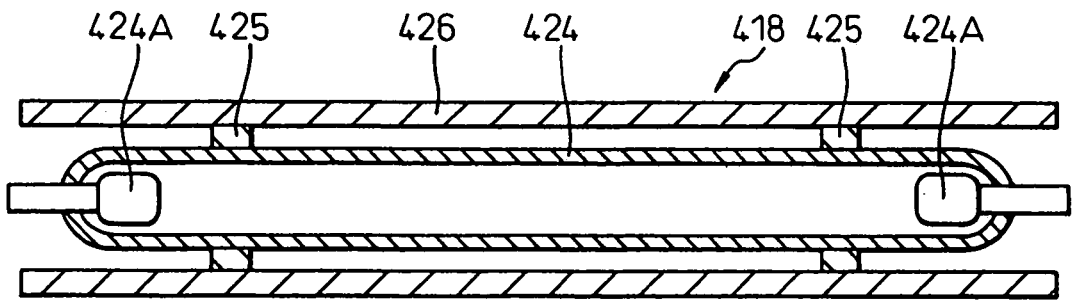
Figure 175:
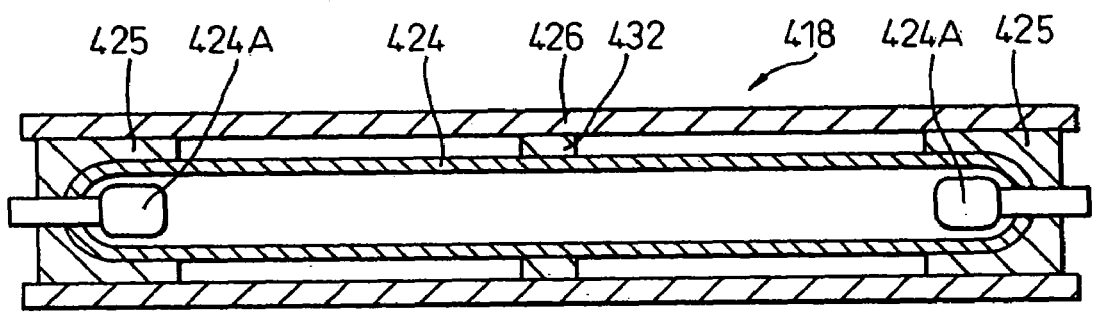

FIGS. 130A to 130C are views showing another example of fabrication of the optical sheet using the mesh;

FIGS. 131A to 131C are views showing still another example of fabrication of the optical sheet using the mesh;

FIG. 132 is a diagram showing the brightness distribution of the optical sheet produced by the method shown in FIGS. 131A to 131C;

FIG. 133 is a view showing still another example of fabrication of the optical sheet using the mesh;

FIG. 134 is a view showing an example of the mask when producing the optical sheet using the mask;

FIG. 135 is a view showing another example of the mask;

FIG. 136 is a view showing the projections formed by the method of FIG. 134;

FIGS. 137A and 137B are views showing the engraving roll;

FIG. 137C is a view showing an example of fabrication of the optical sheet using the engraving roll;

FIG. 138 is a view showing an application example of the optical sheet in FIG. 124;

FIG. 139 is a view showing another application example of the optical sheet in FIG. 124;

FIG. 140 is a view showing still another application example of optical sheet in FIG. 124;

FIG. 141 is a view showing an example of use as a reflection type optical sheet;

FIG. 142 is a view showing an example of the liquid crystal display device in which the reflection type optical sheet is disposed below the light guide plate;

FIGS. 143A and 143B are views showing a modified example of the liquid crystal display device shown in FIG. 142;

FIGS. 144A and 144B are views showing a modified example of the light conduction plate shown in FIGS. 143A and 143B;

FIG. 145 is a view showing an application example of the optical sheet in FIG. 141;

FIG. 146 is a view showing another application example of the reflection type optical sheet in FIG. 141;

FIG. 147 is a view showing still another application example of the reflection type optical sheet in FIG. 141;

FIGS. 148A to 148D are views showing various examples of the optical sheet;

FIGS. 149A to 149E are views showing various examples of the optical sheet;

FIGS. 150A to 150E are views showing various examples of the optical sheet;

FIG. 151 is a view showing an example of the optical sheet produced using a mesh;

FIGS. 152A and 152B are views showing a further example of the optical sheet;

FIGS. 153A to 153C are views showing further examples of the optical sheet;

FIG. 154 is a view showing an optical sheet according to the eighth embodiment of the present invention;

FIG. 155 is a partial enlarged sectional view of the optical sheet in FIG. 154;

FIG. 156 is a top perspective view showing a modified example of the optical sheet in FIG. 154;

FIGS. 157A to 157D are views showing still another example of the optical sheet in FIG. 154;

FIG. 158 is a sectional view showing the backlight according to the ninth embodiment of the present invention;

FIG. 159 is a view showing a modified example of the backlight shown in FIG. 158;

FIG. 160 is a view showing a modified example of the backlight shown in FIG. 158;

FIG. 161 is a view showing a modified example of the backlight shown in FIG. 158;

FIG. 162 is a view showing a modified example of the backlight shown in FIG. 158;

FIG. 163 is a view showing a modified example of the backlight shown in FIG. 158;

FIG. 164 is a perspective view showing the notebook type personal computer including the light source device according to the tenth embodiment of the present invention;

FIG. 165 is a perspective view showing the monitor including the light source device;

FIG. 166 is a plan view of the light guide plate and the light source device of the display device of FIG. 164;

FIG. 167 is a sectional view of the light guide plate and the light source device of FIG. 166;

FIG. 168 is a sectional view showing the discharge tube;

FIG. 169 is a sectional view of the light source device including the discharge tube and the reflector;

FIG. 170 is a sectional view of the light source device, taken along the line VII-VII in FIG. 169;

FIG. 171 is a sectional view of the light source device including the discharge tube and the reflector according to another example;

FIG. 172 is a sectional view of the support member of FIG. 171;

FIG. 173 is a sectional view of the light source device including the discharge tube and the reflector according to a further example;

FIG. 174 is a sectional view of the light source device including the discharge tube and the reflector according to a further example; and FIG. 175 is a sectional view of the light source device including the discharge tube and the reflector according to a further example.

DESCRIPTION OF THE PREFERRED EMBODIMENTS

Figure 1:
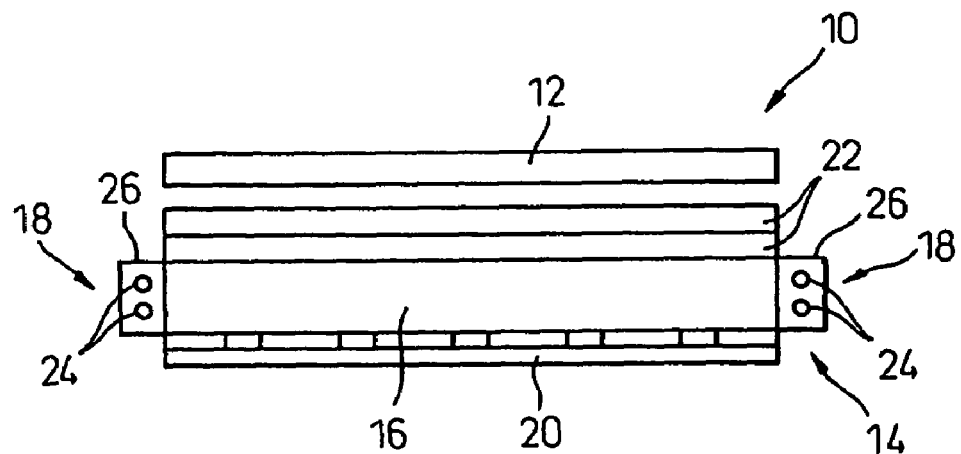
FIG. 1 is a schematic view showing a liquid crystal display device including a backlight according to the present invention.
Figure 2:
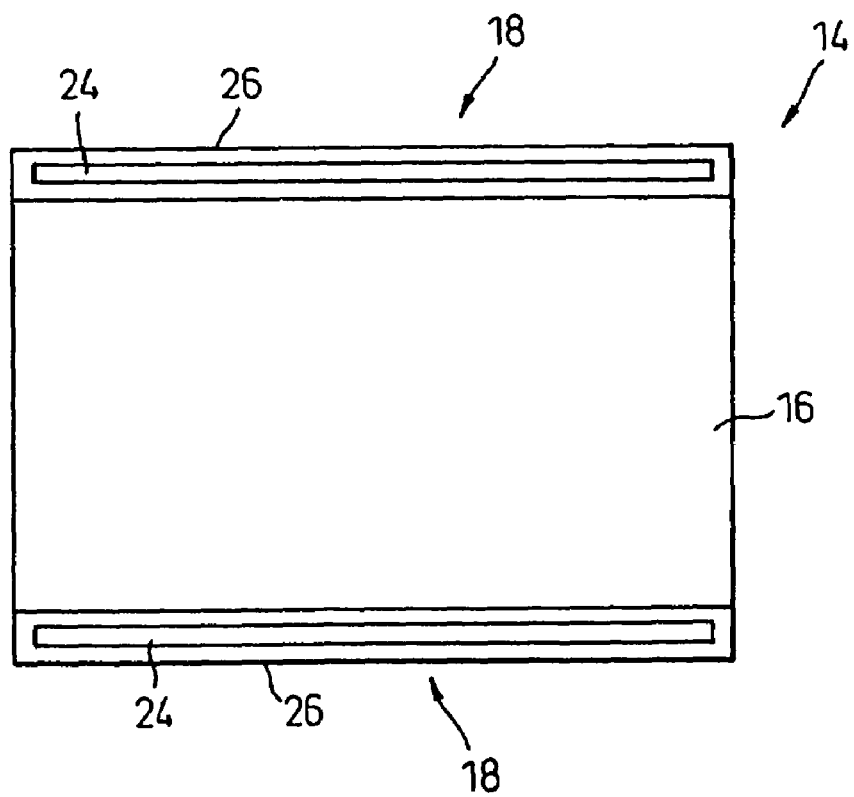
FIG. 2 is a plan view of the backlight shown in FIG. 1.

Embodiments of the present invention will be explained hereinafter with reference to the accompanying drawings. FIG. 1 illustrates a liquid crystal display device including a backlight according to the present invention, and FIG. 2 is a plan view of the backlight shown in FIG. 1. Referring to FIGS. 1 and 2, the liquid crystal display device 10 includes a liquid crystal panel 12 and a backlight 14. The backlight 14 includes a light guide plate 16, light source devices 18 disposed on either side of the light guide plate 16, a scatter reflection plate 20 disposed below the light guide plate 16 and a scatter plate 22 disposed above the light guide plate 16.

Each light source device 18 comprises two discharge tubes 24 and a reflector 26. A part of the light from the discharge tube 24 is made directly incident to the light guide plate 16 and another part is reflected by the reflector 26 and is made incident to the light guide plate 16. The light travels in the light guide plate 16, is reflected by the scatter reflection plate 20, leaves the light guide plate 16 towards the liquid crystal panel 12, is scattered by the scatter plate 22 and is then made incident to the liquid crystal panel 12. The liquid crystal panel 12 forms an image. The ray of light supplied from the backlight 14 illuminates the image formed by the liquid crystal panel 12. Consequently, an observer can view a bright image.

Figure 3:
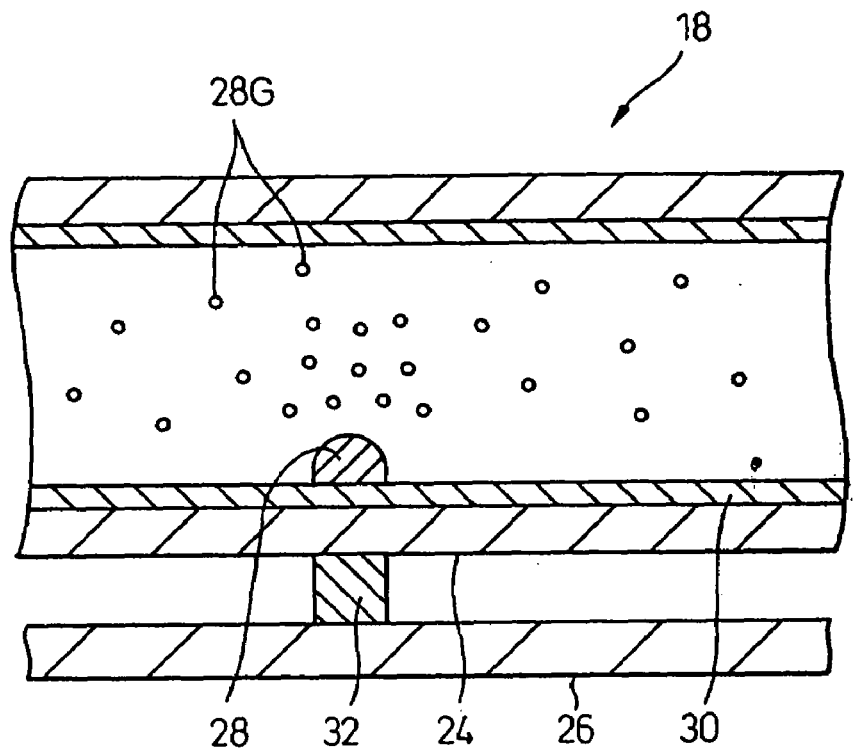
FIG. 3 is a schematic sectional view showing the light source device for explaining the principle of the present invention.

FIG. 3 is a schematic sectional view showing the light source device 18 for explaining the principle of the present invention. In this embodiment, each discharge tube 24 is a cold cathode-ray tube called a "fluorescent lamp". The discharge tube 24 has an inner diameter of 2.0 mm, an outer diameter of 2.6 mm and a full length of 316 mm (power consumption: 3.5 W). Mercury 28 is contained and sealed in the discharge tube 24, and a fluorescent material 30 is coated on the inner wall of the discharge tube 24. The reflector 26 is an aluminum mirror and has a height (height in the direction of the thickness of the light guide plate 16) of 8.5 cm so as to cover the two discharge tubes 24.

A heat conduction member 32 is attached to the reflector 26 so as to contact a part of the discharge tube 24. Therefore, a part of the discharge tube 24 is locally cooled by the heat conduction member 32. The reflector 26 is made of metal and has high heat conductivity and high heat radiation property, so heat of the discharge tube 24 is transferred to the reflector 26 through the heat conduction member 32 and is discharged from the reflector 26.

In this way, in the present invention, a portion having a low temperature in the discharge tube 24 is created, and mercury 28 remains mainly in the liquid state at the low temperature portion. Mercury 28 mainly evaporates at the low temperature portion, and the evaporated mercury gas 28G is diffused to the entire portion in the discharge tube 24. The mercury gas 28G thus diffused returns also to the low temperature portion. In this way, the mercury gas 28G is distributed almost uniformly in the entire discharge 24 and the pressure of the mercury gas 28G is substantially uniform in the entire portion of the discharge tube 24. In other words, the concentration of the mercury gas 28G can be controlled by creating the low temperature portion in the discharge tube 24.

The mercury gas 28G emits ultraviolet light, upon discharge, inside the discharge tube 24. When the ultraviolet light impinges against the fluorescent material 30, the visible light leaves the discharge tube 24. The quantity of the visible ray from the discharge tube 24 is substantially proportional to the current. The mercury gas also has a property of absorbing the ultraviolet rays, and the quantity of the visible ray of light outgoing from the discharge tube 24 becomes maximum at an optimal mercury gas concentration and an optimal internal temperature of the tube corresponding to the former. The quantity of the visible light from the discharge tube 24 decreases from the maximum value both when the mercury gas concentration is higher or lower than the optimal value and when the internal temperature of the tube is higher or lower than the optimal value. The present invention creates the low temperature portion in the discharge tube 24 so that the internal temperature of the tube is identical to, or approximately identical to, the optimal value and the brightness of the ray of light outgoing from the discharge tube 24 becomes a maximum.

By constructing the backlight so that the heat conduction member 32 is coupled to the discharge tube 24 and the reflector 26, the heat conduction member 32 can be arranged in a limited space within the reflector 26 covering the discharge tube 24, and heat of a part of the discharge tube 24 can be efficiently released. The heat conduction member 32 is preferably made of a nonmetal, and is made of at least one of a heat conductive resin, a heat conductive rubber, and a heat conductive adhesive.

Figure 4:
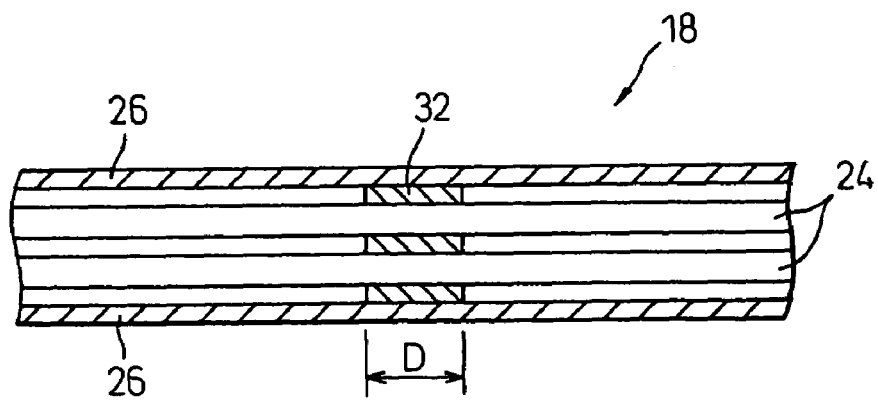
FIG. 4 is a sectional view showing the light source device according to a modified embodiment.
Figure 5:
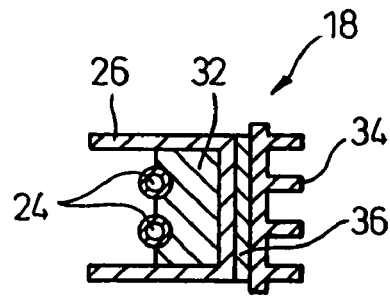
FIG. 5 is a sectional view showing the light source device, passing through the heat conduction member shown in FIG. 4.
Figure 6:
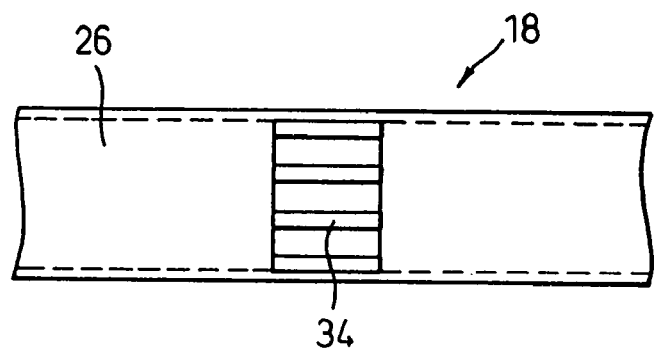
FIG. 6 is a rear view showing the reflector shown in FIGS. 4 and 5.

FIG. 4 is a sectional view showing the light source device of a modified embodiment. FIG. 5 is a sectional view of the light source device of FIG. 4, passing through the heat conduction member. FIG. 6 is a rear view of the reflector shown in FIGS. 4 and 5. Referring to FIGS. 4 to 6, the light source device 18 includes two discharge tubes 24, a reflector 26 covering two discharge tubes 24 and a heat conduction member 32 keeping contact with a part of the discharge tubes 24 and attached to the reflector 26. The discharge tubes 24 and the reflector 26 are the same as those explained with reference to FIG. 3.

The heat conduction member 32 is made of a heat radiating silicone (SE4450 of Dow Corning Toray Silicone Corporation, heat conductivity: 2.5 W/m/K) disposed at the center of the discharge tubes 24 and having a width D (for example, about 2.0 mm). The heat conduction member 32 is filled in the reflection 26, with such a height from the bottom of the reflection 26 that the half of the discharge tubes 24 are buried. A heat sink 34 is fitted to the portion of the back of the reflector 26 corresponding to the arrangement position of the heat conduction member 32. In this instance, a heat conductive adhesive transferring tape (9822, a product of Sumitomo 3M Corporation, heat conductivity: 0.61 W/m/K) 36 is employed.

As a result, heat conductivity can be improved by 6.1 times in comparison with the case where the heat conduction member 32 and the heat sink 34 are not disposed. In the conventional constructions, the temperature of the discharge tubes 24 is higher than the room temperature by 45° C. when rated power is supplied to the discharge tubes 24, and is around the optimal temperature (65° C.) of the discharge tubes (cold-cathode tubes) 24 having the inner diameter of 2.0 mm. In other words, when a power greater than rated power is supplied to the discharge tubes 24, the light emission quantity is likely to drop. In contrast, this embodiment can bring the temperature of the most cooled point of the tube surface to the optimal temperature at power of 6 W. As a result, the maximum value of brightness of the light source can be increased 1.7 times.

Figure 7:
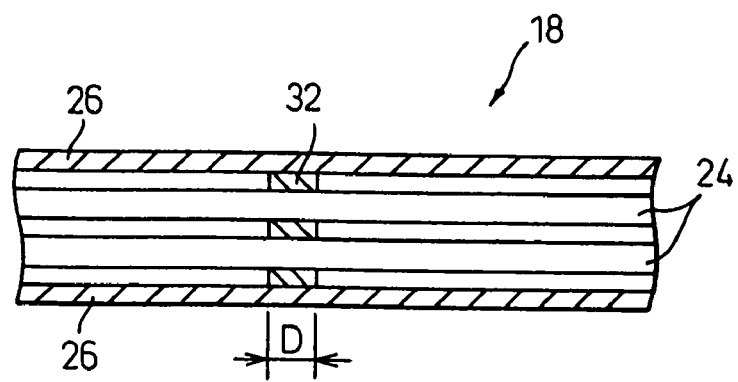
FIG. 7 is a sectional view showing the light source device according to a modified embodiment.
Figure 8:
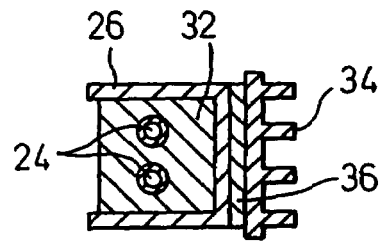
FIG. 8 is a sectional view of the light source device of FIG. 7, passing through the heat conduction member.
Figure 9:
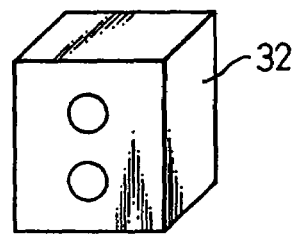
FIG. 9 is a perspective view showing the reflector of FIGS. 7 and 8.

FIG. 7 is a sectional view showing the light source device of a modified embodiment of the present invention. FIG. 8 is a sectional view of the light source device of FIG. 7, passing through the heat conduction member. FIG. 9 is a perspective view showing the reflector of FIGS. 7 and 8. In FIGS. 7 to 9, the light source device 18 includes two discharge tubes 24, a reflector 26 covering two discharge tubes 24 and a heat conduction member 32 keeping contact with a part of the discharge tubes 24 and fitted to the reflector 26. The discharge tubes 24 and the reflector 26 are the same as those explained with reference to FIG. 3. A heat sink 34 is fitted to the back of the reflector 26 using a heat conductive adhesive transfer tape 36.

The heat conduction member 32 is a heat conductive pad (4470CV, a product of Sumitomo 3M Corporation, heat conductivity: 2.0 W/m/K). The heat conduction member 32 has a width D (e.g. about 1.5 mm) at the center of the discharge tubes 24 and the reflector 26. Two through-holes having a diameter of 2.0 mm are formed in the heat conduction member 32 so that the discharge tubes 24 can be inserted in these through-holes. Both surfaces (front and back) to which the through-holes open are coated with a white pigment. This coating is directed to reduce the amount of light absorbed by the heat-conductive pad (dark gray color) and to reduce heat input/output from the surface.

Each discharge tube 24 is fitted into the through-hole of the heat conduction member 32 and is set so that the heat conduction member 32 is positioned at the center of the discharge tube 24. Since each through-hole of the heat conduction member 32 is a little smaller than the outer diameter of the discharge tube 24, the flexible heat conduction member 32 undergoes deformation and comes into close contact with the discharge tube 24. Thereafter the reflector 26 and the discharge tubes 24 are combined with one another. In this instance, a silicone type adhesive is applied to eliminate the gap between the reflector 26 and the discharge tubes 24. As a result, heat conduction can be improved 4.5 times in comparison with the prior art, and the power for achieving the optimal temperature of the discharge tubes 24 is 5.5 W. Further, the maximum light quantity becomes 1.6 times of the prior art.

Figure 10:
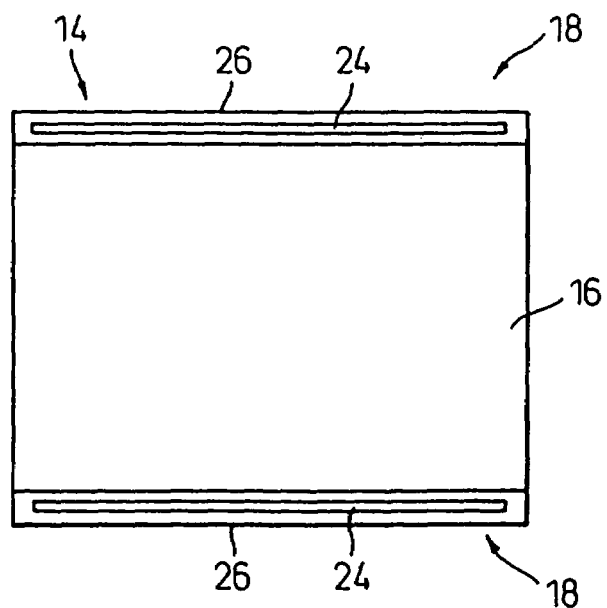
FIG. 10 is a plan view of the backlight including the light source device of a modified embodiment of the present invention.
Figure 11:
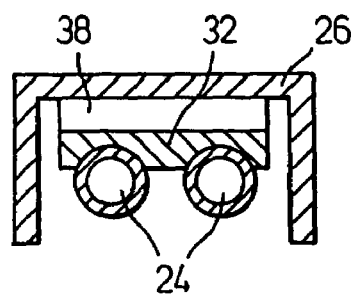
FIG. 11 is a sectional view of the light source device, passing through the upper discharge tubes in FIG. 10.
Figure 12:
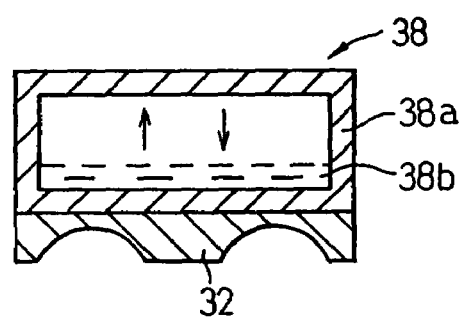
FIG. 12 is a view showing the cooling device including the container into which a material for executing a cooling function by phase transition is loaded.
Figure 13:
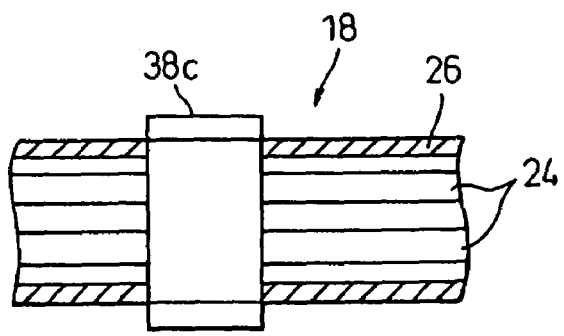
FIG. 13 is a plan view of the light source device passing, through the lower discharge tubes in FIG. 10.
Figure 14:
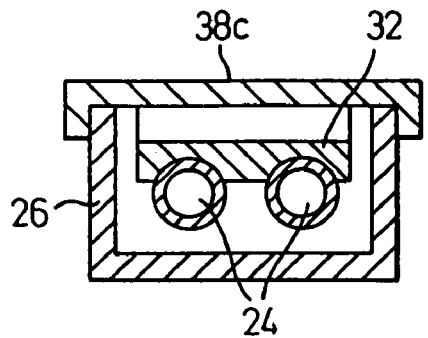
FIG. 14 is a sectional view of the light source device, passing through the lower discharge tube, in FIG. 13.
Figure 15:
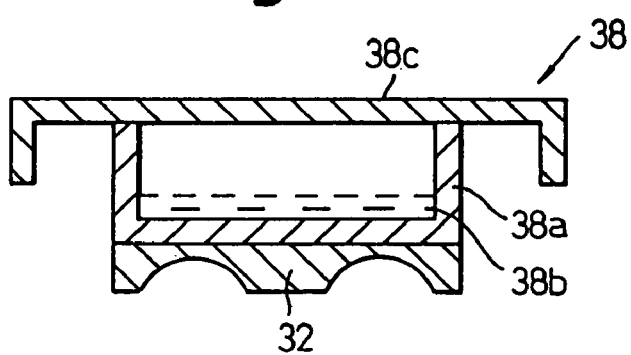
FIG. 15 is a sectional view showing the cooling device including the container in which a material for executing a cooling function by phase transition is loaded.

FIG. 10 is a plan view showing a backlight including the light source device of the modified embodiment of the present invention. FIG. 11 is a sectional view of the light source device, passing through the upper discharge tubes of FIG. 10. FIG. 12 is a sectional view showing a cooling device of FIG. 11, including a container in which a material exhibiting a cooling function by phase transition is inserted. FIG. 13 is a sectional view of the light source device, passing through the lower discharge tubes in FIG. 10. FIG. 14 is a sectional view of the light source device, passing through the lower discharge tubes in FIG. 13. FIG. 15 is a sectional view of a cooling device of FIG. 14, including a container in which a material exhibiting a cooling function by phase transition is inserted.

In FIGS. 10 to 15, the backlight 14 includes a light guide plate 16 and two light source devices 18 disposed on either side of the light guide plate 16. In this case, the liquid crystal display device is used as a monitor and the backlight 14 is vertically disposed. Therefore, the two light source devices 18 are the light source device 18 positioned above and the light source device 18 positioned below, as viewed in FIG. 10.

Each light source device 18 includes two discharge tubes 24, a reflector 26 covering two discharge tubes 26 and a heat conduction member keeping contact with a part of the discharge tubes 24 and fitted to the reflector 26. The discharge tubes 24 and the reflector 26 are the same as those explained with reference to FIG. 3. Further, a cooling device (or a heat siphon device) exhibiting a cooling function by phase transition is interposed between the heat conduction member 32 and the reflector 26.

The cooling device 38 of the light source device 18 positioned at the upper position shown in FIGS. 11 and 12, comprises a container 38a made of a 0.05 mm-thick stainless steel sheet and having a height of 2.5 mm, and a material 38b exhibiting the cooling function by phase transition. After the container 38a is exhausted, the material 38b (methyl alcohol) exhibiting the cooling function is inserted and sealed in the container 38a. The discharge tubes 24 are positioned below the cooling device 38 and heat the material (methyl alcohol) 38b exhibiting the cooling function that stays at the lower side in the container 38a. When the temperature of the discharge tubes 24 reaches the optimal temperature (65° C.) described above, methyl alcohol boils and drastically evaporates upward. The upper surface of the container 38a keeps contact with the reflector 26. Upon coming into contact with this surface, methyl alcohol vapor condenses. The resulting droplets of methyl alcohol return to the lower surface owing to gravity. A heat cycle is formed in this way, and heat is transferred from the discharge tubes 24 to the reflector 26.

The cooling device 38 of the light source device 18 positioned at the lower position, as shown in FIGS. 13 and 15, comprises a container 38a made of a stainless steel sheet and a material 38b (methyl alcohol) exhibiting the cooling function by phase transition. The cooling device 38 of the light source device 18 positioned at the lower position has substantially the same construction and operation as the cooling device 38 of the upper light source device 18. In the case of the cooling device 38 of the lower light source device 18, however, the reflector 26 is positioned below the cooling device 38. Therefore, the upper wall of the container 38a does not come into contact with the reflector 26. Hence the upper wall 38c of the container 38a is formed to a greater size than the height (in the direction of height of the light conduction plate) of the reflector 26 so that the upper wall 38c of the container 38a can be brought into contact with the sidewall of the reflector 26.

Figure 16:
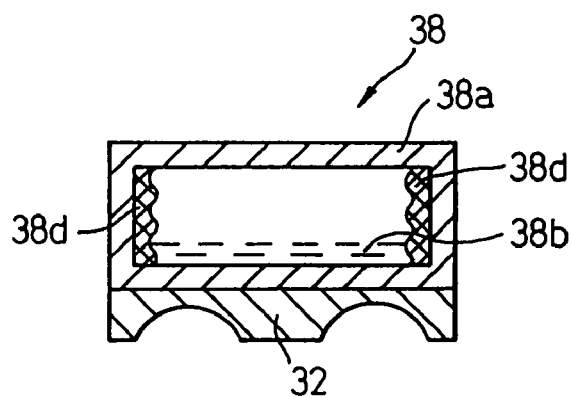
FIG. 16 is a view showing the cooling device including the container in which a material for executing a cooling function by phase transition is loaded according to a modified example of the device of FIGS. 12 and 15.

FIG. 16 is a sectional view showing a modified embodiment of the cooling device as shown in FIGS. 12 and 15 including the container in which the material exhibiting the cooling function by phase transition is fitted. The cooling device 38 of the light source device 18 includes a container 38*a* made of a stainless steel sheet, a material (methyl alcohol) 38*b* exhibiting the cooling function and a stainless steel mesh 38*d*. In this modified embodiment, the steel mesh 38*d* returns the material (methyl alcohol) 38*b* exhibiting the cooling function to the evaporation side owing to capillary action. Therefore, it is not necessary to constitute the upper and lower light source devices into separate constructions as in FIGS. 12 and 15. This has a structure similar to that of a heat pipe in place of the heat siphon device in FIGS. 12 and 15.

Figure 17:
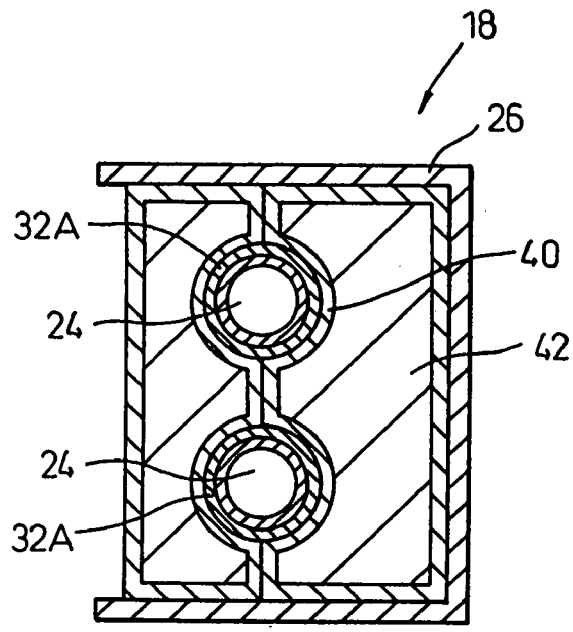
FIG. 17 is a sectional view showing the light source device of a modified embodiment of the present invention.

FIG. 17 is a sectional view showing a light source device of another modified embodiment of the present invention. The light source device 18 of this modified embodiment includes discharge tubes 24 and a reflector 26 in the same way as the embodiment described above. Each discharge tube 24 is covered with a heat conductive pad (ring) 32A. An acrylic container 40 is interposed between the heat conductive pad 32A and the reflector 26. The container 40 has a shape corresponding to the internal shape of the reflector 26 and to the shape of the heat conductive pad 32A. Glycerol 42 is fully charged into the container 40. The container 40 has a width of 10 mm. Since the heat conduction member comprising the heat conductive pad 32A, the container 40 and the glycerol 42 is disposed, heat conductivity can be improved 2.5 times that of the prior art and, eventually, the maximum brightness of the light source becomes 1.2 times that of the prior art.

Figure 18:
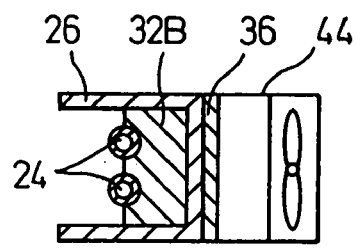
FIG. 18 is a sectional view showing the light source device of a modified embodiment of the present invention.
Figure 19:
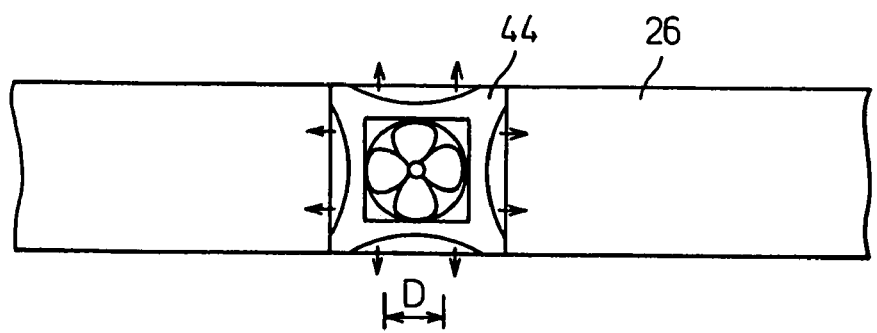
FIG. 19 is a side view of the light source device shown in FIG. 18.
Figure 20:
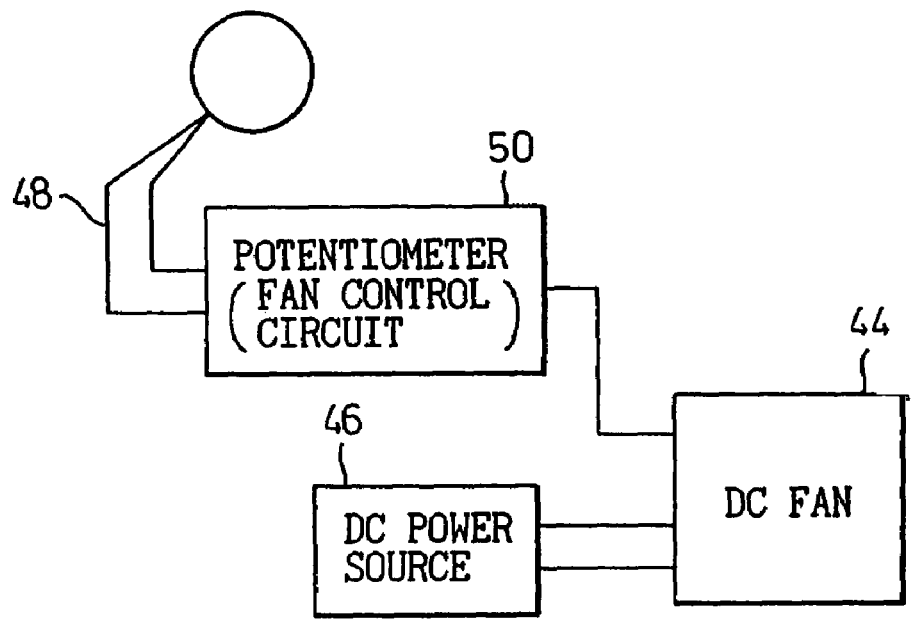
FIG. 20 is a block diagram showing the control of the fan in FIGS. 18 and 19.

FIG. 18 is a sectional view showing the light source device of a further embodiment of the present invention. FIG. 19 is a side view of FIG. 18, and FIG. 20 is a block diagram showing the control of the fan shown in FIGS. 18 and 19. The light source device 18 of this embodiment includes discharge tubes 24 and a reflector 26 in the same way as the modified embodiment described above. A heat conductive member 32B is made of heat radiating compound or a heat radiating silicone that is filled between the discharge tubes 24 and the reflector 26 to the height of the half of the discharge tubes 24. The heat conduction member 32B is 10 mm wide. A DC fan 44 having blades of a 40 mm in diameter is fitted using a heat conductive adhesive transfer tape 36 to the arrangement position of the heat conduction member 32B spaced apart by 10 mm from the back of the reflector 26.

In FIG. 20, the fan 44 is shown connected to a DC power source 46. A potential difference detection circuit and a fan control circuit 50 that receive the output of a thermocouple 48 control the fan 44. Rotation control of the fan 44 is clone according to temperature as tabulated below in accordance with the output of the thermocouple 48. The distal ends of the thermocouple 48 are arranged in touch with the surface of the discharge tubes 24 at the positions at which the discharge tubes 24 keep contact with the heat conductive compound and in a lower direction as to the rotating direction of the discharge tubes 24 due to the gravitational operation.

| Temperature of Thermocouple(° C.) | Speed of Fan (rpm) |
|---|---|
| ~45 | 0 |
| 46~65 | 3,000 |
| 65~ | 4,000 |

Figure 21:
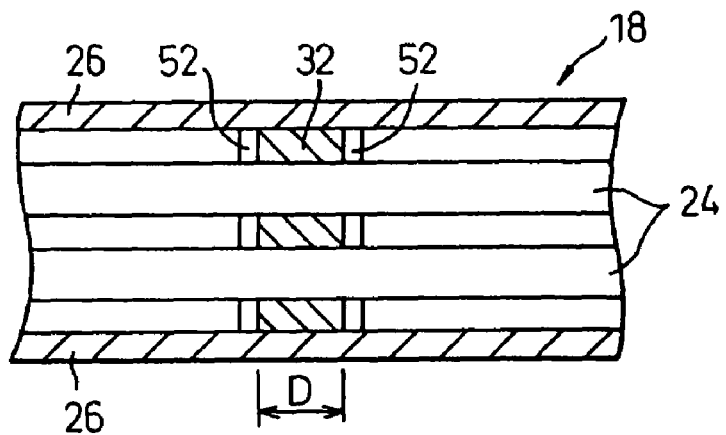
FIG. 21 is a sectional view showing a light source device of a modified embodiment of the present invention.

FIG. 21 is a sectional view showing the light source device of still further embodiment of the present invention.

Figure 22:
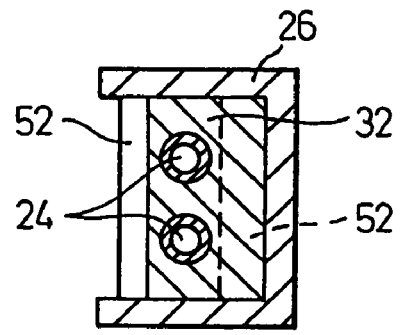
FIG. 22 is a sectional view showing the light source device in FIG. 21.
Figure 23:
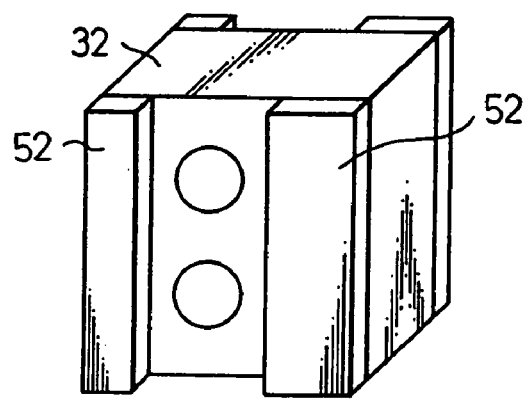
FIG. 23 is a perspective view showing the heat conduction member in FIGS. 21 and 22.

FIG. 22 is a sectional view of the light source device in FIG. 21. FIG. 23 is a perspective view showing a heat conduction member in FIGS. 21 and 22. The light source device 18 of this embodiment includes discharge tubes 24, a reflector 26 and a heat conduction member 32 in the same way as in the embodiment described above. A heat sink is fitted to a part of the back of the reflector 26. The heat conduction member 32 is made of a heat conductive rubber having a large heat expansion coefficient. Through-holes having a diameter of 2.4 mm are bored in the heat conductive rubber. The discharge tubes 24 pass through the respective through-holes and are positioned in such a manner that the heat conductive rubber exists at the center of each discharge tube 24. The width D of the heat conduction member 32 is 1.5 mm. A 0.5 mm-thick smoked acrylic plate (white color) 52 is bonded to the surface of the heat conduction member 32 that is out of contact from the reflector 26. The smoked acrylic plate 52 operates as a restriction plate, so that the heat conduction member 32 made of the heat conductive rubber can expand only in the direction facing the reflector surface (at room temperature). When the discharge tubes 24 are turned on and the heat conduction member 32 is heated to 60° C., the heat conduction member 32 comes into contact with the reflector 26. As a result, heat conductivity is at least twice, at a temperature of 60° C. or more, of the heat conductivity in air, and maximum brightness of the light source is 1.1 times that of the prior art.

Figure 24:
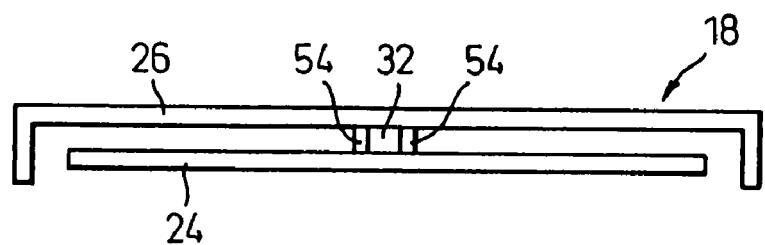
FIG. 24 is a sectional view showing a light source device of a modified embodiment of the present invention.
Figure 25:
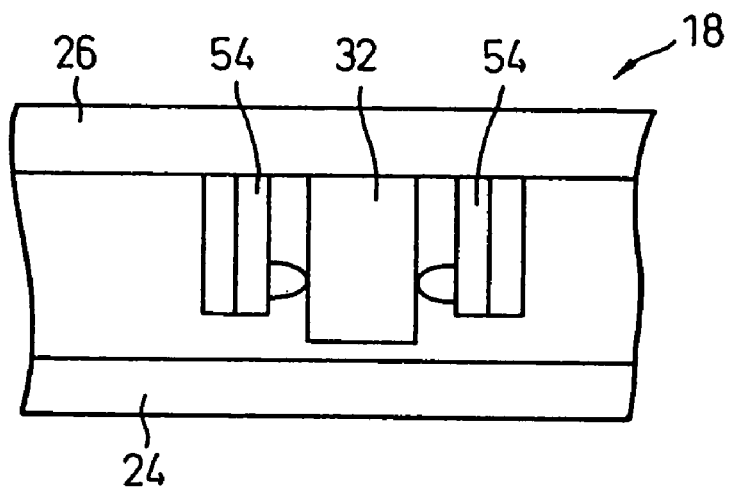
FIG. 25 is a partial enlarged view of the light source device in FIG. 24.
Figure 26:
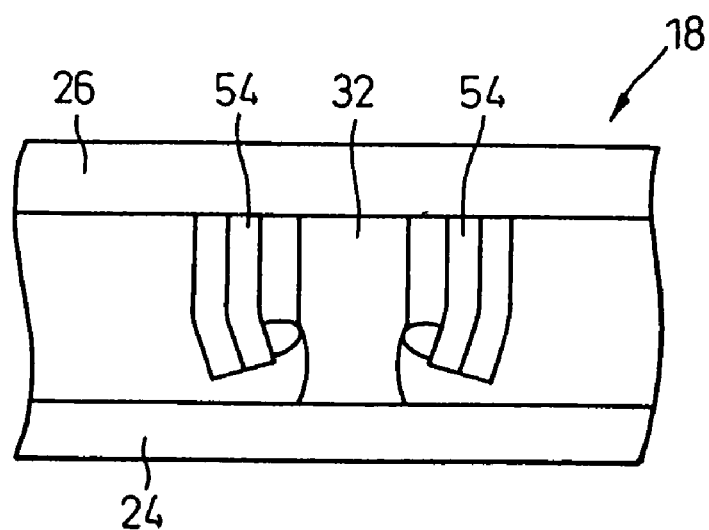
FIG. 26 is a view showing the light source device in FIG. 25 during operation.

FIG. 24 is a sectional view showing the light source device of a still further modified embodiment of the present invention. FIG. 25 is a partial enlarged view of the light source device. FIG. 26 shows the light source device of FIG. 25 in operation. The light source device 18 of this embodiment includes discharge tubes 24, a reflector 26 and a heat conduction member 32 in the same way as in the foregoing embodiments. A heat sink is fitted to a part of the back of the reflector 26. The heat conduction member 32 uses a heat conductive pad (4470CV, a product of Sumitomo 3M Corporation, heat conductivity: 2.0 W/m/K). This heat conduction member 32 is shaped into a thickness of 1.5 mm so that the heat conduction member 32 comes into contact with both discharge tubes 24 and reflector 26. A bimetal 54 is fitted to the reflector 26 on both sides of the heat conduction member 32. When the temperature of the discharge tubes 24 is lower than a predetermined value, deformation of the bimetal is small and the heat conduction member 32 substantially does not come into contact with the discharge tubes 24. When the temperature of the discharge tubes 24 becomes higher than the predetermined value, deformation of the bimetal becomes so great that the heat conduction member substantially comes into contact with the discharge tubes 24 and cools a part of the discharge tubes 24.

Figure 27:
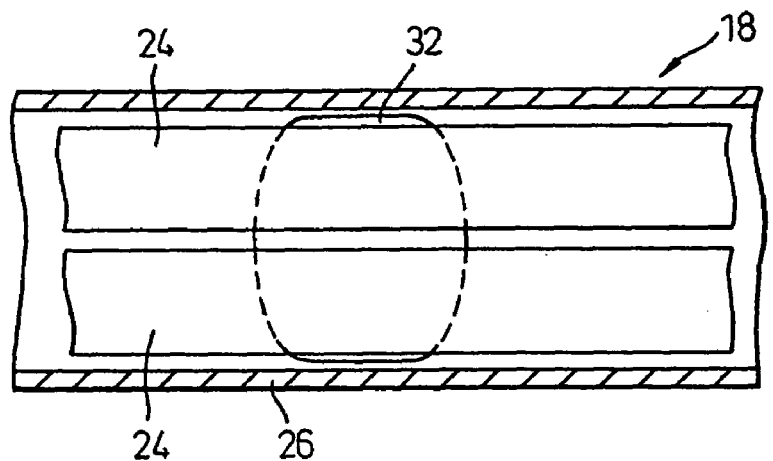
FIG. 27 is a sectional view showing the light source device of a modified embodiment of the present invention.
Figure 28:
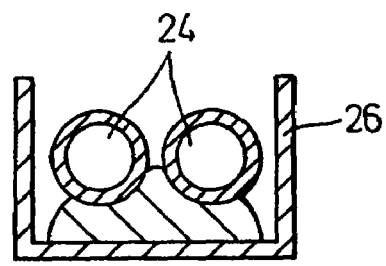
FIG. 28 is a sectional view showing the light source device in FIG. 27.
Figure 29:
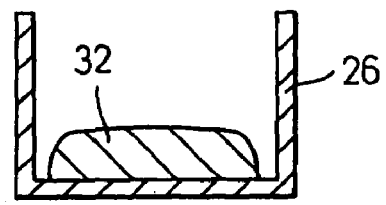
FIG. 29 is a view showing the reflector of FIGS. 27 and 28 when an adhesive is dropped.

FIG. 27 is a sectional view showing the light source device of a still further embodiment of the present invention. FIG. 28 is a sectional view of the light source device shown in FIG. 27. FIG. 29 shows a reflector when an adhesive is dropped. The light source device 18 in this embodiment includes discharge tubes 24, a reflector 26 and a heat conduction member 32 in the same way as in the foregoing embodiment. The heat conduction member 32 uses a heat conductive adhesive (SE4486, a product of Dow Corning Toray Silicone Corporation). As shown in FIG. 29, the adhesive is dropped and applied onto the inner surface of the reflector 26 to form a ball of the adhesive having a width of 5.8 mm and a height of 0.9 mm. Each discharge tube 24 is urged, toward the adhesive ball, by a distance of 0.8 mm from the inner surface of the reflector 26.

Figure 30:
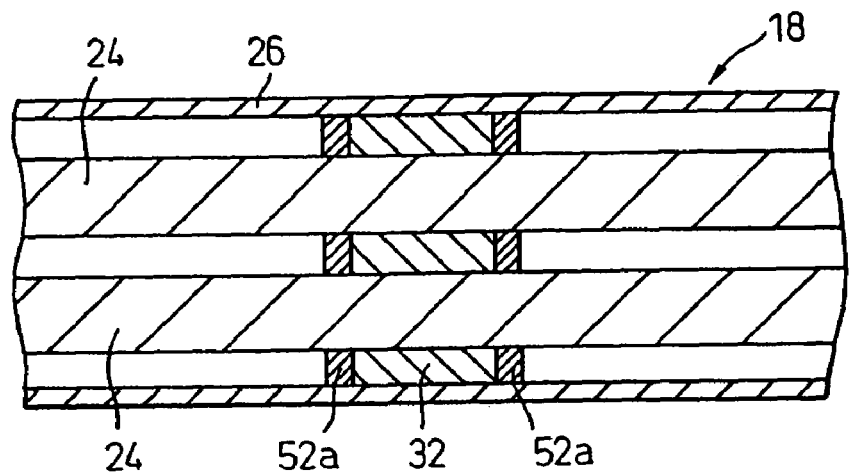
FIG. 30 is a sectional view showing the light source device of a modified embodiment of the present invention.
Figure 31:
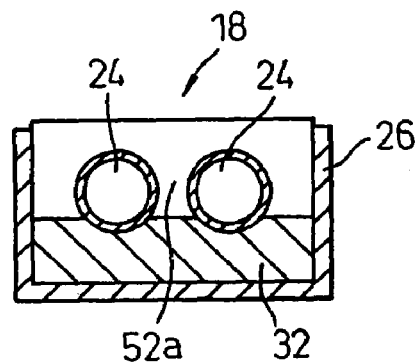
FIG. 31 is a sectional view showing the light source device in FIG. 30.

FIG. 30 is a sectional view showing the light source device of a still further modified embodiment of the present invention. FIG. 31 is a sectional view of the light source device shown in FIG. 30. The light source device 18 in this embodiment includes discharge tubes 24, a reflector 26 and a heat conduction member 32 made of a heat conductive adhesive in the same way as the foregoing embodiment. The heat conduction member 32 is sandwiched by a translucent silicone rubbers (TSE221-5U, a product of GE-Toshiba Silicone Corporation) 52a. The silicone rubber 52a has holes through which the discharge tubes 24 are passed. The discharge tubes 24 are passed through a pair of holes of the silicone rubber 52a, and 0.02 ml of the adhesive is charged into a space between the pair of silicone rubbers 52a while this space is maintained. As a result, the heat conduction member 32 covers ⅓ of the surface (circumference) of the discharge tubes 24 and is fitted to the reflector 26. In this embodiment, the heat radiation property to the reflector 26 is improved 1.8 times the prior art device. When the current to the discharge tubes 24 is set to 10 mA, the temperature rise of the discharge tubes 24 can be limited to about 20° C. with respect to room temperature.

Figure 32:
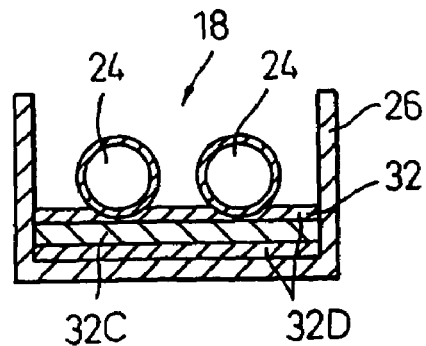
FIG. 32 is a sectional view showing the light source device of a modified embodiment of the present invention.

FIG. 32 is a sectional view showing the light source device of a yet further embodiment of the present invention. The light source device 18 in this embodiment includes discharge tubes 24, a reflector 26 and a heat conduction member 32 made of a heat conductive adhesive in the same way as the foregoing embodiment. The heat conduction member 32 comprises a heat conductive rubber 32C and a heat conductive adhesive. To form the heat conductive rubber 32C, a 0.5 mm-thick silicone type heat conductive rubber (HT-50, a product of Nittoh Shinko Corporation) is cut to 5.5 mm×5.0 mm and is bonded to the discharge tubes 24 and the reflector 26 by using the heat conductive adhesive 32D. The heat conductive adhesive 32D is applied to a wire having a diameter of 0.5 mm and is added drop-wise onto the heat conductive rubber 32C. After the heat conductive rubber 32C is spread on the entire surface the heat conductive rubber 32C, the heat conductive rubber 32C is bonded to the discharge tubes 24 and the reflector 26. As a result, heat radiation efficiency to the reflector can be improved 1.9 times in comparison with the conventional structure. When the current to the discharge tubes 24 is 10 mA, the temperature rise of the discharge tubes 24 is about 18° C. with respect to the room temperature.

Figure 33:
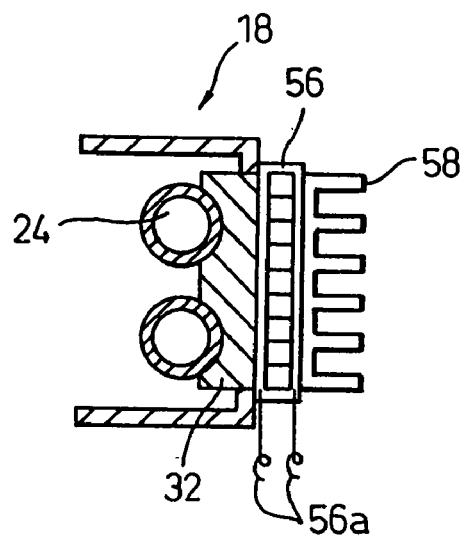
FIG. 33 is a sectional view showing the light source device of a modified embodiment of the present invention.
Figure 34:
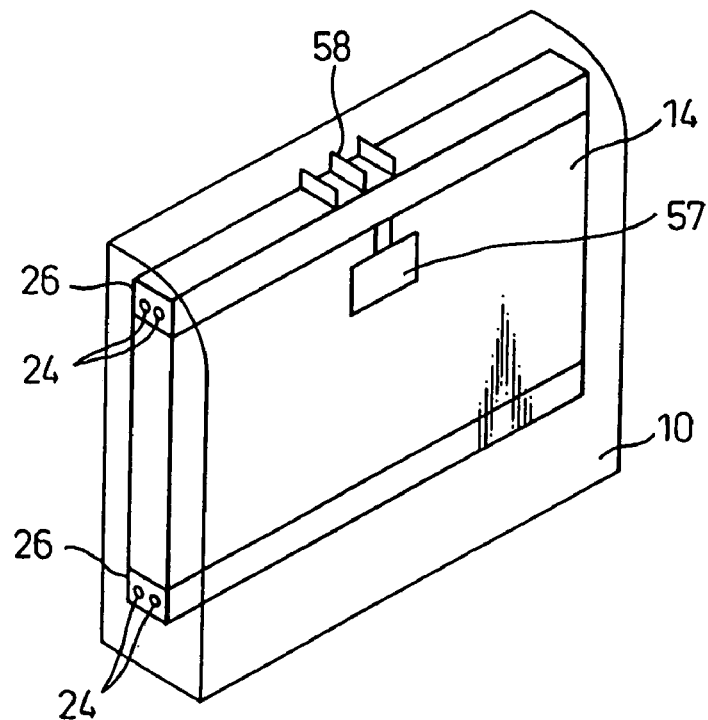
FIG. 34 is a schematic perspective view showing the liquid crystal display device including the light source device in FIG. 33.
Figure 35:
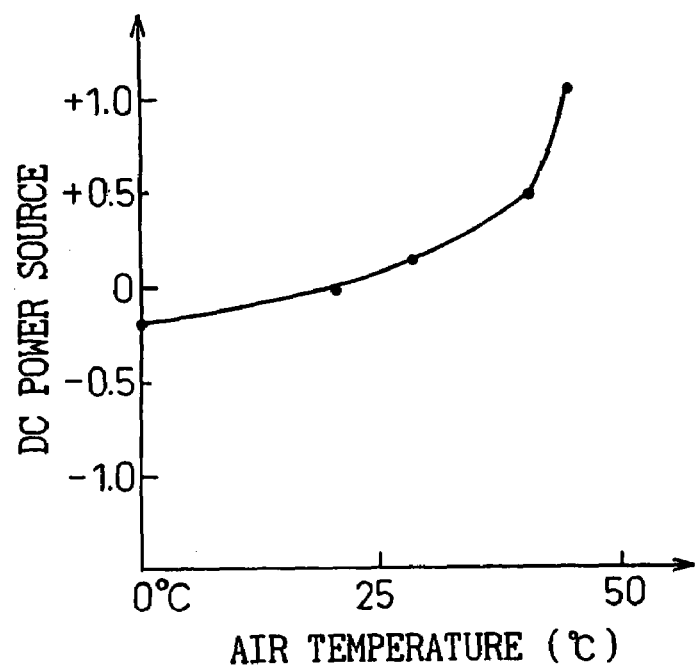
FIG. 35 is a diagram showing the relation between an external temperature of the light source device in FIG. 33 and a current of a Peltier device.
Figure 36:
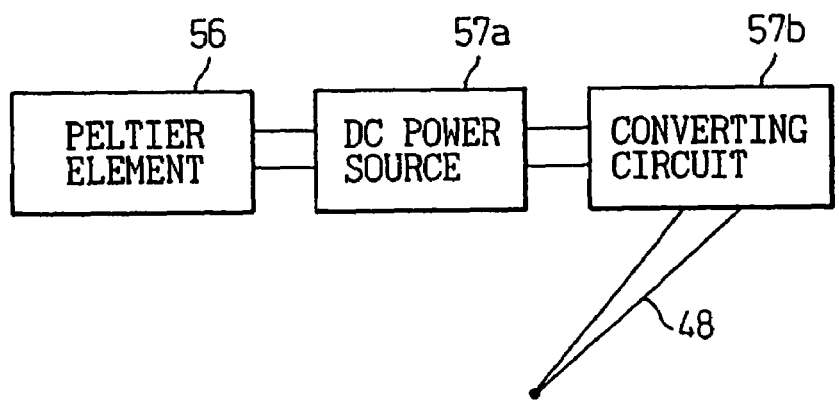
FIG. 36 is a diagram showing an example of a driving circuit of the Peltier device.

FIG. 33 is a sectional view showing the light source device of a yet further embodiment of the present invention. FIG. 34 is a schematic perspective view showing a liquid crystal display device including the light source device of FIG. 33. FIG. 35 is a graph showing the relation between the external temperature of the light source device of FIG. 33 and the current of the Peltier element. FIG. 36 is a block diagram showing an example of a driving circuit for the Peltier element. The light source device 18 in this embodiment includes discharge tubes 24, a reflector 26 and a heat conduction member 32 made of a heat conductive adhesive in the same way as the foregoing embodiment. The heat conduction member 32 comprises a heat conductive rubber 32C and a heat conductive adhesive.

A hole having a size of 5.5 mm×5.5 mm is bored in the bottom of the reflector 26. A heat conduction member 32 made of a heat conductive rubber (Thercon GR-D, a product of Fuji Polymer Corporation, 1.0 mm thick, heat conductivity: 1.5 W/m/K) is brought into contact with the discharge tubes 24 on one hand and is passed through the hole of the reflector 26, on the other. A Peltier element 56 having a size of 6.0 mm×6.0 mm is fitted to the outer surface of the heat conduction member 32 through bonding power of the heat conductive rubber. While the Peltier element 56 and the heat conduction member 32 are pushed onto the discharge tubes 24 at a pressure of 100 kPa, the Peltier element 56 and the heat conduction member 32 are fixed to the reflector 26. Further, a heat sink 58 is fitted to the outside of the Peltier element 56. The Peltier element 56 keeps contact with, or is bonded to, the reflector 26 in the proximity of the point where the reflector 26 keeps contact with, or is bonded to, the heat conduction member 32.

A controller 57 controls the Peltier element 56. A DC current is supplied, by a lead wire 56a, to the Peltier device 56. The controller 57 includes a DC power source 57a and a converting circuit 57b, and the output of a thermocouple 48 is supplied to the converting circuit 57b. The supply of the DC current to the Peltier element 56 is controlled with respect to the external temperature of the backlight unit. Temperature measuring terminals of the thermocouple 48 are arranged at positions spaced apart by 10 mm from the back (the surface not permitting the light to leave therefrom) inside the casing of the liquid crystal display device. Inversion of polarity at the external temperature of 20° C. is inhibited, and 1.2 KW is supplied at an external temperature of 35° C. or more. As the Peltier element 56 is disposed, the temperature of the discharge tubes 24 can be reduced by maximum 35° C. Incidentally, the temperature measuring terminals of the thermocouple 48 are arranged inside the casing of the liquid crystal display device in this embodiment. When any correlation exists between the temperature of air encompassing the discharge tubes and that of open air, the temperature measuring terminals of the thermocouple 48 may well be disposed at any position (outside the casing of the liquid crystal display device, for example).

Figure 37:
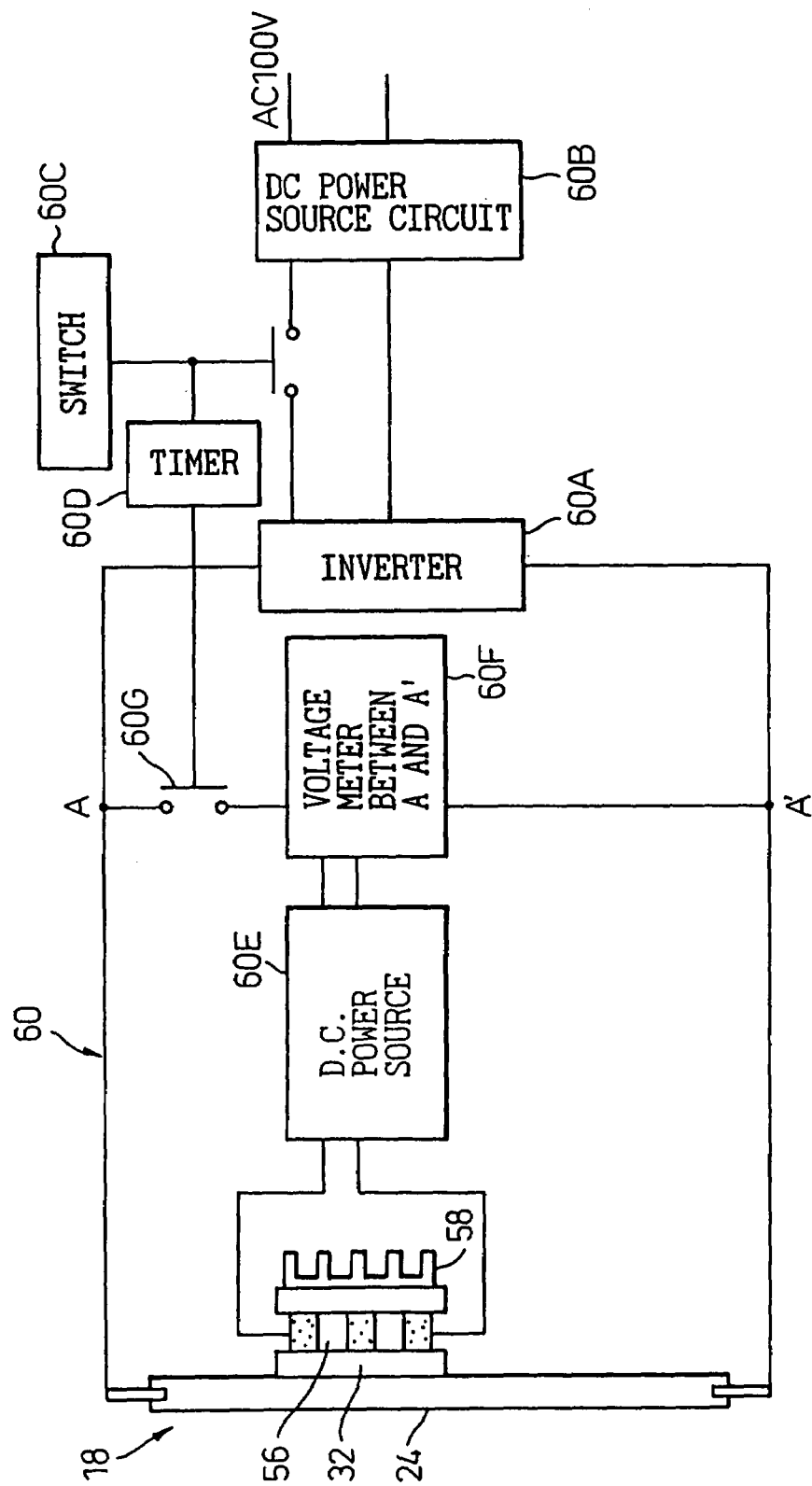
FIG. 37 is a view showing a modified embodiment of the controller in FIG. 36.
Figure 38:
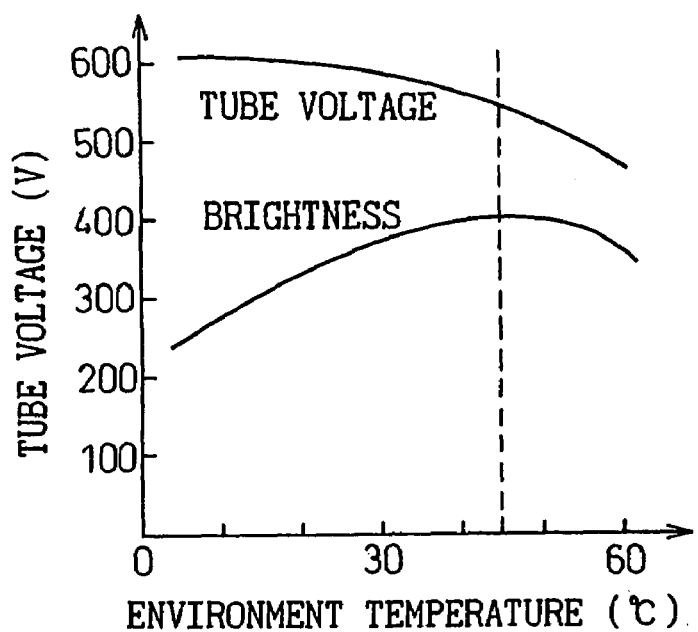
FIG. 38 is a diagram showing the relation between an ambient temperature and a discharge tube voltage.

FIG. 37 shows a modified example of the controller shown in FIG. 36. FIG. 38 is a graph showing the relation between the ambient temperature and the discharge tube voltage. Referring to FIG. 37, the light source device 18 in this embodiment includes discharge tubes 24, a reflector 26 and a heat conduction member 32 in the same way as the foregoing embodiment. A Peltier element 56 is fitted to the outer surface of the heat conduction member 32, and a heat sink 58 is fitted to the outside of the Peltier element 56. A controller 60 controls the Peltier element 56.

The controller 60 includes a discharge tube inverter 60A for supplying the current to the discharge tubes 24. The inverter 60A is connected to a power source circuit 60B and a switch 60C. A timer 60D is connected to the switch 60C. The Peltier element 56 is connected to a constant voltage power source 60E. A voltage meter 60F is connected to the constant voltage power source 60E to detect a voltage across both terminals (A-A' voltage) of the discharge tube 24. A switch 60G is disposed in the circuit of the voltage meter 60F.

The inverter 60A and the DC power source circuit 60B supply a constant current to the discharge tubes 24 to keep the light quantity of the discharge tubes 24 substantially constant. Since the temperature of the discharge tube 24 and its resistance have a negative correlation, the voltage of the discharge tube 24 monotonously decreases when the current of the discharge tube 24 is kept constant. When the current of the discharge tube 24 is 10 mA, its voltage becomes 550 V under the temperature condition in which the light quantity becomes maximal (see FIG. 38).

Therefore, the controller 60 of the Peltier element 56 includes a mechanism for reflecting the voltage of the discharge tube 24 and optimizes the temperature of the discharge tube 24. The Peltier element 56 controls the temperature of the discharge tube 24. The voltage meter 60F measures the voltage drop of the discharge tube 24, and the timer 60D controls the timing at which the voltage meter 60F measures the voltage. The output of the voltage meter 60F is sent to the constant voltage source 60E to reflect the voltage to the Peltier element 56. After the discharge tubes 24 are turned ON for 1 minute, the timer 60D cuts the circuit between the HI side electrode (driving electrode) of the discharge tube 24 and the terminal of the voltage meter 60F. In this way, the initial voltage (>1,000 V) at the ON time is prevented from being applied to the voltage meter 60F.

Figure 39:
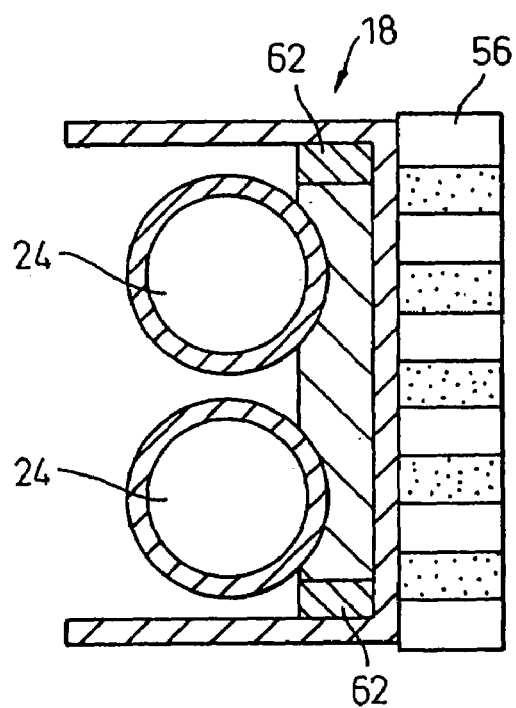
FIG. 39 is a sectional view showing the light source device of a modified embodiment of the present invention.
Figure 40:
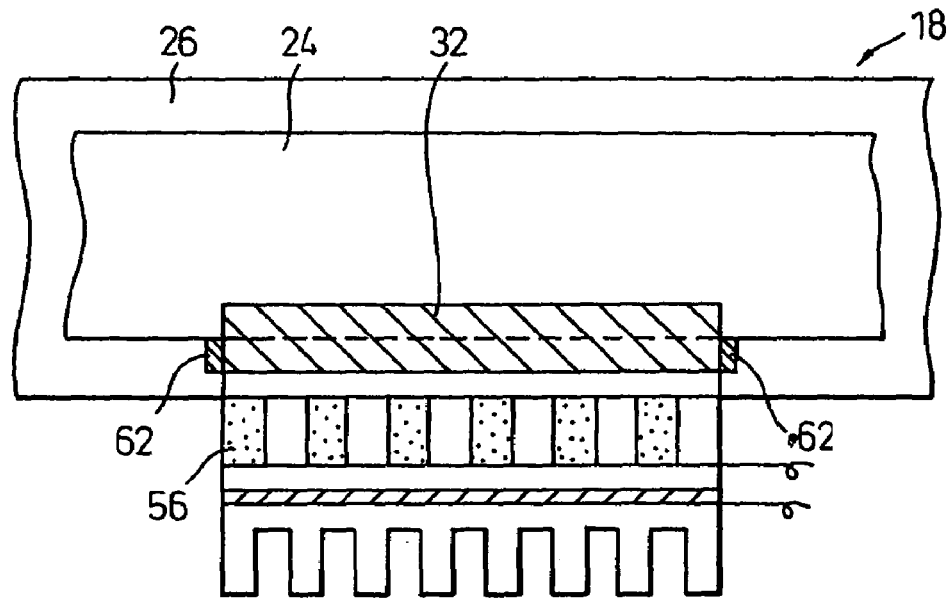
FIG. 40 is a sectional view showing the light source device in FIG. 39.
Figure 41:
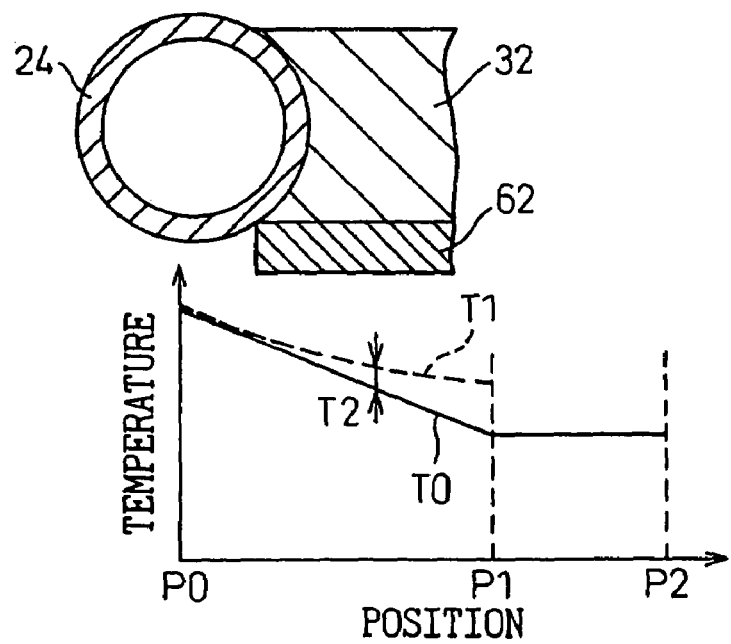
FIG. 41 is an explanatory view explaining the operation of the light source device in FIGS. 39 and 40.

FIG. 39 is a sectional view showing the light source device of a still further embodiment of the present invention. FIG. 40 is a sectional view of the light source device shown in FIG. 39. FIG. 41 explains the operation of the light source device shown in FIGS. 39 and 40. The light source device 18 of this embodiment includes discharge tubes 24, a reflector 26, a heat conduction member 32 made of a heat-conductive rubber and a Peltier element 56 in the same way as in the foregoing embodiment. The heat conduction member 32 comprises a heat-conductive rubber 32C and a heat conductive adhesive 32D. A 0.5 mm-thick bakelite plate 62 is bonded to the periphery of the heat conduction member 32.

Referring to FIG. 41, the curve TO represents the temperature of the heat conduction member 32. The curve T1 represents the ambient air temperature. The curve T2 represents the difference between the curve TO and the curve T1. The position PO represents the surface of the discharge tube 24. The position P1 represents the surface of the Peltier element 56 on the side of the discharge tube 24. The position P2 represents the surface of the Peltier element 56 on the heat discharge side. When the Peltier element 56 absorbs much heat from the heat conduction member 32, it takes away heat from around the heat conduction member 32 through the heat conduction member 32. In other words, heat in the heat conduction member 32 is lost to the extent corresponding to the temperature T2. When this heat absorption is examined, 0.7 W is taken from air among calorie of 1 W (per 0.36 cm$^2$) discharged from the Peltier element 56. In this embodiment, the bakelite plate 62 is disposed so that heat cannot be taken away easily from the portions other than the discharge tube 24. Consequently, cooling efficiency of the predetermined portion of the discharge tube 24 can be drastically improved. In this way, electric power necessary for lowering the tubular wall temperature of the discharge tube 24 by 30° C. can be reduced from 1.2 W to 0.7 W.

Figure 42:
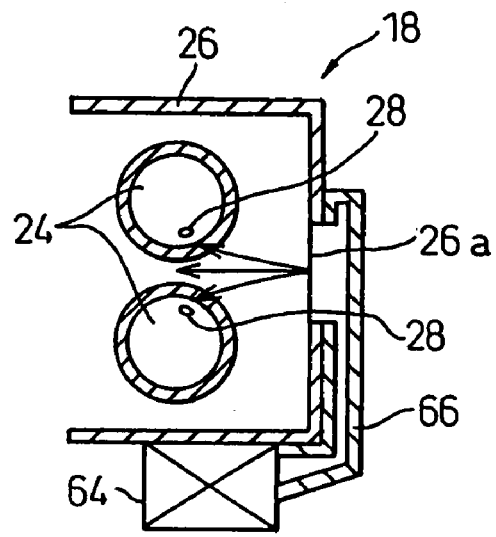
FIG. 42 is a sectional view showing the light source device according to the second embodiment of the present invention.
Figure 43:
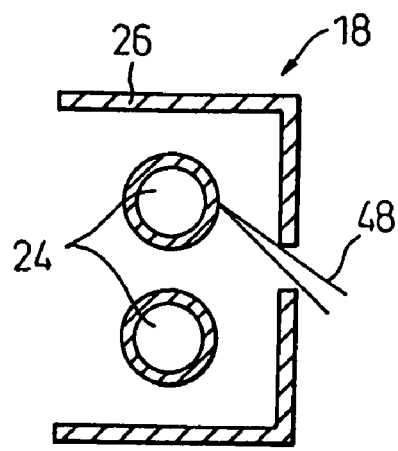
FIG. 43 is a sectional view showing the light source device in FIG. 42.
Figure 44:
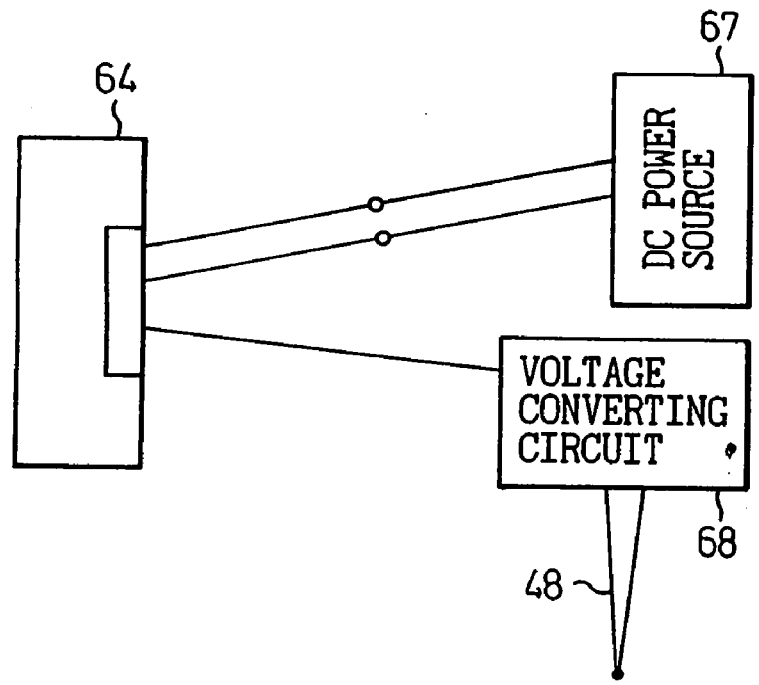
FIG. 44 is a block diagram showing the control of the fan in FIGS. 42 and 43.
Figure 45:
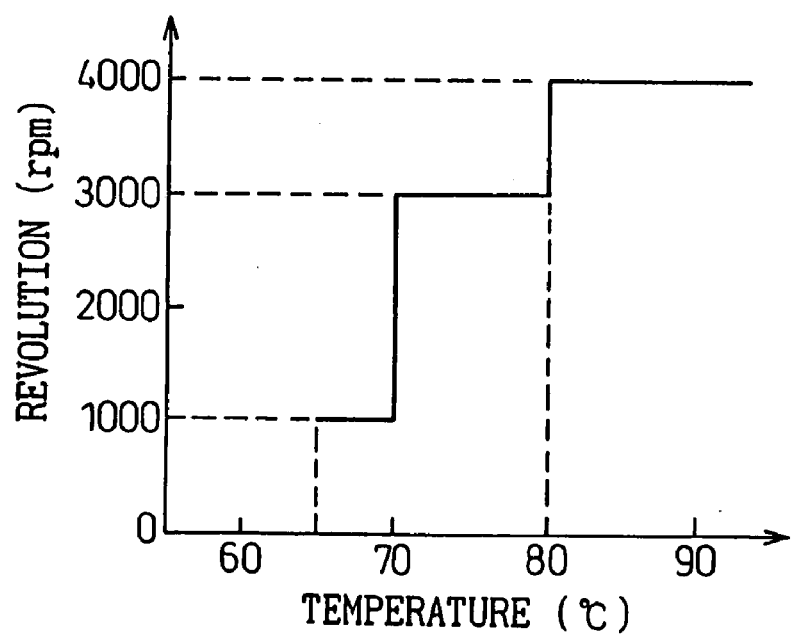
FIG. 45 is an explanatory view explaining the operation of the light source device in FIGS. 42 and 43.

FIG. 42 is a sectional view showing the light source device of the second embodiment of the present invention. FIG. 43 is a sectional view of the light source device shown in FIG. 42. FIG. 44 is a circuit diagram showing a fan controlling circuit in FIGS. 42 and 43. FIG. 45 explains the operation of the light source device shown in FIGS. 42 and 43. The light source device 18 in this embodiment includes a plurality of discharge tubes 24 and a reflector 26 covering all these discharge tubes 24. A fan 64 and a duct 66 are disposed to cool the discharge tubes 24. A hole 26a having a diameter of 0.5 mm is formed at the center of the bottom of the reflector 26.

Cooling air flows from the axial-flow fan (40 mm in diameter) 64 fitted below the reflector 26 through the duct 66 and the hole 26a of the reflector 26 and is blown to the opposing portions of the two discharge tubes 24. As a result, one point of the mutually opposing sides of the two discharge tubes 24 becomes the most cooled portion as to the circumferential direction of the discharge tubes 24 so that non-evaporated mercury particles 28 can be concentrated on this portion of the discharge tube 24. Since the mercury particles 28 cut off the light, luminance drops at this portion of the discharge tube 24, but the light outgoing from this portion of the discharge tube 24, to which the mercury particles 28 adhere, are made incident to the opposing discharge tube 24. In consequence, the loss of the light quantity does not occur, and the loss of the light quantity can be substantially reduced in comparison with the case where the mercury particles are allowed to adhere to other portions. Further, the speed of the fan 64 is controlled depending on the surface temperature of the discharge tube 24.

AS shown in FIG. 43, a thermocouple 48 is fitted to the surface of the discharge tube 24 (at a position opposing the bottom of the reflector 26 and spaced apart by 50 mm from the position at which cooling air is blown in the longitudinal direction). FIG. 44 shows a DC power source 67 and a voltage converting circuit 68 for controlling the fan 64. When the temperature detected by the thermocouple 48 is not higher than 65° C., the speed of the fan is set to 0. The speed is controlled, depending on the temperature, at a temperature higher than 65° C.

Figure 46:
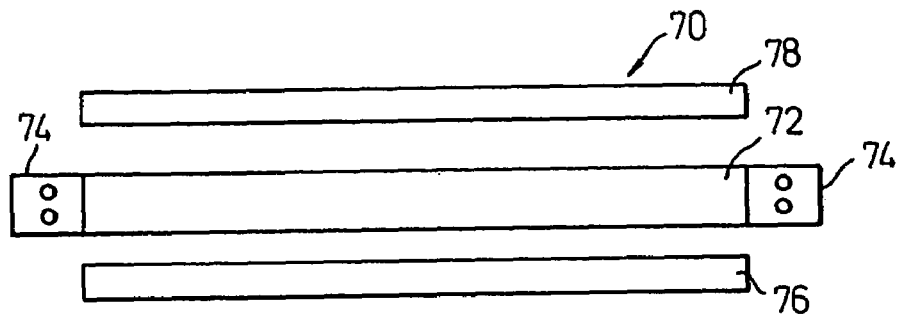
FIG. 46 is a view showing the backlight of a liquid crystal display device according to the third embodiment of the present invention.

FIG. 46 shows the backlight of the liquid crystal display device according to the third embodiment of the present invention. Referring to FIG. 46, the backlight 70 of the liquid crystal display device includes a light guide plate 72, light source devices 74 disposed on either side of the light guide plate 72, an interference type mirror 76 disposed below the light guide plate 72 and a linear polarization separating element 78 disposed above the light guide plate 16. Each light source device 74 comprises discharge tubes and a reflector as described above. A conventional scattering layer is coated onto the acrylic light guide plate 72 by screen-printing.

The polarization separating element 78 comprises a cholesteric liquid crystal polymer film and broad-band 4/1 wavelength plates bonded to both surfaces of the cholesteric liquid crystal polymer film. The interference type mirror 76 has a multi-layered structure fabricated by laminating a plurality of transparent film layers having a light absorption property and birefringence.

The polarization separating element 78 receives the ray of light outgoing from the light guide plate 16, and allows a first linearly polarized light having a plane of polarization (vibration plane) inclusive of the transmission axis to transmit therethrough and to be a second linearly polarized light having a plane of polarization inclusive of the reflection axis to be reflected. The interference type mirror 76 rotates the plane of polarization of the second linearly polarized light reflected by the polarization separating element 78 and converts it mainly into the first linearly polarized light. First linearly polarized light so converted is made incident again to the polarization separation element 78 through the light guide plate 72 and is transmitted through the polarization separating element 78. Therefore, this embodiment can improve the utilization efficiency of light.

Figure 47:
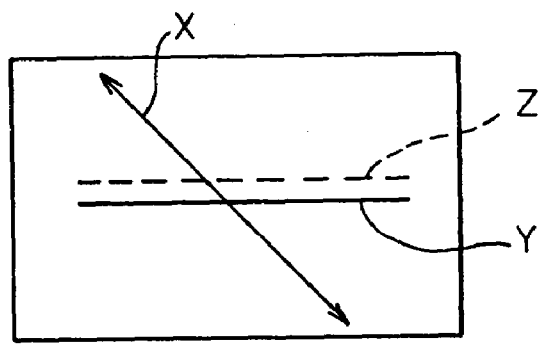
FIG. 47 is a diagram showing the relation between the linear polarization separating device and the interference type mirror.

FIG. 47 shows the relation between the polarization separating element 78 and the interference type mirror 76 shown in FIG. 46. Arrow X represents the vibrating direction of the second linearly polarized light reflected by the polarization separating element 78. Straight line Y of solid line represents the direction of a fast axis or a slow axis of the interference type mirror 76. The straight broken line Z represents the fast axis or the slow axis of the ¼ wavelength plate of the polarization separating element 78 on the side of the light guide plate 72.

In this embodiment, the direction of the fast axis or the slow axis of the interference type mirror 76 represented by the line Y is arranged at an angle of 45 degrees to the vibrating direction of second linearly polarized light reflected by the polarization separating element 78 represented by the arrow X. The direction of the fast axis or the slow axis of the ¼ wavelength plate of the polarization separating element 78 represented by the line Z on the side of the light guide plate 72, too, is arranged at the angle of 45 degrees to the vibrating direction of the second linearly polarized light. In other words, the direction of the fast axis or the slow axis of the interference type mirror 76 is the same as the direction of the fast axis or the slow axis of the ¼ wavelength plate of the polarization separating element 78 on the side of the light guide plate 72.

Figure 48:
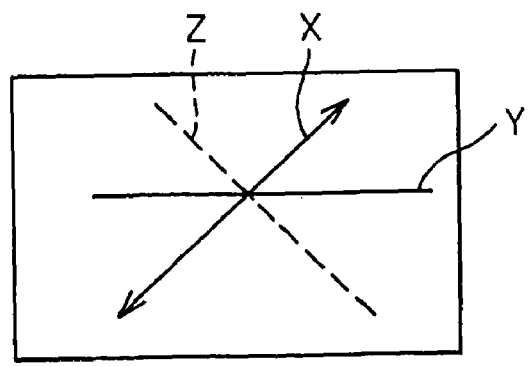
FIG. 48 is a diagram showing the relation between the linear polarization separating device and the interference type mirror of the backlight of a modified embodiment of the present invention.

FIG. 48 shows the relation between the polarization separating element 78 and the interference type mirror 76 of the backlight of another embodiment of the present invention. The backlight of this modified embodiment has the same structure as that of the backlight shown in FIG. 46. In this embodiment, however, the polarization separating element 78 uses the same interference type film as that of the interference type mirror 76. The interference type mirror 76 has a multi-layered structure made of a transparent material having no light absorbing property.

Referring to FIG. 48, the fast axis or the slow axis of the interference type mirror 76 represented by straight line Y is arranged at an angle of 45 degrees to the vibrating direction of the second linearly polarized light reflected by the polarization separating element 78 represented by arrow X. The direction of the fast axis or the slow axis of the polarization separating element 78 represented by line Z is arranged at an angle of 90 degrees to the vibrating direction of the second linearly polarized light. In other words, the direction of the fast axis or the slow axis of the interference type mirror 76 is arranged at an angle of 45 degrees to the direction of the fast axis or the slow axis of the polarization isolation element 78.

Figure 49:
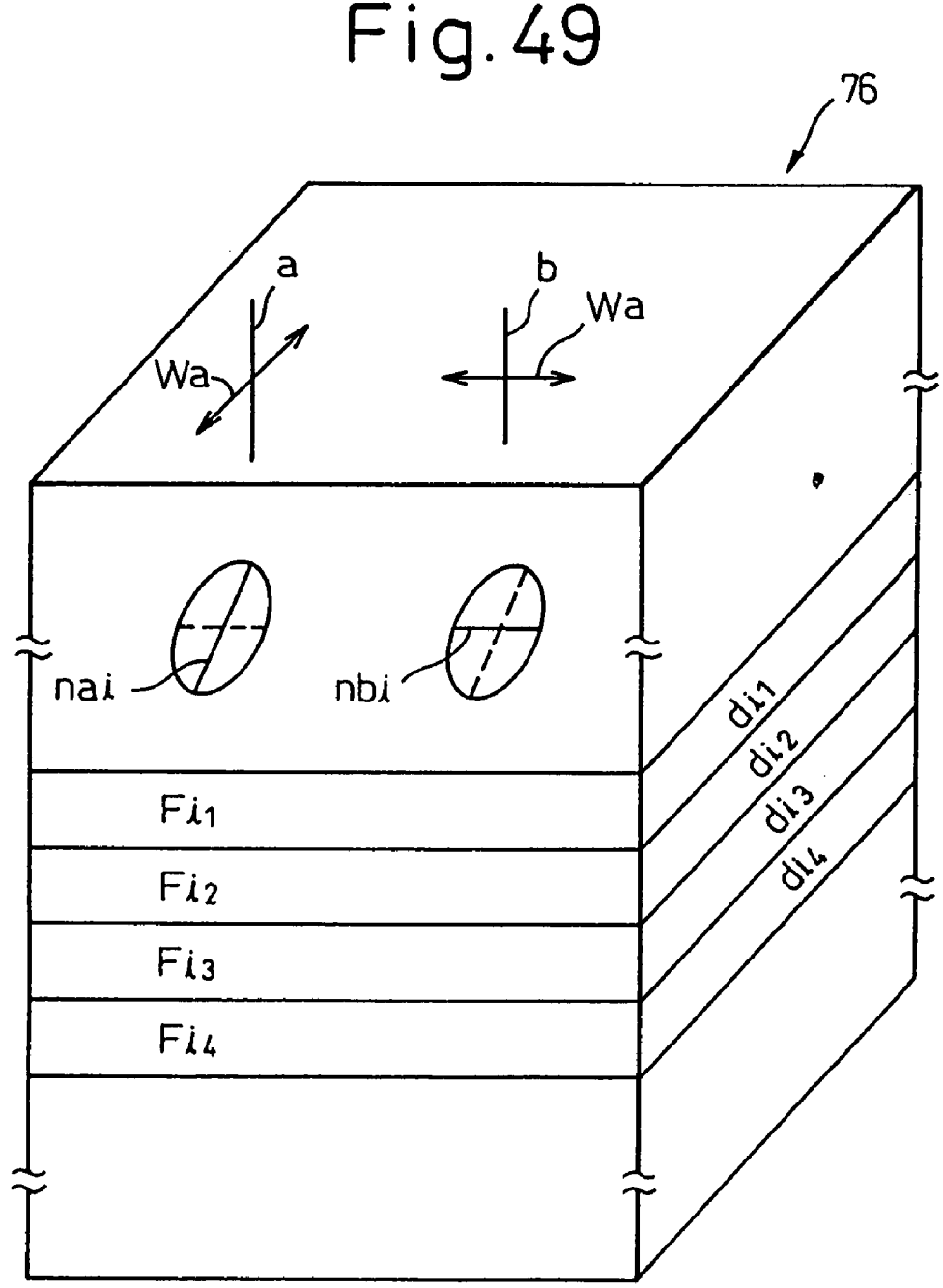
FIG. 49 is a view showing a construction of the interference type mirror.

FIG. 49 shows the construction of the interference type mirror 76. The interference type mirror 76 is a multi-layered structure film fabricated by alternately laminating extremely thin polyester films having birefringence realized by a relatively strong stretching and extremely thin polyester films having birefringence realized by a relatively weak stretching. Symbols Fi1 to Fi4 represent the film layers. Symbols di1 to di4 represent the thickness of the film layers Fi1 to Fi4.

The number "i" film layer Fi1 of the interference type mirror 76 has such a property that with respect to two orthogonal linearly polarized lights "a" and "b", a predetermined wavelength $\lambda ai$ satisfies the relation, $nai \times di = nai \times (N+0.5)$ and a predetermined wavelength $\lambda bi$ satisfies the relation, $nbi \times di + nbi \times (N+0.5)$, where nai and nbi are birefringence of the film for two orthogonal linearly polarized lights, and $\lambda ai \approx \lambda bi$.

Figure 50:
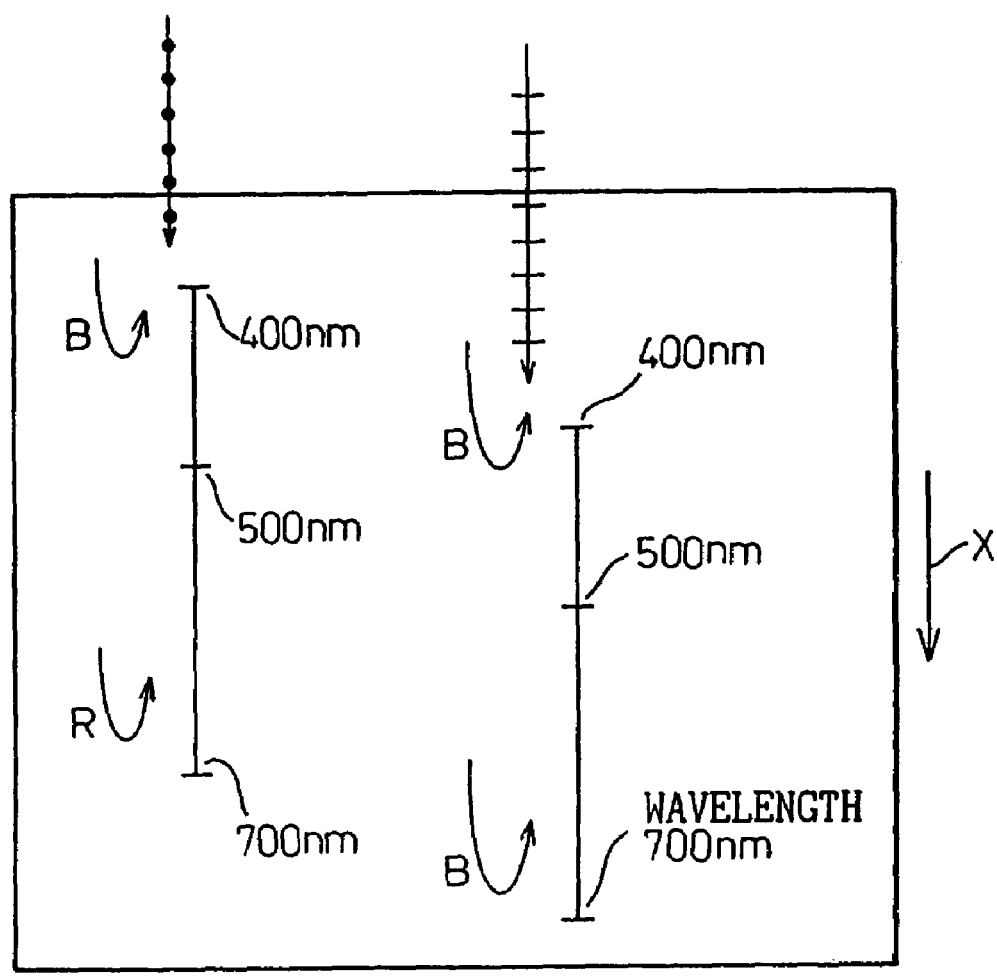
FIG. 50 is a view explaining the function of the interference type mirror.

The wavelengths $\lambda ai$ and $\lambda bi$ for two linearly polarized lights "a" and ""b" become approximately greater as the number "i" increases, and are intended to cover the visible light range (wavelength band: 400 to 700 nm: see FIG. 50). In FIG. 50, for example, the position at which the linearly polarized light "a" of a wavelength band of B color band is reflected (that is, the film layer) is different from the position at which the linearly polarized light "b" of a wavelength of B color (that is, the film layer) is reflected. This also holds true of the linearly polarized light of other colors.

Since the effective reflection film layers for the same wavelength $\lambda$ are different, a phase difference $\Delta\lambda \approx 0.5\lambda$ occurs between two linearly polarized light "a" and "b" having the same wavelength $\lambda$. The phase difference preferably satisfies the relation $\Delta\lambda = 0.5\lambda$ at all the wavelengths but the relation $\Delta\lambda \approx 0.5\lambda$ may well be satisfied at wavelengths of predetermined bands (420 to 500 nm in the B color band, 415 to 590 nm of a G color band and 600 to 670 nm in a R color band). As long as $\Delta\lambda$ or the mean value of $\Delta\lambda$ substantially falls within the range of $0.25\lambda$ to $0.75\lambda$ at wavelengths of predetermined bands (420 to 500 nm in the B color band, 410 to 590 nm in the G color band and 600 to 670 nm in the R color band), the major proportion of the rays of light reflected by the interference type mirror 76 and made incident to the polarization separating element 78 transmit through the polarization separating element 78 and are effectively utilized.

Figure 51:
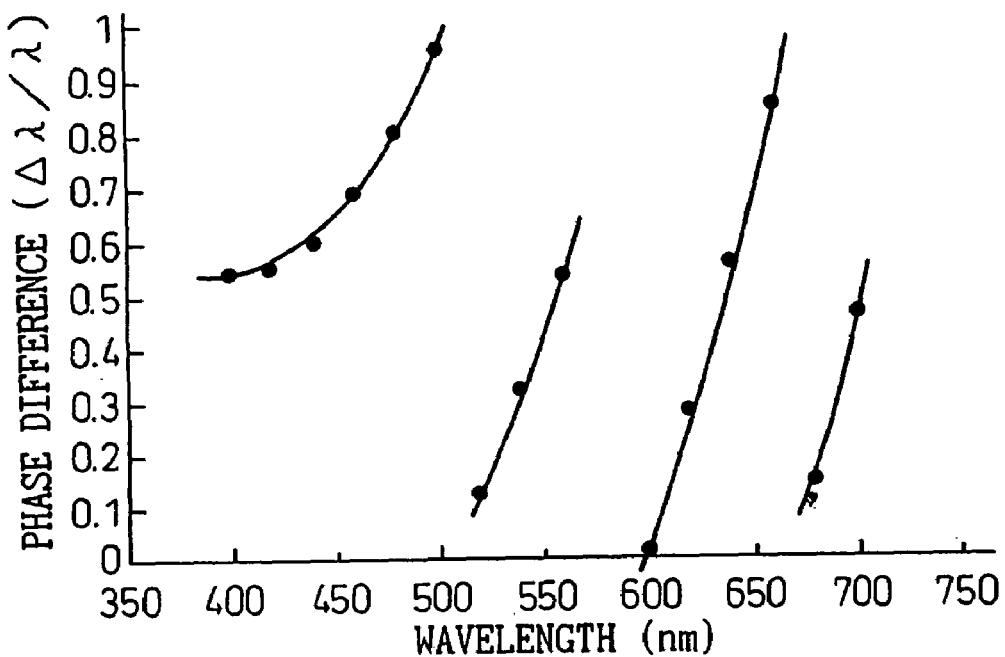
FIG. 51 is a diagram showing the relation between a wavelength and a phase difference for explaining the characteristic example 1 of the interference type mirror.
Figure 52:
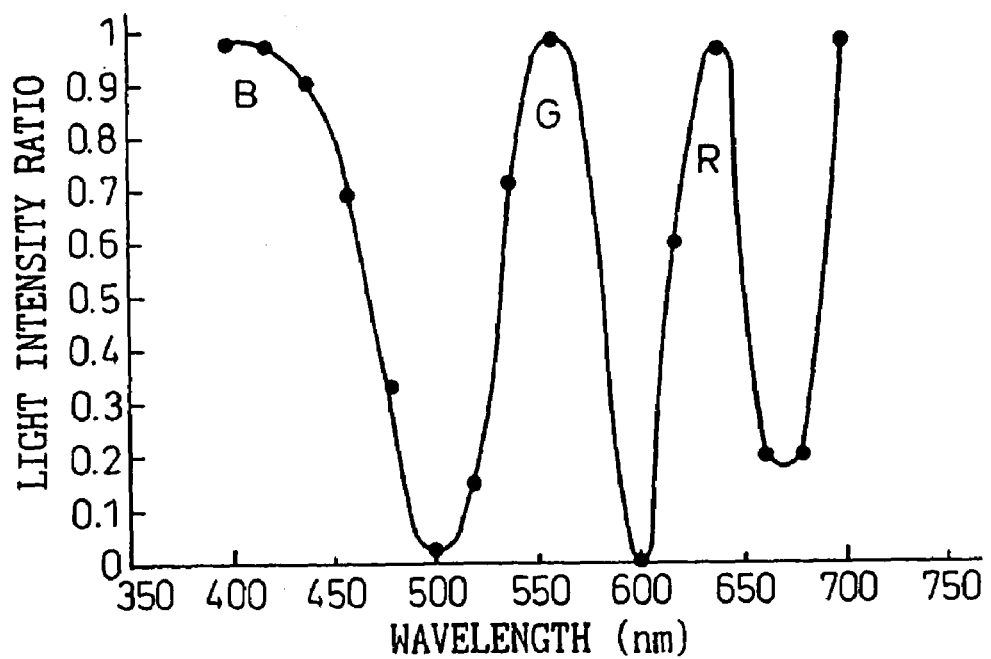
FIG. 52 is a diagram showing the relation between a wavelength and a light quantity ratio for explaining the characteristic example 1 of the interference type mirror.

FIGS. 51 and 52 show a characteristic example (1) of the interference type mirror 76. This example is directed to allow the B color reflected light and the R color reflected light to pass through the polarization separating element 78 to the greatest possible amount to acquire high brightness.

Figure 53:
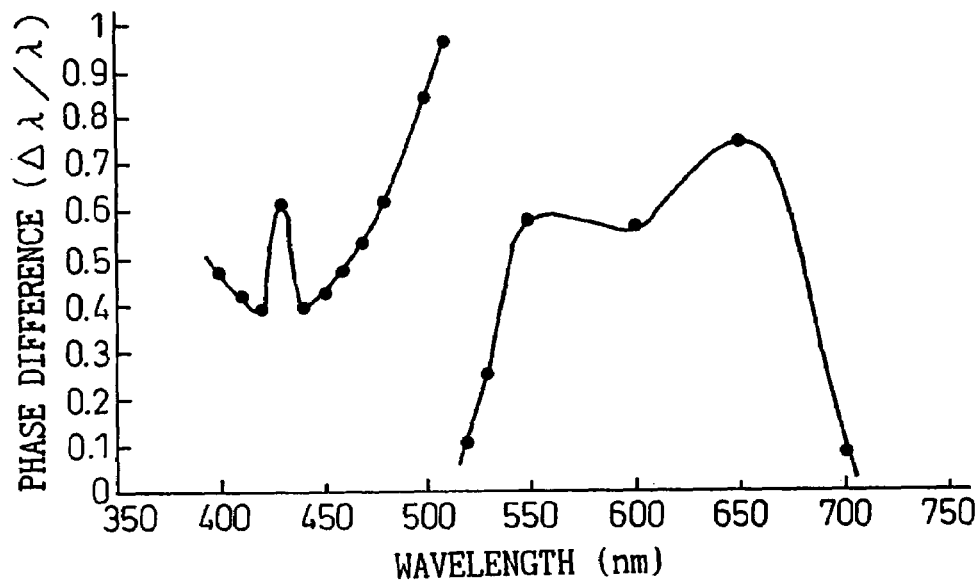
FIG. 53 is a diagram showing the relation between a wavelength and a phase difference for explaining the characteristic example 2 of the interference type mirror.
Figure 54:
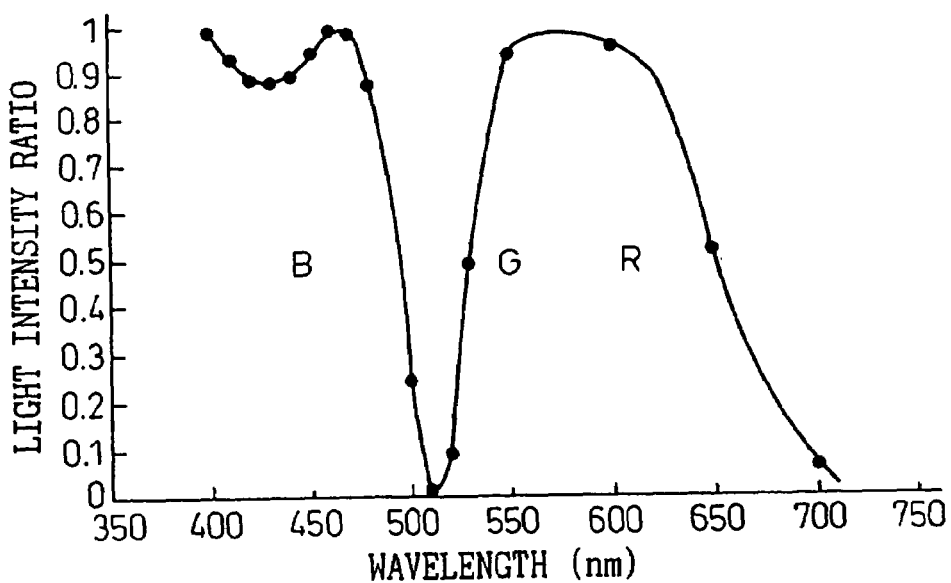
FIG. 54 is a diagram showing the relation between a wavelength and a light quantity ratio for explaining the characteristic example 2 of the interference type mirror.

FIGS. 53 and 54 show a characteristic example (2) of the interference type mirror 76, which is directed so that portions of spectrum existing at boundaries between three primary color portions cannot easily pass through the polarization separating element 78 to acquire highly pure chromaticity of the three primary colors.

Figure 55:
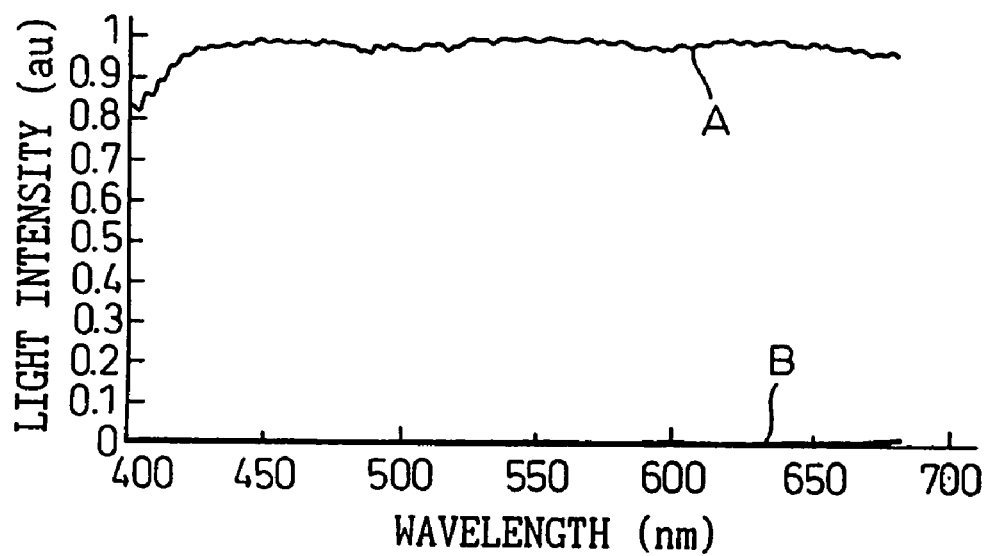
FIG. 55 is a diagram showing the relation between a wavelength and a phase difference for explaining the characteristic example 3 of the interference type mirror.
Figure 56:
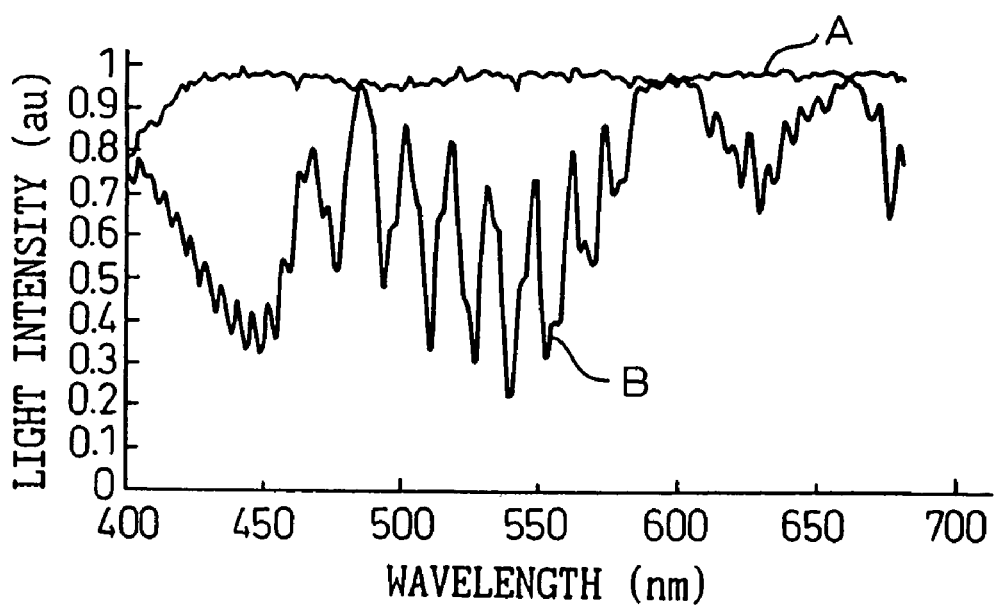
FIG. 56 is a diagram showing the relation between a wavelength and a light quantity ratio for explaining the characteristic example 3 of the interference type mirror.

FIGS. 55 and 56 show a characteristic example (3) of the interference type mirror film. This example indicates that, in the relation between the fast axis (slow axis) of the interference type mirror 76 and the fast axis (slow axis) of the ¼ wavelength plate constituting the polarization separating element 78 on the light guide plate side, the quantity of effective reflected light having a plane of polarization in the transmitting direction of the polarization separating element 78 is great when both of them face the same direction but the quantity of effective reflected light becomes extremely small when both describe an angle of 45 degrees.

In this embodiment, light utilization efficiency can be improved by 0 to 10% in the backlight 70 equipped with the polarization separating element 78, by replacing the conventional scatter reflection plate with the interference type mirror 76, since scattering due to the scatter reflection plate disappears. Alternatively, by replacing the conventional metal mirror with the interference mirror 76, absorption due to the metal mirror does not exist, so that light utilization efficiency can be improved by 0 to 20%. Further, when the direction of the fast axis (slow axis) of the birefringence film layer constituting the interference type mirror 76 is controlled, light utilization efficiency can be improved by 10 to 20%.

As described above, the interference type mirror 76 is made of a birefringence film material, so that two linearly polarized lights having identical wavelength interfere with each other or are reflected by different layers to impart a predetermined phase difference to the reflection type mirror 76. Furthermore, the direction of the fast axis or the slow axis of the birefringence layer of the interference type mirror 76 and the direction of polarized light reflected by the polarization separating element 78 are set to form approximately 45 degrees, so that the light quantity of two polarized lights are equal to each other. In this case, the direction of the fast axis or the slow axis of the birefringence layer of the interference type mirror 76 and the direction of polarized light reflected by the polarization separating element 78 are set to 45°±22.50° (23 to 67°) and, by so doing, the initial object can be accomplished.

Incidentally, the interference type mirror 76 comprises a multi-layered structure having a plurality of film layers, and there may be a case where the directions of the fast axes or the slow axes of the birefringence layers of the interference type mirror 76 are not perfectly aligned with a predetermined direction. It can be said, however, that the directions of the fast axes or the slow axes of the birefringence layers of the interference type mirror 76 are generally aligned in all the film layers (or in almost all the film layers or in at least two film layers). Therefore, the directions of the fast axes or the slow axes of the interference type mirror 76 can be determined as a whole as the mean value in the direction of the fast axes or the slow axes of all the film layers.

More specifically, the directions of the fast axes or the slow axes of the birefringence layers of the interference type mirror 76 can be said as a group of directions in which the difference between refractive indices of the adjacent film layers taken within respective layer planes and in the same directions becomes maximum, or statistic direction (the direction having higher correlation) of a group of the directions of the fast axes or the slow axes of the birefringence layers. The direction of polarized light reflected by the polarization separating element 78 can be said as the direction of the reflecting axis of the polarization separating element 78.

As the interference type mirror 76 is employed, the reflection ratio of a predetermined linearly polarized light can be improved to 100% (without the transmission loss) and the rays of reflected light can more easily pass through the polarization isolation device 78, since the absorption loss and the scattering loss of the interference type mirror 76 do not exist.

The construction shown in FIG. 48 can acquire the same function and effect as described above.

Since the angle described above may be set to 45°±22.5° (23° to 67°), the processing can be done easily by using practical stretched films. In the practical stretched films (particularly in biaxially stretched films), the fast axis (slow axis) is greatly curved in the width-wise direction of the film roll, but this curve falls within the range of, at most, ±20°, and therefore, no problem presumably occurs even when film layers of a large size are laminated as such and are then cut to produce a multi-layered film.

This embodiment uses polyester as the film material of the interference type mirror 76, but other transparent plastic films having birefringence (such as polyethylene terephthalate) can be used. This also holds true of the interference type polarization separating element 78.

Further, in the modified example of the interference type mirror 76, when the interference type mirror 76 has the multi-layered structure of films having birefringence or when the interference type mirror 76 has a multi-layered structure of films having birefringence and films not having birefringence, the group of the directions in which the difference between refractive indices of the birefringence layers in the same direction becomes maximum, or the group of the directions of the fast axis or the slow axis of the birefringence layer, may have the structure not having statistic directivity (distributed substantially uniformly in all directions, or directivity has no correlation).

Figure 57:
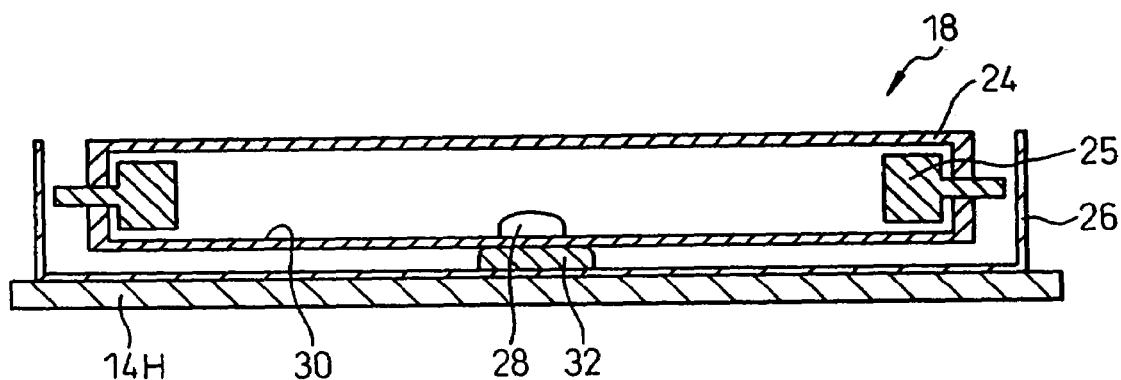
FIG. 57 is a view showing the light source device of a backlight according to the fourth embodiment of the present invention.

FIG. 57 shows the light source device 18 of the backlight according to the fourth embodiment of the present invention. The light source device 18 includes a discharge tube 24 containing mercury 28, a reflector 26 and a heat conduction member 32 interposed between the discharge tube 24 and the reflector 26. The discharge tube has electrodes 25. A fluorescent material 30 is coated to the inner surface of a glass tube constituting the discharge tube 24. The heat conduction member 32 is a cooling device defining a first position of the discharge tube 24 as a most cooled portion (the position of the discharge tube 24 at which the heat conduction member 32 is disposed is called the first position). The backlight is arranged such that liquid mercury 28 is collected at the first position in the discharge tube 24, and the discharge tube 24 emits the light with the highest brightness based on the temperature of the first position. In this embodiment, liquid mercury 28 is gathered at the first position in the discharge tube 24 through a special process before shipment of products. Incidentally, the light source device 18 is mounted to a housing 14H of the backlight 14 of the liquid crystal display device 10.

Figure 58A:
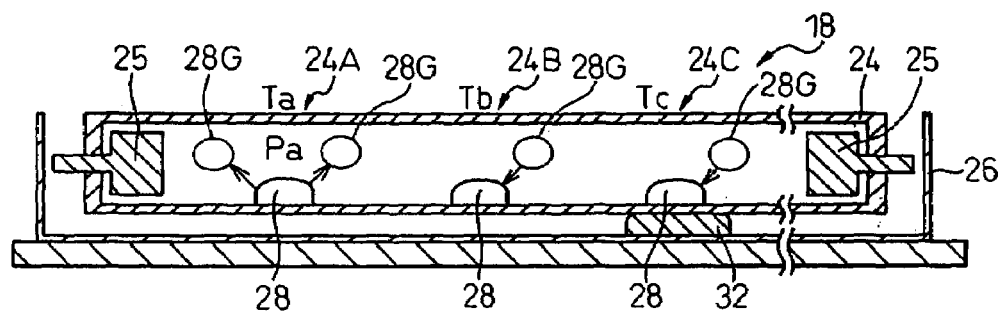
FIGS. 58A to 58C are views explaining the phenomenon where the characteristics of the light source device changes.
Figure 58B:
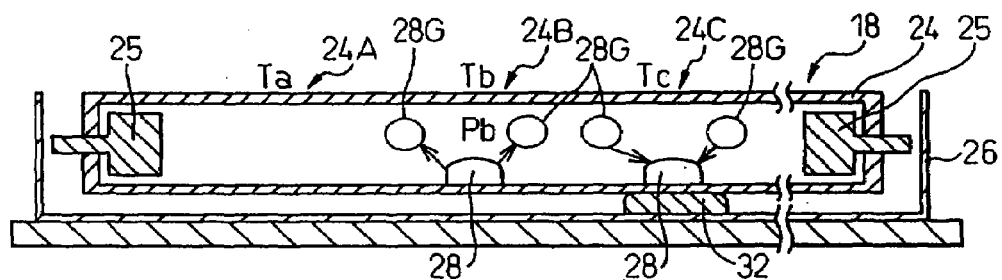
Figure 58C:
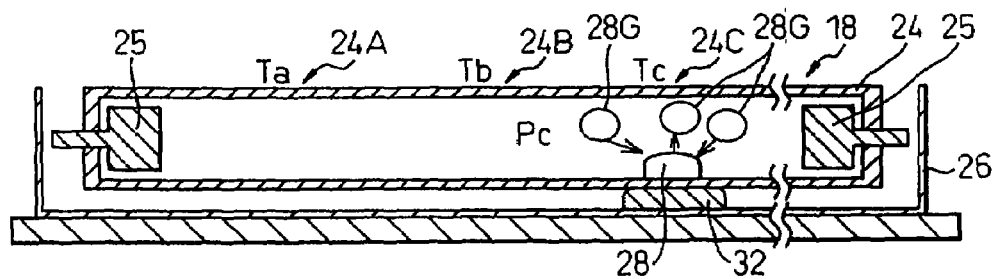
Figure 58D:
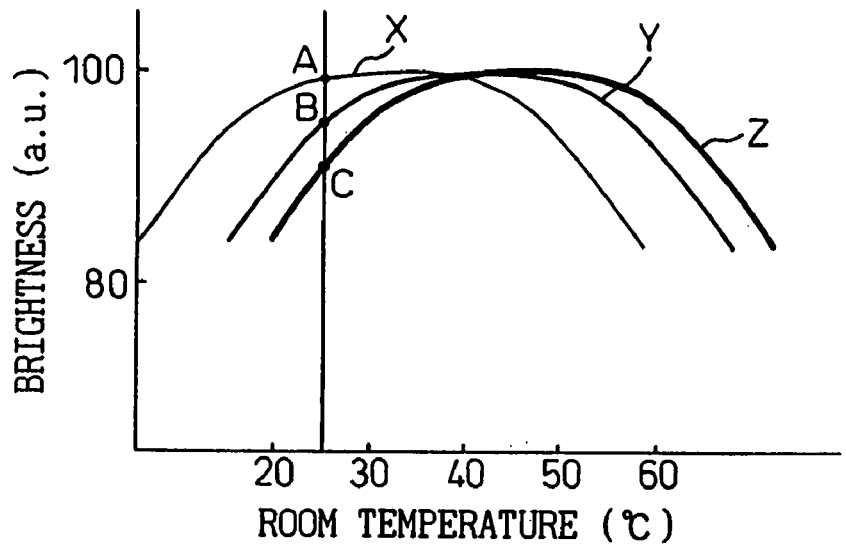
FIG. 58D is a diagram showing the relation between the brightness and the room temperature.

FIGS. 58A to 58D are views explaining the change of the characteristics of the light source device 18 when it is used while mercury is not gathered at the most cooled portion in the light source devices 18 shown in FIGS. 1 to 45. FIGS. 58A to 58C show that the position of liquid mercury 28 changes with the passage of the number of days of using the light source device 18. FIG. 58D shows the relation between the room temperature and brightness.

In FIG. 58D, curve X represents the relation between the room temperature and brightness when the light source device 18 is used immediately after production. As represented by the curve X, the maximum value of brightness reaches the point A when the room temperature is around 25° C., and brightness drops from the maximum value A when the temperature changes both up and down from 25° C. Therefore, this light source device 18 is suitably used at the room temperature of around 25° C.

It has been found, however, that, as the number of days of using the light source device 18 increases, the characteristics of the light source device 18 change. Curve Y is a graph representing the relation between the room temperature and brightness when the light source device 18 is used for 50 days after the production. As represented by the curve Y, the brightness reaches maximum at a room temperature of around 40° C. Curve Z is a graph representing the relation between the room temperature and brightness when the light source device 18 is used for 100 days after production. As represented by the curve Z, brightness reaches maximum when the room temperature is around 50° C. After the passage of 100 days, the characteristics of the light source device 18 do not change much but remain stable.

If the characteristics of the light source device 18 change as described above, the maximum brightness A cannot be achieved after the passage of a considerable number of days when the light source device 18 is always used at the room temperature, for example. In other words, brightness around 25° C. in the curve Y is the point B whereas brightness around 25° C. in the curve Z is the point C. Thus, brightness of the light source device 18 drops. Therefore, it is necessary to conduct aging in which the light source device 18 is kept ON before shipment, to stabilize the characteristics of the light source device 18. However, if aging is carried out for a long time, the number of production steps increases, a large space becomes necessary, the production cost increases, the light source device itself becomes like a used article, and brightness drops. Therefore, a light source device not calling for such aging and a production method of a backlight have been desired.

FIG. 58A shows the case where the light source device 18 is used immediately after its production. FIG. 58B shows the case where the light source 18 is used after the passage of several days from its production. FIG. 58C shows the case where the light source device 18 is used after the number of days further increases from its production. In FIGS. 58A to 58C, reference numerals 24A, 24B and 24C denote the position in the discharge tube 24, and symbols Ta, Tb and Tc denote the temperatures at these positions 24A, 24B and 24C, respectively. Here, Ta, Tb and Tc satisfy the relation Ta>Tb>Tc. In other words, the temperature Tc at the position 24C in the discharge tube 24 corresponding to the heat conduction member 32 is the lowest. Pa, Pb and Pc represent the saturation vapor pressure of mercury at the temperatures Ta, Tb and Tc, and satisfy the relation Pa>Pb>Pc.

Referring to FIG. 58A, liquid mercury 28 is distributed throughout the discharge tube 24 at the initial stage of use of the light source device 18. When electric power is supplied to the electrodes 25 of the discharge tube 24, discharge starts occurring, and the temperature of the discharge tube 24 rises, so that the mercury gas 28G generates ultraviolet light during discharge, and the ultraviolet light impinges against the fluorescent material 30 to generate visible light. The higher the temperature Thg of mercury, the higher becomes the saturation vapor pressure Phg of mercury as expressed by the following equation (where E and k are constants).

$$Phg = E\exp(-k/Thg)$$

Liquid mercury at the high temperature position 24A in the discharge tube 24 first evaporates in accordance with the saturation vapor pressure Pa that is determined by the temperature Ta. The pressure of mercury reaches mostly the pressure Pa in all portions of the discharge tube because the mercury vapor attempts to establish pressure equilibrium. It will be assumed that the thermal gradient of the discharge tube 24 is designed so that the temperature Ta at the position 24A is 65° C. and the room temperature is 25° C. Then, the maximum brightness is given at the temperature of 65° C. of the discharge tube 24, that is, at a room temperature of 25° C. The curve X in FIG. 58D represents the relation between the temperature and brightness of the light source device 18 at this situation.

In this time, the saturation vapor pressures of mercury at other positions 24B and 24C of the discharge tube 24 are Pb and Pc. Therefore, the mercury vapor generated at position 24A and flows in the tube is liquefied at positions 24B and 24C. This phenomenon lasts until liquid mercury no longer exists at position 24A.

In FIG. 58B, after liquid mercury no longer exists at position 24, liquid mercury at position 24B having the second highest temperature evaporates in accordance with the saturation vapor pressure of mercury in accordance with the temperature Tb at position 24B. In this case too, the mercury vapor attempts to establish pressure equilibrium and the pressure throughout the whole tube substantially reaches Pb. At this time, the maximum brightness is attained at the temperature Tb of about 65° C. The room temperature corresponds to 40° C. when the temperature at the position 24B is 65° C., according to the condition of the thermal gradient described above where the temperature Ta at position 24A is 65° C. and room temperature is 25° C. The curve Y in FIG. 58D represents the relation between the temperature and luminance of the light source device 18 at this situation.

In this time, at the other position 24C of the discharge tube 24, the saturation vapor pressure of mercury is Pc. Therefore, the mercury vapor generated at position 24B and spreading in the discharge tube 24 is liquefied at position 24C. This phenomenon lasts until liquid mercury no longer exists at position 24B. Since the pressure relation is Pa>Pb, liquefaction of mercury does not occur at position 24A.

In FIG. 58C, after liquid mercury no longer exists at the position 24B, liquid mercury at position 24C as the lowest temperature position evaporates with the saturation vapor pressure of mercury in accordance with the temperature $T_C$ at that position. In this case too, the mercury vapor attempts to establish pressure equilibrium, and the pressure in the whole discharge tube substantially reaches Pc. The maximum brightness is reached at this time when the temperature Tc is around 65° C. The room temperature at this time corresponds to 50° C. The curve Z in FIG. 58D represents the relation between the temperature and brightness of the light source device 18.

At position 24C having a low pressure, when the vapor pressure of mercury in the discharge tube 24 reaches the supersaturated pressure due to the change of the room temperatures or the like, re-liquefaction occurs at the position 24C. In consequence, liquid mercury positioned at the position 24C does not move and the temperature-brightness characteristics are stabilized.

Therefore, when the light source 18 is shipped as the product, it is desired that liquid mercury 24 be collected from the beginning at the position (first position) corresponding to the heat conduction member 32 in the discharge tube 24 by a method not relying on aging, and then to arrange the heat conduction member 32 at the first position so that the light source device 18 can be used at desired brightness.

Figure 59:
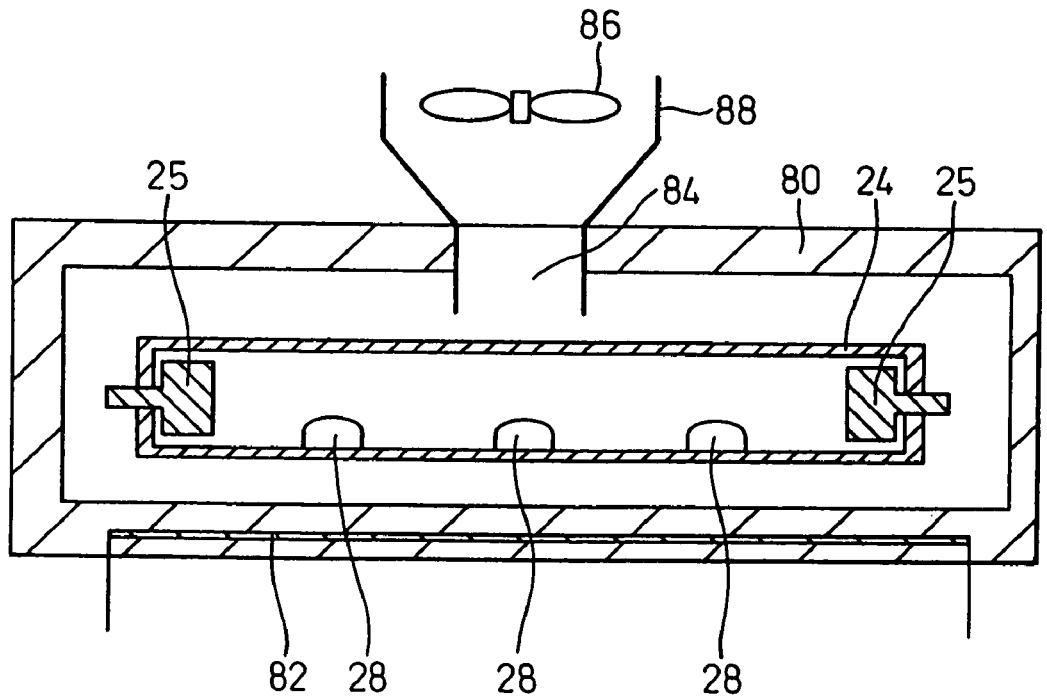
FIG. 59 is a view showing a production apparatus for the light source device and its production method.

FIG. 59 shows an apparatus and a method of fabricating the light source 18. At this stage, the discharge tube 24 that has already been produced is employed, and liquid mercury is collected at the first position (the position corresponding to the heat conduction member 32) of the discharge tube 24. The reflector 26 and the heat conduction member 32 are not yet fitted to the discharge tube 24.

The production apparatus of the light source device 18 includes an electric furnace 80 having a heater 82 and a cooling opening 84. A cooling fan 86 is disposed in a duct 88 fitted in the cooling opening 84. The cooling fan 86 blows cooling air to the first position of the discharge tube 24 in the electric furnace 80.

The discharge tube 24 is a cold-cathode tube called a "fluorescent lamp" that is the same as the one explained with reference to FIGS. 1 to 3. The discharge tube 24 has, for example, an inner diameter of 2.2 mm, an outer diameter of 2.8 mm and a full length of 386 mm (consumed power: 3.5 W). The inner volume of the discharge tube 24 is 1,467 mm$^3$, and 2.5 mg of mercury 28 is charged in the discharge tube 24. A fluorescent material 30 (not shown in FIG. 59) is applied to the inner wall of the glass tube forming the discharge tube 24. Electrodes 25 are fitted to both ends of the discharge tube 24, and mercury and a rare gas are charged into the discharge tube 24.

Figure 60:
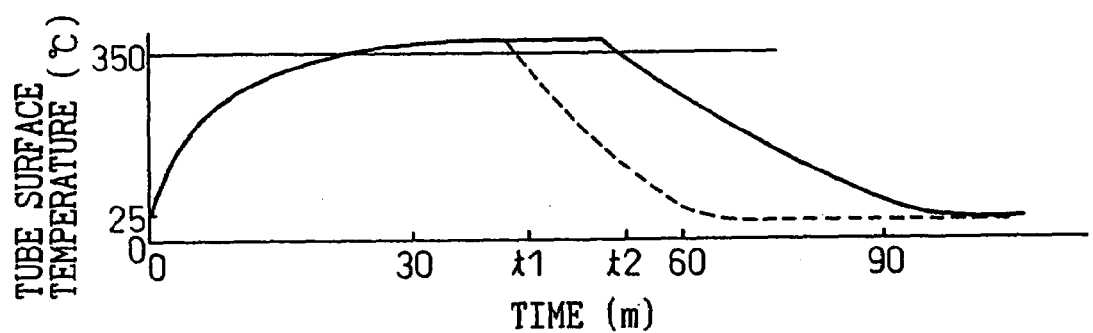
FIG. 60 is a view explaining the operation of the production apparatus of the light source device shown in FIG. 59.

FIG. 60 explains the operation of the production apparatus of the light source device 18 shown in FIG. 59. The discharge tube 24 is placed into the electric furnace 80 and electric power is applied to the heater 82 to raise the temperature in the electric furnace 80. First, liquid mercury 28 is distributed throughout in the discharge tube 24, as explained with reference to FIG. 48(A). As the temperature in the electric furnace 80 rises, liquid mercury 28 starts evaporating.

Preferably, the temperature in the electric furnace 80 is raised to 300° C. or higher than 300° C. When the temperature in the discharge tube 24 reaches 300° C. or above, the saturation vapor pressure of mercury in the discharge tube 24 becomes high and all mercury charged evaporates. The temperature in the electric furnace 80 is raised preferably to 350° C. or above. In this embodiment, the temperature in the electric furnace 80 is raised to 400° C.

The reason why the temperature in the electric furnace 80 is raised to 300° C. or above is as follows. When 2.5 mg of mercury is charged in the discharge tube 24 having the volume of 1,467 mm³, the amount of mercury that can evaporate in the discharge tube 24 is calculated in the following way. First, the saturation vapor pressure P (Torr) of mercury is given by P=Eexp (A/T). Here, T is the temperature (K), E is a constant (=1.51×10⁸) and A is a constant (=7,495). The saturation vapor pressure P' expressed in terms of Pascal is P' (Pa)=133.32×P.

When this value is put into the equation of state of a gas (PV=nRT) and the amount of mercury capable of evaporating in the discharge tube 24 is calculated, the result is tabulated in Table 1. R is a constant (=8.314) and n=N/200.6. The numeric value 200.6 is the atomic weight of mercury, and the evaporated mercury amount N is given by N=PV× 200.6/R/T.

TABLE 1

Relation between Temperature and Amount of Mercury capable of evaporation

| Temp. (C.) | Temp. (K) | P' (Pa) | Evaporated Hg (N: mg) |
|---|---|---|---|
| 0 | 273 | 0.024025 | 0.0000 |
| 50 | 323 | 1.684061 | 0.0002 |
| 100 | 373 | 37.77732 | 0.0036 |
| 150 | 423 | 406.2085 | 0.034 |
| 200 | 473 | 2643.547 | 0.20 |
| 250 | 523 | 12025.19 | 0.81 |
| 300 | 573 | 41993.22 | 2.6 |
| 350 | 623 | 119975.8 | 6.8 |
| 400 | 673 | 293267.8 | 15.4 |
| 450 | 723 | 633499.4 | 31.0 |
| 500 | 773 | 1238675 | 56.7 |

It can be understood from Table 1 that when the temperature is 300° C. or above, 2.5 mg of mercury can completely evaporate. However, since the amount of mercury charged in the discharge tube 24 has variance, the temperature is preferably 350° C. or above. Even when variance of 0.5 mg exists, mercury can completely evaporate if the temperature is 350° C. or above.

In the embodiment shown in FIG. 60, the discharge tube 24 is heated first while the cooling fan 86 is kept stopped. When the temperature of the discharge tube 24 reaches 350° C. or above (time t1), the cooling fan 86 is driven to start cooling of the first position of the discharge tube 24. The temperature at the first position of the discharge tube 24 starts dropping as indicated by broken line. The supply of electric power to the heater 82 is stopped at a suitable time t2 after the time t1, the temperature in the electric furnace 80 (at positions other than the first position) is lowered as indicated by solid line. The temperature of the electric furnace 80 is lowered to the room temperature while the temperature at the first position is kept lower than the temperature at other positions of the discharge tube 24. The heater 82 can be turned OFF at the time t2. Alternatively, the heater 82 can be turned ON and OFF repeatedly after it is turned OFF at the time t2 so as to gradually lower the temperature in the electric furnace (at positions other than the first position).

As the temperature at the first position of the discharge tube 24 gradually lowers as indicated by broken line, the saturation vapor pressure of mercury at this position lowers, so that mercury is liquefied at the first position. The first position corresponds to the most cooled position shown in FIGS. 58A to 58C and liquid mercury 28 is collected at the first position of the discharge tube 24 in the same way as explained with reference to FIGS. 58A to 58C. As heating and cooling are conducted in this way, liquid mercury 28 is collected within a short time to the first position of the discharge tube 24 as the most cooled position.

In consequence, liquid mercury can be collected within a relatively short time to the first position of the discharge tube 24. Thereafter, the reflector 26 and the heat conduction member 32 are fitted to the discharge tube 24. The heat conduction member 32 is interposed between the discharge tube 24 and the reflector 26 in such a fashion as to come into contact with the first position of the discharge tube 24 at which liquid mercury is collected by the process described above.

Figure 61:
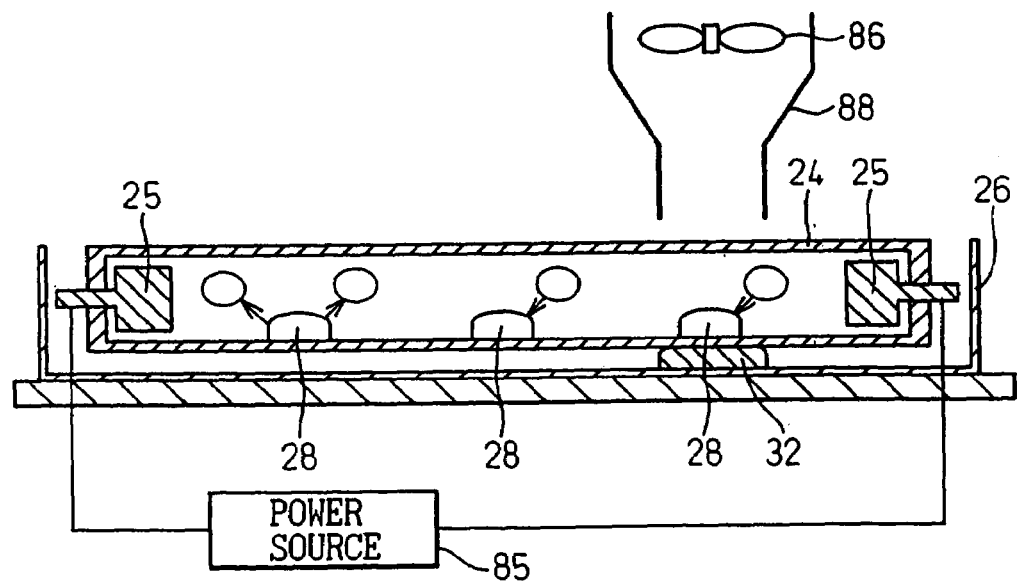
FIG. 61 is a view showing a modified example of the production apparatus for the light source device in FIG. 59.

FIG. 61 shows a modified example of the production apparatus of the light source device shown in FIG. 59. Referring to FIG. 61, after the discharge tube 24 is produced, a power source 85 inclusive of an inverter supplies power to the electrodes 25 of the discharge tube 24 to heat the discharge tube 24. The operation for heating the discharge tube 24 by supplying power to the electrodes 25 of the discharge tube 24 after the discharge tube 24 is produced is called "aging". However, when aging is merely conducted, a long time of more than hundreds of hours is necessary to gather liquid mercury to the first position (the position corresponding to the heat conduction member 32).

Referring to FIG. 61, the cooling fan 86 is shown disposed in the duct 88 and blows cooling air to the first position of the discharge tube 24. When aging of the discharge tube 24 is conducted while the first position of the discharge tube 24 is positively cooled in this way, liquid mercury can be gathered to the first position of the discharge tube 24 within a sho ter time. Aging can be conducted while the reflector 26 and the heat conduction member 32 are fitted to the discharge tube 24. Consequently, the position of the distal end part of the duct 88 and the position of the heat conduction member 32 can be easily brought into conformity with each other.

Figure 62:
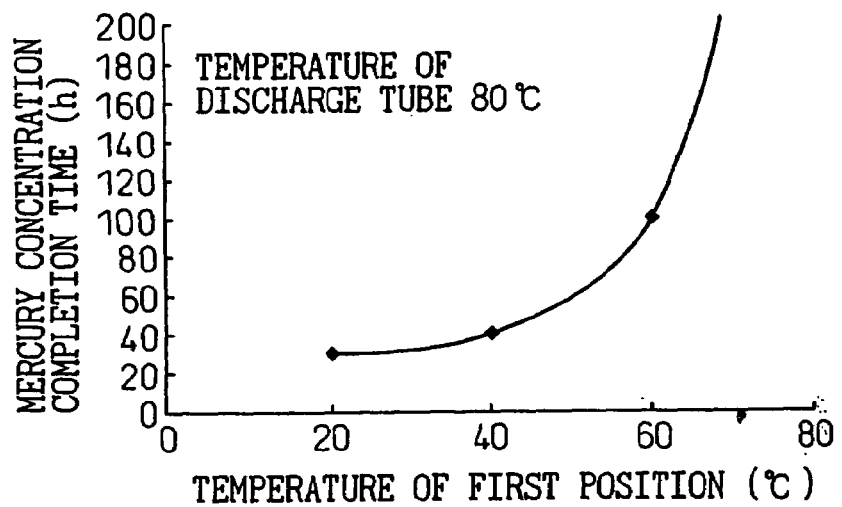
FIG. 62 is a diagram showing a mercury concentration completion time when the temperature of the first position of the discharge tube is changed while the temperature of the discharge tube is kept constant.

FIG. 62 shows the mercury concentration completion time when the temperature of the first position of the discharge tube 24 is changed while the temperature of the discharge tube 24 is kept constant. The mercury concentration completion time represents the time necessary for collecting almost all liquid mercury to the first position of the discharge tube 24 (the position corresponding to the heat conduction member 32). The temperature at portions of the discharge tube 24 (other than the first position) is about 80° C. due to aging. The temperature of the first position of the discharge tube 24 that receives cooling air from the cooling fan 86 is lower than 80° C. The lower the temperature at the first position of the discharge tube 24, the lower becomes the saturation vapor pressure of the mercury and the greater becomes the liquefaction amount of mercury. Therefore, the mercury concentration completion time can be shortened. The higher the temperature at portions of the discharge tube 24 (other than the first position), the higher becomes the saturation vapor pressure of mercury and the greater becomes the evaporation amount of liquid mercury. The greater the amount of gaseous mercury, the greater becomes the liquefaction amount of mercury at the first position and the shorter becomes the mercury concentration completion time.

Figure 63:
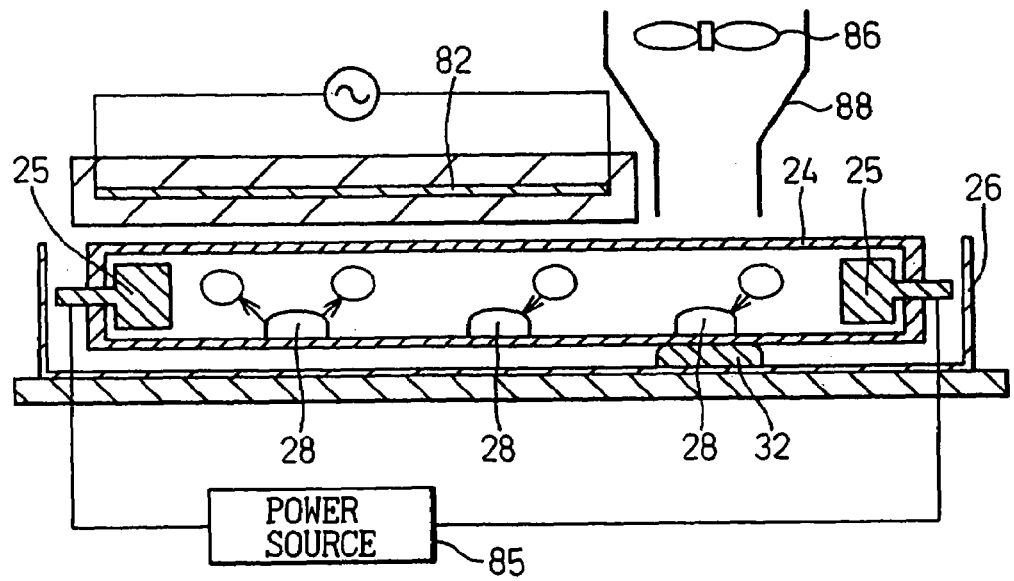
FIG. 63 is a view showing a modified example of the production apparatus for the light source device in FIG. 59.

FIG. 63 shows a modified example of the production apparatus of the light source shown in FIG. 59. In FIG. 63, the heater 82 can heat the discharge tube 24. Further, the power source 85 supplies electric power to the electrodes 25 of the discharge tube 24 to heat the discharge tube 24. While the heater 82 heats the discharge tube 24, aging is conducted. The cooling fan 86 is disposed in the duct 88 and blows cooling air to the first position of the discharge tube 24.

When the discharge tube 24 is aged by positively heating the discharge tube 24 and positively cooling the first position of the discharge tube 24, liquid mercury can be collected within a shorter time to the first position of the discharge tube 24. Aging can be conducted under the state where the reflector 26 and the heat conduction member 32 are fitted to the discharge tube 24. Therefore, the position of the distal end of the duct 88 and the position of the heat conduction member 32 can be easily brought into conformity with each other.

Figure 64:
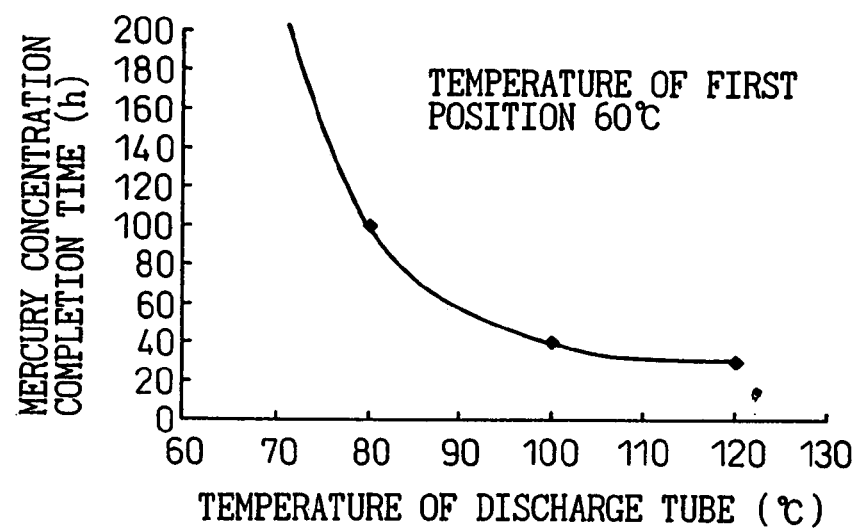
FIG. 64 is a diagram showing a mercury concentration completion time when the temperature of the discharge tube is changed while the temperature of the first position of the discharge tube is kept constant.

FIG. 64 shows the mercury concentration completion time when the temperature of the discharge tube 24 (portions other than the first position) is changed while the temperature of the first position of the discharge tube 24 is kept constant. The temperature of the first position of the discharge tube 24 is set to about 60° C. by aging. The temperature at portions other than the first position of the discharge tube 24 readily reaches 100° C. or above. When the temperature of the portions other than the first position of the discharge tube 24 is 100° C., the mercury concentration completion time can be shortened to 40 hours. When the temperature of the first position of the discharge tube 24 is about 20° C. and the temperature of the portions other than the first position of the discharge tube 24 is 100° C., the mercury concentration completion time can be shortened to about 10 hours.

Figure 65:
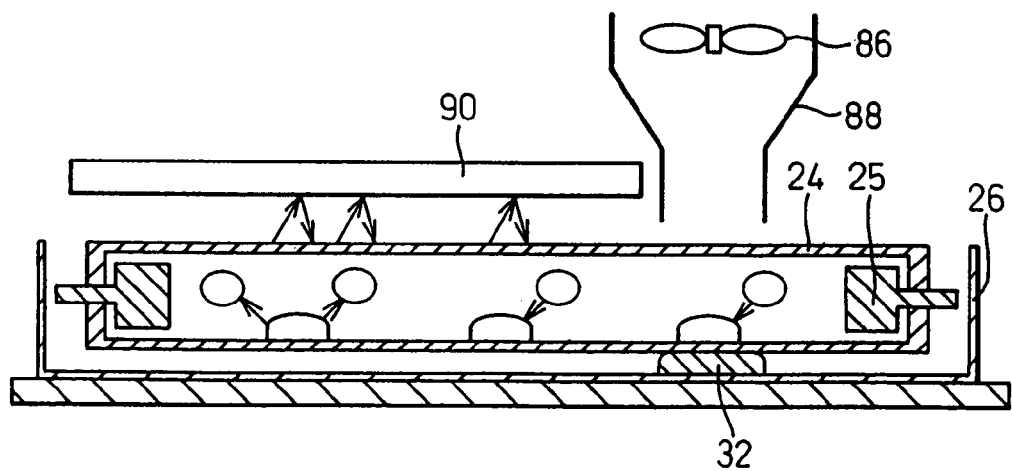
FIG. 65 is a view showing a modified example of the production apparatus of the light source device in FIG. 59.

FIG. 65 shows a still another modified example of the production apparatus of the light source device shown in FIG. 59. Referring to FIG. 65, a mirror 90 covers the discharge tube 24. The mirror 90 reflects the light of the aged discharge tube 24 towards the discharge tube 24. Accordingly, the discharge tube 24 is heated much more than when it is merely aged. The cooling fan 86 is disposed in the duct 88 and blows cooling air to the first position of the discharge tube 24. In this way, liquid mercury 28 can be collected at the first position of the discharge tube 24 in a shorter time. Incidentally, a heat insulating material may be used to cover the discharge tube 24 in place of the mirror 90.

Figure 66:
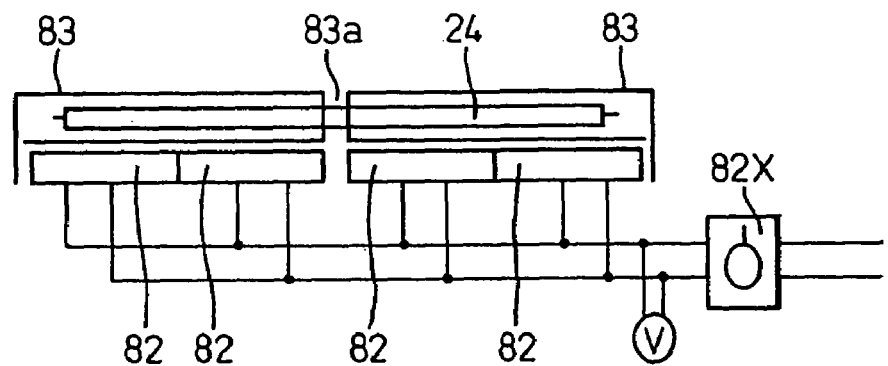
FIG. 66 is a view showing a modified example of the production apparatus for the light source device in FIG. 59.

FIG. 66 shows still another modified example of the production apparatus of the light source device shown in FIG. 59. In FIG. 66, a metal plate (an aluminum plate, for example) 83 encompasses the discharge tube 24 with a spacing 83A, and the heater 82 heats the discharge tube 24 through the metal plate 83. The spacing 83A opens the first position of the discharge tube 24 to the open air and cools the discharge tube 24 heated by the heater 82 at the first position. The heater 82 is arranged dividedly in the same way as the metal plate 83, and a voltage regulator 82X controls each part of the heater 82 so divided.

Figure 67:
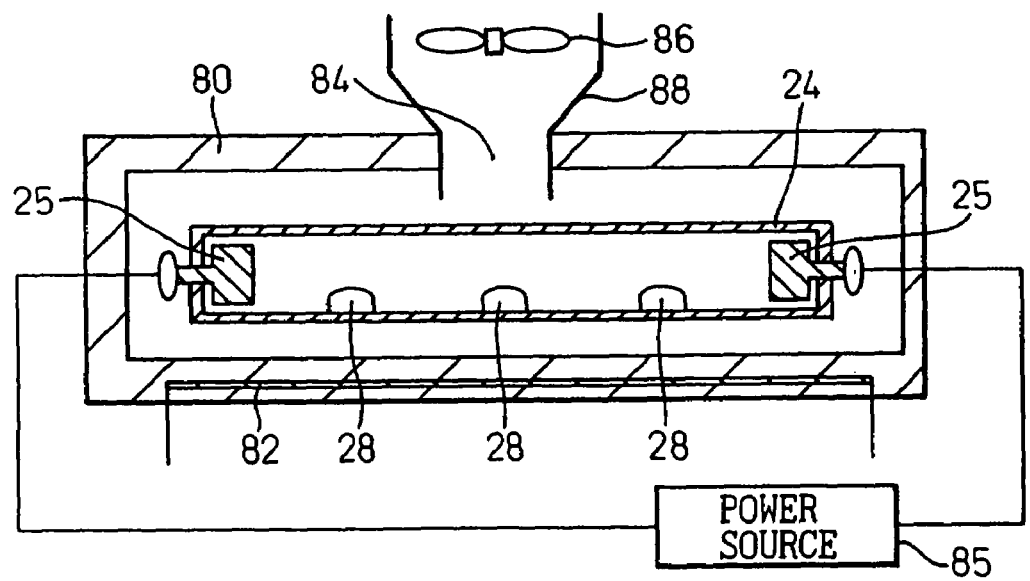
FIG. 67 is a view showing a modified example of the production apparatus for the light source device in FIG. 59.

FIG. 67 shows a still another modified example of the production apparatus of the light source device shown in FIG. 59. The discharge tube 24 is placed into the electric furnace 80 having the heater 80. Power is supplied to the electrodes 25 of the discharge tube 24 from the power source 85 to conduct aging. The cooling fan 86 is disposed in the duct 88 and blows cooling air to the first position of the discharge tube 24.

Figure 68:
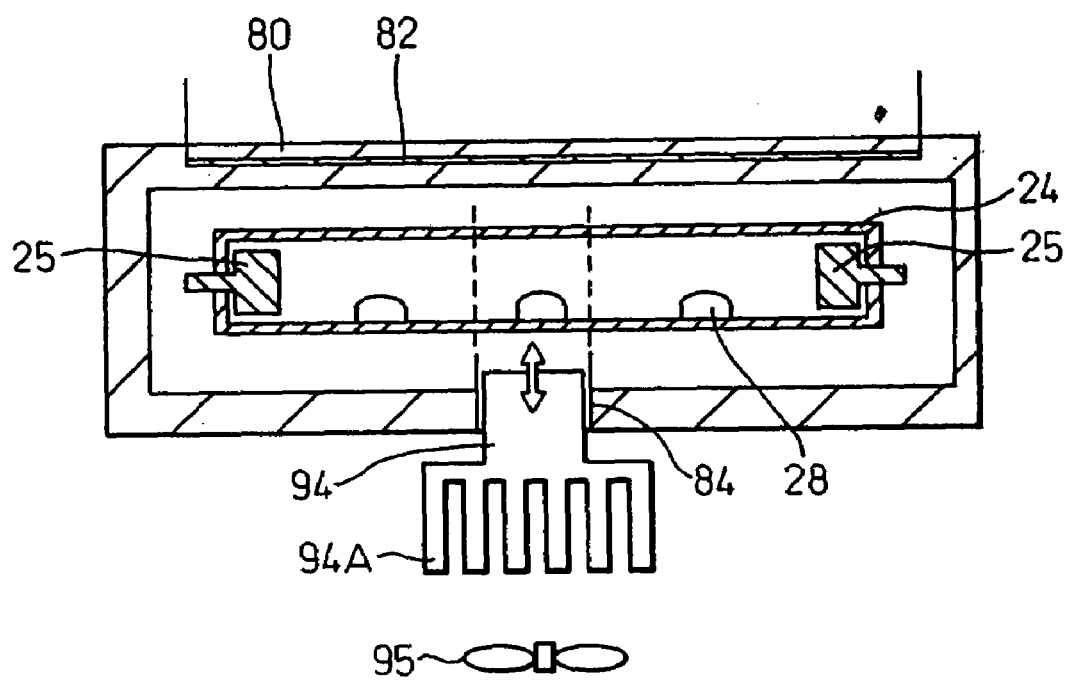
FIG. 68 is a view showing a modified example of the production apparatus for the light source device in FIG. 59.

FIG. 68 shows still another example of the production apparatus of the light source shown in FIG. 59. The production apparatus of the light source device includes the electric furnace 80 having the heater 82 and the cooling opening 84. A cooling metal member 94 equipped with a heat sink 94A is provided to the cooling opening 84 in such a fashion as to be capable of moving in and out from the opening 84. A fan 95 cools the cooling metal 94 through the heat sink 94A. The cooling metal member 94 keeps contact with the discharge tube 24 at the time of mercury concentration and cools the first position of the discharge tube 24. Since the cooling metal member 94 equipped with the heat sink 94A is used in place of the cooling fan 86 shown in FIG. 59, the range of the liquid mercury concentration portion formed at the first position of the discharge tube 24 can be reduced. As the range of the liquid mercury concentration portion is made smaller, scattering and absorption of light by the liquid mercury concentration portion during use can be restricted, and utilization efficiency of light can be improved.

Figure 69A:
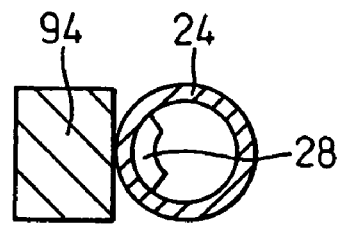
FIGS. 69A to 69C show examples of the cooling metal device shown in FIG. 68.
Figure 69B:
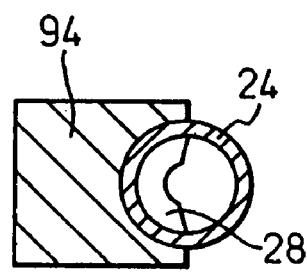
Figure 69C:
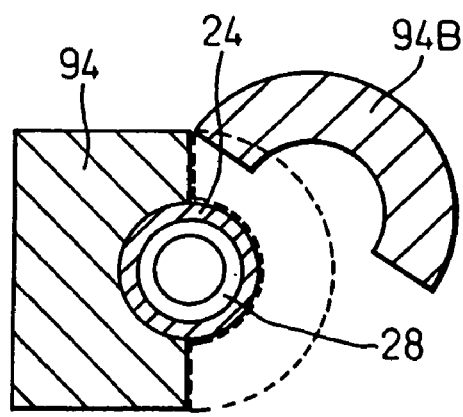
Figure 70A:
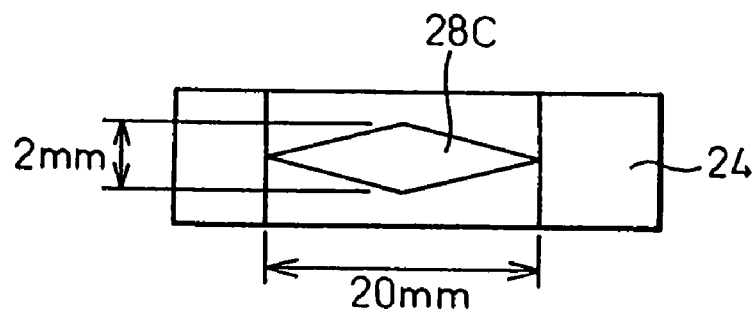
FIGS. 70A to 70C show examples of the range of the liquid mercury concentration portion formed at the first position of the discharge tube when the cooling metal device shown in FIGS. 69A to 69C are used.
Figure 70B:
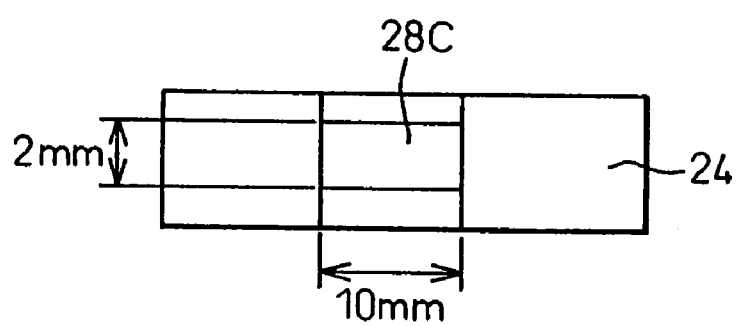
Figure 70C:
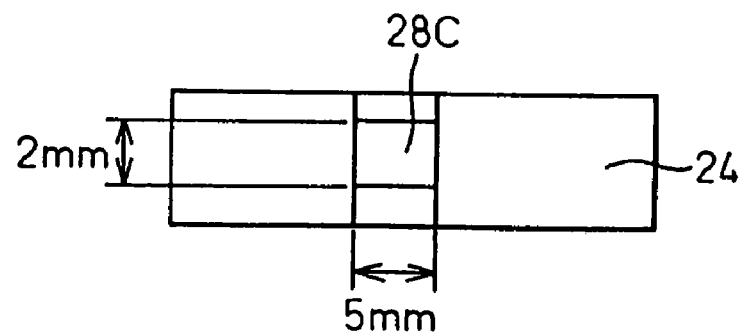

FIGS. 69A to 69C show examples of the cooling metal member 94 in FIG. 68. FIGS. 70A to 70C show the range 28C of the liquid mercury concentration portion formed at the first position of the discharge tube 24 when the cooling metal member 94 shown in FIGS. 69A to 69C is used. FIG. 69A shows an example where a flat surface of the cooling metal member 94 comes into contact with the surface of the discharge tube 24. FIG. 70A shows the range 28C of the liquid mercury concentration portion when the cooling metal member 94 shown in FIG. 69A is used.

FIG. 69B shows an example where an arcuate recessed surface of the cooling metal member 94 comes into contact with the surface of the discharge tube 24. FIG. 70B shows the range 28C of the liquid mercury concentration portion when the cooling metal member 94 shown in FIG. 69B is used. In FIG. 70B, the range 28C of the liquid mercury concentration portion can be expanded in the circumferential direction of the discharge tube 24 and can be shortened in the axial direction of the discharge tube 24. FIG. 69C shows an example where an arcuate recessed surface of the cooling metal member 94 keeps contact with the surface of the discharge tube 24 and an auxiliary metal 94B having an arcuate recessed surface keeps contact with the surface of the discharge tube 24 on the opposite side. The auxiliary metal 94B is removable. FIG. 70C shows the range 28C of the liquid mercury concentration portion when the cooling metal 94 shown in FIG. 69C is used. In FIG. 70C, the range 28C of the liquid mercury concentration portion can be further expanded in the circumferential direction of the discharge tube 24 and can be further reduced in the axial direction of the discharge tube 24.

Figure 71A:
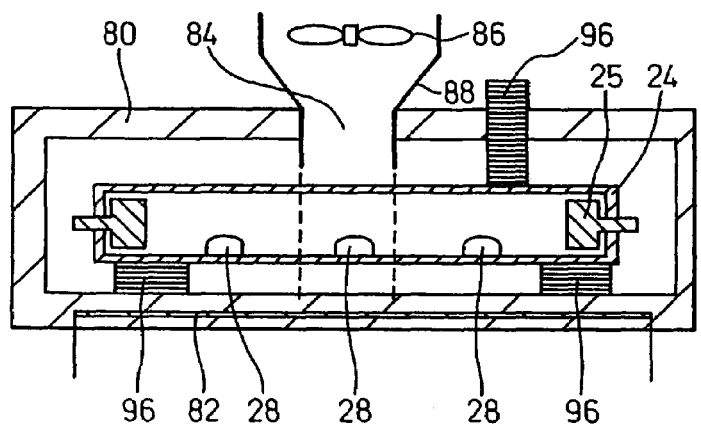
FIGS. 71A and 71B show a modified example of the production apparatus for the light source device in FIG. 59.
Figure 71B:
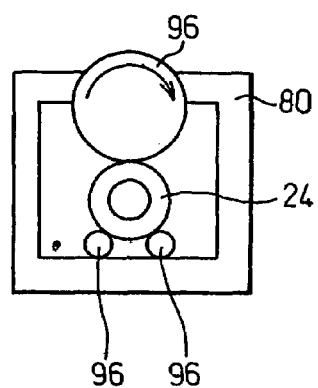

FIGS. 71A and 71B show still another example of the production apparatus of the light source device shown in FIG. 59. In the example shown in FIGS. 71A and 71B, a rotation mechanism 96 is further provided to the production apparatus of the light source device shown in FIG. 59. FIG. 71A is a longitudinal sectional view and FIG. 71B is a transverse sectional view. The discharge tube 24 is rotated as shown in FIG. 71B. In this way, liquid mercury can be distributed in the circumferential direction, and the range 28C of the liquid mercury concentration portion can be further reduced in the axial direction of the discharge tube 24 as explained with reference to FIG. 70C.

Figure 72:
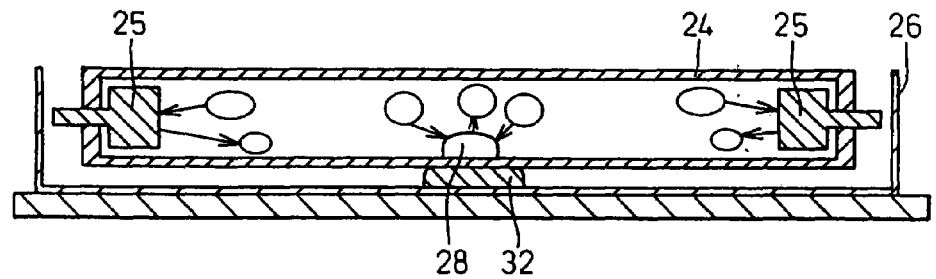
FIG. 72 is a view showing an example where the concentration position of liquid mercury and the position of a heat conduction member are arranged substantially at the central portion of the discharge tube.

FIG. 72 shows an example where the concentration position of liquid mercury and the position of the heat conduction member 32 are arranged at the substantially center of the discharge tube 24. The electrodes 25 are made of tungsten or nickel. In the conventional devices, a part of the mercury vapor or the rare gas is ionized during energization of the discharge tube 24 and impinges against the electrode 25 while being accelerated by the electric field of the electrode 25. As a result, the electrode 25 is sputtered and the electrode atoms spring out into the discharge tube 24. Since the electrode atoms are activated and are stable, they adhere relatively immediately to the inner wall of the discharge tube 24 and are stabilized. When the electrode atoms are stabilized on the inner wall of the discharge tube 24, they combine with surrounding liquid mercury and form mercury amalgams, thereby consuming mercury. This mercury consumption amount determines the service life of the discharge tube 24. When most of mercury charged changes to amalgams and can no longer contribute to light emission, mercury light emission of the discharge tube 24 extinguishes, and light emission mainly relies on the rare gas, particularly on argon. When the emission color of the discharge tube 24 starts changing, life of the discharge tube 24 is judged as expired.

By arranging the light source device 18 as shown in FIG. 72, liquid mercury does not exist in the proximity of the electrodes 25. Therefore, even when the electrodes 25 are sputtered, the mercury amalgams are not formed and life of the discharge tube 24 can be extended. The concentration position of liquid mercury and the position of the heat conduction member 32 need not necessarily be the substantially center of the discharge tube 24 but may be those positions which are considerably spaced apart from the electrodes 25. Similar effects can be obtained in this case too.

In the discharge tube 24 in which liquid mercury is collected to the first position and the heat conduction member 32 is arranged at the first position, the mercury vapor that contributes to light emission is liquefied on the tube wall at the time of turn-off with the drop of the temperature of the tube after turn-off. When the ambient temperature at the time of turn-on is extremely low, however, the amount of mercury in the proximity of the electrodes, that is first heated, is small. Consequently, the vapor pressure in the tube does not readily rise, and reddish argon light emission is sometimes observed for a long time in the proximity of the electrodes of the discharge tube 24. Also, when a user uses a dimmer switch, turns off the discharge tube 24 under a low brightness state and then turns on again the discharge tube 24 (turns on the discharge tube at a low tube current), the rise of the tube temperature is slow, and reddish argon light emission is observed in some cases in the proximity of the electrodes of the discharge tube 24.

Figure 73:
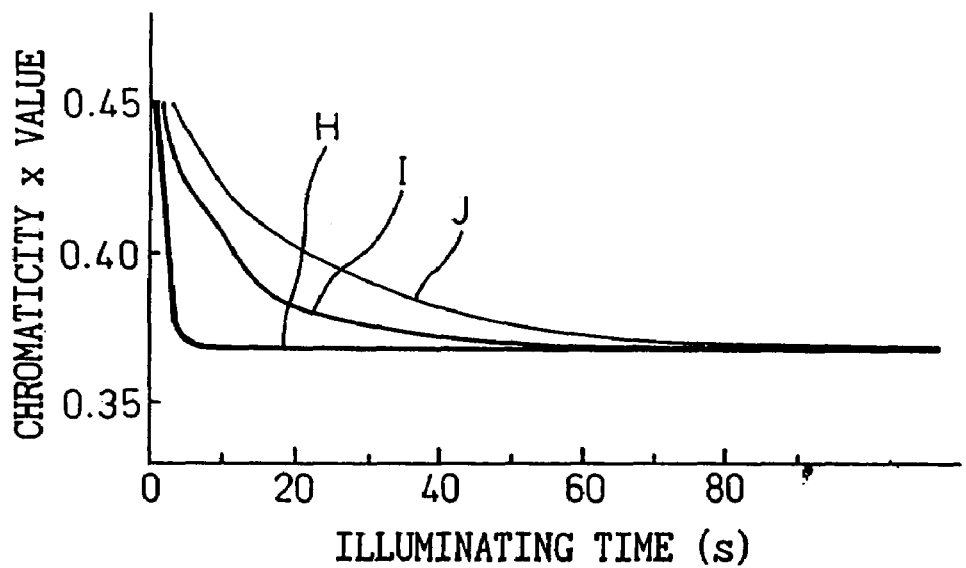
FIG. 73 is a diagram showing the relation between the turn-on time of the discharge tube and chromaticity of light emission.

FIG. 73 is a graph showing the relation between the illuminating (turn-on) time of the discharge tube and chromaticity (x value) of light emission. Curve H represents the case where a maximum tube current (14 mA, for example) is applied to the discharge tube 24. Curve I represents the case where a current of ½ of the maximum tube current is applied to the discharge tube 24. Curve J represents the case where a current of 1/10 of the maximum tube current is applied to the discharge tube 24. When a current is caused to flow through the discharge tube 24, reddish argon light emission first occurs and then mercury light emission (white) develops. In the curve H, argon light emissions lasts for about 5 seconds. In the curve I, argon light emission lasts for about 30 seconds. In the curve J, argon light emission lasts for about 60 seconds. This is the time necessary for mercury adhering to the tube wall of the discharge tube 24 and mercury at the mercury concentration portion to evaporate, and for gaseous mercury to move near to the electrode 25. It can be appreciated, from this result, that the greater the tube current, the shorter becomes the time of argon light emission.

Figure 74:
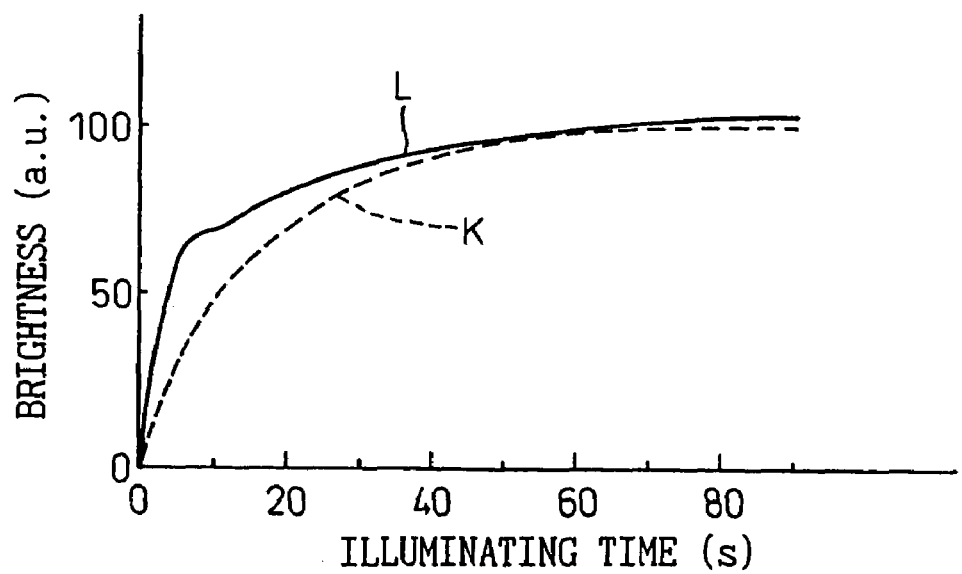
FIG. 74 is a diagram showing the relation between the turn-on time of the discharge tube and brightness.

FIG. 74 shows the relation between the illuminating (turn-on) time of the discharge tube 24 and brightness. Curve K represents the relation between the turn-on time and brightness when the discharge tube 24 is turned on at a typical current. Curve L represents the relation between the turn-on time and brightness when a maximum tube current is applied at the initial stage of turn-on and the discharge tube 24 is then turned on at the typical current. When the maximum tube current is applied at the initial stage of turn-on and then (at least 5 seconds later) the discharge tube 24 is turned on at the typical current as represented by the curve L, the time of argon light emission can be shortened, and the tube current of brightness the user desires can be thereafter achieved. In the curve K, brightness is low at the initial stage of turn-on and becomes gradually higher in the course of about 30 seconds. This is because the tube temperature gradually rises from the room temperature and light emission efficiency of mercury rises. As represented by the curve L, brightness is not excessively high even when the tube wall is increased at the initial stage of turn-on. Since the elevation time of the tube temperature can be shortened, the dark time at the time of initial stage of turn-on can be shortened.

Figure 75:
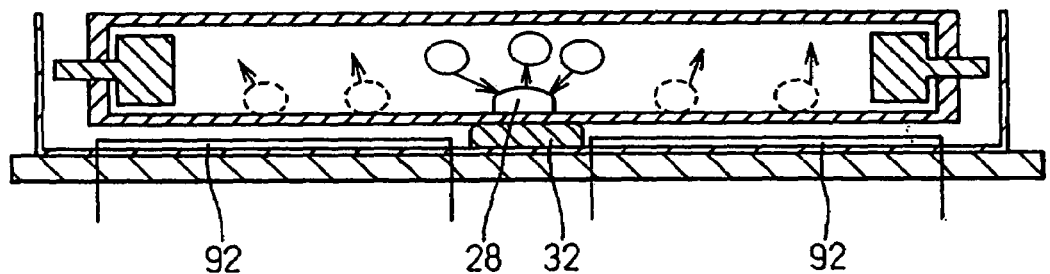
FIG. 75 is a view showing a modified example of the light source device.

FIG. 75 shows still another modified example of the light source device. In this example, liquid mercury is collected at the first position of the discharge tube 24, and the heat conduction member 32 is disposed at the first position at which liquid mercury is collected. Further, the heater 92 is disposed at a position other than the first position. The heater 92 heats the discharge tube 24 at the initial stage of turn-on of the discharge tube 24. Consequently, the heater 92 promotes the temperature elevation of the discharge tube 24 at the initial stage of turn-on of the discharge tube 24 as well as the evaporation of mercury, and prevents argon light emission.

A light source device having high brightness can thus be obtained. Further, a backlight having high brightness and high light utilization efficiency can be obtained, too.

Figure 76:
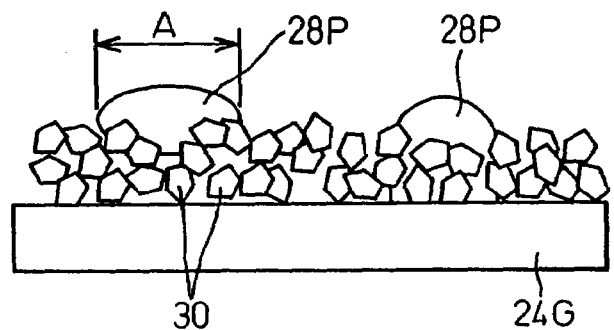
FIG. 76 is a partial enlarged view showing a part of the discharge tube of FIGS. 57 to 75.

FIG. 76 is a partial enlarged view of the discharge tube of the embodiment shown in FIGS. 57 to 75. Liquid mercury is collected at the first position of the discharge tube 24 and the heat conduction member 32 is disposed at the first position at which liquid mercury is collected (with the heat conduction member 32 being omitted in FIG. 76). The fluorescent material 30 is applied to the inner wall of the glass tube 24G of the discharge tube 24.

Particles of liquid mercury collected at the first position are represented by reference numeral 28P. The particles 28P of liquid mercury are a plurality of fine mercury particles. The size A (diameter) of the liquid mercury particles 28P is preferably not greater than 0.2 mm. Alternatively, the liquid mercury particles 28P preferably soak into the fluorescent material 30. The liquid mercury particle 28P positioned on the left side in FIG. 76 is put on the fluorescent material 30 while the liquid mercury particle 28P on the left side in FIG. 76 soaks into the fluorescent material 30.

Figure 77:
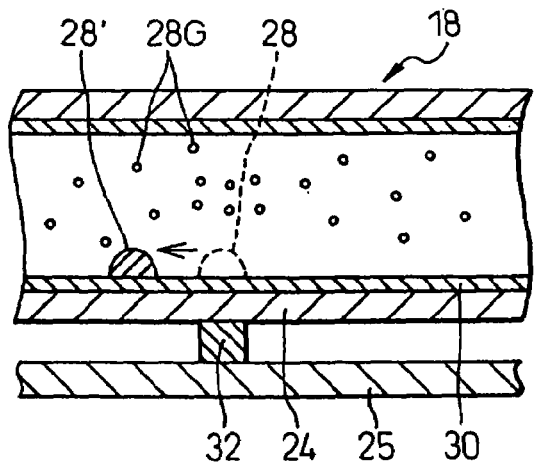
FIG. 77 is a view showing the light source device similar to the one shown in FIG. 3 when an impact test is conducted.

FIG. 77 shows a light source device similar to the one shown in FIG. 3 when an impact test is conducted. Liquid mercury 28 is collected at the first position corresponding to the heat conduction member 32. When the impact test is carried out, however, liquid mercury moves in some cases from the first position as indicated by reference numeral 28'. The light source device is used as a backlight of a liquid crystal display device and an impact of about 30 G is imparted to the backlight unit to conduct the impact test.

Figure 78:
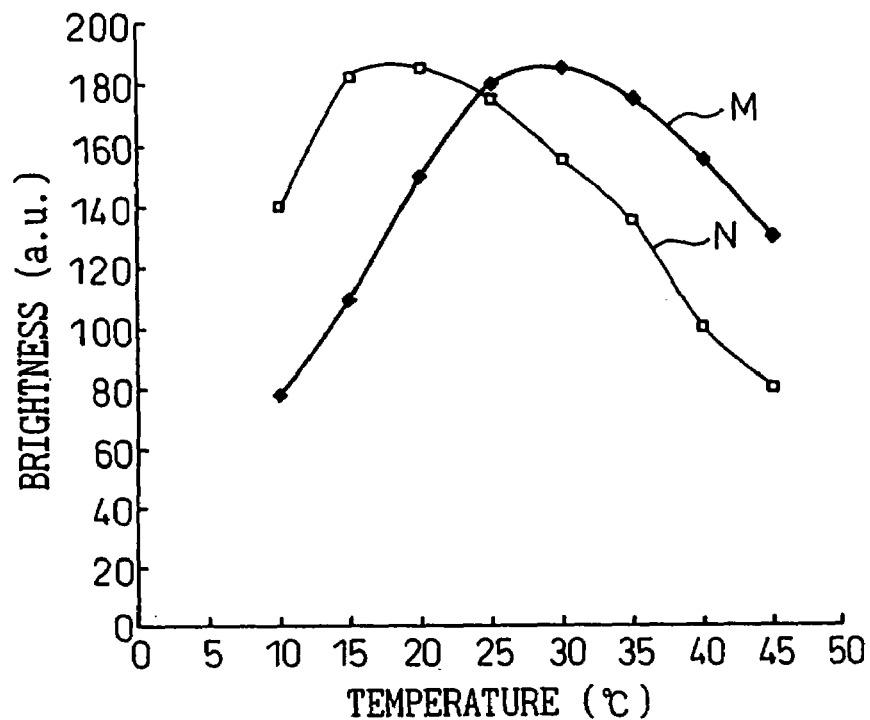
FIG. 78 is a diagram showing the relation between the brightness and the room temperatures, before and after the impact test.

FIG. 78 is a graph showing the relation between the room temperature and brightness of the discharge tube 24 before and after the impact test is carried out, respectively. Curve M represents the relation between the room temperature and brightness of the discharge tube 24 before the impact test is carried out. Curve N represents the relation between the room temperature and brightness of the discharge tube 24 after the impact test is carried out. In the curve M, brightness of the discharge tube 24 attains maximum near the room temperature of 30° C. whereas in the curve N, brightness of the discharge tube 24 attains maximum near the room temperature of 20° C. The light emission characteristics of the discharge tube 24 are likely to change as described above. One of the causes of the change of the light emission characteristics of the discharge tube 24 is presumably the movement of liquid mercury from the first position as indicated by reference numeral 28' in FIG. 77.

Generally, about 1 to 5 mg of mercury is charged into the discharge tube 24 (2.5 mg in the embodiment). When liquid mercury 28 is gathered at the first position inside the discharge tube 24, liquid mercury forms one or a plurality of spherical or semi-spherical particles having a diameter of 0.3 mm or more due to surface tension. The greater the size of liquid mercury particle, the more readily it moves from the first position because a particle of liquid mercury has a weight corresponding to its size as explained with reference to FIG. 77.

In FIG. 76, the fluorescent material 30 comprises fluorescent material particles having diameters of several to dozens of microns, and these particles coarsely adhere in a thickness of 20 to 50 μm to the inner wall of the glass tube 24G of the discharge tube 24. In the fluorescent material layer thus adhered, gaps in the order of dozens of microns are formed among the fluorescent material particles, and projections and depressions of about 0.1 mm are formed on the surface of the fluorescent material layer.

Therefore, when the size (diameter) A of the liquid mercury particle 28P is not greater than 0.2 mm or when it soaks into the fluorescent material 30, the liquid mercury particle 28P does not easily move even when the impact is imparted to the discharge tube 24. In other words, when the liquid mercury particle 28P is as small as the size of the projections and depressions of the surface of the fluorescent material layer, the contact area becomes great between the liquid mercury particle 28P and the fluorescent material 30, and the intermolecular force between the mercury molecule and fluorescent material molecule functions as the frictional force. In consequence, even when an impact is imparted, this frictional force overcomes the impact force and the liquid mercury particle 28P does not move. When the liquid mercury particle 28P soaks into the gap between the fluorescent materials 30, the liquid mercury particle 28P does not move even when an impact is imparted thereto because the fluorescent material 30 functions as an obstacle. For these reasons, the light emission characteristics of the light source device do not change even when an impact is imparted to the light source device.

Figure 79:
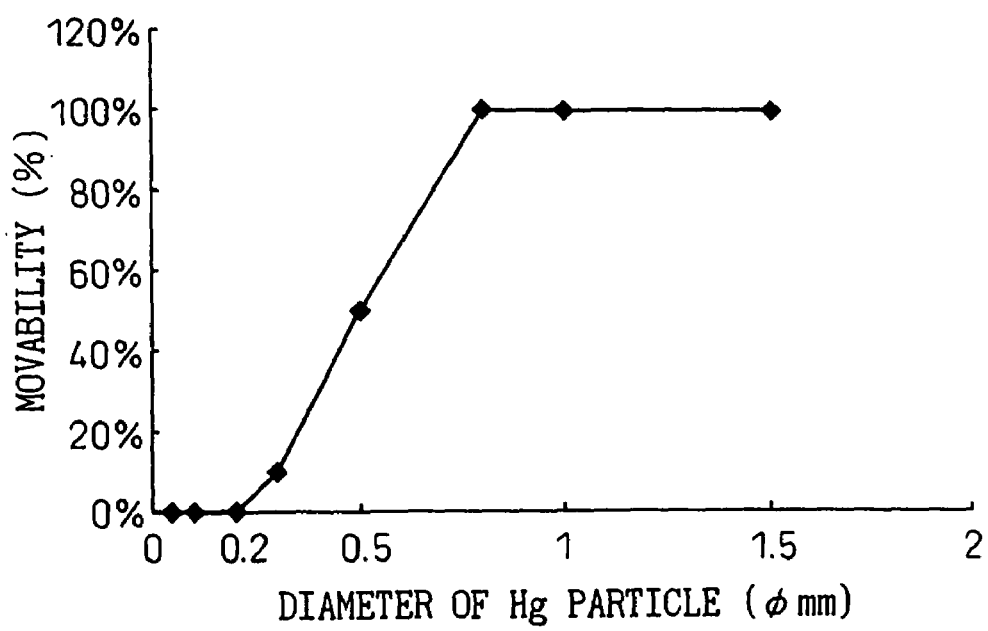
FIG. 79 is a diagram showing an examination result of moving ratios of mercury particles, before and after the impact test is conducted.

FIG. 79 is a graph showing the examination result of a movability of the liquid mercury particle 28P before the impact test is conducted and after it is conducted at 50 G. The abscissa represents the diameter of the liquid mercury particle 28P and the ordinate indicates the movability. When the number of the liquid mercury particles 28P is N1 before the impact test is conducted and the number of the liquid mercury particles 28P that do not move after the impact test is N2, the movability is defined as (N1−N2)/N1. Since the fluorescent material exists, the number of the liquid mercury particles 28P is confirmed through the microscopic observation of transmission light. The number of the liquid mercury particles 28P can also be confirmed by X-ray observation.

In FIG. 79, almost all the liquid mercury particles 28P having diameters greater than 0.8 mm move by the impact of 50 G. It has been found, however, that the liquid mercury particles 28 having diameters of not greater than 0.2 mm hardly move by the impact of 50 G. It has also been found through X-ray observation that the liquid mercury particles 28P soaking into the fluorescent material 30 hardly move by the impact of 50 G. Therefore, a change in the light emission characteristics of the light source device resulting from the movement of the liquid mercury particles 28P does not occur.

Figure 80:
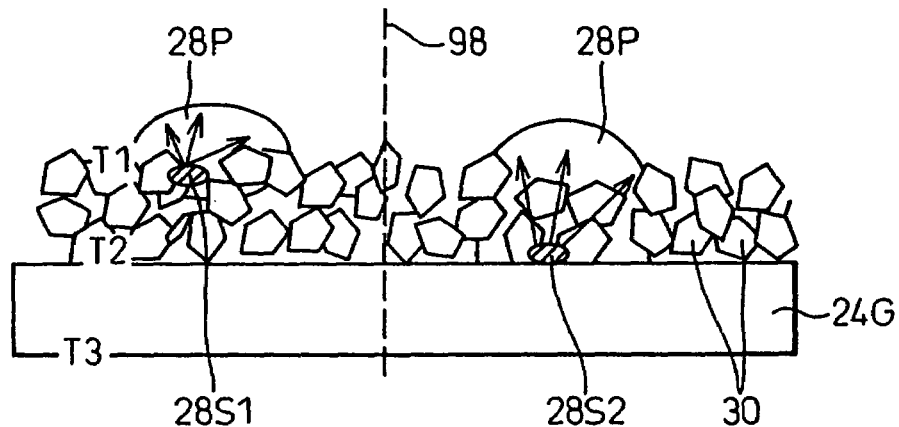
FIG. 80 is a view explaining the formation of liquid mercury particles soaking into the fluorescent material in the discharge tube.

FIG. 80 is a schematic view useful for explaining the formation of the liquid mercury particles 28P soaking into the fluorescent material 30 in the discharge tube 24. It will be assumed in FIG. 80 that the temperature of the inner surface of the fluorescent material 30 adhering to the inner wall of the glass tube 24G of the discharge tube 24 is T1, the temperature of the outer surface of the fluorescent material 30 keeping contact with the inner wall of the glass tube G of the discharge tube 24 is T2, and the temperature of the outer surface of the glass tube G of the discharge tube 24 is T3.

The liquid mercury particle 28P existing on the left side in FIG. 80 is formed by the production apparatus (without turn-on aging) of the light source device shown in FIG. 59 and the liquid mercury particle 28P existing on the right side in FIG. 80 is formed by the production apparatus (with turn-on aging) of the light source device shown in FIG. 67.

When the first position of the discharge tube 24 is cooled without turn-on aging, the outer surface of the glass tube 24G of the discharge tube 24 is most cooled. Therefore, the relation, T3<T1, T2 exists. Because the thickness of the fluorescent layer is only 20 μm, there is hardly any difference between T1 and T2. Therefore, the mercury vapor of the glass tube 24G is sensitive to the temperatures of both T1 and T2 and is liquefied with the same probability. For this reason, a seed of liquefied mercury is formed in the proximity of the inner surface of the fluorescent material 30 as indicated by 28S1.

When the first position of the discharge tube 24 is cooled with turn-on aging, discharge referred to as a "positive column" 98 occurs in the discharge tube 24, and this positive column 98 supplies heat and light to the inner surface of the fluorescent material 30 of the temperature T1. Therefore, the relations T2<T1 and T2<T3 hold, and the temperature T2 at the contact portion between the inner surface of the glass tube 24G of the discharge tube 24 and the outer surface of the fluorescent material 30 becomes the lowest. Since the mercury vapor inside the discharge tube 24 is liquefied at the lowest temperature position, a seed of liquefied mercury is formed in the proximity of the outer surface of the fluorescent material 30 as indicated by 28S2. Liquefaction of mercury spreads from the seed 28S2 of liquefied mercury towards the inner surface of the fluorescent material 30, and the particles 28P of liquefied mercury are collected to the first position while soaking into the fluorescent material 30 in the discharge tube 24. After the liquefied mercury particles 28P soak into the fluorescent material 30 in the discharge tube 24, they do not easily move even when the impact is subsequently imparted to them. Consequently, the light emission characteristics of the light source device do not change.

Figure 81:
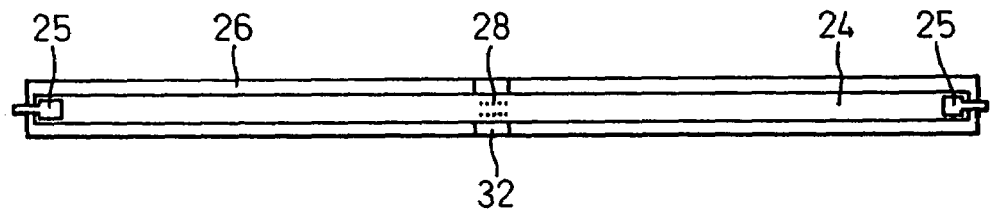
FIG. 81 is a view showing the backlight according to the fifth embodiment of the present invention.

FIG. 81 shows the backlight according to the fifth embodiment of the present invention. The backlight has the discharge tube 24 and the heat conduction member (cooling structure) 32 for cooling the discharge tube 24. The discharge tube 24 comprises the fluorescent material 30 (not shown in FIG. 81), two electrodes 25 and mercury. Liquid mercury 28 is collected to the center portion (the first position) of the discharge tube 24, and the heat conduction member 32 is arranged at the center portion (the first position) of the discharge tube 24. Liquid mercury 28 is vaporized to mercury vapor during use, and the fluorescent material converts the ultraviolet light emitted by the mercury vapor to the visible light.

Figure 82:
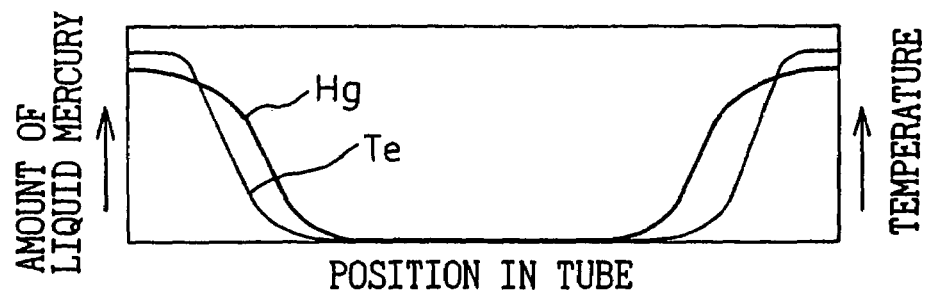
FIG. 82 is a diagram showing temperature characteristics and the distribution of liquid mercury of a prior art backlight.

FIG. 82 shows the temperature characteristics of the conventional backlight and the distribution of liquid mercury. Both of the temperature (Te) of the backlight and the amount (Hg) of liquid mercury of the liquid crystal display device are high at opposite ends of the discharge tube 24.

Figure 83:
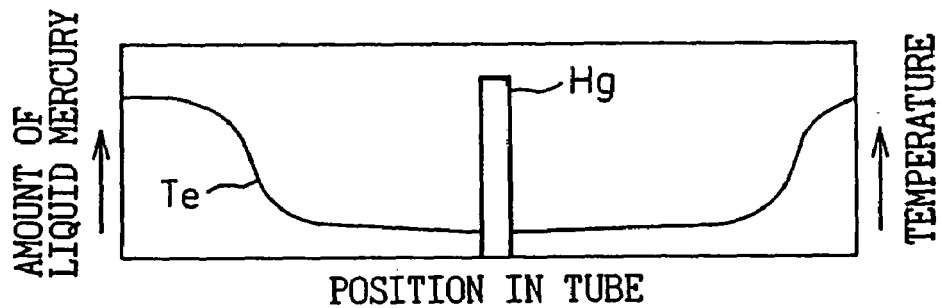
FIG. 83 is a diagram showing temperature characteristic and a distribution of liquid mercury of the backlight of FIG. 81.

FIG. 83 shows the temperature characteristics of the backlight and the amount of liquid mercury shown in FIG. 81. The temperature (Te) of the discharge tube 24 attains the lowest at the center portion (the first position) of the discharge tube 24, becomes substantially constant on both sides of the center portion (the first position) and becomes high at both end portions of the discharge tube 24. The amount (Hg) of liquid mercury 28 is concentrated locally and mostly on the center portion (the first position) of the discharge tube 24.

Figure 84:
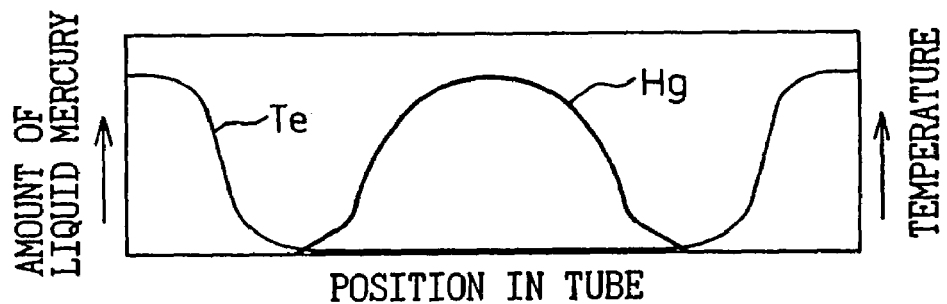
FIG. 84 is a diagram showing temperature characteristics and a distribution of liquid mercury of the backlight of the modified example of FIG. 81.

FIG. 84 shows the temperature distribution and the amount of liquid mercury in the backlight of another example. The portion of the low temperature (Te) of the discharge tube 24 exists in a relatively broad region of the discharge tube 24. The amount (Hg) of liquid mercury is not as concentrated as in the case of FIG. 83 but is wholly concentrated throughout the entire portion with the exception of the electrodes 25. A part of liquid mercury 28 is evaporated at the time of turn-on but another part of liquid mercury 28 remains as such. The portion at which liquid mercury 28 is positioned is kept at a relatively low temperature due to the operation of the heat conduction member 32.

In the backlight shown in FIG. 81, the inner diameter of the glass tube of the discharge tube 24 is D and the distance between the distal ends of two electrodes 25 is L. The existing region of liquid mercury 28 is preferably the center region that is spaced apart by at least 20 D from the distal end of each electrode 25, or the center region that is spaced apart by at least 0.25L from the distal end of each electrode 25. The first position is a local portion inside the region described above as shown in FIG. 83, or the whole portion inside the region described above as shown in FIG. 84. Incidentally, liquid mercury preferably exists in the region spaced apart by at least 5D from the distal end of each electrode 25, more preferably by at least 10D, in order to avoid the influence of sputtered products of the electrode 25.

The diameter of liquid mercury 28 is preferably not greater than 0.2 mm as described above. To keep liquid mercury immobile at a vibration of 50G, the diameter of liquid mercury 28 is preferably not greater than 0.1 mm. Alternatively, the diameter of liquid mercury 28 is 0.15D or below, preferably 0.1D or below.

The discharge tube 24 contains a rare gas together with mercury. In one embodiment of the present invention, the rare gas does not include argon.

Generally, argon, as a buffer gas, and a suitable amount of mercury are sealed in the discharge tube 24. The cold cathode 25 has a sheet-like, rod-like or a cylindrical (sleeve) structure of a metal such as nickel, stainless steel or niobium. The buffer gas uses Ne—Ar. A starting voltage becomes high when the gas pressure is high. The starting voltage becomes low when the Ar/Ne ratio is high.

When a high voltage is applied across the electrodes 25 at both ends of the discharge tube 24, the electrons remaining in the discharge tube 24 are attracted to the anode. While the electrons are moving at a high speed, they impinge against argon. The cations propagated by ionization by collision impinge against the cathode, strike out the secondary electrons from the cathode and trigger discharge. The electrons flowing due to discharge impinge against the mercury atoms, and the excited mercury radiates the ultraviolet light. The ultraviolet light excites the fluorescent material 30 and it emits the visible light peculiar to the fluorescent material.

After impinging against the electrons, argon then impinges against the mercury atoms and dissociates the mercury atoms. The mercury atoms contribute to discharge. The dissociation voltage of argon is 15.75 eV and the excitation voltage of argon is 11.5 eV. The dissociation voltage of mercury is 10.4 eV. Argon can be excited at 11.5 eV. Therefore, the starting voltage becomes lower from the viewpoint of the dissociation voltage of 15.75 eV. This is called "Penning effect". When the ambient temperature becomes lower, the starting voltage becomes higher because the mercury vapor pressure drops.

Argon is added to lower the starting voltage as described above. When argon is added, however, the problems of low efficiency and low light emission quantity occur because argon invites a thermal change of electron energy, and absorbs the ultraviolet light emitted by mercury and perform thermal conversion. Therefore, these problems can be solved when the discharge tube 24 does not contain argon. In this case, the starting voltage is set to a high voltage and is then adjusted to a predetermined voltage after the start.

In this embodiment, the electrode 25 comprises a carbon nano-tube. A carbon nano-tube is a third isotope of carbon, different from diamond and graphite, and exhibits the properties of a metal or a semiconductor. The carbon nano-tube used as the electrode 25 can restrict the starting voltage to a low level and is not easily sputtered because its melting point is high. Therefore, when the carbon nano-tube is used as the electrode 25, discharge can be easily initiated even when argon is not contained. The amount of mercury entrapped by the sputtered product becomes also small. The sputtered product does not adhere to the glass tube and does not invite cracking of the discharge tube due to red heat during turn-on. Therefore, the discharge tube 24 having the electrodes 25 made of the carbon nano-tube is free from degradation of performance and can have an extended life.

It is very important to extend the life of a lamp in association with ecology that will be described later. Counter-measures can be divided in accordance with constituent materials. Development of fluorescent materials that can minimize degradation due to mercury and ultraviolet light is necessary. The electrode materials must have high sputtering resistance so as to reduce blackening and consumption of mercury.

Ecology presents a problem both during and after the use of the discharge tube 24 as the cold cathode fluorescent lamp. Power loss and short life are the problems during the use of the discharge tube 24. After the use of the discharge tube 24, the influence of the constituent materials on the environment are important. Recovery of mercury, in particular, will become relatively easy if the lamp can be exchanged easily and recovery of the device or the lamp can be completely made. (It is also important that the device construction is designed in advance into an easily decomposable construction). Since the carbon nano-tube is made only of carbon, it is a material that is kind to the environment.

The heat conduction member 32 that keeps contact with the discharge tube 24 and cools the first position of the discharge tube 24 is made of a thermo-chromic material or a transparent material containing a thermo-chromic material. In the discharge tube of the type that utilizes light emission of mercury, efficiency and the light emission quantity drop when the temperature excessively rises or drops. In other words, there is an optimum mercury vapor pressure depending on a mechanical specification. Since the mercury vapor pressure is determined by the temperature of liquid mercury adhering to the inner wall of the tube, liquid mercury must be kept at a predetermined constant temperature in order to always keep maximum light emission with maximum efficiency irrespective of changes in the room temperature and the tube current.

The heat conduction member 32 made of the thermo-chromic material has both the function as a heat pipe for transferring heat and the function as a heat generating body for absorbing light by the thermo-chromic material and generating heat. The thermo-chromic material used hereby is a reversible material, and absorbs a greater quantity of light at a temperature lower than a predetermined temperature and a smaller quantity of light at a temperature higher than the predetermined temperature.

Since the temperature of the tube is low immediately after turn-on of the discharge tube 24, the heat pipe absorbs a greater amount of light, generates heat and rapidly heats the discharge tube 24. Therefore, the heat pipe heats liquid mercury adhering to the inside of the discharge tube 24, rapidly evaporates mercury and elevates the vapor pressure of mercury. As the vapor pressure of mercury becomes higher, the light emission quantity becomes all the greater, so that light absorption heat of the thermo-chromic material becomes greater and the temperature becomes drastically higher.

When the temperature of the thermo-chromic material exceeds the predetermined temperature, light absorption becomes small. Consequently, only the function as the heat pipe appears, and heat is allowed to escape from the discharge tube 24 to the reflector 26 and the housing member outside the former. Therefore, the temperature drops. In this way, the temperature at the first position of the discharge tube 24 can be kept at the transition temperature of the thermo-chromic material.

The thermo-chromic material is sold as "Dyna-Color Thermo-Chromic Ink" in the form of encapsulated ink from CTI Co., for example. This embodiment uses the ink having a transition point of 50° C. However, a thermo-chromic material having a lower transition point can be used when the position of the thermo-chromic material is further spaced apart from the position of liquid mercury, and a thermo-chromic material having a higher transition point can be used when its position is brought closer to the position of liquid mercury.

Figure 85:
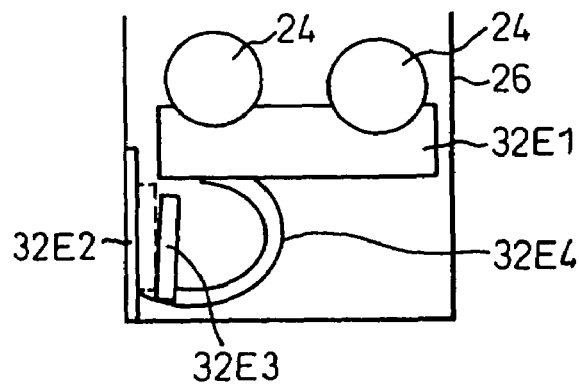
FIG. 85 is a view showing the backlight according to the sixth embodiment of the present invention.

FIG. 85 shows the light source device according to the sixth embodiment of the present invention. The light source device 18 of this embodiment includes a discharge tube 24 which contains mercury and in which liquid mercury is collected at the first position, and a cooling device for cooling the first position of the discharge tube 24. The cooling device includes a cooling capacity varying mechanism for varying the cooling capacity in accordance with the voltage (or current and voltage) applied to the discharge tube, or the temperature at any position of the light source device, or the light emission quantity of the discharge tube.

In FIG. 85, the cooling device comprises a first heat conduction member 32E1 keeping contact with the discharge tube 24, a second heat conduction member 32E2 keeping contact with a reflector, a movable third heat conduction member 32E3 capable of coming into contact with the second heat conduction member 32E2 and a fourth heat conduction member 32E4 fixed to the first heat conduction member 32E1 and supporting the third heat conduction member 32E3.

The first and second heat conduction members 32E1 and 32E2 each comprise a heat conduction sheet obtained by dispersing a heat conductive filler into a silicone resin. The third and fourth heat conduction members 32E3 and 32E4 comprise a bimetal, and undergo deformation in accordance with the change of the temperature of the discharge tube 24 to thereby bring the third heat conduction member 32E3 into contact with the second heat conduction member 32E2 or to control the gap between the third heat conduction member 32E3 and the second heat conduction member 32E2.

A portion of the bimetal forming the fourth heat conduction member 32E4 is formed into a semi-circular shape, and one of its ends is buried in and fixed to the first heat conduction member 32E1. The portion of the bimetal forming the third heat conduction member 32E3 is formed in a flat sheet-like shape. The bimetal has a sheet thickness of 0.1 mm, a radius of curvature of 2.0 mm at the semi-circular portion, and the length of 6.0 mm at the line portion. When the temperature of the first heat conduction members 32E1 and E2 contacting the discharge tube 24 is 55° C., the third heat conduction member 32E3 comes into contact with the second heat conduction member 32E2 as represented by broken line.

When the light source device 18 is used as the backlight of the liquid crystal monitor, there are change of the ambient temperature (5 to 40° C., for example), and control of intensity of light of the monitor (the change of power of the discharge tube), so the temperature of the discharge tube 24 greatly changes. When the temperature of the discharge tube 24 changes, the brightness of the discharge tube 24 changes, too. When the current of the discharge tube 24 is lowered to 50%, the temperature of the first heat conduction member 32E1 reaches 35° C., and the bimetal undergoes deformation. As a result, the third heat conduction member 32E3 is spaced apart by 1 mm from the second heat conduction member 32E2 as indicated by solid line. This shape change can offset the change of the tube temperature of 15° C. resulting from the current change, and the tube temperature can be kept at a temperature of maximum light emission efficiency. Since the gap between the bimetal and the heat conduction sheet can be changed substantially linearly with respect to the tube temperature even within this temperature range, the tube temperature can be kept substantially constant.

Figure 86:
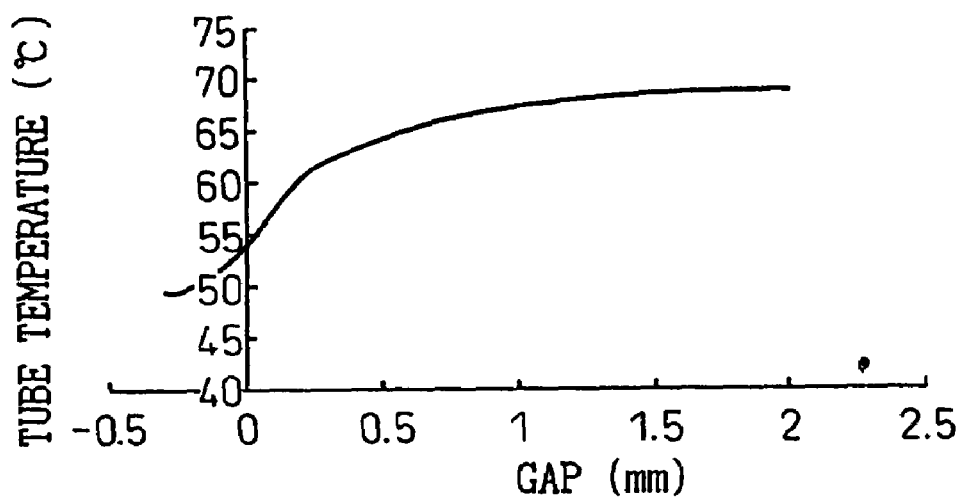
FIG. 86 is a diagram showing the relation between the gap of second and third heat conduction members and the tube temperature.

FIG. 86 is a graph showing the relation between the spacing of the second heat conduction member 32E2 from the third heat conduction member 32E3 and the tube temperature. This graph shows the tube temperature when the spacing is changed under the same condition with a tube temperature of 45° C. being the reference. The case where the spacing takes a negative value indicates that the second heat conduction member 32E2 and the third heat conduction member 32E3 come into mutual contact as the pressure is applied to them. The tube temperature can be controlled at the spacing of 1 mm or more.

Figure 87:
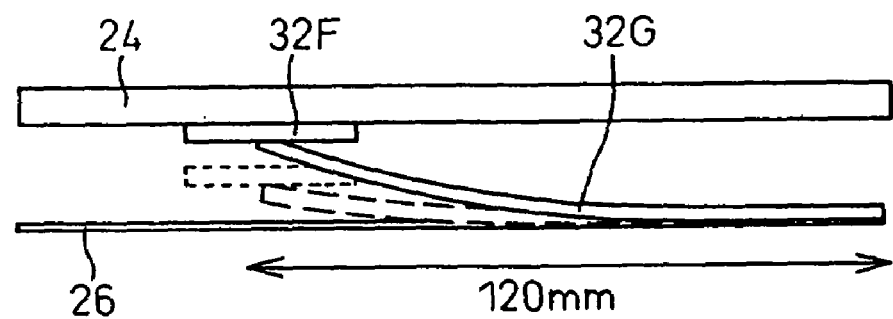
FIG. 87 is a view showing a modified example of the optical device shown in FIG. 85.

FIG. 87 shows a modified example of the light source apparatus shown in FIG. 85. In this example, the first heat conduction member 32F comprising the heat conduction sheet is so disposed as to come into contact with, or to be spaced apart from, the discharge tube 24, and the second heat conduction member 32G made of the bimetal supports, at one of its ends, the first heat conduction member 32F. The other end of the second heat conduction member 32G is welded to the reflector 26. The bimetal is a Ni—Cu type bimetal having a length of 125 mm, a width of 6 mm and a thickness of 0.5 mm. The first heat conduction member 32F is bonded to the surface of the bimetal on the side of a low expansion coefficient. The first heat conduction member 32F has a length of 15 mm, a width of 6 mm and a thickness of 0.5 mm.

The bimetal is constituted so that when the ambient temperature inside the reflector 26 is 45° C., the first heat conduction member 32F comes into contact with the discharge tube 24. At this time, the first heat conduction member 32F is positioned so that the mid point of the effective length of the discharge tube 24 and the center of the first heat conduction member 32F coincide with each other within an error of 1 mm. It has been found that the ambient temperature inside the reflector 26 (the value at a position spaced apart by 1 mm from the reflector 26) and the surface temperature of the discharge tube 24 (with the proviso that an air layer of at least 2 mm exists around the discharge tube) satisfy the relation tabulated in Table 2 given below.

TABLE 2

Relation between Ambient Temperature and Tube Surface Temperature

| Tube Ambient Temperature | 90° C. | 70° C. | 60° C. |
|---|---|---|---|
| Ambient Temperature | 55° C. | 45° C. | 38° C. |

It can be appreciated from Table 2 that the ambient temperature and the tube surface temperature have a correlation. Assuming that the spacing between the discharge tube 24 and the reflector 26 is 2 mm, the mean value of the ambient temperature that the bimetal senses is the temperate at the position spaced apart by 1 mm from the discharge tube 24. Therefore, within the range where the tube temperature exceeds 70° C., the first heat conduction member 32F is pressed to the discharge tube 24 and heat conductivity increases. When the tube temperature is lower than 60° C., the first heat conduction member 32F is spaced apart by at least 0.5 mm from the discharge tube 24, and the temperature of the discharge tube 24 does not drop extremely.

Figure 88:
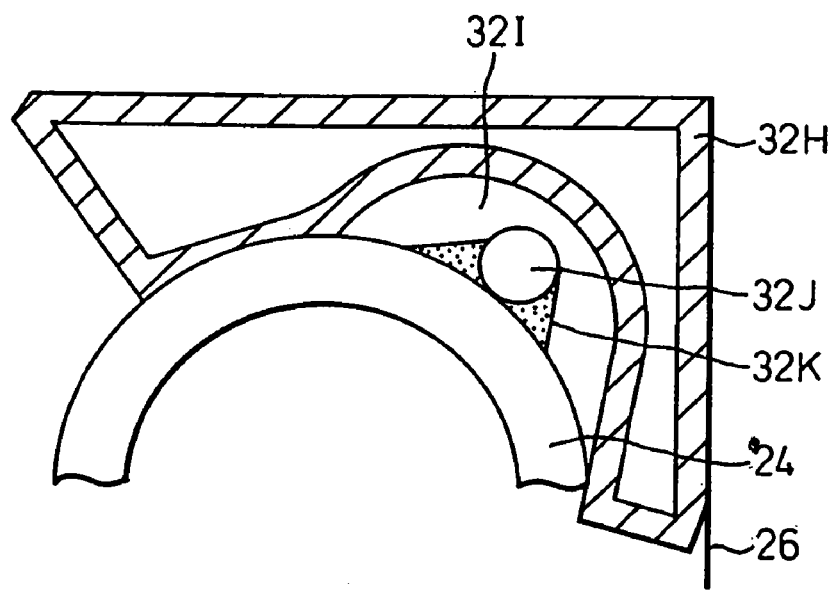
FIG. 88 is a view showing a modified example of the optical device shown in FIG. 85.

FIG. 88 shows a modified example of the optical apparatus shown in FIG. 85. In this example, the heat conduction member 32H comprising a silicone resin molded article is disposed at a corner of the reflector 24 and keeps contact with the discharge tube 24 and with the reflector 24. The heat conduction member 32H has a recess 32I. A nichrome wire 32J is disposed in the recess 32I and is fitted to the discharge tube 24 by an adhesive 32K. The nichrom wire 32J has a diameter of 0.3 mm and a length of 11 mm with the mid point of the effective length of the discharge tube 24 being the center.

Figure 90:
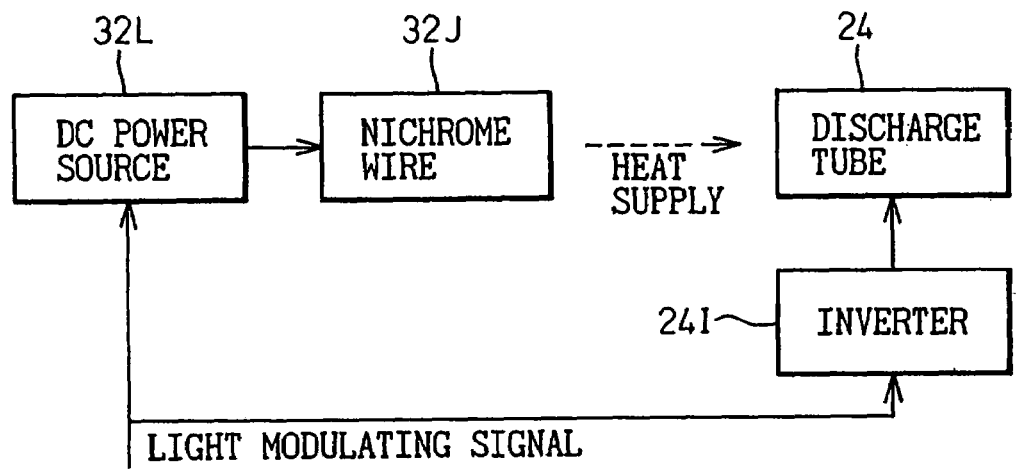
FIG. 90 is a block diagram showing the power supply to the nichrome wire of the light source device shown in FIG. 88.

As shown in FIG. 90, one end of the nichrome wire 32J keeping contact with the discharge tube 24 is connected to a DC power source 32L and the other end is connected to the reflector 24 kept at ground potential. An inverter circuit 24I supplies a current of 14 mA (7W) per discharge tube 24 and adjusts the intensity of light with a duty ratio. Control of light intensity is conducted by receiving a signal voltage of 0.3 DC. The DC power source 32L supplies power to the nichrome wire 32J in accordance with the signal voltage to the inverter circuit 24I while taking the relation between the signal voltage and the duty ratio of the tube current into consideration.

Figure 89:
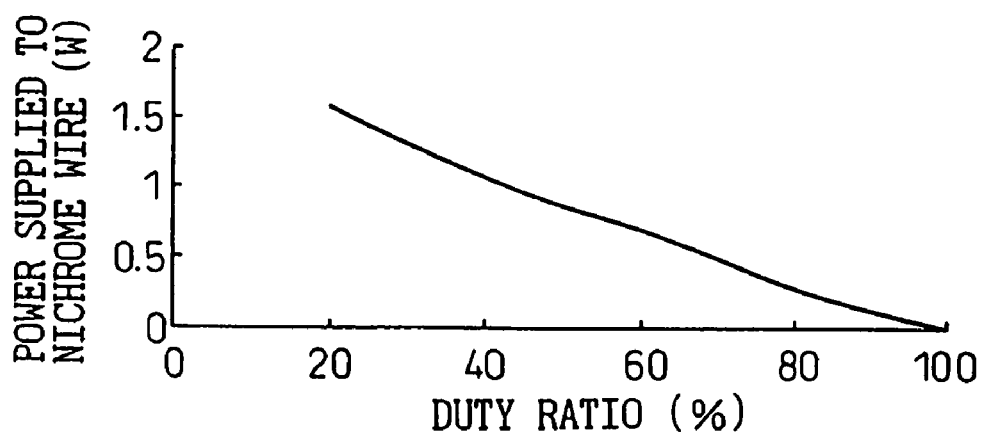
FIG. 89 is a diagram showing the relation between a duty ratio of the tube current and the feed power to a nichrome wire in the light source device shown in FIG. 88.

FIG. 89 is a graph showing the relation between the duty ratio of the tube current and feed power to the nichrome wire 32J. In this example, the heat conduction member 32H and the nichrome wire 32J together constitute the cooling device. The heat conduction member 32H cools the discharge tube 24 and the nichrome wire 32J heats the discharge tube, thereby correcting the cooling capacity of the heat conduction member 32H. In this way, the heat generated by the discharge tube 24 and the nichrome wire 32J per unit length becomes substantially constant, and the temperature of the first position of the discharge tube 24 relative to the ambient temperature of the light source device can be kept substantially constant.

Further, the construction shown in FIGS. 18 to 20, the construction shown in FIGS. 34 to 36, the construction shown in FIG. 37 and the constructions analogous to them can be used as the cooling device including the cooling capacity varying mechanism of the light source device comprising the discharge tube which contains mercury and in which liquid mercury is gathered to the first position, and the cooling device for cooling the first position of the discharge tube.

Figure 91:
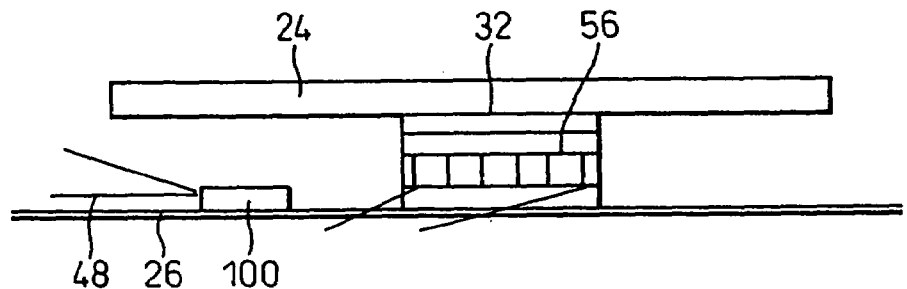
FIG. 91 is a view showing a modified example of the light source device in FIG. 85.

FIG. 91 shows another modified example of the optical device shown in FIG. 85. In this example, the heat conduction member 32 is fitted to the discharge tube 24, and a Peltier device 56 is fitted to the heat conduction member 32. A black silicone sheet 100 is bonded to the position of the reflector 26 spaced away, by about 30 mm, in the longitudinal direction from the range in which the heat conduction member 32 exists. This silicone sheet 100 has a size of 0.5×0.5 mm, a thickness of 0.5 mm and heat conductivity of 0.15 W/K/m. A junction portion of a thermocouple 48 is buried into the silicone sheet 100. The temperature of the thermocouple 48 rises as the heat absorption quantity of the silicone sheet 100 increases. In other words, the thermocouple 48 attains a high temperature when large power is applied to the discharge tube 24. In this way, the light emission quantity is monitored and the Peltier device 56 is controlled.

Figure 92:
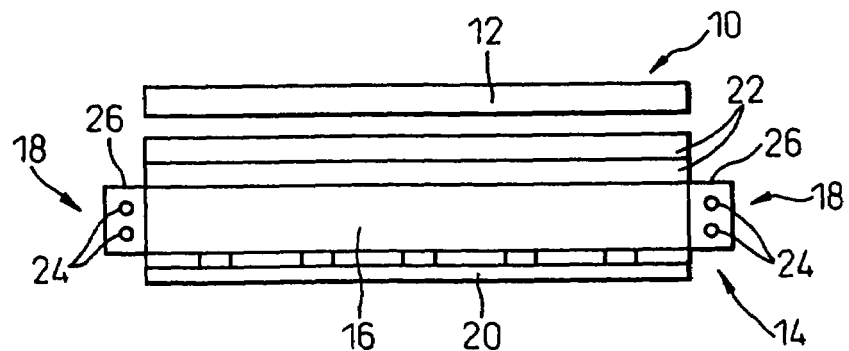
FIG. 92 is a view showing the display device according to the fifth embodiment of the present invention.

FIG. 92 shows a display device according to still another embodiment of the present invention. The display device 10 includes a liquid crystal panel 12 and a backlight 14 in the same way as the display device shown in FIG. 1. The backlight 14 includes a light guide plate 16, light source devices 18 disposed on either side of the light guide plate 16, a scatter reflection plate 20 disposed below the light guide plate 16 and a scatter plate 22 disposed above the light guide plate 16. Each light source device 18 comprises two discharge tubes 24 and a reflector 26. This light source device 18 comprises discharge tubes 24 which contain mercury and in which liquid mercury is collected to the first position, and a cooling device capable of varying in cooling capacity and cooling the first position of the discharge tube 24.

Figure 93:
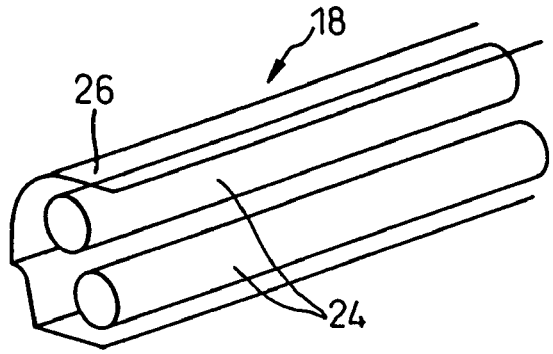
FIG. 93 is a perspective view showing the light source device of the display device in FIG. 92.
Figure 94:
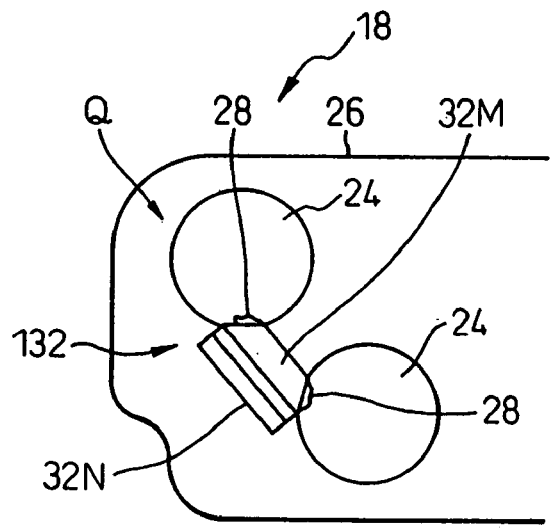
FIG. 94 is a transverse sectional view of the light source device in FIG. 93.
Figure 95:
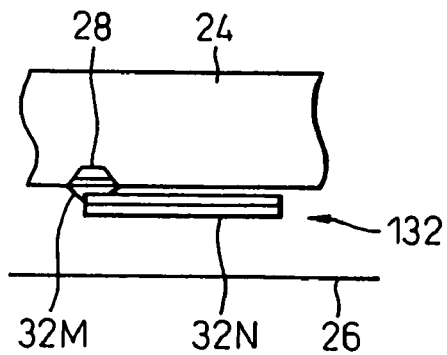
FIG. 95 is a side view of the discharge tube and the cooling device, as viewed from arrow Q in FIG. 94.

FIG. 93 is a perspective view showing the light source device 18 of the display device 10 shown in FIG. 92. FIG. 94 is a transverse sectional view of the light source device shown in FIG. 93. FIG. 95 is a side view of the discharge tube and the cooling device as viewed from the direction of arrow Q in FIG. 95.

Liquid mercury 28 is collected to the first position inside the discharge tube 24. The heat conduction member 32M that is a part of the cooling device and contains an adhesive extends to two discharge tubes 24 and is fitted to the first position of each discharge tube 24. One of the ends of a bimetal as a part of the cooling device is fitted to the heat conduction member 32M. In FIGS. 94 and 95, the other end of the bimetal 32N is shown separated from the reflector 26.

Figure 96:
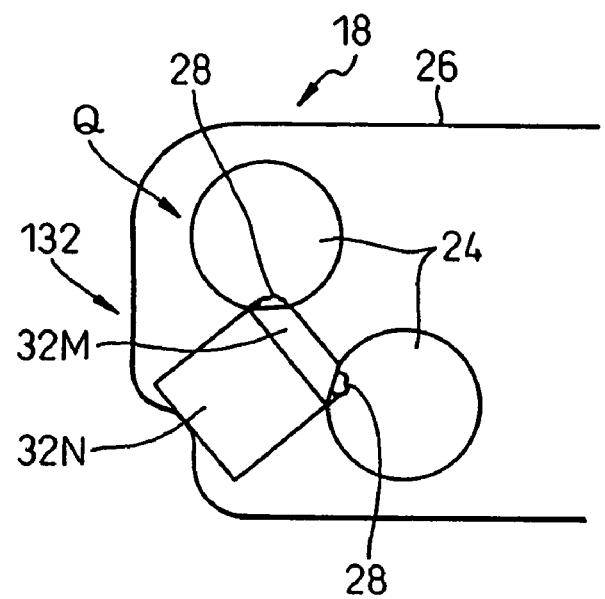
FIG. 96 is a transverse sectional view of the light source device similar to the one shown in FIG. 94 when the bimetal extends.
Figure 97:
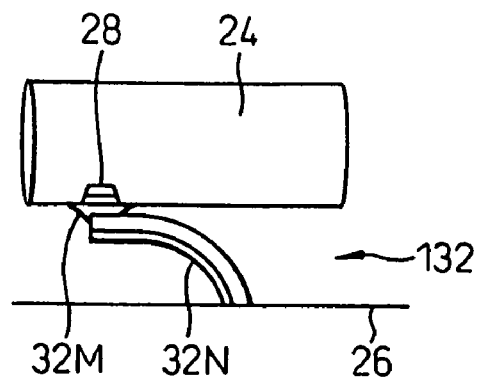
FIG. 97 is a side view of the discharge tube and the cooling device, as viewed from arrow Q in FIG. 96.

FIG. 96 is a sectional side view of the light source device 18 under the state where the bimetal 32N extends in the same way as in FIG. 94. FIG. 97 is a side view of the light source device 18 as viewed from the direction of arrow Q. FIG. 97 is a side view of the light source device 18 as viewed from arrow Q in FIG. 96. In FIGS. 96 and 97, the other end of the bimetal 32N keeps contact with the reflector 26. Therefore, the first position of the discharge tube 24 is cooled by the cooling device comprising the heat conduction member 32M and the bimetal 32N. Since the current supplied to the discharge tube 24 is changed and the cooling capacity of the cooling device is changed in this way, the brightness of the display screen of the display device 10 can be greatly changed.

Figure 98:
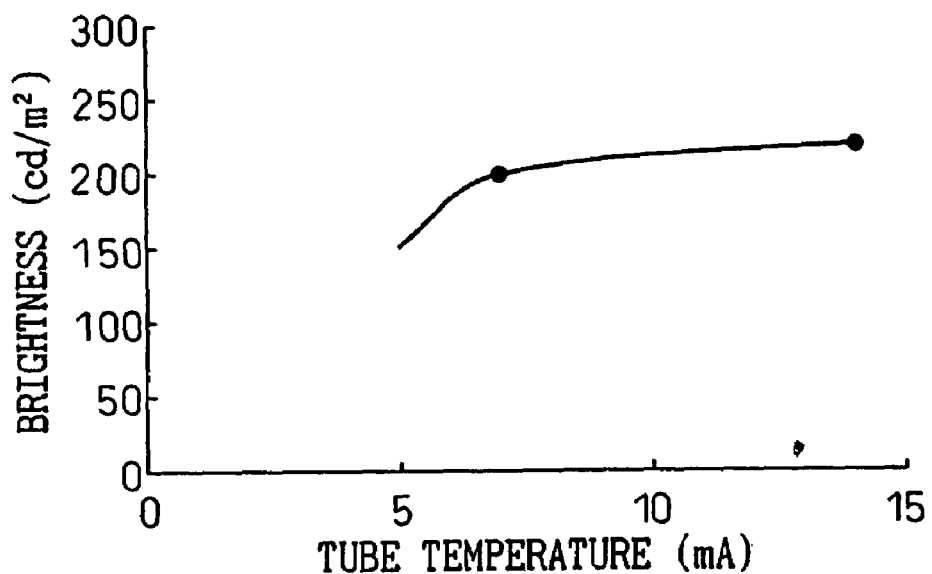
FIG. 98 is a diagram showing the relation between the tube current and the brightness of a conventional display device.

The operation of the display device shown in FIGS. 92 to 97 will be explained. FIG. 98 is a graph showing the relation between the tube current and brightness of the conventional display device. As the tube current supplied to the discharge tube 24 is increased, brightness rises but the degree of this rise is small. It will be assumed, for example, that while the display device 10 is used at an ordinary current of 7 mA, the necessity for particularly increasing brightness of display occurs and a current of 14 mA is supplied. However, even when the current is increased from 7 mA to 14 mA, the brightness is not increased as much as expected.

Figure 99:
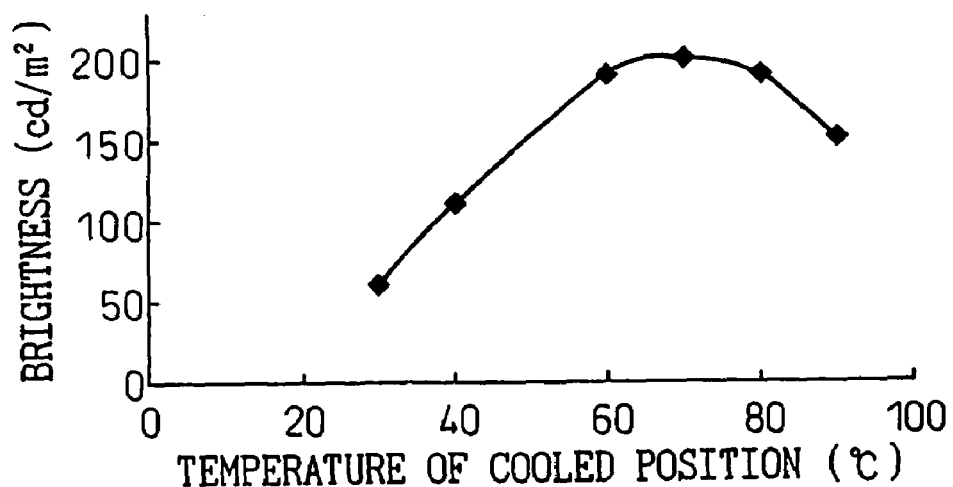
FIG. 99 is a diagram showing the relation between the temperature at the first position of the discharge tube and brightness.

FIG. 99 is a graph showing the relation between the temperature of the first position (cooled portion) and brightness when liquid mercury 28 is gathered to the first position inside the discharge tube 24 and the cooling device cools the first position of the discharge tube 24. The operation of the light source device 18 having such features has already been explained in detail in the foregoing embodiments. In FIG. 99, maximum brightness can be acquired when the first position of the discharge tube 24 is kept at about 70° C.

Therefore, when a current of 7 mA is supplied and the display device 10 is used, the other end of the bimetal 32N separates from the reflector 26 as shown in FIG. 95, so that the cooling device 24 comprising the heat conduction member 32M and the bimetal 32N does not substantially cool the discharge tube 24. The display device 10 can be used normally under this condition.

Particularly when it is desired to increase brightness of display, a current of 14 mA is supplied. Then, the temperature of the discharge tube 24 rises. As shown in FIGS. 96 and 97, the bimetal 32N undergoes deformation and the other end of the bimetal 32N comes into contact with the reflector 26. The cooling device comprising the heat conduction member 32M and the bimetal 32N cools the first position of the discharge tube 24, and the temperature of the first position of the discharge tube 24 reaches about 70° C. in FIG. 99. Then, even when the temperature rises at other portions of the discharge tube 24, the discharge tube 24 emits light at maximum brightness, and brightness greatly rises.

The heat conduction member 32 uses SE4486 of Dow Corning Toray Silicone Corporation (heat conductivity: 1.6 W/Km), for example. A composite material such as Ni—Cu, Cu—Zn, Ni—Mn—Fe, Ni—Cr—Fe, Ni—Mo—Fe, Ni—Mn—Cu, or the like, can be used as the high expansion material. Japanese Industrial Standard (JIS) classifies bimetal sheets for electrical applications in accordance with a curve coefficient and a volume resistivity, and this embodiment uses a kind of TM having a large curve coefficient. The curve coefficient of the flat sheet type bimetal is expressed by $K = Dt/\Delta Tl^2$. Here, K is the curve coefficient, D is a displacement distance, t is a sheet thickness, $\Delta T$ is a temperature difference and l is an operating length.

When a bimetal having $K=14\times10^{-6}/°$ C., t=0.5 mm and l=20 mm is used, the displacement amount D is given by D=0.62 mm when the temperature rises from the room temperature of 20° C. to 75° C. When a current of 0.7 mA is caused to flow through the discharge tube 24 at the room temperature of 20° C., the tube temperature rises to about 70° C. However, since the temperature is below 75° C., the other end of the bimetal 32N remains separated from the reflector 26. When a current of 14 mA is caused to flow through the discharge tube 24, the tube temperature rises to 75° C. or above, and the other end of the bimetal 32N comes into contact with the reflector 26.

Figure 100:
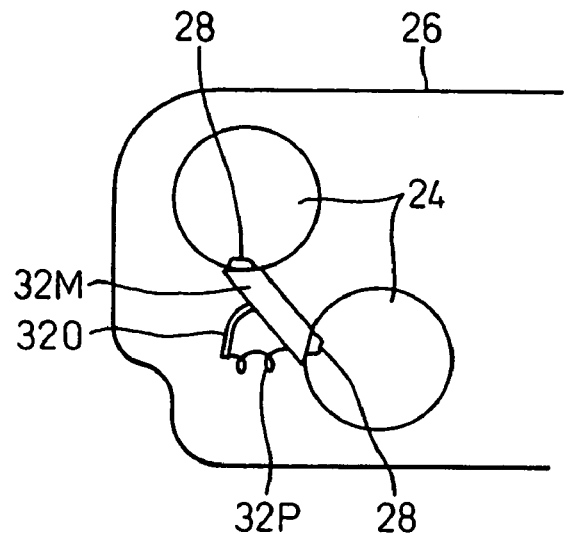
FIG. 100 is a view showing an example of the use of the shape memory alloy as the cooling device of the light source device of the display device.
Figure 101:
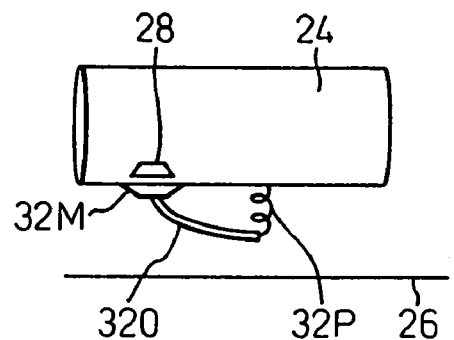
FIG. 101 is a view showing the state where the shape memory alloy in FIG. 100 is separated from the reflector.
Figure 102:
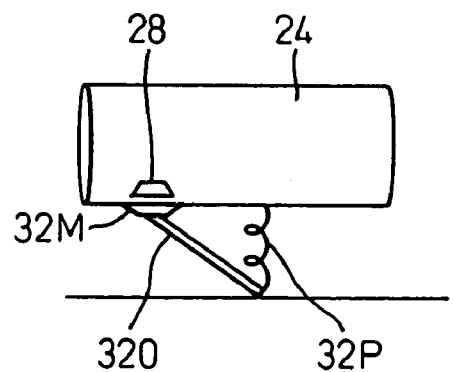
FIG. 102 is a view showing the state where the shape memory alloy in FIG. 100 keeps contact with the reflector.

FIGS. 100 to 102 represent the case where a shape memory alloy is used for the cooling device of the light source device of the display device. The heat conduction member 32M that is a part of the cooling device and contains the adhesive is fitted to the first position of the discharge tube 24. One of the ends of the shape memory alloy 32O as a part of the cooling device is fitted to the heat conduction member 32M. The other end of the shape memory alloy 32O is so arranged as to come into contact with and out of contact from the reflector 26. FIG. 101 shows the state where the shape memory alloy 32O is out of contact from the reflector 26. FIG. 102 shows the state where the shape memory alloy 32O keeps contact with the reflector 26.

The shape memory alloy 32O is a Ni—Ti alloy and is provided with memory in a linear form having a diameter of 0.25 mm and a length of 30 mm. A spring 32P pulls the shape memory alloy 32O into a curved shape. The shape memory alloy 32O is in the martensite phase and has a small elastic coefficient at 75° C. or below. Therefore, the shape memory alloy 32O is out of contact from the reflector 26 as it is pulled by the spring 32P. However, when the current of 14 mA is applied to the discharge tube 24 and its temperature reaches 75° C. or above, the shape memory alloy 32O undergoes the phase transition, the elastic coefficient becomes great and the alloy turns to the linear shape memorized. In consequence'' the temperature of the first position of the discharge tube 24 is lowered and brightness can be efficiently improved.

Figure 103:
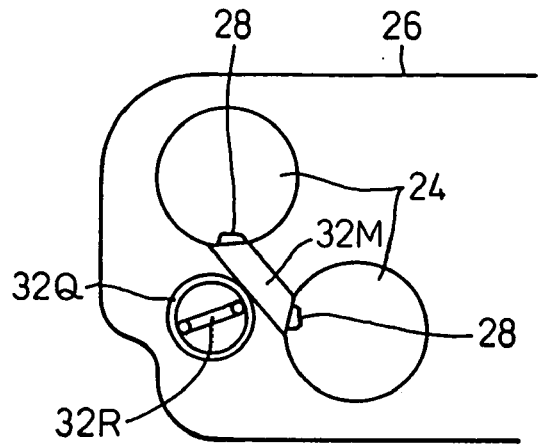
FIG. 103 is a view showing an example of the use of the shape memory alloy and the resin as the cooling device of the light source device of the display device.
Figure 104:
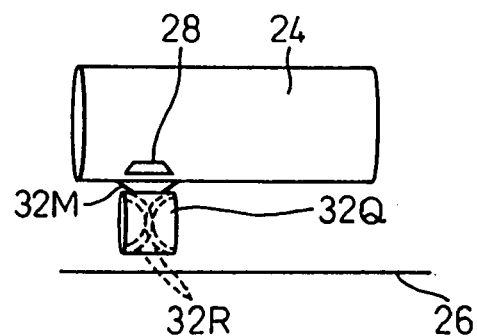
FIG. 104 is a view showing the state where the resin in FIG. 103 is separated from the reflector.
Figure 105:
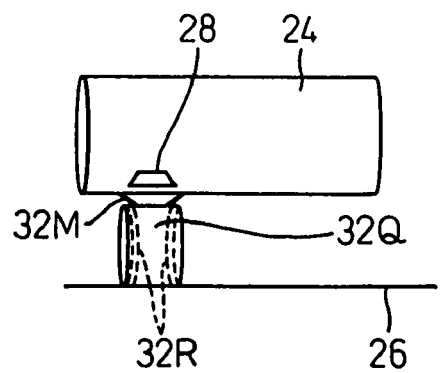
FIG. 105 is a view showing the state where the resin in FIG. 103 keeps contact with the reflector.

FIGS. 103 to 105 represent an example where a shape memory alloy and a resin are used as the cooling device of the light source of the display device. The heat conduction member 32M that is a part of the cooling device and contains an adhesive is fitted to the first position of the discharge tube 24. A tube 32Q of a heat conductive silicone resin encompasses the shape memory alloy 32R as a part of the cooling device. One of the ends of this resin tube 32Q is fitted to the heat conduction member 32M. The other end of the resin tube 32Q is so arranged as to come into contact with, or to depart from, the reflector 26. FIG. 104 shows the state where the resin tube 32Q is separated from the reflector 26. FIG. 105 shows the state where the resin tube 32Q keeps contact the reflector 26. Unlike the case shown in FIGS. 100 to 102 where the shape memory alloy 32O is used alone, the contact area with the reflector 26 becomes greater when the resin tube 32Q encompassing the shape memory alloy 32R is used. Therefore, the movement of heat upon contact becomes great, too. The resin material is not particularly limited to silicone so long as the tube shape changes due to the phase transition of the shape memory alloy 32O and the material has high heat conductivity.

Figure 106A:
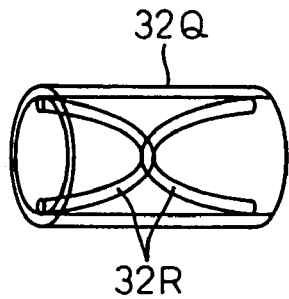
FIGS. 106A to 106D are views showing various examples of the tube of resin encompassing the shape memory alloy.
Figure 106B:
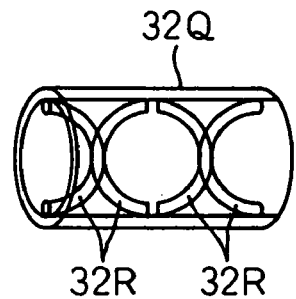
Figure 106C:
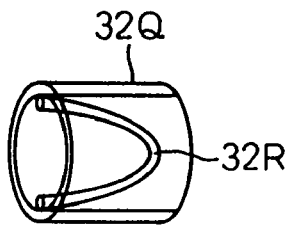
Figure 106D:
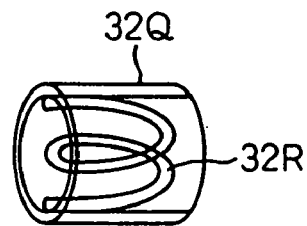

FIGS. 106A to 106D show examples of the resin tube 32Q that encompasses the shape memory alloy 32R. In FIG. 106A, two shape memory alloys 32R having a U-shape are used. In FIG. 106B, four shape memory alloys 32R having a C-ring shape are used. In FIG. 106C, one shape memory alloy 32R having a U-shape is used. In FIG. 106D, a shape memory alloy 32R having a coil shape is used.

Figure 107:
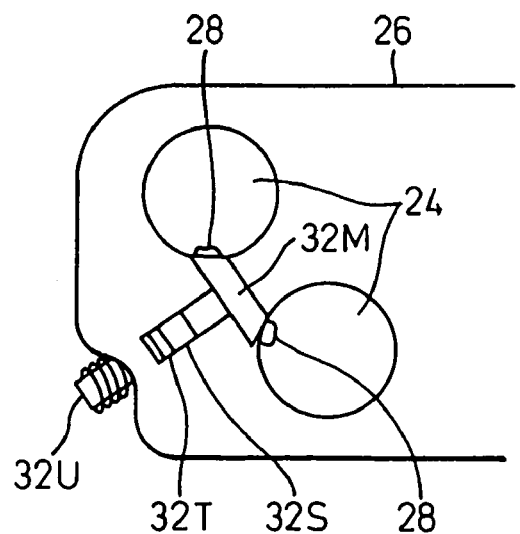
FIG. 107 is a view showing an example of the use of the spring and the magnet as the cooling device of the light source device of the display device.
Figure 108:
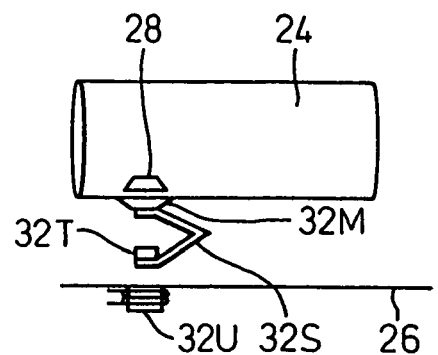
FIG. 108 is a view showing the state where the magnetic substance in FIG. 107 is separated from the electromagnet.
Figure 109:
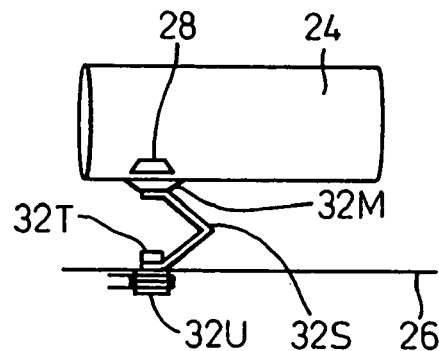
FIG. 109 is a view showing the state where the magnetic substance in FIG. 107 is attracted to the electromagnet.

FIG. 107 shows an example where a spring and a magnet are used as the cooling device of the light source device of the display device. The heat conduction member 32M is fitted to the first position of the discharge tube 24. A spring 32S having a magnetic substance 32T fitted to the tip thereof is in turn fitted to the heat conduction member 32M. An electromagnet 32U is disposed at a position opposing the magnetic substance 32T of the reflector 26. FIG. 108 shows the state where a current of 7 mA is applied to the discharge tube 24 and the magnetic substance 32T is separated from the electromagnet 32U. FIG. 109 shows the state where a current of 14 mA is applied to the discharge tube 24 and the magnetic substance 32T is attracted to, and keeps contact with, the electromagnet 32U. The width of the spring 32S and the contact area are adjusted so that the temperature of the discharge tube 24 at the current 14 mA is equal to the temperature of the discharge tube 24 at the current 7 mA.

Figure 110:
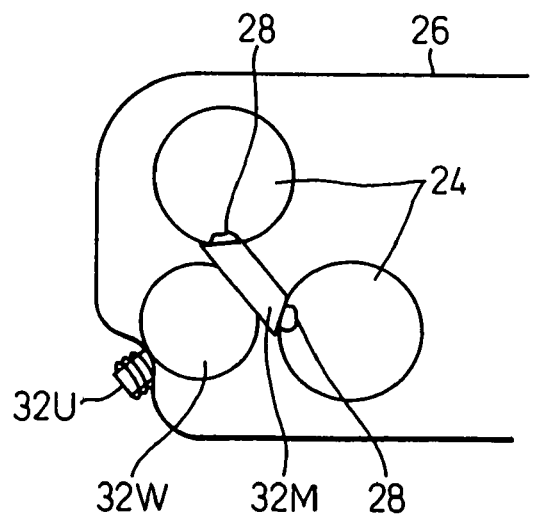
FIG. 110 is a view showing an example of the use of the ball member including the metal rod as the cooling device of the light source device of the display device.

FIG. 110 shows an example where a ball member including a metal rod is used as the cooling device of the light source device of the display device. The heat conduction member 32M is fitted to the first position of the discharge tube 24. The ball member 32W including the metal rod X is interposed between the heat conduction member 32M and the reflector 26. The side surface of the metal rod 32X is insulated, and its end face is a magnetic substance. A recess having an arcuate section is formed in the surface of the heat conduction member 32M. The ball member 32W is disposed in the recess of the heat conduction member 32M and can freely rotate but cannot jump out from the recess of the heat conduction member 32M. Further, an electromagnet 32U is disposed at a position opposing the ball member 32W of the reflector 26.

Figure 111:
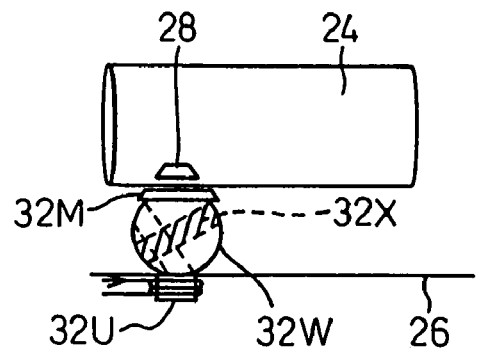
FIG. 111 is a view showing the state where the end face of the metal rod of the ball member in FIG. 110 is separated from the electromagnet.
Figure 112:
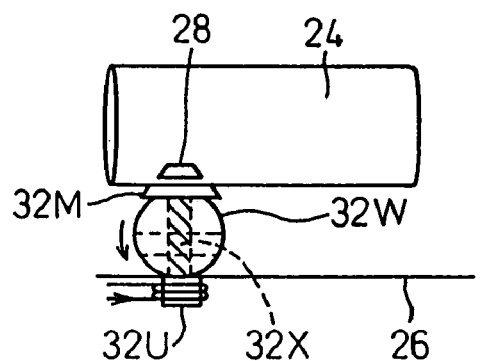
FIG. 112 is a view showing the state where the end face of the metal rod of the ball member in FIG. 110 is attracted to the electromagnet.

FIG. 111 shows the state where a current of 7 mA is applied to the discharge tube 24 and the end face of the metal rod 32X of the ball member 32W exists at the position separated from the electromagnet 32U. At this time, the heat conduction member 32M is thermally isolated from the reflector 26. FIG. 112 shows the state where a current of 14 mA is applied to the discharge tube 24 and the end face of the metal rod 32X of the ball member 32W is attracted to, and keeps contact with, the electromagnet 32U. At this time, the heat conduction member 32M is brought into thermal contact with the reflector 26.

Figure 113:
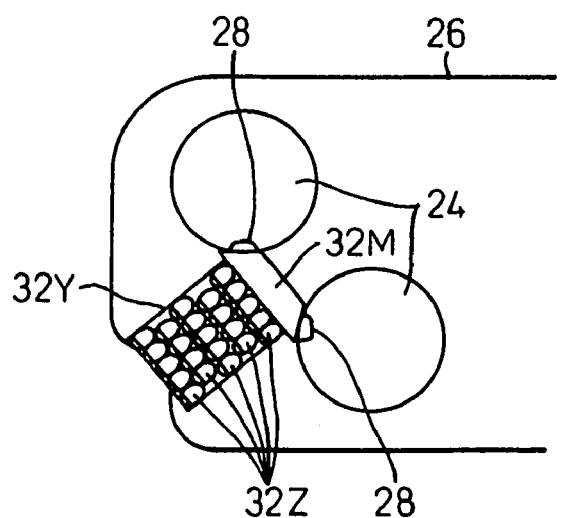
FIG. 113 is a view showing an example of the use of a phase transition member as the cooling device of the light source device of the display device.

FIG. 113 shows an example where a phase transition member is used as the cooling device of the light source device of the display device. The heat conduction member 32M is fitted to the first position of the discharge tube 24. A container 32Y containing a plurality of capsules 32Z is interposed between the heat conduction member 32M and the reflector 26. Each capsule 32Z is a glass capsule or an acrylic capsule, and a small amount of a liquid 32ZL having a boiling point of 80° C. (Fluorinate FC-84, a product of 3M Co.) is charged into the capsule.

Figure 114:
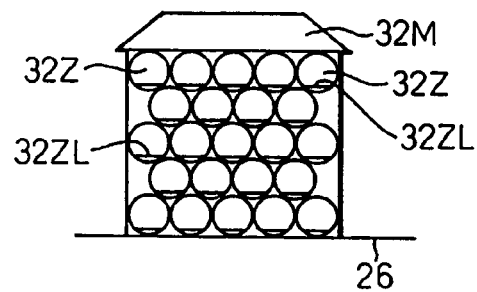
FIG. 114 is a view showing the state where the liquid in FIG. 113 moves to the low position in each capsule.
Figure 115:
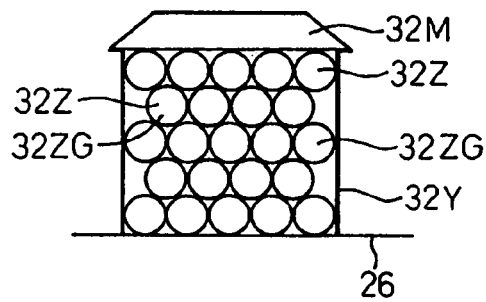
FIG. 115 is a view showing the state where the liquid in FIG. 113 changes to a gas, and the gas spreads in each capsule.

FIG. 114 shows the state where a current of 7 mA is applied to the discharge tube 24 and the liquid 32ZL is situated at a low position inside each capsule 32Z because the temperature of the discharge tube 24 is low. At this time, the group of the capsules 32Z has low heat conductivity, and the heat conduction member 32M is thermally isolated from the reflector 26. FIG. 115 shows the state where the current 14 mA is applied to the discharge tube 24, the temperature of 80° C. is transferred to the capsules 32Z as the temperature of the discharge tube 24 becomes high, hence the liquid 32ZL changes to a gas 32ZG and the gas 32ZG spreads inside each capsule 32Z. At this time, the group of capsules 32Z has high heat conductivity (about 400 times), and the heat conduction member 32M keeps thermal contact with the reflector 26.

As described above, the display device 10 is used while a certain current is applied to the discharge tube 24 in a certain case. Particularly when high brightness is desired, a higher current is applied to the discharge tube 24 to operate the cooling device, and the display device 10 can be used at maximum brightness. For example, brightness is changed over between the case where the display device is used in a dark room and the case where it is used in a bright room. Brightness is also changed over between the case where a single person uses the display device and the case where a large number of persons use the display device. Further, brightness is changed over between the case where the display device is used as a display of a personal computer and the case where it is used as a monitor. Brightness is further changed over between the case where a user watches images having low mean brightness and the case where the user watches images having high mean brightness. Brightness can be changed over either automatically or manually. The user can much more enjoy dynamic images by increasing the backlight output for the bright images and lowering the backlight output for the dark images. When the display device is continuously used under the high output state, degradation of the discharge tube occurs quickly. However, life of the discharge tube can be extended when the display device is used while the output is changed.

This embodiment can provide a light source device having high brightness. Furthermore, the embodiment can provide a backlight having high light utilization efficiency and high brightness.

Figure 116:
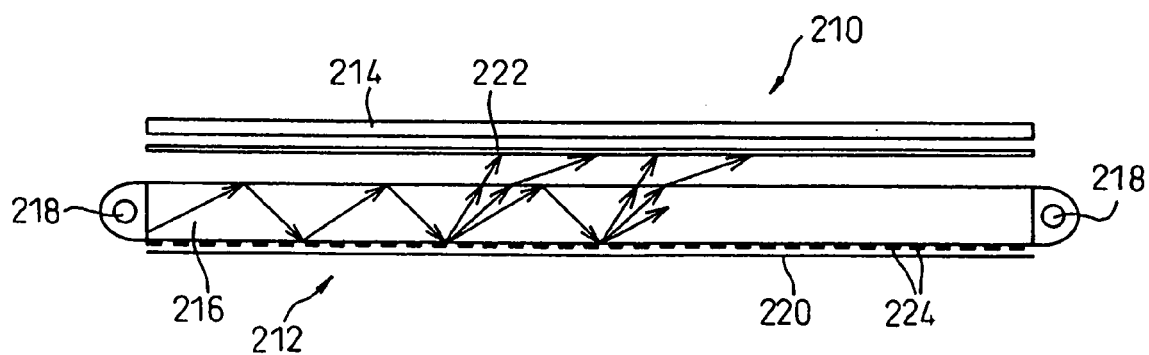
FIG. 116 is a view showing the liquid crystal display device including an optical sheet and an illumination device according to the seventh embodiment of the present invention.

FIG. 116 shows the liquid crystal display device including an optical sheet and an illumination device according to the seventh embodiment of the present invention. In FIG. 116, the liquid crystal display device 210 includes an illumination device (backlight) 212 and a liquid crystal panel 214. The backlight 212 includes a light guide plate 216, light sources 218 disposed on either side of the light guide plate 216, a reflection plate 220 disposed below the light guide plate 216 (on the far side from the liquid crystal panel 214) and an optical sheet 222 disposed above the light guide plate 216 (on the near side of the liquid crystal panel 214). The light source 218 comprises a discharge tube such as a cold-cathode fluorescent tube, a hot-cathode fluorescent tube, a light emitting tube such as an EL element or an LED element, and a reflector. Scattering dots 224 are formed on the lower surface of the heat guide plate 216. The light leaving from the light source 218 is made incident to the light guide plate 216 and propagate therein while being totally reflected in the light guide plate 216. A part of the light is scattered by the scattering dots 224, is reflected by the reflecting plate 220 and leaves from the light guide plate 216. The light leaving from the light guide plate 216 passes through the optical sheet 222 and is made incident to the liquid crystal panel 214.

Figure 117A:
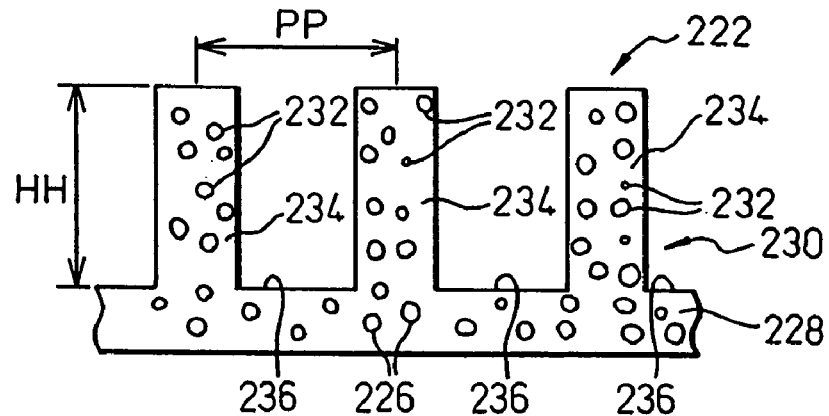
FIGS. 117A to 117C are sectional views showing various examples of the optical sheet shown in FIG. 116.
Figure 117B:
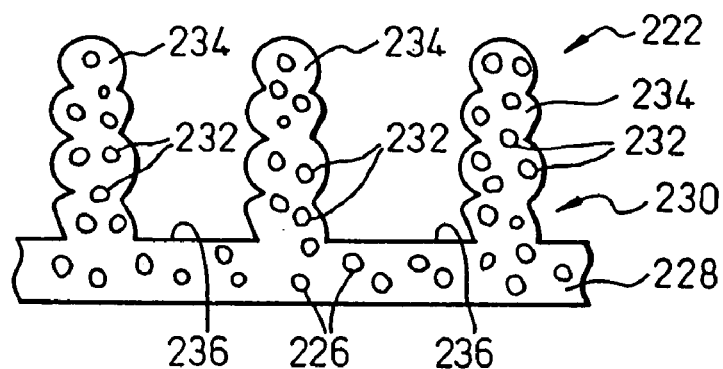
Figure 117C:
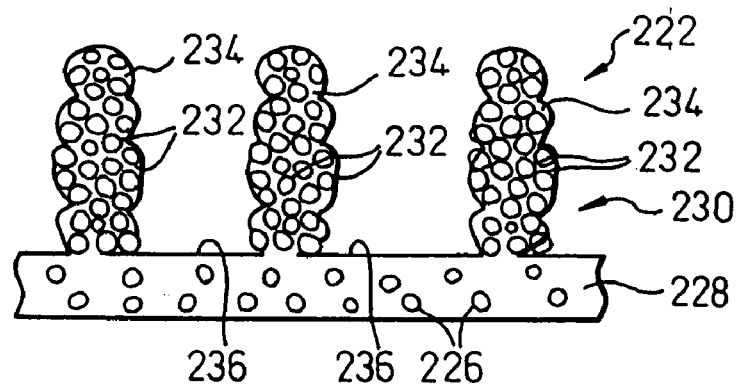
Figure 118A:
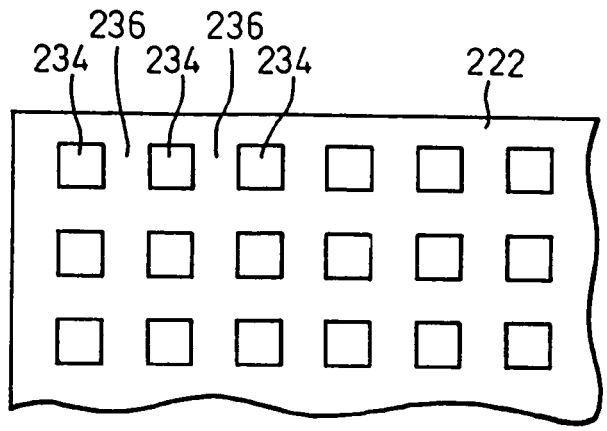
Figure 118B:
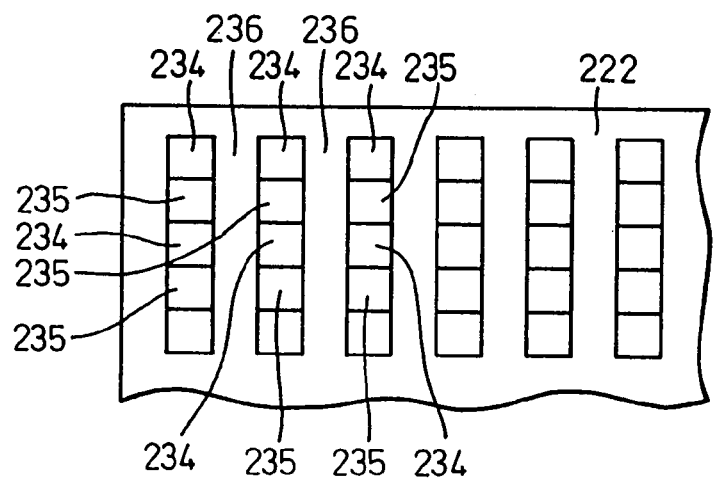
Figure 118C:
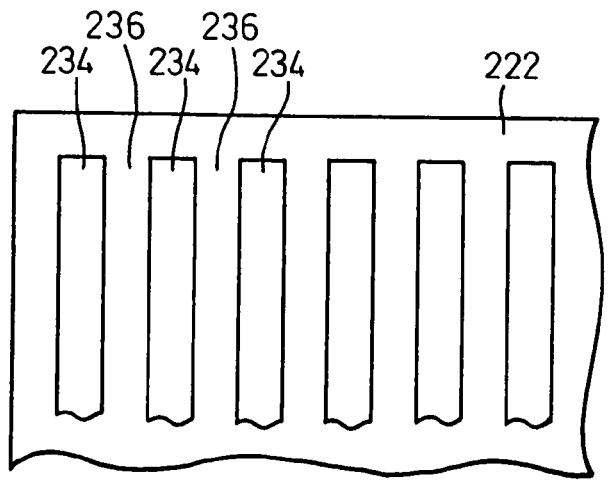

FIGS. 117A to 117C are sectional views showing examples of the optical sheet 222 shown in FIG. 116. FIGS. 118A to 118C are plan views of the optical sheet 222.

In FIG. 117A, the optical sheet 222 includes a base sheet portion 228 having scattering material particles 226 and a diffusion portion 230 that is integrally joined to (brought into optically close contact with) the base sheet portion 228. The diffusion portion 230 has a plurality of spaced apart projections 234 containing scattering material particles 232. Valley portions 236 are defined between adjacent projections 234. The projections 234 are periodically arranged on a plane, facing to one side. Symbol PP represents the cycle of the projections 234. Symbol HH represents the height of the projections 234.

In FIGS. 117B and 117C too, the optical sheet 222 includes a base sheet portion 228 including scattering material particles 226 and a diffusion portion 230 integrally joined to the base sheet portion 228. The diffusion portion 230 has a plurality of spaced apart projections 234 containing scattering material particles 232. Valley portions 236 are defined between adjacent projections 234.

In FIG. 117A, each projection 234 has a rectangular sectional shape. In FIG. 117B, each projection 234 has a substantially rectangular sectional shape having a rugged surface. In FIG. 117C, each projection 234 has a substantially rectangular sectional shape having a rugged surface, and each projection 234 comprises a group of a plurality of small scattering material particles 232 gathered together. In other words, the scattering material particles 232 are brought into close contact with one another through a binder but are not dispersed in a base material such as a resin. The projections 234 can have various shapes in this way, and the surface of the projections 234 is not necessarily precisely stipulated. Therefore, they need not be produced so precisely unlike the prisms of the conventional prism sheet.

FIG. 118A shows an example of the optical sheet 222 the projections 234 of which are shaped into a dot shape. FIG. 118B shows an example of the optical sheet the projections 234 of which are shaped into a dot shape, but the depth of the valley portions 234 between each pair of adjacent projections 234 viewed in the column direction is different from the depth of the valley portions 235 between each pair of adjacent projections 234 viewed in the row direction. For example, the depth of the valley 234 is 1 (the height of the projections 234 is 1) and the depth of the valley portion 235 is 0.5 (the height of the projections is 0.5). This arrangement can provide anisotropy to the distribution of the angles of light. FIG. 118C shows an example of the optical sheet the projections 234 of which are formed into a long peak shape.

Figure 119:
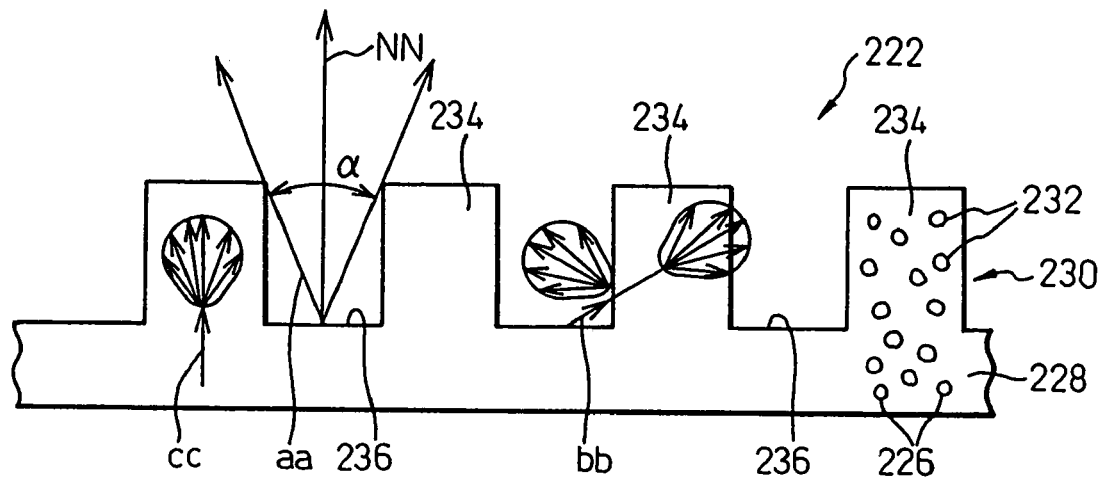
Figure 122:
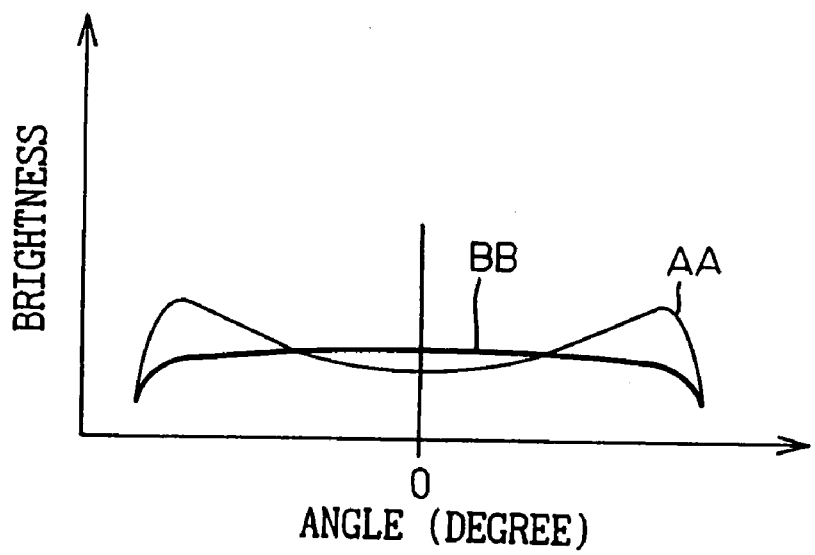

FIG. 119 explains the construction and operation of the optical sheet 222. The optical sheet 222 is so fabricated as to possess the following features. This optical sheet 222 represents an example of a transmission type optical sheet. The incident light is made incident to the base sheet portion 228 of the optical sheet 222 from the light guide plate 216 shown in FIG. 116. The incident light impinges against the scattering material particles 226 of the base sheet portion 228 and is scattered. The light made incident to the optical sheet 22 is scattered light leaving the light guide plate 216, but it contains a large proportion of a light component having a large angle to the normal (a normal direction N) to the optical sheet 222 (curve AA in FIG. 122). The base sheet portion 228 converts the scattering incident light into light having higher scattering property (curve BB in FIG. 122).

The light made incident from the base sheet portion 228 to the diffusion portion 230 impinges against the scattering material particles 232 of the projections 234 and is scattered. First, the light aa and bb leaving from the valley portion 236 between the two projections 234 of the diffusion portion 230 will be explained. The light aa leaves from the valley portion 236 and travels within a predetermined range of angle α without contacting the adjacent projections 234. The light bb leaves from the valley portion 236 and is made incident to the side surface of the projection 234. The light bb made incident to the side surface of the projection 234 impinges against the scattering material particles 232 therein, and on the surface of the projection 234, and is then scattered.

In other words, the light bb made incident to the side surface of the projection 234 is scattered inside the projection 234 or on the side surface of the projection 234, and outgoes as scattered light from the projection 234. Scattered light outgoing from the projection 234 contains light components in various directions. Therefore, a part of the ray of light outgoing from the projection 234 travels at a relatively small angle to the normal direction NN without contacting the adjacent projection 234. On the other hand, another part of the light outgoing from the projection 234 travels at a relatively large angle to the normal direction NN, is made incident to other projection 234 and is further scattered. A part of the light scattered by other projection 234 travels at a relatively small angle to the normal direction NN without contacting the adjacent projections 234. Another part of the light outgoing from other projection 234 travels at a relatively large angle to the normal direction NN, is made incident to still another projection 234 and is scattered. Therefore, among the rays of light made incident to and scattered by a certain projection 234, the light component describing a relatively large angle to the normal direction NN is converted into the light component that gradually describes a relatively smaller angle to the normal direction NN, and outgoing light is thus provided gradually with directivity. Therefore, it becomes possible to obtain a broad brightness distribution such that the quantity of light outgoing with a relatively small angle to the normal direction NN becomes great, and the quantity of light progressively decreases as the angle to the normal direction NN becomes greater.

Further, the light cc made directly incident from the base sheet portion 228 to the projection 234 of the diffusion portion 230 impinges against the scattering material particle 232, is scattered and outgoes as scattered light from the projection 234. In this case too, a part of the light outgoing from the projection 234 travels at a relatively small angle to the normal direction NN. Another part of light outgoing from the projection 234 travels at a relatively large angle to the normal direction NN is made incident to another projection 234 and is further scattered. Therefore, as to the light cc, the light component describing a relatively large angle to the normal direction NN among the light outgoing from a certain projection 234 is gradually converted into a light component describing a relatively small angle to the normal direction NN. In consequence, outgoing light is gradually provided with directivity.

Figure 121:
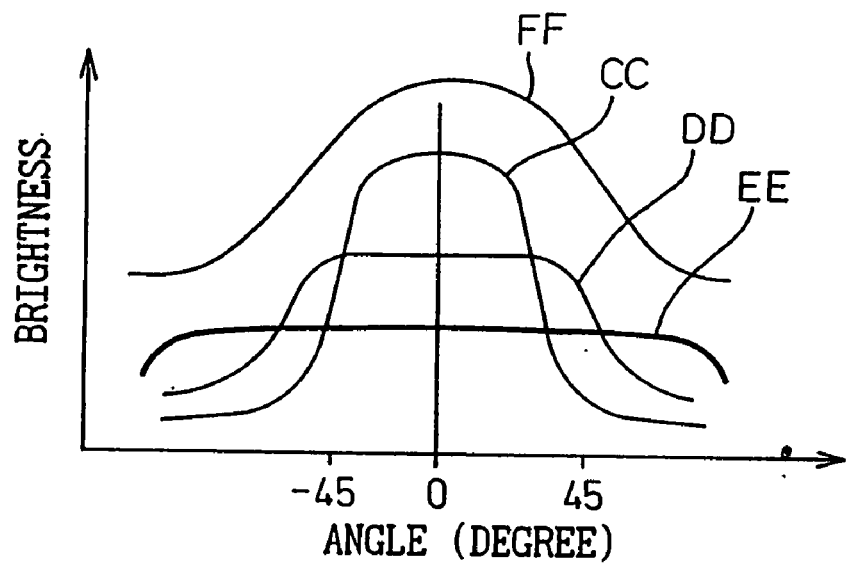

FIG. 121 shows a brightness distribution of the light outgoing from the optical sheet 222. In FIG. 121, curve CC represents a brightness distribution of the light aa outgoing from the valley portion 236 without contacting the adjacent projections 234. The predetermined range of angle α in FIG. 119 is set to ±45°, for example. According to the curve CC, a bright display can be obtained when the liquid crystal panel 214 is viewed from the direction of the front surface (normal direction NN).

Curve DD shows a brightness distribution of the light that outgoes from portions near the root of the projection 234 and does not contact the adjacent projections 234. Among the light outgoing from the portions near the root of the projection 234, this light is the remainder of the light that contact the adjacent projections 234 (the light describing relatively large angle to the normal direction NN). Therefore, this light has higher directivity to the normal direction NN than the ray of light outgoing from the base sheet portion 228 (curve BB).

Curve EE shows a brightness distribution of light outgoing from portions near the distal end of the projection 234.

This light has a low probability of contacting the adjacent projections 234 and merely receives the scattering operation of the scatter material particles 232. Therefore, the brightness distribution is analogous to the curve BB in FIG. 122. Curve FF represents a brightness distribution of light as the sum of the curves CC, DD and EE. This is the brightness distribution of the light outgoing from the optical sheet 222. The curve FF represents the broad brightness distribution such that the quantity of light outgoing with relatively small angles to the front surface direction is the greatest and the quantities of the outgoing light become progressively smaller as the angles become greater from the front surface direction.

Figure 123:
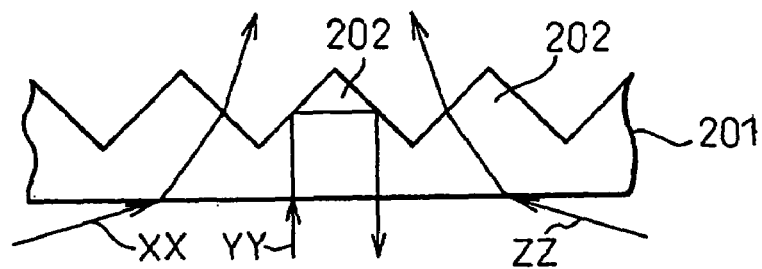

Also, in the present invention, scattering reflection occurs on the side surface of the projection 234. Therefore, the light made incident with certain inclination, such as the light XX shown in FIG. 123, for example, has a component of light outgoing from the optical sheet 222 with inclination opposite to the inclination at the time of incidence due to scattering reflection on the side surface of the projection 234. Therefore, the history of the incident light is eliminated.

The operation described above greatly depends on the ratio of the height HH of the projection 234 to the pitch PP (HH/PP) and on the scattering capacity of the scatter material 232 of the projection 234. Therefore, the present invention sets the ratio (HH/PP) and the scattering property of the scatter material particles 232 to values that satisfy the operation described above. The ratio (HH/PP) is important for setting the predetermined range of angle a shown in FIG. 119.

Also, as represented by the curve EE in FIG. 121, the light outgoing from the portion of the projection 234 near the tip end thereof does not contribute to directivity to the normal direction NN. Therefore, the quantity of light outgoing from the portion of the projection 234 near the tip is preferably as small as possible. For this purpose, the scattering capacity is preferably great inside and on the surface of the projection 234 in the present invention. Scattering of the projection 234 is preferably such that back scattering occurs and the probability of impingement of the rays of light traveling inside the projection 234 against the scatter material particles 232 is high, thereby making it difficult for the ray of light to ass through the projection 234.

Figure 120:
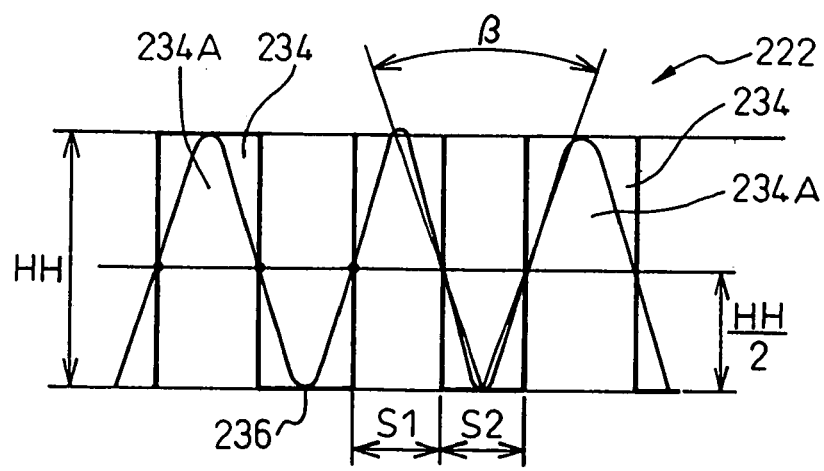

FIG. 120 explains the projections 234 of the optical sheet 222 and its valley portions 236. In the present invention, the projection 234 may take various shapes. In FIG. 120, the proximal portion of each projection and its tip and the valley portion 236 are clearly distinguished from one another. However, the projection 234A has a profile of a curve, and the proximal portion of the projection 234A and the valley portion 236 cannot be clearly distinguished. Therefore, the proximal portion of the projection 234A and the valley portion 236 are defined herein as follows. The proximal portion of the projections 234 or 234A is defined as the position of HH/2 of the height HH of the projections 234 or 234A. The valley portion 236 is defined as a portion below HH/2. The tip portion of the projections 234 or 234A is defined as the position lower by 10% HH from the tip of the projections 234, 234A.

As a factor representative of scattering performance of the scattering material particles 232 of the projection 234, the ratio of the quantity of light outgoing from the tip portion of the projection 234 to the quantity of light made incident to the proximal portion of the projection 234 is preferably 30% or below. This relation can be expressed by $S1+S2=1$ and $S1 \times T0/S2 < 0.3$ when the area of the proximal portion of the projections 234 or 234A is S1, the quantity of light made incident from the base sheet portion 228 to the proximal portion of the projections 234 or 234A is T1, the area of the valley portion 236 is S2 and the quantity of light made incident from the base sheet portion 228 to the valley portion 236 is T0. These formulas can be re-written into $T0 < 0.3 \times (1-S1)/S1$. Further, when the angle described by the center of the valley portion 236 and two lines passing the centers of the tip of the two projections 234 and 234A is β, the ratio (HH/PP) is set so that the minimum value of the predetermined angle range β is not greater than ±60°.

FIG. 124 shows the optical sheet 222 according to still another embodiment of the present invention. The optical sheet 222 shown in FIG. 124 can be used as the optical sheet 222 of the backlight 212 of the liquid crystal display device 210 shown in FIG. 116. This also holds true of the optical sheets 222 of the following embodiments.

The optical sheet 222 comprises a base sheet portion 228 containing scattering material particles 226 and a diffusion portion 230 having spaced apart projections 234 that are arranged periodically and contain scattering material particles 232. The optical sheet 222 shown in FIG. 124 is formed by the steps of forming the base sheet portion 228 containing the scattering material particles 226 on a PET substrate 238 and then forming the diffusion portion 230 containing the scattering material particles 232 on the base sheet portion 228 using a mesh.

The projections 234 of the diffusion portion 230 are periodically arranged. Each projection 234 is shaped as a whole into a rounded shape and has a small projections and depressions structure on its surface. In other words, the projection 234 need not have a side surface or a slope that is accurately formed as the prisms of the prism sheet, and the optical sheet 222 can be therefore produced relatively easily.

Figure 126A:
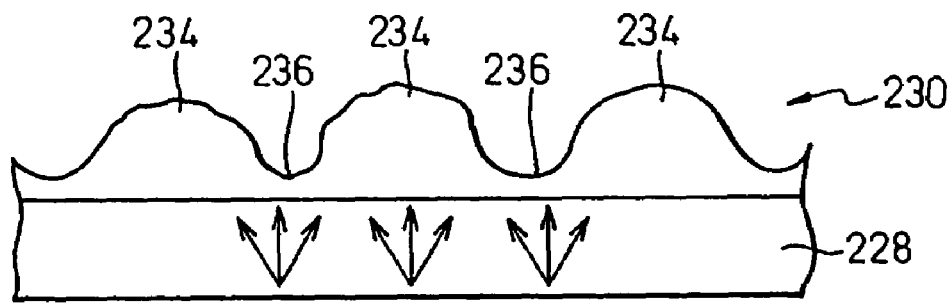
Figure 126B:
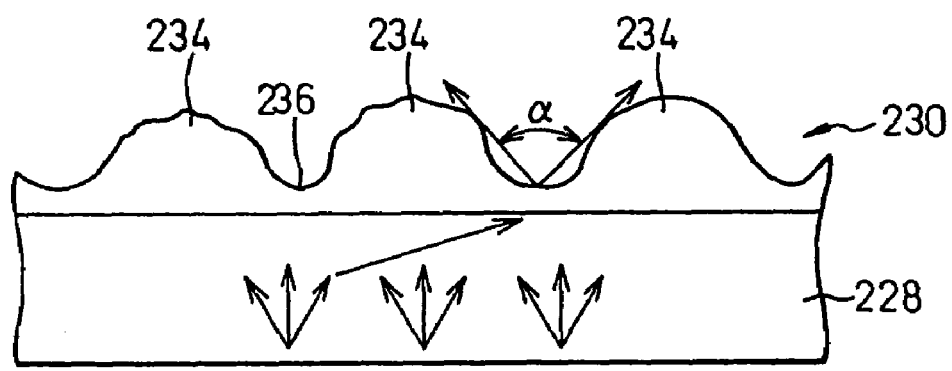
Figure 126C:
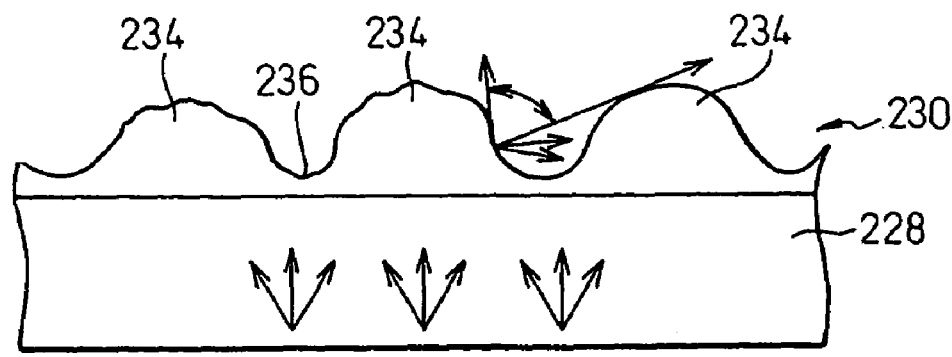

FIGS. 126A to 126C are explanatory views for explaining the operation of the optical sheet 222 shown in FIG. 124. Since the PET substrate 238 is transparent, it is omitted in FIGS. 126A to 126C. FIG. 126A shows that the incident ray of light is scattered by the base sheet portion 228. FIG. 126B shows that the rays of light outgo from the valley portion 236 between two projections 234. FIG. 126C shows that the rays of light outgoing from the side surface of the projection 234 travel without contacting the adjacent projection 234. The operation of the optical sheet 222 shown in FIGS. 124 and 126A to 126C is substantially the same as that of the optical sheet 222 shown in FIG. 119.

Figure 127A:
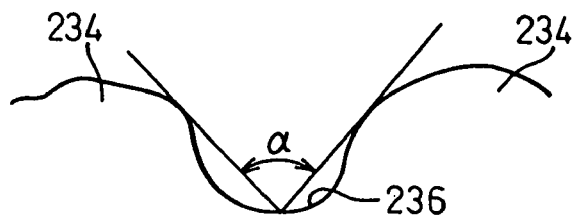
Figure 127B:
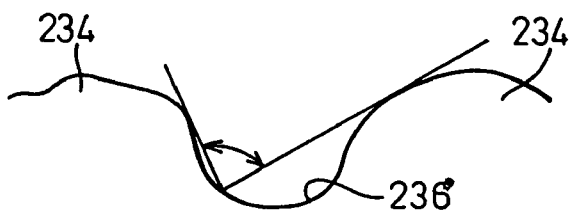
Figure 127C:
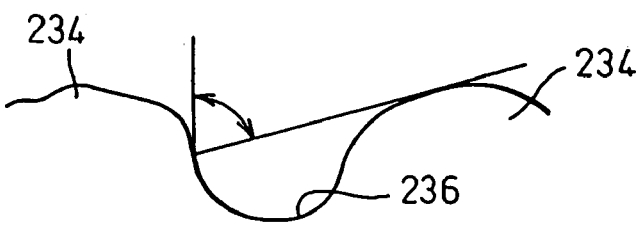

FIGS. 127A to 127C show the ray of light that outgoes from several points of the side surface of the projection 234 and the valley portion 236 without contacting the adjacent projection 234. In FIG. 124, a clear boundary does not exist between the side surface of the projection 234 and the valley portion 236, and the side surface of the projection 234 and the valley portion 236 continue each other. Therefore, the ray of light outgoing from many points of the side surface of the projection 234 and the valley portion 236 outgo at diversified angles.

Figure 127D:
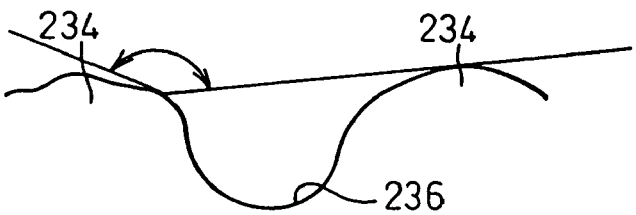
Figure 127E:
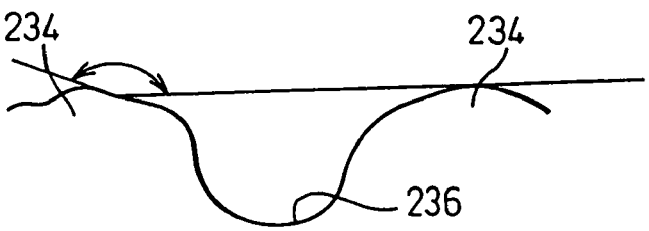

FIG. 127A shows the ray of light outgoing from the center point of the valley portion 236. FIG. 127B shows the ray of light outgoing from one point near the boundary between the valley portion 236 and the side surface of the projection 234. FIG. 127C shows the ray of light outgoing from one point near the boundary between the valley portion 236 and the side surface of the projection 234. FIG. 127D shows the ray of light outgoing from one point near the tip of the projection 234. FIG. 127E shows the ray of light outgoing from the tip of the projection 234.

Figure 125:
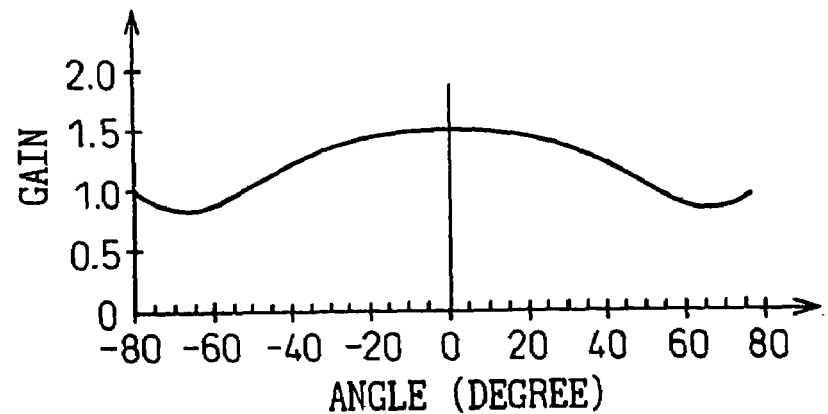

FIG. 125 shows a brightness gain of outgoing light of the optical sheet 222 shown in FIG. 124. The brightness gain of the outgoing rays of light of the optical sheet 222 has a broad brightness distribution such that the quantity of light outgoing at an angle in the front surface direction is maximum and progressively decreases as the angle becomes greater from the front surface direction. However, the brightness gain at the angle in the front surface direction is about 1.5. When this value is not satisfactory, the height of the projection 234 may be increased.

Production of the optical sheet 222 shown in FIG. 124 will be further explained. The base sheet portion 228 is made of an acrylic resin having a refractive index of 1.5, and 12.5 vol % of TiO$_2$ beads having a particle diameter of 1 μm and a refractive index of 2.5 are dispersed as the scattering material particles 226 into this acrylic resin. The acrylic resin containing the TiO$_2$ beads dispersed therein and an organic solvent are mixed in a ratio of 1:3 to prepare ink. This ink is applied to the PET substrate 238 and is dried. Since the organic solvent does not remain after being dried, the mixing ratio is set to be a viscosity that allows easy application. Particularly, the viscosity is adjusted so that a flat surface is formed due to the surface tension of ink after application. The layer thickness of the base sheet portion 228 is 20 μm.

The diffusion portion 230 is formed from the same ink as that of the base sheet portion 228. In other words, an acrylic resin having a refractive index of 1.5 and containing 12.5 vol % of TiO$_2$ beads as the scattering material particles 232, that have a particle diameter of 1 μm and a refractive index of 2.5 and are dispersed in the acrylic resin, and an organic solvent are mixed to prepare the ink. This ink is applied by screen-printing by using a mesh to form the diffusion portion 230 having the projections 234. In this case, however, the ratio of the solvent to the resin is 1:1 to increase the ink viscosity. In consequence, the mesh shape can be transferred with high reproducibility.

Figure 128A:
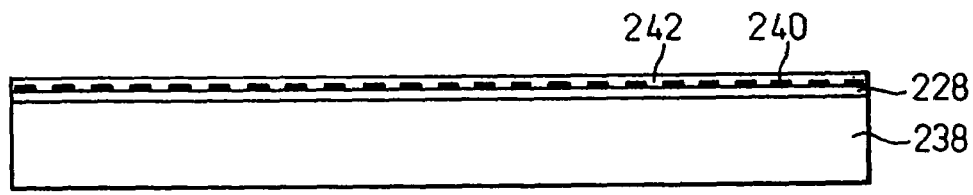
Figure 128B:
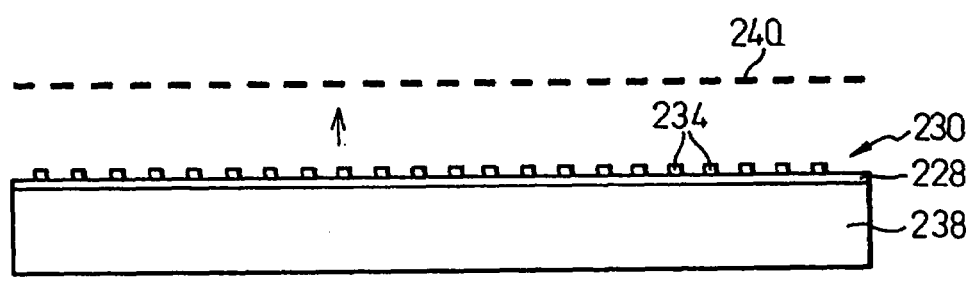
Figure 129:
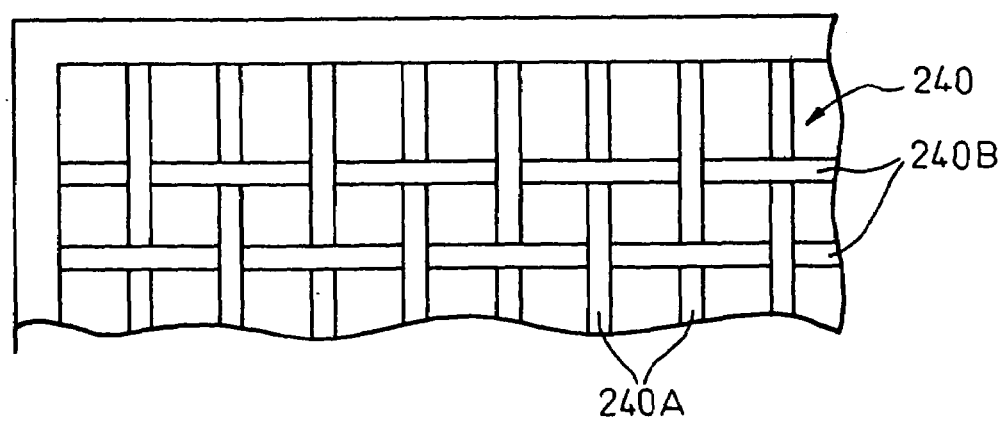

FIGS. 128A and 128B show a production example of the optical sheet 222 by screen-printing using the mesh. FIG. 129 shows an example of the mesh used in FIGS. 128A and 128B. The mesh (silk screen for silk printing) 240 comprises polyester filaments 240A and 240B that are entangled with one another in both transverse and longitudinal directions into a woven fabric shape. This example uses a 120 meshes/inch polyester mesh (wire diameter: 46 μm, opening: 149 μm square, thickness: 80 μm). The gap between two polyester filaments 240A and 240B is greater than the wire diameter of the polyester filaments 240A and 240B.

As shown in FIG. 128A, the ink 242 described above is applied to the PET substrate 238 and is then dried to form the base sheet portion 228. The mesh 240 is then put on the base sheet portion 228 and the ink 242 is applied. As shown in FIG. 128B, the mesh 240 is removed to form the diffusion portion 230. In this case, the viscosity of the ink is increased so that the mesh shape can be transferred with high reproducibility as described above.

The projections 234 formed thereby have a size of 149 μm square, a height of 80 μm and a pitch of 195 μm. (Note, the projections are condensed during the drying and solidification process and the shape becomes blunt due to the surface tension of the adhesive). Since the diffusion portion 230 is made of the same material as the base sheet portion 228, they are optically integrated with each other (without forming the interface of the refractive index).

FIGS. 130A to 130C show another production example of the optical sheet 22 by using the mesh. As shown in FIG. 130A, the ink is applied to the PET substrate 238 and is dried to form the base sheet portion 228. The ink 242 is then applied. As shown in FIG. 130B, the mesh 240 is pushed to the ink 242. The mesh 240 is thereafter removed to form the diffusion portion 230 as shown in FIG. 130C.

FIGS. 131A to 131C show another production example of the optical sheet 222 by use of the mesh. As shown in FIG. 131A, the mesh 240 comprises filaments 240A and 240B that are entangled with each other into a woven fabric shape in both longitudinal and transverse directions. The wire diameter of the filament 240A is different from that of the filament 240B. FIG. 131B is a sectional view of the optical sheet 222 produced by using the mesh 240 shown in FIG. 131A when taken along a line XVIB-XVIB in FIG. 131A. FIG. 131C is a sectional view of the optical sheet 222 produced by using the method 240 shown in FIG. 131A when taken along a line XVIC-XVIC in FIG. 131A.

FIG. 132 is a graph showing a brightness distribution of the optical sheet 222 produced by using the mesh 240 shown in FIGS. 131A to 131C. Curve FF represents brightness when viewed in the section shown in FIG. 131B, and curve GG represents brightness when viewed in the section shown in FIG. 131C.

FIG. 133 shows another production example of the optical sheet 222 by using the mesh. A roller 240R equipped with a mesh pattern is caused to travel on the base sheet portion 228 to form the projections 234. Reference numeral 244 denotes an ink applicator.

FIG. 134 shows an example of a mask 246 when the mask is used to produce the optical sheet 222. In the mask 246, holes 246a are formed in a metal sheet by etching, for example. The holes 246a are arranged in a square arrangement. This mask 246 is used in place of the mesh 240 shown in FIGS. 128A, 128B and 130A to 130C to produce the optical sheet 222 as shown in these drawings.

FIG. 135 shows another example of the mask 246 when the mask 246 is used to produce the optical sheet 222. In the mask 246, holes 246a are formed in a metal sheet by etching, for example. The holes 246a are periodically arranged in the columnar direction but are arranged zigzag in the longitudinal direction. This mask 246 is used to produce the optical sheet 222 in the same way as in FIG. 134.

FIG. 136 shows another example of the optical sheet 222 produced by use of the mask shown in FIG. 134 or 135. When the mesh 240 is used, a commercially available mesh 240 may be used. However, since the height of the projections 234 depends on the diameters of the filaments 240A and 240B, high projections 234 cannot be produced so easily. When the mask 246 is used, however, high projections 234 can be formed.

A production example of the optical sheet 222 using the mask 246 will be explained. To fabricate the base sheet portion 228 and the diffusion portion 130, an acrylic resin having a refractive index of 1.5 and containing 12.5 vol % of TiO$_2$ beads having a refractive index of 2.5 and a particle diameter of 2 μm, and dispersed in the resin as the scatter materials 226 and 232, and an organic solvent, are mixed first to prepare ink. The thickness of the mask 246 is 185 μm. The size of the holes 46a is 280 μm. The pitch of the holes 246a is 350 μm. In this case, the holes 246a are arranged in a square arrangement as shown in FIG. 134. A 50 μm-thick base sheet portion 228 is formed on a PEP substrate 238, and the diffusion portion 230 is formed on the base sheet portion 228 by use of the mask 246. The beads are larger than the beads of the example shown in FIG. 124, and the pitch of the holes 246 (pitch of the projections 234) is changed to match the larger beads.

Immediately after printing, the projections 234 have a size of 280 μm square, a height of 185 μm and a pitch of 350 μm. After drying, the projections 234 have a size of 221 μm square, a height of 145 μm and a pitch of 350 μm. (The projections are condensed during the drying and solidification process and the shape becomes dull due to the surface tension of the adhesive). In this way, high projections 234 can be formed and a brightness gain of 2.1 can be accomplished.

Next, a production example of the optical sheet 222 having higher projections 234 will be explained. Ink for forming the base sheet portion 228 and the diffusion portion 230 is the same as that of the foregoing embodiments. The mask 246 has a thickness of 800 μm, a hole size of 280 μm square and a hole pitch of 350 μm. In this case, the holes 246a are arranged zigzag as shown in FIG. 135. After printing and drying, the projections 234 have a size of 221 μm, a height of 600 μm and a pitch of 350 μm. In this way, the projections 234 having a greater height can be formed, and a brightness gain of 2.5 can be achieved. Since the projections 234 are arranged zigzag, uniformity of the pitch drops. Therefore, this optical sheet is combined with a device having a uniform pitch such as a liquid crystal panel to reduce the possibility of occurrence of moiré.

FIGS. 137A to 137C shows a production example of the optical sheet by use of a metal roll. In FIG. 137A, the base portion 228 is applied and dried onto the PEP substrate 238. The sheet 245 having the ink 242 formed thereon is passed between a metal roll 248 and a roll 249. FIG. 137B shows a part of the metal roll 248 and FIG. 137C shows the diffusion portion 230 having the projections 234 formed of the ink 242.

FIG. 138 shows an application example of the optical sheet 222 of FIG. 124. In FIG. 138, the optical sheet 250 comprises a first optical sheet 222 and a second optical sheet 252 laminated on each other. The first optical sheet 222 corresponds to the optical sheet 222 shown in FIG. 124. The second optical sheet 252 comprises a transparent PET resin layer 252a and a diffusion portion 252b having projections 234a containing a scattering material. The diffusion portion 252b has a structure similar to that of the diffusion portion 230 of the optical sheet 222 shown in FIG. 124.

The first optical sheet 222 accomplishes a brightness distribution having high directivity. Therefore, the second optical sheet 252 need not have the scattering layer corresponding to the base sheet portion 228 of the first optical sheet 222, but may well have a transparent resin layer 252a. However, a thin scattering layer, or a scattering layer having a small difference between the refractive index of the scattering material and the refractive index of the base resin, or a small amount of the scattering layer may be used in place of the transparent resin layer 252a.

When the brightness gain of the optical sheet 222 shown in FIG. 124 is lower than a desired value, the desired brightness gain (for example, 2) can be accomplished when the first optical sheet 222 and the second optical sheet 252 are laminated as in the case of the optical sheet 250 shown in FIG. 138. In this case, in the liquid crystal display device 210 shown in FIG. 116, the optical sheet 250 is used in place of the optical sheet 222 shown in FIG. 116.

FIG. 139 shows another application example of the optical sheet 22 of FIG. 124. In the optical sheet 222 shown in FIG. 124, the base sheet portion 228 is formed on the PET substrate 238. In FIG. 139, the base sheet portion 228 is directly formed on the light guide plate 216. The operation of the optical sheet 222 in this case is the same as that of the foregoing embodiment. This optical sheet 222 is produced in the following way. To form the base sheet portion 228 and the diffusion portion 230, ink is first prepared by mixing an acrylic resin having a refractive index of 1.5 and dispersing therein 42.2 vol % of TiO$_2$ beads having a particle diameter of 2 μm and a refractive index of 2.5 as the scatter materials 226 and 232, and an organic solvent.

The mask 262 has the thickness of 185 μm, the hole size of 280 μm square and the hole pitch of 350 μm for the holes 246a. In this case, the holes 246a are arranged zigzag as shown in FIG. 135. The base sheet portion 228 is formed on the light guide plate 216 to the thickness of 20 μm, and the diffusion portion 230 is formed on the base sheet portion 228, using the mask 246. The resulting projections 234 have the size of 221 μm square, the height of 145 μm and the pitch of 350 μm. Scattering dots 224 shown in FIG. 116 are then formed on the lower surface of the light guide plate 216. The optical sheet 222 having excellent directivity can be accomplished in this way. Since this optical sheet 222 is integrated with the light guide plate 216, another component need not be added, and the production cost can be lowered.

The optical sheet explained above constitutes the liquid crystal display device in cooperation with the light source, the light conduction plate and the liquid crystal panel. Similarly, the following optical sheet constitutes the liquid crystal display device.

FIG. 140 shows another application example of the optical sheet 222 of FIG. 124. This example represents an example of direct illumination type backlight 254. The direct illumination type backlight 254 is disposed just below the liquid crystal panel 214 and includes a plurality of lamps 256 and a reflector 258 arranged in one plane. The optical sheet 222 is disposed between a plurality of lamps 256 and the liquid crystal panel 214. In the direct illumination type backlight 254, the distribution of light is different between a position II near the lamp 256 and a position JJ far from the lamp 256. Therefore, when such a ray of light is made incident to the liquid crystal panel 214, uneven brightness occurs in the liquid crystal panel 214. The optical sheet 222 includes the base sheet portion 228 and the diffusion portion 230 as described above, and there is a function so that the incident ray of light in an inclined direction is scattered and caused to be directed to the normal direction. Consequently, the ray of light having an excellent distribution with the front surface direction as the center is made incident to the liquid crystal panel 214, and an uneven brightness does not occur in the liquid crystal panel 214.

As described above, the ray of light is scattered more vigorously by the projections 234 when the scattering performance of the scattering material particles 232 is greater, and directivity becomes higher. In the foregoing embodiment, the scattering performance of the scattering material particles 232 of the projections 234 is expressed by the ratio of the quantity of the ray of light outgoing from the tip portion of the projection 234 to the quantity of the ray of light made incident to the proximal portion of the projection 234. Here, the scattering performance of the scatter material 232 of the projections 234 is expressed by the difference of refractive indices (Δn) between the refractive index (n0) of the resin constituting the diffusion portion 230 and the refractive index (n1) of the scattering material particles 232 (where Δn is an absolute value of (n0-n1)), and the density of the scattering material particles 232 (or volume percent) in the resin constituting the diffusion portion 230. When the size of the scattering material particles 232 becomes 1 μm or below, interference and the Mie scattering effect start appearing. In consequence, an undesired scattering condition is established, and the size of the scattering material particles 232 is preferably at least 1 μm.

Table 3 given below tabulates the simulation result of determining the brightness gain of the transmission type optical sheet 222 by using the ratio (H/P) of the height of the projection 234 to the pitch, the refractive index difference Δn and the density of the scattering material particles 232 as the parameters. The result that provides the brightness gain of 1.5 or more is judged as good. Incidentally, an example of Δn=1 corresponds to the case where the scattering material particles 232 uses polycarbonate, and Δn=0.05 corresponds to the case where the scattering material particles 232 uses silica. As to the density of the scattering material particles 232, the case where the diameter of the scattering material particles 232 is 0.5% P is used as the reference. In other words, when the diameter of the scattering material particles 232 is 2 μm and the pitch P is 400 μm, the density is 50 pcs/pitch. Similarly, when the diameter of the scattering material particles 232 is 1 μm and the pitch P is 200 μm, the density is 50 pcs/pitch. Further, 50 pcs/pitch corresponds to 1.56 vol %, 10 pcs/pitch corresponds to 12.5 vol %, and 100 pcs/pitch corresponds to 12.5 vol %.

TABLE 3

|  |  | Δn |  |  |  |
|---|---|---|---|---|---|
|  |  | 0.05 | 0.1 | 0.5 | 1.0 |
| H/P = 1.5 | 50 (N/P) |  |  |  |  |
|  | 100 (N/P) | 1.6 |  |  |  |
|  | 150 (N/P) | 1.9 |  |  | 3.3 |
| H/P = 1.0 | 50 (N/P) |  |  |  | 1.8-1.9 |
|  | 100 (N/P) | 1.4 | 1.5 | 2.3 | 2.3-2.5 |
|  | 150 (N/P) | 1.6 |  |  |  |
| H/P = 0.4 | 50 (N/P) |  |  |  | 1.5-1.7 |
|  | 100 (N/P) |  |  |  | 1.7-2.0 |
|  | 150 (N/P) |  |  |  | 2.1 |
| H/P = 0.3 | 50 (N/P) |  |  |  |  |
|  | 100 (N/P) |  |  |  | 1.5 |
|  | 150 (N/P) |  |  |  | 2.0 |

(N/P) is the number N of the scattering material particle 232 per the pitch PP.

It can be understood from Table 3 that the ratio (H/P) of the height HH of the projections 234 to the pitch PP is preferably at least 0.3, the refractive index difference Δn (where Δn is an absolute value of (n0-n1)) between the index (n0) of the base material of the diffusion portion 230 and the refractive index (n1) of the scattering material particles 232 is preferably 0.05, and the density of the scatter material 232 in the diffusion portion 230 is preferably at least 50 (N/P). When the size of the scattering material particles 232 changes, the values of the respective factors can be selected so as to acquire equivalent scattering performance.

Table 4 given below tabulates the simulation result of determining the brightness gain of the transmission type optical sheet 222 by using the ratio (H/P) of the height of the projection 234 to the pitch, the refractive index difference Δn and the density of the scattering material particles 232 as the parameters when the optical sheet 222 is integrated with the light conduction plate 216 as shown in FIG. 139.

TABLE 4

|  |  | Δn |  |  |  |
|---|---|---|---|---|---|
|  |  | 0.05 | 0.1 | 0.5 | 1.0 |
| H/P = 1.5 | 50 (N/P) |  |  |  |  |
|  | 100 (N/P) |  |  |  |  |
|  | 150 (N/P) | 2 |  |  | 3.0 |
| H/P = 1.0 | 50 (N/P) | x | x | 1.4 | 1.2-1.3 |
|  | 100 (N/P) | x | x | 1.4 | 1.5-1.8 |
|  | 150 (N/P) |  |  |  | 1.9-2.5 |

TABLE 4-continued

|  |  | Δn |  |  |  |
|---|---|---|---|---|---|
|  |  | 0.05 | 0.1 | 0.5 | 1.0 |
| H/P = 0.4 | 50 (N/P) | x | x | 1.1 | x |
|  | 100 (N/P) | x | x | 1.1 | 1.1-1.2 |
|  | 150 (N/P) |  |  |  | 2.0 |

It can be understood from Table 4 that the ratio (H/P) of the height HH of the projections 234 to the pitch PP is preferably at least 1.0, the refractive index difference Δn is preferably 0.05, and the density of the scattering material 232 in the diffusion portion 230 is preferably at least 100 (N/P). When the size of the scattering material 232 changes, the values of the respective factors can be selected so as to acquire the equivalent scattering performance.

FIG. 141 shows an example where the optical sheet 222 is used as a reflection type optical sheet. In this case, a reflecting mirror 260 is disposed on the base sheet portion 228. The base sheet portion 228 and the diffusion portion 230 are made of an acrylic resin having a refractive index of 1.5. As the scattering material particles 226, 42.4 vol % of $SiO_2$ beads having a particle diameter of 2 μm and a refractive index of 1.55 are dispersed in this acrylic resin. The acrylic resin having the $SiO_2$ beads dispersed therein and an organic solvent are mixed to give ink. The refractive index difference Δn is 0.05.

This ink is applied to the PET substrate 238 to a thickness of 200 μm, and the projections 234 are then formed by using the metal roll 248 shown in FIG. 137A. The metal roll 248 has a plurality of blades having a pitch of 200 μm and a depth of 350 μm. While being rotated, the blades are urged to the ink, thereby cutting the ink having a thickness of 300 μm into the base sheet portion 228 having a thickness of 100 μm and the diffusion portion 230 having a thickness of 350 μm. After this ink is further dried, the reflecting mirror 260 is disposed on the surface of the PET substrate 238 on the opposite side.

In the reflection type optical sheet 222, the light is made incident from the diffusion portion 230 to the optical sheet 222, passes through the diffusion portion 230 and the base sheet portion 228, is reflected by the reflecting mirror 260, passes again through the base sheet portion 228 and the diffusion portion 230, and outgoes from the diffusion portion 230. The light finally passes through the base sheet portion 228 and the diffusion portion 230, and outgoes from the diffusion portion 230. Therefore, the operation of the reflection type optical sheet 222 is similar to that of the transmission type optical sheet 222 described above.

In the reflection type optical sheet 222, a lot of light is made incident to the projections 234 at many angles. In the reflection type optical sheet 222, the light is made incident to the projections 234 and must pass through the projections 234 and the base sheet portion 228 to reach the reflecting mirror 260 while being scattered. Therefore, it cannot be said that the scattering performance of the projections 234 is preferably as high as possible. It is therefore necessary for the projections 234 to have a low scattering performance so that the ray of light can reach the reflecting mirror 260, and a sufficient scattering performance so that the ray of light reflected by the reflecting mirror 260 can be scattered and exhibit directivity described above. For this purpose, it is preferred to use beads having a lower scattering capacity so as to allow easy passage of the ray of light and to allow the reflected ray of light to travel in a long distance to provide the desired scattering effect. For this reason, the reflection type optical sheet 222 preferably has higher projections 234 than the transmission type optical sheet 222. Incidentally, the reflecting mirror 260 may be either a mirror surface reflecting mirror or a scattering-reflecting mirror. The reflecting mirror may be produced by vacuum evaporating Al, Ag, or the like, to the PET substrate 238. The base sheet portion 228 may also be formed on the reflecting mirror (sheet) 260 by omitting the PET substrate 238.

Table 5 given below tabulates the simulation result of determining the brightness gain of the reflection type optical sheet 222 by using the ratio (H/P) of the height HH of the projection 234 to the pitch PP, the refractive index difference $\Delta n$ and the density of the scattering material particles 232 as the parameters.

TABLE 5

|  |  | $\Delta n$ | | |
|---|---|---|---|---|
|  |  | 0.05 | 0.1 | 1.0 |
| H/P = 11.5 | 50 (N/P) | 2.5 | 2 | x |
|  | 100 (N/P) | 4.1 | 3.6 | x |
|  | 150 (N/P) | 9 | 7.4 |  |
| H/P = 5.7 | 50 (N/P) | 2 | 1.8 | x |
|  | 100 (N/P) | 2.5 | 2.3 | x |
|  | 150 (N/P) | 5 | 4.1 |  |
| H/P = 2.8 | 50 (N/P) | 2 | 1.8 | x |
|  | 100 (N/P) | 2 | 2 | x |
|  | 150 (N/P) | 3 | 2.5 |  |

|  |  | $\Delta n$ | | |
|---|---|---|---|---|
|  |  | 0.05 | 0.1 | 0.1 |
| H/P = 1.9 | 50 (N/P) |  |  |  |
|  | 100 (N/P) |  |  |  |
|  | 150 (N/P) | 2.2 |  |  |

|  |  | $\Delta n$ | | |
|---|---|---|---|---|
|  |  | 0.05 | 0.1 | 1.0 |
| H/P = 1.1 | 50 (N/P) |  |  |  |
|  | 100 (N/P) |  |  |  |
|  | 150 (N/P) | 1.7 |  |  |

It can be appreciated from Table 5 that the ratio (H/P) of the height HH of the projections 234 to the pitch PP is preferably at least 1.1, the refractive index difference $\Delta n$ ($\Delta n$ is an absolute value of (n0-n1)) is preferably 0.1 or below, and the density of the scattering material particles 232 in the diffusion portion 230 is preferably at least 50 (N/P). When the size of the scattering material particles 232 changes, the values of the respective factors can be selected so as to acquire equivalent scattering performance.

FIG. 142 shows an example of a liquid crystal display device wherein the reflection type optical sheet is disposed below the light guide plate. The light guide plate 216 is disposed below the liquid crystal panel 214. A light source 218 comprising a lamp and a reflector is disposed on each side of the light guide plate 216. The reflection type optical sheet 222 is disposed below the light guide plate 216 (on the side opposite to the liquid crystal panel 214). Scattering dots 224 are formed on the lower surface of the light guide plate 216. A scattering ray of light is made incident from the light guide plate 216 to the reflection type optical sheet 222 through the scattering dots 224, and the directive light reflected by the reflection type optical sheet 222 passes through the light guide plate 216 and is made incident to the liquid crystal panel 214. The optical sheet need not be interposed between the light guide plate 216 and the liquid crystal panel 214 as has been required in the prior art. However, a scattering sheet or a transmission type optical sheet may further be interposed between the light guide plate 216 and the liquid crystal panel 214.

FIGS. 143A and 143B show another modified example of the liquid crystal display device of FIG. 142. This example uses a light guide plate 216 having projections 224a formed thereon in place of the light guide plate 216 having the scattering dots of FIG. 142. The projections 224a are formed simultaneously with the formation of the light guide plate 216. FIG. 143B is an enlarged view of one projection 224a shown in FIG. 143B. The projection 224a has side surfaces 224b which are inclined to the lower surface of the light guide plate 216. When the angle of inclination of the side surface 224b is appropriately set, a part of the ray of light totally reflected inside the light guide plate 216 is allowed to outgo towards the reflection type optical sheet 222.

The angle of inclination of the side surface 224b is preferably 10° or below, more preferably 5° or below. When the angle of inclination of the side surface 224b is set in this way, the light is efficiently allowed to outgo from the light guide plate 216 towards the reflection type optical sheet 222 through the projections 224a. In the case of the light conduction plate 216 having the scattering dots 224 of FIG. 142, on the other hand, light components that scatter rearward develop in the scattering dots 224. The light components scattering rearward outgo from the light guide plate 216 at an angle outside a predetermined angle range, and a loss occurs.

FIGS. 144A and 144B show a modified example of the light guide plate 216 of FIGS. 143A and 143B. FIG. 144A shows a light guide plate 216 the projections 224a of which have different height. FIG. 144B shows the light guide plate 216 the pitch of the projections 224a of which is different. In this way, the shape and the pitch of the projections 224a of the light guide plate 216 as outgoing means to the reflection type optical sheet 222 need not always have a predetermined shape and a predetermined pitch. When the shape and/or the pitch of the projections 224a is changed, light direction characteristics can be changed.

FIG. 145 shows another application example of the reflection type optical sheet 222 of FIG. 41. This example represents an example of the direct illumination type backlight 262. The direct illumination type backlight 254 is disposed just below the liquid crystal panel 214 and includes a plurality of lamps 256 and reflectors 258 arranged in one plane. The optical sheet 222 is disposed on the opposite side of the liquid crystal panel 214 to the lamps 256. In the direct illumination type backlight 254, the distribution of light is different between the position near the lamp 256 and the position far from the lamp 256. Therefore, when such ray of light is made incident to the liquid crystal panel 214, uneven brightness occurs in the liquid crystal panel 214. The optical sheet 222 includes the base sheet portion 228 and the diffusion portion 230 as described above. Therefore, the ray of light having directivity is made incident to the liquid crystal panel 214, and uneven brightness of the liquid crystal panel 214 does not occur.

FIG. 146 shows another application example of the reflection type optical sheet 222 of FIG. 141. In this example, the reflection type optical sheet 222 is brought into optically close contact with the light guide plate 216 through a transparent resin layer 264. The transparent resin layer 264 is made of the same acrylic resin having a refractive index of 1.5 as the base material of the reflection type optical sheet 222. The light guide plate 216 has a silver reflection film 266 having different areas that are greater in the proximity of the light source 218 and become progressively smaller towards the center. Therefore, the ray of light reflected by the reflection film 266 among those propagating in the light guide plate 216 continues to travel in the light guide plate 216, and the ray of light made incident to the transparent resin layer 264 through the gaps in the reflection film 266 are made incident to the reflection type optical sheet 222. In this example, the reflection film 266 controls the transmission quantity of light so that the proportion of the incident ray of light is decreased near the light source where the quantity of light is great in the light guide plate 216 but is increased at the center portion where the quantity of light in the light guide plate 216 is great. The light so controlled is made incident to the reflection type optical sheet 222 and receives the action of this sheet 222 in the same way as described above. Since the reflection type optical sheet 222 is integrated with the light guide plate 216, the number of assembly steps can be reduced and the rate of defective products can be reduced.

FIG. 147 shows still another application example of the reflection type optical sheet 222 of FIG. 144. In this example, a transparent resin layer 265 of the same material as the acrylic resin of the base material of the reflection type optical sheet 222 is applied to (brought into optically close contact with) the projections 234 of the optical sheet 222, and is cured under a flat state. A transparent resin 268 (optical adhesive) bonds the transparent resin layer 265 to the light guide plate 216. The adhesive 268 is formed as dots the area of which is small in the proximity of the light source 218 and becomes progressively greater towards the center. The ray of light the incidence quantity of which is adjusted is made incident to the reflection type optical sheet 222. The ray of light receive the similar action of the reflection type optical sheet 222 described above.

Figure 148A:
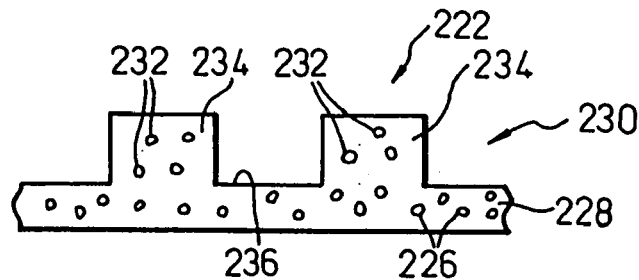

FIGS. 148A to 148D show further examples of the optical sheet. FIG. 148A shows the optical sheet 222 similar to the optical sheet 222 shown in FIGS. 117A to 117C. In other words, this optical sheet 22 includes the base sheet portion 228 containing the scattering material particles 226 and the diffusion portion 230 integrally joined to the base sheet portion 228. The diffusion portion 230 has a plurality of projections 234 containing the scattering material particles 232 and the valley portions 236 formed between the projections 234.

Figure 148B:
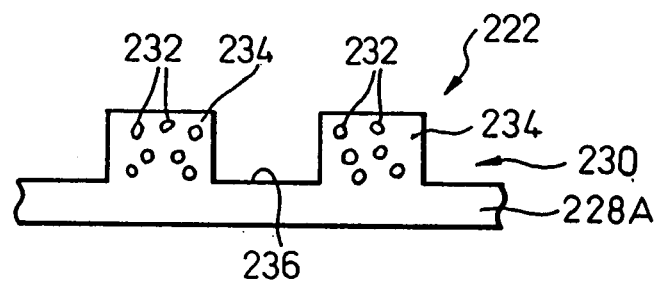

In FIG. 148B, the optical sheet 222 includes the transparent base sheet portion 228A and the diffusion portion 230 integrally bonded to the base sheet portion 228A. The diffusion portion 230 has a plurality of projections 234 containing the scattering material particles 232 and the valley portions 236 formed between the projections 234. When the light made incident to the optical sheet 222 is scatted light having higher scattering performance than those represented by the curve AA in FIG. 122, for example, a transparent base sheet portion 228A may be used in place of the base sheet portion 228 containing the scattering material particles 226.

In the present invention, the construction of the diffusion portion 230 is important to improve directivity of light, and the base sheet portion 228 containing the scattering material particles 226 need not always be joined integrally with the diffusion portion 230. When the scattering operation of the base sheet portion 228 containing the scattering material particles 226 is necessary, a scattering sheet formed separately may be laminated with the diffusion portion 230 without integrally joining the base sheet portion 228 to the diffusion portion 230.

Figure 148C:
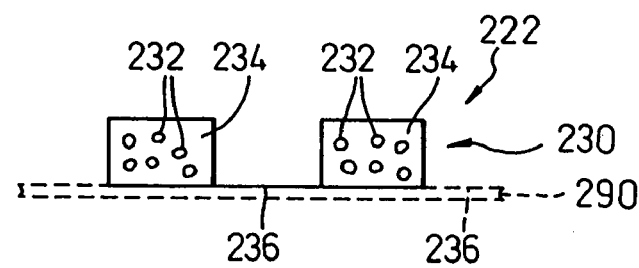

In FIG. 148C, the optical sheet 22 includes the diffusion portion 230 having a plurality of spaced apart projections 234 containing the scattering material particles 232, and the valley portions 236 formed between projections 234. In other words, this optical sheet 222 does not contain the base sheet portion 228 shown in FIG. 148A or the base sheet portion 228A shown in FIG. 148B. The diffusion portion 230 may be supported by any other support structures 290.

Figure 148D:
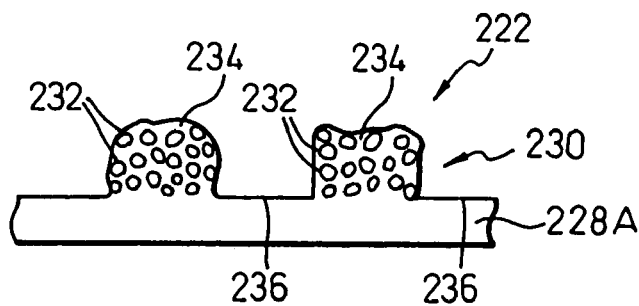

Referring to FIG. 148D, the optical sheet 222 includes the transparent base sheet portion 228A and the diffusion portion 230 integrally bonded to the base sheet portion 228A. The diffusion portion 230 has a plurality of projections 234 containing the scattering material particles 232 and the valley portions 236 formed between the projections 234. The projections 234 comprise a group of small scattering material particles 232 gathering in the same way as in FIG. 117C. In other words, the scattering material particles 232 are brought into close contact with one another by a binder, but are not dispersed in the base material such as the resin.

Figure 149A:
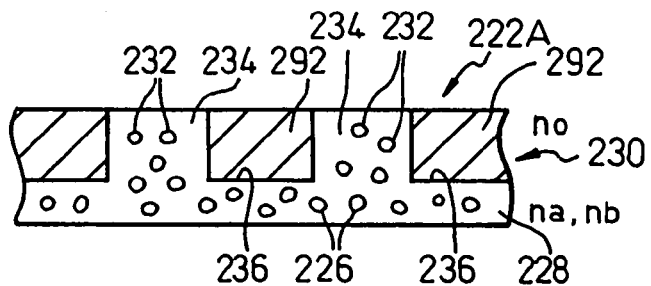

FIGS. 149A to 149E show still further example of the optical sheet of FIG. 148A. The optical sheet 222 shown in FIG. 149A is fabricated by further disposing a transparent material layer 292 on one of the sides of the diffusion portion 230 in such a fashion as to substantially fill the valley portions 236. In other words, the optical sheet 222A includes the base sheet portion 228 containing the scattering material particles 226, the diffusion portion 230 integrally joined to the base sheet portion 228 and having a plurality of projections 234 containing the scattering material particles 232 and the valley portions 236 formed between projections 234, and the transparent material layer 292 substantially filling the valley portions 236. In FIG. 149A, the transparent material layer 292 is shown formed to the same height as the tip of the projection 234. However, it is also possible to form the transparent material layer 292 to the thickness higher than the tip of the projections 234 so that the transparent material layer 292 completely covers the tips of the projections 234. The transparent material layer 292 is analogous to the transparent resin layers 264 and 265 shown in FIGS. 146 and 147. As the transparent material layer 292 is disposed, it buries the projections 234, and the optical sheet 22A having flat upper and lower surfaces can be obtained.

The projections are formed by scattering the scattering material particles 232 in the resin as the base material, and the transparent material layer 292 is made of the resin. Here, when the refractive index of the base material of the projections 234 is (n0) and that of the transparent material layer 292 is (n2), the materials can be selected to satisfy the relation n0=n2. In this way, total reflection does not occur on the interface between the projections 234 and the transparent material layer 292, and the scattered light is allowed to more easily leave from the projections 234 to the transparent material layer 292. Further, the materials can be selected so as to satisfy the relation n0<n2. In this way, probability of total reflection, on the surface of the projections 234, of the ray of light describing relatively small angles to the normal direction N among those traveling from the transparent material layer 292 to the projections 234 increases, and directivity becomes higher.

Figure 149B:
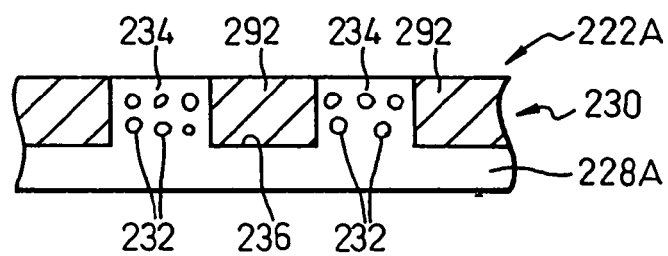

The optical sheet 222A shown in FIG. 149B is the same as the optical sheet 222A shown in FIG. 149A with the exception that the base sheet portion 228 containing the scattering material particles 226 is changed to the transparent base sheet portion 228A. The operation of this optical sheet 222A is the same as that of the optical sheet 222A shown in FIG. 149A.

Figure 149C:
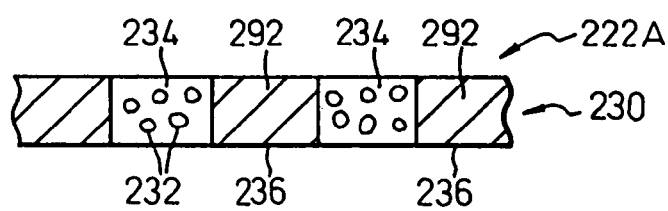

The optical sheet 222A shown in FIG. 149C has the diffusion portion 230 having a plurality of spaced apart projections 234 containing the scattering material particles 232 and the valley portions 236 formed between the projections 234, and the transparent material layer 292 substantially filling the valley portions 236. In this optical sheet 222A, the transparent material layer 292 serves as the support structure of the projections 234. In this optical sheet 222A, therefore, the base sheet portion 228 or 228A can be omitted in the same way as in FIG. 148C. The operation of this optical sheet 222A is the same as that of the optical sheet 222A shown in FIG. 149A.

Figure 149D:
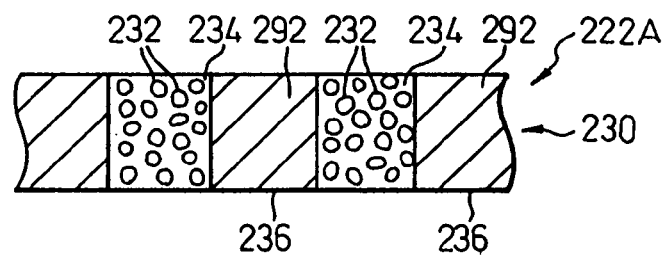

The optical sheet 222A shown in FIG. 149D is the same as the optical sheet 222A shown in FIG. 149C with the exception that the projection 234 comprises a group of a plurality of small scattering material particle 232 gathering together.

Figure 149E:
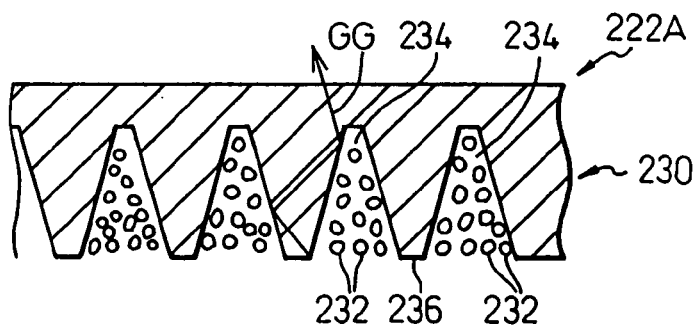

The optical sheet 222A shown in FIG. 149E is the same as the optical sheet 222A shown in FIG. 149C or 149D with the exception that the projections 234 have the inclined side surfaces. When this construction is employed, the angles of the ray of light totally reflected on the surfaces of the projections 234 become smaller whenever they are totally reflected as indicated by arrow G when the materials are so selected as to satisfy the relation n0<n2. In consequence, directivity becomes higher.

FIGS. 150A to 150E show still further examples of the optical sheet. The optical sheet 222B shown in FIG. 150A includes the diffusion portion 230 having a plurality of spaced apart projections 234 facing to one side and the valley portions 236 formed between the projections 234. A layer 294 having scattering property is disposed on the surface of the projection 234B. The protuberances 234B are integrally disposed with the base sheet portion 228B. The projections 234B in this example do not contain any scattering material particles such as the scattering material particles 232 of the projections 234 explained so far. However, the layer 294 having the scattering property and disposed on the projections 234B operate in the same way as the projections 234 containing the scattering material particles 232 of the foregoing embodiments.

Figure 150A:
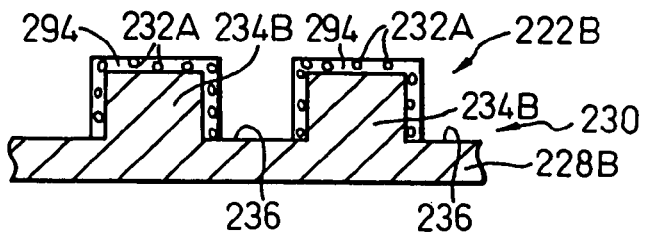
Figure 150B:
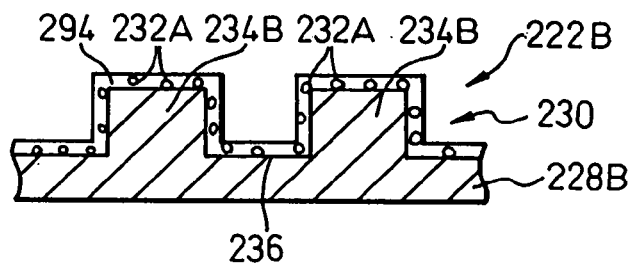

In the optical sheet 222B shown in FIG. 150B, the layer 294 having the scattering property covers the entire surface of the projections 234B and the valley portions 236. The operation of this optical sheet 222B is the same as the operation of the optical sheet 222B shown in FIG. 150A. The optical sheets 222B shown in FIGS. 150A and 150B can be produced by the steps of molding a resin containing no scatter material to obtain the diffusion portion 230 having the projections 234B and the valley portions 236, and applying the layer 294 having the scattering property onto the projections 234B or bonding a scatter sheet. Therefore, the production is easy.

Figure 150C:
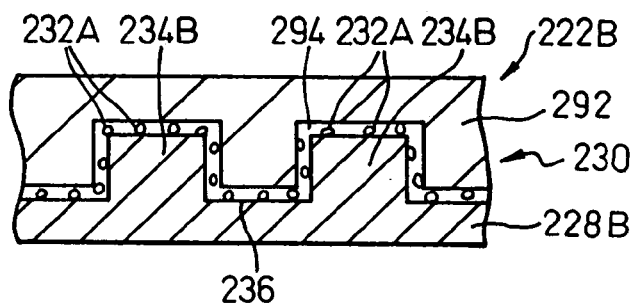

The optical sheet 222B shown in FIG. 150C is formed by adding a transparent material layer 292 for filling the valley portions 236 of the optical sheet 222B shown in FIG. 150B. This optical sheet 222B has the same operation as the optical sheet 222B shown in FIG. 150B and has the feature of the transparent material layer 292 explained with reference to FIGS. 149A to 149E.

Figure 150D:
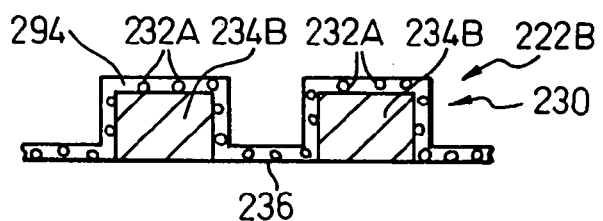

The optical sheet 222B shown in FIG. 150D is formed by adding a transparent material layer 294 having the scattering property on the projections 234B formed without the base sheet portion 228 in the same way as the projections 234 of the optical sheet 222B shown in FIG. 148B. This optical sheet 222B has the same operation as the optical sheet 222B shown in FIG. 150B.

Figure 150E:
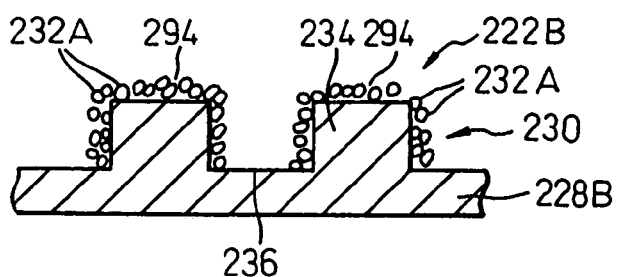

The optical sheet 222B shown in FIG. 150E is formed by adding a layer 294 having the scattering property on the projections 234B formed without the scatter material 232. The layer 294 having the scattering property contains the scattering material particles 232A. The scattering material particles 232A comprises a group of a plurality of small scattering material particles adhering to one another, in the same way as the scattering material particles 232 of the projections 234 shown in FIG. 148A.

FIG. 151 shows an example of the optical sheet 222 produced using a mesh. In the production of the optical sheet 222, the base sheet portion 228 is first formed on the acrylic substrate 238, and the diffusion portion 230 is then formed on the base sheet portion 228 using the mesh 40 (mesh No. 300). In this case, the ink 242 is applied under the condition where the mesh 240 is disposed on the base sheet portion 228, and the mesh 240 is left on the base sheet portion 228 even after the ink 242 is dried and cured. The ink is a transparent ink containing an acrylic resin as a base component, and beads having diameters of several microns as the scattering material particles 232. The filaments of the mesh 240 do not contain the scattering material particles. The ink 242 comprises a material having a refractive index different from the refractive index of the mesh 240. The portion of the ink 242 positioned between the filaments of the mesh 240 operates in the same way as the projection 234 shown in FIG. 119, and the filaments of the mesh 240 operate in the same way as the transparent material layer 292 shown in FIG. 149A.

As a modified example of the optical sheet 222 shown in FIG. 151, it is also possible to employ the construction in which the ink 242 does not contain the scattering material particles 232 but the filaments of the mesh 240 contain the scattering material particles 232. In this case, each filament of the mesh 240 operates as the projection 234, and the portion of the ink 242 positioned between the filaments of the mesh 240 operates in the same way as the transparent material layer 292 in FIG. 149A.

In the example shown in FIG. 151 and its modified example, the line width of the filament of the mesh 240 and the thickness of the mesh 240 preferably have the relation, {opening width/(line width+opening width)}≧10(%) and the relation, {thickness of mesh 240/(line width+opening width)} 40(%).

FIGS. 152A and 152B show another embodiment of the optical sheet 222. This optical sheet 222 includes the diffusion portion 230 having the projections 234 containing the scattering material particles 232 (see FIG. 119) and the valley portions 236. FIGS. 152A and 152B show a production process of this optical sheet 222. In FIG. 152A, the ink 242A is applied to the diffusion portion 230 having the projections 234. The ink 242A comprises scattering material particles 242B contained in a dispersion base material. The dispersion base material comprises a binder having an adhering action and a solvent. The amount of the binder is considerably small to such an extent as to be capable of fixing the scattering material particles 232A with one another. Since the scattering material particles 242B are heavier than the solvent, they are distributed along the surfaces of the projections 234 and the valley portions 236.

In FIG. 152B, the optical sheet 22 is turned upside down so that the applied ink 242A comes to the lower side of the diffusion portion 230, and the solvent is evaporated. The scattering material particles 242B positioned on the valley side 236 move along the surface of the valley portions 236 and travel to below the projections 234. As the solvent evaporates, the surface of the ink 242A comes close to the surface of the diffusion portion 230. As a result, the scattering material particles 242B are gathered together into a group of scattering material particles below the projections 234. In this way, the effect obtained is the same as when the height of the projections 234 having the scatter material 232 increases.

FIGS. 153A to 153C shows another embodiment of the optical sheet. In the optical sheets 222 and 222A of the foregoing embodiments, the projections 234 contain the scattering material particles 232, or the layer 294 having the scattering property is provided onto the projections 234B. The scattering material particles 232 or 232A make the refractive index of the projections 234 or 234B non-uniform and scatter the ray of light. Therefore, the projections 234 or 234B can be expressed as the portions having the non-uniform refractive index. Furthermore, the portions having the non-uniform refractive index do not always contain the scattering material particles 232 or 232A.

The optical sheet 222B shown in FIG. 153A includes a diffusion portions 230 having a plurality of spaced apart or periodically arranged portions 234C having non-uniform refractive index, and portions 296 having a uniform refractive index and positioned between the portions 234C having non-uniform refractive index. The portions 234C having the non-uniform refractive index can be arranged in the same way as the projections 234 or 234B in the previous embodiment. Since the refractive index in the portions 234C is non-uniform, the portions, 234C having the non-uniform refractive index operate in the same way as the projections 234 or 234B containing the scattering material particles 232 or 232A in the foregoing embodiments. Therefore, the operation of the optical sheet 222 shown in FIG. 153A is identical to the operation of the foregoing optical sheets 222 or 222A. Transparent sheets 298A and 298B are arranged on the optical sheet 222B on the upper and lower sides thereof.

FIG. 153B shows a production example of the optical sheet 222B shown in FIG. 153A. A transparent UV curable resin 296A is sandwiched between the transparent sheets 298A and 298B, and ultraviolet light is irradiated using a mask 300. The UV curable resin 296A is cured by the irradiation of the UV light, but the refractive index becomes non-uniform at the portions 234C to which the UV light is strongly irradiated through the open portions of the mask 300, and becomes uniform at other portions.

FIG. 153C shows another production example of the optical sheet 222B. A transparent UV curable resin 296A is sandwiched between transparent sheets 298A and 298B. While a sheet 302 having needle-like projections 302A presses the transparent sheet 298B to apply the stress to the UV curable resin 296A, the UV ray is irradiated from the side of the transparent sheet 298A. The UV curable resin 296A is cured by the irradiation of the UV ray. In this case, the refractive index becomes non-uniform at the portions to which the stress is applied and the UV ray is irradiated, and becomes uniform at other portions.

FIGS. 154 to 157D show the optical sheet according to the eighth embodiment of the present invention. FIG. 154 is a partial perspective view of the optical sheet, and FIG. 155 is a partial enlarged sectional view of the optical sheet of FIG. 154. The optical sheet 222C includes a diffusion portion 330 having a plurality of spaced apart wall members 304 having scattering property, and openings 306 formed between the wall members 304. The wall members 304 having the scattering property include scattering material particles 232. Two wall members 304 extend vertically in parallel with each other, and have the same height, and each opening 306 is formed between two wall members 304 and extends through the optical sheet 222C. In FIG. 154, the diffusion portion 330 is formed into a honeycomb structure, and each opening 306 is formed by four wall members 304 (two sets of opposing wall members 304). This optical sheet 222C can be used suitably while being placed on the light guide plate 216, for example, though this arrangement is not restrictive.

Each wall member 304 has first and second side surfaces 304a and 304b opposing each other. The wall member 304 is formed in such a fashion that the ray of light is substantially scatter-reflected by the first and second side surfaces 304a and 304b. In FIG. 155, the ray of light dd outgoing from the light guide plate 216 outgoes from the optical sheet 222C within a predetermined angle range a without impinging against the wall member 304 in the same way as the ray of light aa explained with reference to FIG. 119. The ray of light ee outgoing from the light guide plate 216 is made incident to the wall member 304 in the same way as the light bb explained with reference to FIG. 119, and the light made incident to the wall member 304 is scatter-reflected by the first and second side surfaces 304a and 304b. A part of the light thus scatter-reflected outgoes from the optical sheet at a relatively small angle to the normal direction NN, and the rest of the light is made incident to other wall member 304 at relatively large angles to the normal direction NN and further scatter-reflected, and outgoing of light and scatter-reflection are repeated. In this way, the light outgoing from the optical sheet 222C is provided with strong directivity in the normal direction NN.

If the light having relatively large angles to the normal direction NN transmit across and through the wall member 304, the effect of directivity is low, so the wall member 304 is preferably constructed to prevent the light from substantially transmitting across and through the wall member 304. To this end, the scattering material particles 232 of the wall members 304 are arranged in the highest possible density so that the light is substantially back scattered at the first and second side surfaces 304a and 304b. It is advisable to arrange a member permitting no passage of the ray of light or a core member reflecting the ray of light in the center of the wall member 304, and the scattering material particles 232 are arranged on both sides of this member.

FIG. 156 shows a modified example of the optical sheet of FIG. 154. The optical sheet 222C includes a diffusion portion 230 having a plurality of spaced apart wall members 304 having scattering property, and openings 306 formed between the wall members 304. The diffusion portion 230 further includes a plurality of beht sheets 310 that are bent into the shape of a folding screen, and each section extends between the bending positions of each bent sheet 310 serves as each wall member 304. The bent sheets 310 are arranged in parallel with one another, and an opening 306 is formed between the wall members 304 of two bent sheets 310.

The operation of this optical sheet 22C is the same as the operation of the optical sheet 222C shown in FIG. 154. In the optical sheet 222c shown in FIG. 156, the gap between two opposing wall members 304 is different between the X direction and the Y direction, and therefore, anisotropy can be imparted to the brightness distribution of the outgoing ray of light. Incidentally, the gap between the two projections 234 can be varied in the X direction and in the Y direction (or in the longitudinal direction and in the transverse direction) in all of the foregoing embodiments in the same way as in this embodiment. It is obvious from the principle of the present invention that a maze structure too, provides the same effect.

Figure 157A:
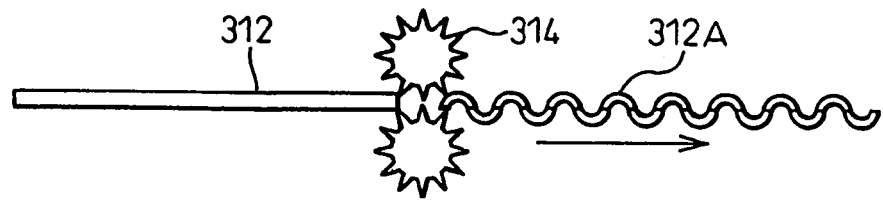
Figure 157B:
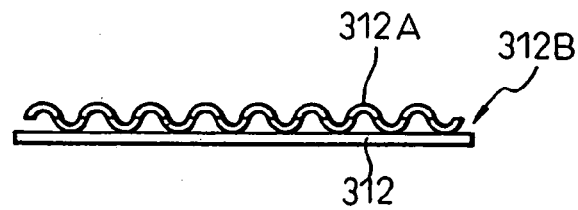
Figure 157C:
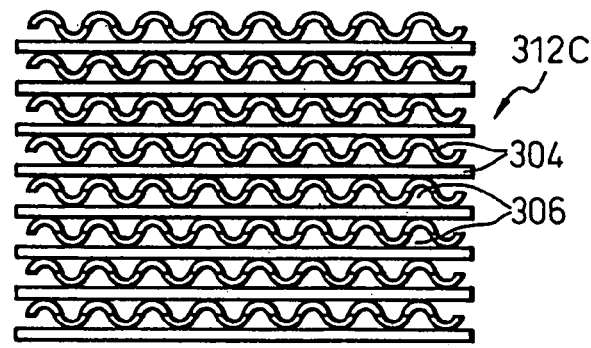
Figure 157D:
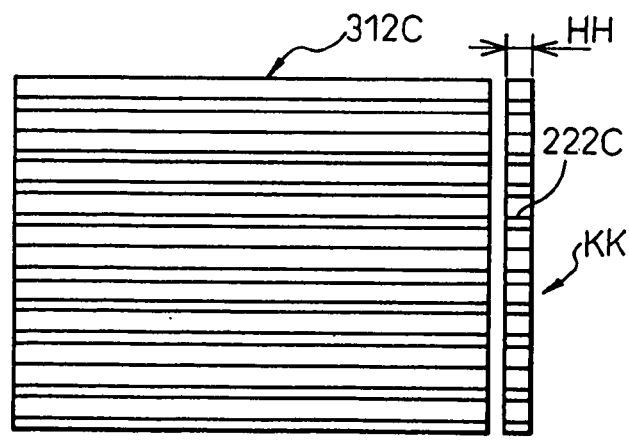

FIGS. 157A to 157D show another example of the optical sheet and its production method. In FIG. 157A, a scattering sheet 312 containing scattering material particles 232 is prepared, and the scattering sheet 312 is shaped into a corrugated sheet 312A using an embossing roller 314. In FIG. 157B, the flat scattering sheet 312 and the corrugated sheet 312A are bonded to obtain a laminate sheet 312B. In FIG. 157C, a large number of laminate sheets 312B are laminated to obtain a laminate sheet 312C. In FIG. 157D, the laminate sheet 312C is turned 90 degrees from the state shown in FIG. 157C, and is cut into a thickness HH in a plane perpendicular to the sheet of the drawing to obtain optical sheets 222C. The thickness HH corresponds to the height of the optical sheet 222c as viewed under the condition shown in FIG. 154. When the optical sheet 222C shown in FIG. 157D is viewed from the direction of arrow KK, it appears as shown in FIG. 157C. The optical sheet 222C has wall members 304 and openings 306.

FIG. 158 is a sectional view showing a backlight (illumination device) according to the ninth embodiment of the present invention. In this drawing, the backlight 270 includes a light guide plate (optical member) 272. FIG. 158 shows an example of the backlight including a thin light guide plate 272. Even though the light guide plate 272 is thin, the backlight can input a large quantity of light.

The light guide plate 272 comprises a flat sheet-like body having a light guide region 274 and a light turning region 276. The light guide region 274 and the light turning region 276 are formed as an optically continuous region. The light guide region 274 is a region substantially transparent to the ray of light having a predetermined wavelength, and the light turning region 276 is a region having a non-uniform refractive index. The light turning region 274 has a plurality of spaced apart portions having a non-uniform refractive index and extending along a first line which is not parallel to the flat sheet-like body, and portions having a uniform refractive index and positioned between the portions having the non-uniform refractive index.

The light guide region 274 is made of a transparent resin such as an acrylic resin in the same way as the conventional light guide plate. The light turning region 276 has a construction similar to that of the optical sheet 222 explained with reference to FIGS. 116 to 153C. In other words, the light turning region 276 has a base sheet portion 228X and a diffusion portion 230X. The diffusion portion 230X has projections 234X containing scattering material particles 232 (or portions 234C having a non-uniform refractive index). The scattering material particles 232 are omitted in FIG. 158. The projections 234X are arranged with gaps between them along a line parallel to the flat sheet-like body, and are inclined at a certain angle to that line. Incidentally, the base sheet portion 228X can be omitted in this embodiment in the same way as the examples of the optical sheet 22 explained above.

The backlight 270 further includes a light source 278 comprising a lamp 278A such as a cold-cathode fluorescent tube or a hot-cathode fluorescent tube and a reflector 278B. The light source is disposed on or near the light turning region 276 of the light guide plate 272, and the reflector 278B substantially encompasses the lamp 278A and the light turning region 276. The ray of light outgoing from the lamp 278A and the ray of light reflected by the reflector 278B are made incident to the light turning region 276. In the construction including the projections 234X containing the scattering material particles 232 in the same way as the optical sheet 222 of the foregoing embodiments, a part of the light outgoing from the valley portion between two projections 234X outgoes without contacting the projections 234X, and another part of the light is made incident to the projections 234X and is scattered. A part of the scattered light outgoing from the projection 234X outgoes without contacting the projections 234X, and another part of the scattered light is again made incident to the projections 234X and is scattered. In this way, the ray of light is provided with directivity in the extending direction of the projections 234X, and travels from the light turning region 276 to the light guide region 274. Even when the light guide plate 272 is very thin, the ray of light is efficiently inputted from the light source 278 into the light guide plate 272.

FIG. 159 shows a modified example of the backlight 270. This example is different from the example shown in FIG. 158 in that the light source 278 comprises an LED device 278C. In FIGS. 158 and 159, the base sheet portion 228X and the diffusion portion 230X are constituted into a unit, and the backlight can be fabricated by bringing this unit into optically close contact with the surface of the light guide plate 272 in the light turning region 276. Alternatively, the base sheet portion 228X, the diffusion portion 230X, and the transparent resin layer (refer to the resin layers 264 and 265 in FIG. 146) are constituted into a unit and this unit is brought into optically close contact with the end portion of the light guide region 274 of the light guide plate 272 to form the light turning region 276.

FIG. 160 shows a modified example of the backlight 270 shown in FIG. 158. In this example, the light turning region 276 comprises the diffusion portion 230 having the projections 234X containing the scattering material particles 232. The projections 234X are spaced apart from each other along a first line perpendicular to the flat sheet-like body, and are arranged perpendicularly to the first line. A reflecting mirror 280 is disposed at the end of the light turning region 276 on the side opposite to the light guide region 274. The projections 234X are formed as layers that are relatively elongated and have a large width. The transparent resin layers exist between the adjacent layers. The operation of this example is the same as that of the foregoing example. In the example shown in FIG. 160, the light source 278 comprises the lamp 278A. The example shown in FIG. 161 is the same as the example shown in FIG. 160, with the exception that the light source 278 comprises the LED device 278C.

FIG. 162 shows a still modified example of the backlight 270. This example is the same as the example shown in FIG. 158 with the exception that the base sheet portion 228X is disposed on the side near the light source 278. The operation of this example is the same as that of the foregoing example.

FIG. 163 shows a still another modified example of the backlight 270. The light source 278 is disposed by the side of the light guide plate 272 or, in other words, by the side of the light turning region 276. The outgoing light from the lamp 278A and the light reflected reflector 278B are made incident to the side surface, the upper surface and the lower surface of the light turning region 276. The operation of this example is the same as that of the foregoing example.

In FIGS. 158 to 163, the light source 278 is disposed on only one end side of the light guide plate 272 but light guides may be disposed on both end sides of the light guide plate 272. It is further possible to provide a light absorption member covering the end portions of the reflector 278B put on the flat sheet-like body and to prevent leak of the ray of light from the gap between the flat sheet-like body and the reflector 278B.

As explained above, the present invention can acquire an optical sheet and an illumination device which have a suitable brightness distribution such that the brightness is higher in the normal direction and progressively decreases with an increasing angle from the normal direction, and which can be economically produced. Further, the present invention can provide an optical member capable of inputting large quantities of light even when a light guide plate is thin.

FIG. 164 is a perspective view showing the notebook type personal computer including the light source device according to the tenth embodiment of the present invention. FIG. 165 is a perspective view showing the monitor including the light source device according to the similar embodiment of the present invention.

In FIG. 164, the notebook type personal computer 401 comprises a body 403 having a keyboard 402 and electronic circuits, and a display part 405 having a display device 404 such as a liquid crystal display device. The display part 405 has a light source device 418. The notebook type personal computer 401 of FIG. 164 includes one light source device 418, but it is possible to arrange two light source devices 418, as in the case of the monitor 406 of FIG. 165.

In FIG. 165, the monitor 406 comprises a body 408 having a display device 407 such as a liquid crystal display device and electronic circuits. The body 408 has light source devices 418. The monitor 406 of FIG. 165 includes two light source devices 418, but it is possible to arrange one light source device 418, as in the case of the notebook type personal computer 401 of FIG. 164.

FIG. 166 is a plan view of the light guide plate and the light source device of the display device of FIG. 164, and FIG. 167 is a sectional view of the light guide plate and the light source device of FIG. 166. In FIGS. 166 and 167, the display device 404 includes a liquid crystal display panel 412 and a backlight 414. The backlight 414 includes a light guide plate 416, the light source devices 418 arranged at either side of the light guide plate 416, a scattering reflection plate 420 arranged below the light guide plate 416, and a scattering plate 422 arranged above the light guide plate 416.

The light source device 418 comprises a discharge tube 424 and a reflector 426. A part of the ray of light outgoing from the discharge tube 424 is made directly incident to the light guide plate 416, and another part of the light outgoing from the discharge tube 424 is reflected by the reflector 426 to be made incident to the light guide plate 416. The light travels within the light guide plate 416, is reflected by the scattering reflection plate 420 to outgo from the light guide plate 416 toward the liquid crystal display panel 412, and is made incident to the liquid crystal display panel 412 after being scattered by the scattering plate 422. The liquid crystal display panel 412 forms an image, and the light supplied from the light source device 414 illuminates the image formed by the liquid crystal display panel 412, so that a viewer can see a bright image.

FIG. 168 is a sectional view showing the discharge tube 424, and FIG. 169 is a sectional view showing the light source device 414 including the discharge tube 424 and the reflector 426. FIG. 170 is a sectional view of the light source device 414, taken along the line VII-VII in FIG. 169. The discharge tube 424 comprises a cold-cathode tube called a fluorescent lamp electrodes 424A made of metal such as Ni or W are arranged on the ends of the discharge tube 424. Lean gas (such as Ar or Ne) and mercury 28 are inserted and sealed in the discharge tube 424, and a fluorescent material is coated on the inner surface of the discharge tube 424. The reflector 426 comprises an aluminum mirror, for example, and has a cross-sectional shape such a U-shape to cover the discharge tube 424.

Support members 425 are arranged on the discharge tube 424 near the electrodes 424A for supporting the discharge tube 424 to the reflector 426. The inner surface of the support member 425 is in close contact with the discharge tube 424, and the outer surface of the support member 425 is in close contact with the reflector 426. A portion of the electrode 424A is within the discharge tube 424, and another portion of the electrode 424A extends to the exterior of the discharge tube 424 through the end of the discharge tube 424 and the end of the support member 425.

The support member 425 is formed of a heat insulating structure so as to prevent a temperature drop of a portion of the discharge tube 424 near the electrode 424A. In this embodiment, the support member 425 is made of a material having high heat insulating property and high withstanding property to voltage. For example, the support member 425 is made of Aramid Paper (Nomex sheet of Dupont Corporation). The support member 425 can be made of glass wool.

In the structure in which the discharge tube 424 is supported to the reflector 426 by the support members 425, there is a tendency that heat of the discharge tube 424 is thermally conducted to the reflector 426 through the support members 425, and further from the reflector 426 to the housing of the display device, so that the temperature of a portion of the discharge tube 424 near the electrodes 424A may be reduced.

Generally, the operating life of the discharge tube 424 will end if the mercury contained in the discharge tube 424 is consumed. Consumption of mercury occurs in such a manner that gaseous mercury in the discharge tube 424 reacts with particles of metal of the electrodes 424A (for example, Ni) caused by sputtering with electrons and is adhered to the inner surface of the discharge tube 424. A sufficiently large amount of mercury is usually inserted in the discharge tube 424, and it takes much time for mercury to be consumed, and therefore, the operating life of the discharge tube 424 is guaranteed to some extent. However, there are several discharge tubes 424 among many discharge tubes 424 which may have had in an extremely shortened operating life. The object of this embodiment is to prevent the discharge tubes 424 from ending in a shortened operating life.

According to the inventor's study, a shortened operating life of the discharge tubes 424 can be caused in the following way. Conventional support members are made of silicone so as to withstand high voltage applied to the electrodes 424A. The temperature at the portion of the discharge tube 424 near the electrodes 424A is fundamentally higher than that at the other portion of the discharge tube 424 since much heat is generated at that portion, but in the structure in which the discharge tube 424 is supported to the reflector 426 by the silicone support members, heat of the discharge tube 424 is thermally conducted very much to the reflector 426 through the silicone support members since silicone has good heat conductivity, and the temperature of the portion of the discharge tube 424 near the electrodes 424A may be reduced to the lowest value. Therefore, liquid mercury is collected at the portion of the discharge tube 424 near the electrodes 424A where the temperature is lowest. If particles of metal of the electrodes 424A caused by sputtering are deposited on liquid mercury collected at the portion of the discharge tube 424 near the electrodes 424A, and produce a thin membrane on liquid mercury. This membrane prevents mercury from evaporating and the amount of gaseous mercury is decreased. The discharge tube 424 becomes dark in the activated condition if the amount of gaseous mercury is decreased, and the operating life thereof is shortened.

In this embodiment of the present invention, the support member 425 is formed of a heat insulating structure, so heat of the discharge tube 424 is thermally conducted less to the reflector 426 through the support members, and the temperature of the portion of the discharge tube 424 near the electrodes 4244 is not reduced to the lowest value. The temperature at the portion of the discharge tube 424 near the electrodes 424A is fundamentally higher than that at the other portion of the discharge tube 424 since much heat is generated at that portion, and the position at which the temperature becomes lowest in the discharge tube 424 is located to positioned shifted inwardly with respect to the region in which the support member 425 extends. Therefore, liquid mercury is not collected at the portion of the discharge tube 424 near the electrodes 424A.

On the other hand, metal of the electrodes 424A is sputtered with electrons during discharge and particles of metal of the electrodes 424A are deposited on the inner surface of the discharge tube 424. The region in which particles of metal of the electrodes 424A are deposited on the inner surface of the discharge tube 424 is restricted to the region within a restricted distance from the end of the electrode 424A. For example, in the case of the discharge tube 424 having the diameter of 5 mm, the region in which particles of metal of the electrodes 424A are deposited on the inner surface of the discharge tube 424 is the region within 10 mm from the end of the discharge tube 424 or within 5 mm from the end of the electrode 424A.

Liquid mercury is not collected in the region in which particles of metal of the electrodes 424A are deposited, so liquid mercury is not enclosed by particles of metal. Therefore, according to the present invention, most liquid mercury can continue to evaporate and the amount of gaseous mercury is not reduced, so the operating life of the discharge tube 424 is not shortened.

FIG. 171 is a sectional view of the light source device 418 including the discharge tube 424 and the reflector 426 according to a modified embodiment, and FIG. 172 is a sectional view of the support member of FIG. 171. Support members 425 are arranged on the discharge tube 424 near the electrodes 424A for supporting the discharge tube 424 to the reflector 426. The support member 425 is formed of a heat insulating structure so as to prevent a temperature drop of a portion of the discharge tube 424 near the electrode 424A. In this embodiment, the support member 425 is made of silicone, similar to a conventional support member, but the support member 425 has a hollow portion 425B to realize the heat insulating structure. The operation of this embodiment is similar to that of the previous embodiment.

FIG. 173 is a sectional view of the light source device 418 including the discharge tube 424 and the reflector 426 (reflector 426 is omitted in FIG. 173) according to a modified embodiment. In this embodiment, the discharge tube 424 is partially formed of a heat insulating structure so as to prevent a temperature drop of a portion of the discharge tube 424 near the electrode 424A of the discharge tube 424. In other words, the end portion of the discharge tube 424 is formed in a double-tube structure having an outer tube portion 424*o* and an inner tube portion 424*i*, so that a heat insulation part is provided between the outer tube portion 424*o* and the inner tube portion 424*i*. The support member 425 is arranged around the outer tube portion 424*o* and supports the discharge tube 424 to the reflector 426. The operation of this embodiment is similar to that of the previous embodiment.

FIG. 174 is a sectional view of the light source device 418 including the discharge tube 424 and the reflector 426 according to a modified embodiment. In this embodiment, the support members 425 are arranged at inward positions from ends of electrodes 424A of the discharge tube 424 so as to prevent a temperature drop of a portion of the discharge tube 424 near the electrode 424A of the discharge tube 424. As described above, the region in which particles of metal of the electrodes 424A are deposited on the inner surface of the discharge tube 424 is restricted to the region within a restricted distance from the end of the electrode 424A. The support members 425 are arranged on the outside of the region in which particles of metal of the electrodes 424A are deposited (i.e., inward positions).

In this case, the support members 425 are not necessarily made of a heat insulating material, and are made of silicone. Therefore, the temperature is lowest at the portion of the discharge tube 424 where the support members 425 are located due to the thermal conduction through the support members 425, as described above. However, the portion of the discharge tube 424 where the temperature is out of the region in which particles of metal of the electrodes 424A are deposited on the inner surface of the discharge tube 424, so liquid mercury is not enclosed by particles of metal. Therefore, according to the present invention, most liquid mercury can continue to evaporate and the amount of gaseous mercury is not reduced, so the operating life of the discharge tube 424 is not shortened.

FIG. 175 is a sectional view of the light source device 418 including the discharge tube 424 and the reflector 426 according to a modified embodiment. In this embodiment, the light source device 418 comprises support members 425 arranged at positions near electrodes 424A of the discharge tube 424 for supporting the discharge tube 424 to the reflector 426, and a heat conduction member 432 contacting a central portion of the discharge tube 424. The support members 425 are made of silicone. The heat conduction member 432 is made of silicone having good heat radiating property. Alternatively, it is possible to arrange fins on the heat conduction member 432 or to cool the heat conduction member 483 by cooling air blown by a fan.

The heat conduction member 432 also contacts the reflector 426 and releases heat of the central portion of the discharge tube 424 to the reflector 426, so that the temperature at the central portion of the discharge tube 424 is lowest. Therefore, liquid mercury is not collected a portion of the discharge tube 424 near the electrodes 424A, and liquid mercury is not enclosed by particles of metal. Therefore, according to the present invention, most liquid mercury can continue to evaporate and the amount of gaseous mercury is not reduced, so the operating life of the discharge tube 424 is not shortened.

Also, by producing a lowest temperature point at the central portion of the discharge tube 424, mercury evaporates mainly at the lower temperature portion and resultant gaseous mercury diffuses in the whole discharge tube 424. The diffused gaseous mercury also returns to the lower temperature portion. In this way, gaseous mercury is uniformly distributed in the whole discharge tube 424, and the temperature and the pressure of gaseous mercury are constant in the whole discharge tube 424. That is, it is possible to control the temperature of gaseous mercury, by producing lower temperature point. The brightness of the ray of light outgoing from the discharge tube 424 becomes maximum at the optimum concentration of gaseous mercury and the corresponding temperature in the discharge tube 424, and the brightness of the ray of light outgoing from the discharge tube 424 is lower than the maximum value if the concentration of gaseous mercury is higher or lower than the optimum concentration or the temperature in the discharge tube 424 is higher or lower than the maximum value. In the this embodiment, it is possible to acquire the maximum brightness of the light outgoing from the discharge tube 424, by by producing a lower temperature point in the discharge tube 424 to thereby setting the temperature in the discharge tube 424 at or near the optimum value.

As explained, according to these embodiment, it is possible to obtain a light source device having a discharge tube having a long operating life.

The invention claimed is:

1. A backlight comprising:
   a discharge tube containing mercury in which almost all liquid mercury except for an amount of gaseous mercury at a time of discharge is collected at a first position apart from an end of said discharge tube;
   a cooling device for cooling said first position of said discharge tube;
   a reflector for reflecting a ray of light radiated from said discharge tube and a light guide plate receiving the ray of light radiated from said discharge tube and the ray of light reflected by said reflector; and
   a width of the cooling device in a length direction of the discharge tube is not more than 7.5 times an inner diameter of the discharge tube.

2. A backlight according to claim 1,
   wherein said cooling device comprises a heat conduction member positioned to come into contact with said first position of said discharge tube, or positioned in the proximity of said first position of said discharge tube.

3. A backlight as set forth in claim 1, wherein a width of the cooling device in a length direction of the discharge tube is not less than an inner diameter of the discharge tube.

4. A backlight comprising:
   a discharge tube containing mercury in which almost all liquid mercury except for an amount of gaseous mercury at a time of discharge is collected at a first position apart from an end of said discharge tube;
   a cooling device for cooling said first position of said discharge tube; and
   a reflector for reflecting a ray of light radiated from said discharge tube and a light guide plate receiving the ray of light radiated from said discharge tube and the ray of light reflected by said reflector,
   wherein said discharge tube has electrodes at opposite ends thereof, and said first position is located within a range spaced apart by 10D or by at least 0.25L from a tip of said electrode at each end of said discharge tube, where an inner diameter of said discharge tube is D and a distance between the electrodes at opposite ends of said discharge tube is L.

5. A backlight according to claim 4, wherein said first position possesses a limited portion in said range or a whole portion in said range.

6. A backlight comprising:
   a discharge tube containing mercury in which almost all liquid mercury except for an amount of gaseous mercury at a time of discharge is collected at a first position apart from an end of said discharge tube;
   a cooling device for cooling said first position of said discharge tube; and
   a reflector for reflecting a ray of light radiated from said discharge tube and a light guide plate receiving the ray of light radiated from said discharge tube and the ray of light reflected by said reflector,
   wherein said mercury comprises mercury particles having a size of not greater than 0.2 mm, or said mercury soaks into a fluorescent material applied to an inner wall of said discharge tube.

7. A backlight comprising:
   a discharge tube containing mercury in which almost all liquid mercury except for an amount of gaseous mercury at a time of discharge is collected at a first position apart from an end of said discharge tube;
   a cooling device for cooling said first position of said discharge tube; and
   a reflector for reflecting a ray of light radiated from said discharge tube and a light guide plate receiving the ray of light radiated from said discharge tube and the ray of light reflected by said reflector,
   wherein said discharge tube contains a rare gas, and said rare gas does not contain argon.

8. A backlight according to claim 7, wherein electrodes of said discharge tube further comprise a carbon nanotube.

9. A backlight comprising:
   a discharge tube containing mercury in which almost all liquid mercury except for an amount of gaseous mercury at a time of discharge is collected at a first position apart from an end of said discharge tube; and
   a cooling device for cooling said first position of said discharge tube,
   wherein said discharge tube contains a rare gas, and said rare gas does not contain argon, and
   wherein said cooling device comprises a thermo-chromic material coming into contact with said discharge tube, or a transparent material containing a thermo-chromic material.

10. A backlight comprising:
    a discharge tube containing mercury in which almost all liquid mercury except for an amount of gaseous mercury at a time of discharge is collected at a first position apart from an end of said discharge tube;
    a cooling device for cooling said first position of said discharge tube; and
    a reflector for reflecting a ray of light radiated from said discharge tube and a light guide plate receiving the ray of light radiated from said discharge tube and the ray of light reflected by said reflector,
    wherein said cooling device includes a cooling capacity varying mechanism.

11. A backlight comprising:
    a discharge tube containing mercury in which almost all liquid mercury except for an amount of gaseous mercury at a time of discharge is collected at a first position apart from an end of said discharge tube; and
    a cooling device for cooling said first position of said discharge tube,
    wherein said cooling device includes a movable heat conduction member.

* * * * *

UNITED STATES PATENT AND TRADEMARK OFFICE
CERTIFICATE OF CORRECTION

PATENT NO.         : 7,309,146 B2
APPLICATION NO.    : 11/100136
DATED              : December 18, 2007
INVENTOR(S)        : Keiji Hayashi et al.

It is certified that error appears in the above-identified patent and that said Letters Patent is hereby corrected as shown below:

On the Title Page

Under Item "[75] Inventors:" the following names should be deleted:

"Akio Sotokawa, Kawasaki (JP)
Seiji Hachisuka, Kawasaki (JP)"

Signed and Sealed this

Sixth Day of October, 2009

David J. Kappos
*Director of the United States Patent and Trademark Office*